(12) United States Patent
Danesh

(10) Patent No.: US 12,352,405 B2
(45) Date of Patent: Jul. 8, 2025

(54) ADJUSTABLE ELECTRICAL APPARATUS WITH HANGAR BARS FOR INSTALLATION IN A BUILDING

(71) Applicant: DMF, Inc., Carson, CA (US)

(72) Inventor: Michael D. Danesh, Carson, CA (US)

(73) Assignee: DMF, Inc., Carson, CA (US)

( * ) Notice: Subject to any disclaimer, the term of this patent is extended or adjusted under 35 U.S.C. 154(b) by 0 days.

(21) Appl. No.: 18/501,219

(22) Filed: Nov. 3, 2023

(65) Prior Publication Data
US 2024/0344675 A1    Oct. 17, 2024

Related U.S. Application Data

(63) Continuation of application No. 17/677,300, filed on Feb. 22, 2022, now Pat. No. 11,808,430, which is a
(Continued)

(51) Int. Cl.
*F21S 8/02* (2006.01)
*F21V 15/01* (2006.01)
(Continued)

(52) U.S. Cl.
CPC ............... *F21S 8/02* (2013.01); *F21V 15/01* (2013.01); *F21V 21/048* (2013.01);
(Continued)

(58) Field of Classification Search
CPC .......... F21S 8/02; F21V 15/01; F21V 21/048; F21V 23/003; F21V 17/12; F21V 21/14;
(Continued)

(56) References Cited

U.S. PATENT DOCUMENTS

| 1,133,535 A | 3/1915 | Cain et al. |
| 1,454,722 A | 5/1923 | Leo |

(Continued)

FOREIGN PATENT DOCUMENTS

| CA | 2243934 C | 6/2002 |
| CA | 2502637 A1 | 9/2005 |

(Continued)

OTHER PUBLICATIONS

2006 International Building Code, Section 712 Penetrations, Jan. 2006, 4 pages.
(Continued)

*Primary Examiner* — Bao Q Truong
(74) *Attorney, Agent, or Firm* — Smith Baluch LLP

(57) ABSTRACT

A junction box having a cavity to contain electrical wires that provide a connection to a building mains voltage from an electrical system of a building is coupled to a plurality of telescoping hanger bars to hold the junction box in a wall or ceiling in the building. Each telescoping hanger bar is extendible and/or retractable to vary a length of the hanger bar. A position of the junction box is adjustable along the length of each telescoping hanger bar. In one example, the apparatus does not include a can, separate from the junction box, to contain a lighting device of a recessed lighting assembly.

20 Claims, 79 Drawing Sheets

Related U.S. Application Data continuation of application No. 17/234,421, filed on Apr. 19, 2021, now Pat. No. 11,255,497, which is a continuation of application No. 17/000,702, filed on Aug. 24, 2020, now Pat. No. 10,982,829, which is a continuation of application No. 15/901,738, filed on Feb. 21, 2018, now Pat. No. 10,753,558, which is a continuation-in-part of application No. 15/167,682, filed on May 27, 2016, now Pat. No. 10,591,120, and a continuation-in-part of application No. 15/132,875, filed on Apr. 19, 2016, now Pat. No. 10,563,850, and a continuation-in-part of application No. 14/942,937, filed on Nov. 16, 2015, now Pat. No. 10,551,044, and a continuation-in-part of application No. 14/184,601, filed on Feb. 19, 2014, now Pat. No. 9,964,266, and a continuation-in-part of application No. 14/183,424, filed on Feb. 18, 2014, now Pat. No. 10,139,059.

(60) Provisional application No. 62/168,510, filed on May 29, 2015, provisional application No. 62/151,308, filed on Apr. 22, 2015, provisional application No. 61/843,278, filed on Jul. 5, 2013.

(51) Int. Cl.

| | |
|---|---|
| *F21V 21/04* | (2006.01) |
| *F21V 23/00* | (2015.01) |
| *H02G 3/08* | (2006.01) |
| *H02G 3/20* | (2006.01) |
| *F21V 17/12* | (2006.01) |
| *F21V 21/14* | (2006.01) |
| *F21Y 115/10* | (2016.01) |
| *F21Y 115/15* | (2016.01) |

(52) U.S. Cl.
CPC ............ *F21V 23/003* (2013.01); *H02G 3/08* (2013.01); *H02G 3/20* (2013.01); *F21V 17/12* (2013.01); *F21V 21/14* (2013.01); *F21Y 2115/10* (2016.08); *F21Y 2115/15* (2016.08)

(58) Field of Classification Search
CPC ........ H02G 3/08; H02G 3/20; F21Y 2115/10; F21Y 2115/15
See application file for complete search history.

(56) References Cited

U.S. PATENT DOCUMENTS

| | | | |
|---|---|---|---|
| 1,471,340 A | 10/1923 | Knight | |
| 1,856,356 A | 5/1932 | Owen | |
| 2,038,784 A | 4/1936 | Ghadiali | |
| 2,179,161 A | 11/1939 | Rambusch | |
| 2,197,737 A | 4/1940 | Appleton | |
| 2,352,913 A | 7/1944 | Morrill | |
| 2,528,989 A | 11/1950 | Ammells | |
| 2,597,595 A | 5/1952 | Ordas | |
| 2,642,246 A | 6/1953 | Larry | |
| 2,670,919 A | 3/1954 | Vincent | |
| 2,697,535 A | 12/1954 | Olson | |
| 2,758,810 A | 8/1956 | Good | |
| D180,844 S | 8/1957 | Poliakoff | |
| 2,802,933 A | 8/1957 | Broadwin | |
| 2,809,002 A | 10/1957 | Rudolph | |
| 2,998,512 A | 8/1961 | Duchene et al. | |
| 3,023,920 A | 3/1962 | Cook et al. | |
| 3,057,993 A | 10/1962 | Gellert | |
| 3,104,087 A | 9/1963 | Joseph et al. | |
| 3,214,126 A | 10/1965 | Roos | |
| 3,422,261 A | 1/1969 | McGinty | |
| 3,460,299 A | 8/1969 | Wilson | |
| 3,650,046 A | 3/1972 | Skinner | |
| 3,675,807 A | 7/1972 | Lund et al. | |
| 3,700,885 A | 10/1972 | Bobrick | |
| 3,711,053 A | 1/1973 | Drake | |
| D227,989 S | 7/1973 | Geisel | |
| 3,773,968 A | 11/1973 | Copp | |
| 3,812,342 A | 5/1974 | Mcnamara | |
| 3,836,766 A | 9/1974 | Auerbach | |
| 3,874,035 A | 4/1975 | Schuplin | |
| 3,913,773 A | 10/1975 | Copp et al. | |
| D245,905 S | 9/1977 | Taylor | |
| 4,050,603 A | 9/1977 | Harris et al. | |
| 4,062,512 A | 12/1977 | Arnold | |
| 4,088,827 A | 5/1978 | Kohaut | |
| 4,176,758 A | 12/1979 | Glick | |
| 4,280,169 A | 7/1981 | Allen | |
| D267,694 S | 1/1983 | Moriarty et al. | |
| D267,695 S | 1/1983 | Paquette et al. | |
| D267,775 S | 2/1983 | Holcombe | |
| 4,399,497 A | 8/1983 | Druffel | |
| 4,450,512 A | 5/1984 | Kristofek | |
| 4,460,948 A | 7/1984 | Malola | |
| 4,520,435 A | 5/1985 | Baldwin | |
| 4,539,629 A | 9/1985 | Poppenheimer | |
| 4,601,145 A | 7/1986 | Wilcox | |
| 4,667,840 A | 5/1987 | Lindsey | |
| 4,723,747 A | 2/1988 | Karp et al. | |
| 4,729,080 A | 3/1988 | Fremont et al. | |
| 4,733,339 A | 3/1988 | Kelsall | |
| 4,754,377 A | 6/1988 | Wenman | |
| 4,770,311 A | 9/1988 | Wang | |
| 4,880,128 A | 11/1989 | Jorgensen | |
| 4,910,651 A | 3/1990 | Montanez | |
| 4,919,292 A | 4/1990 | Hsu | |
| 4,929,187 A | 5/1990 | Hudson et al. | |
| 4,930,054 A | 5/1990 | Krebs | |
| 5,044,582 A | 9/1991 | Walters | |
| D326,537 S | 5/1992 | Gattari | |
| 5,216,203 A | 6/1993 | Gower | |
| 5,222,800 A | 6/1993 | Chan et al. | |
| 5,239,132 A | 8/1993 | Bartow | |
| 5,250,269 A | 10/1993 | Langer et al. | |
| D340,856 S | 11/1993 | McHugh | |
| D341,819 S | 11/1993 | Carlstrom | |
| 5,266,050 A | 11/1993 | O'Neil et al. | |
| 5,291,381 A | 3/1994 | Price | |
| 5,303,894 A | 4/1994 | Deschamps et al. | |
| 5,382,752 A | 1/1995 | Reyhan et al. | |
| 5,420,376 A | 5/1995 | Rajecki et al. | |
| 5,465,199 A | 11/1995 | Bray et al. | |
| D365,165 S | 12/1995 | Stultz | |
| 5,505,419 A | 4/1996 | Gabrius | |
| 5,544,870 A | 8/1996 | Kelley et al. | |
| 5,560,101 A | 10/1996 | Sandell | |
| 5,562,343 A | 10/1996 | Chan et al. | |
| 5,571,993 A | 11/1996 | Jones et al. | |
| 5,580,158 A | 12/1996 | Aubrey et al. | |
| 5,588,737 A | 12/1996 | Kusmer | |
| 5,603,424 A | 2/1997 | Bordwell et al. | |
| 5,609,408 A | 3/1997 | Targetti | |
| 5,613,338 A | 3/1997 | Esposito | |
| D381,111 S | 7/1997 | Lecluze | |
| 5,662,413 A | 9/1997 | Akiyama et al. | |
| D386,277 S | 11/1997 | Lecluze | |
| 5,690,423 A | 11/1997 | Hentz et al. | |
| D387,466 S | 12/1997 | Lecluze | |
| 5,738,436 A | 4/1998 | Cummings et al. | |
| 5,778,625 A | 7/1998 | Druffel et al. | |
| 5,836,678 A | 11/1998 | Wright et al. | |
| 5,942,726 A | 8/1999 | Reiker | |
| 5,944,412 A | 8/1999 | Janos et al. | |
| 5,957,573 A * | 9/1999 | Wedekind | F21V 27/00 |
| | | | 362/147 |
| 6,030,102 A | 2/2000 | Gromotka | |
| 6,033,098 A | 3/2000 | Hentz et al. | |
| 6,076,788 A | 6/2000 | Akiyama | |
| 6,082,878 A | 7/2000 | Doubek et al. | |
| 6,095,669 A * | 8/2000 | Cho | F21S 8/026 |
| | | | 362/147 |
| 6,098,945 A | 8/2000 | Korcz | |
| 6,105,334 A | 8/2000 | Monson et al. | |

(56) References Cited

U.S. PATENT DOCUMENTS

| | | |
|---|---|---|
| 6,161,910 A | 12/2000 | Reisenauer et al. |
| 6,170,685 B1 | 1/2001 | Currier |
| 6,174,076 B1 | 1/2001 | Petrakis et al. |
| 6,176,599 B1 | 1/2001 | Farzen |
| 6,267,491 B1 | 7/2001 | Parrigin |
| 6,332,597 B1 | 12/2001 | Korcz et al. |
| 6,350,043 B1 | 2/2002 | Gloisten |
| 6,350,046 B1 | 2/2002 | Lau |
| 6,364,511 B1 | 4/2002 | Cohen |
| 6,375,338 B1 | 4/2002 | Cummings et al. |
| 6,402,112 B1 | 6/2002 | Thomas et al. |
| 6,423,899 B1 | 7/2002 | Reiker |
| D461,455 S | 8/2002 | Forbes |
| 6,461,016 B1 * | 10/2002 | Jamison ............... F21V 21/048 362/147 |
| 6,474,846 B1 | 11/2002 | Kelmelis et al. |
| 6,491,270 B1 | 12/2002 | Pfaller |
| 6,491,413 B1 | 12/2002 | Benesohn |
| D468,697 S | 1/2003 | Straub, Jr. |
| D470,970 S | 2/2003 | Huang |
| 6,515,313 B1 | 2/2003 | Ibbetson et al. |
| 6,521,833 B1 | 2/2003 | DeFreitas |
| D471,657 S | 3/2003 | Huang |
| 6,583,573 B2 | 6/2003 | Bierman |
| 6,585,389 B2 | 7/2003 | Bonazzi |
| 6,600,175 B1 | 7/2003 | Baretz et al. |
| D478,872 S | 8/2003 | Heggem |
| 6,632,006 B1 | 10/2003 | Rippel et al. |
| 6,657,236 B1 | 12/2003 | Thibeault et al. |
| 6,666,419 B1 | 12/2003 | Vrame |
| D488,583 S | 4/2004 | Benghozi |
| 6,719,438 B2 | 4/2004 | Sevack et al. |
| 6,758,578 B1 | 7/2004 | Chou |
| 6,777,615 B1 | 8/2004 | Gretz |
| 6,779,908 B1 | 8/2004 | Ng |
| 6,827,229 B2 | 12/2004 | Dinh et al. |
| 6,827,471 B1 | 12/2004 | Benghozi |
| 6,838,618 B2 | 1/2005 | Newbold et al. |
| 6,889,943 B2 | 5/2005 | Dinh et al. |
| 6,906,352 B2 | 6/2005 | Edmond et al. |
| D509,314 S | 9/2005 | Rashidi |
| 6,948,829 B2 | 9/2005 | Verdes et al. |
| 6,958,497 B2 | 10/2005 | Emerson et al. |
| 6,964,501 B2 | 11/2005 | Ryan |
| 6,967,284 B1 | 11/2005 | Gretz |
| D516,235 S | 2/2006 | Rashidi |
| 7,025,477 B2 | 4/2006 | Blessing |
| 7,064,269 B2 | 6/2006 | Smith |
| D528,673 S | 9/2006 | Maxik et al. |
| 7,102,172 B2 | 9/2006 | Lynch |
| D531,740 S | 11/2006 | Maxik |
| D532,532 S | 11/2006 | Maxik |
| 7,148,420 B1 | 12/2006 | Johnson et al. |
| 7,148,632 B2 | 12/2006 | Berman et al. |
| 7,154,040 B2 | 12/2006 | Tompkins |
| 7,170,015 B1 | 1/2007 | Roesch et al. |
| D536,349 S | 2/2007 | Humber et al. |
| D537,039 S | 2/2007 | Pincek |
| D539,229 S | 3/2007 | Murphey |
| 7,186,008 B2 | 3/2007 | Patti |
| 7,190,126 B1 | 3/2007 | Paton |
| 7,211,833 B2 | 5/2007 | Slater, Jr. et al. |
| 7,213,940 B1 | 5/2007 | Van De Ven et al. |
| 7,234,674 B2 | 6/2007 | Rippel et al. |
| D547,889 S | 7/2007 | Huang |
| D552,969 S | 10/2007 | Bobrowski et al. |
| D553,267 S | 10/2007 | Yuen |
| D555,106 S | 11/2007 | Pape et al. |
| D556,144 S | 11/2007 | Dinh |
| 7,297,870 B1 | 11/2007 | Sartini |
| 7,312,474 B2 | 12/2007 | Emerson et al. |
| 7,320,536 B2 | 1/2008 | Petrakis et al. |
| D561,372 S | 2/2008 | Yan |
| D561,373 S | 2/2008 | Yan |
| 7,335,920 B2 | 2/2008 | Denbaars et al. |
| D563,896 S | 3/2008 | Greenslate |
| 7,347,580 B2 | 3/2008 | Blackman et al. |
| D570,012 S | 5/2008 | Huang |
| 7,374,308 B2 | 5/2008 | Sevack et al. |
| D570,504 S | 6/2008 | Maxik et al. |
| D570,505 S | 6/2008 | Maxik et al. |
| 7,399,104 B2 | 7/2008 | Rappaport |
| 7,413,156 B1 | 8/2008 | Cho |
| 7,429,025 B1 | 9/2008 | Gretz |
| D578,677 S | 10/2008 | Huang |
| 7,431,482 B1 | 10/2008 | Morgan et al. |
| 7,432,440 B2 | 10/2008 | Hull et al. |
| 7,442,883 B2 | 10/2008 | Jolly et al. |
| 7,446,345 B2 | 11/2008 | Emerson et al. |
| 7,470,048 B2 | 12/2008 | Wu |
| 7,473,005 B2 | 1/2009 | O'Brien |
| 7,488,097 B2 | 2/2009 | Reisenauer et al. |
| 7,494,258 B2 | 2/2009 | McNaught |
| 7,503,145 B2 | 3/2009 | Newbold et al. |
| 7,510,159 B2 | 3/2009 | Rippel |
| 7,524,089 B2 | 4/2009 | Park |
| D591,894 S | 5/2009 | Flank |
| D592,945 S | 5/2009 | Mahan |
| 7,534,989 B2 | 5/2009 | Suehara et al. |
| D596,154 S | 7/2009 | Rivkin |
| 7,566,154 B2 | 7/2009 | Gloisten et al. |
| D599,040 S | 8/2009 | Alexander et al. |
| D600,836 S | 9/2009 | Hanley et al. |
| 7,588,359 B2 | 9/2009 | Coushaine et al. |
| 7,592,583 B2 | 9/2009 | Page et al. |
| D606,696 S | 12/2009 | Chen et al. |
| 7,625,105 B1 | 12/2009 | Johnson |
| 7,628,513 B2 | 12/2009 | Chiu |
| 7,651,238 B2 | 1/2010 | O'Brien |
| 7,654,705 B2 | 2/2010 | Czech et al. |
| D611,650 S | 3/2010 | Broekhoff |
| 7,670,021 B2 | 3/2010 | Chou |
| 7,673,841 B2 | 3/2010 | Wronski |
| 7,677,766 B2 | 3/2010 | Boyer |
| D613,444 S | 4/2010 | Rashidi |
| 7,692,182 B2 | 4/2010 | Bergmann et al. |
| 7,699,283 B2 | 4/2010 | Vrame |
| 7,704,763 B2 | 4/2010 | Fujii et al. |
| D616,118 S | 5/2010 | Thomas et al. |
| 7,712,922 B2 | 5/2010 | Hacker et al. |
| 7,722,208 B1 | 5/2010 | Dupre et al. |
| 7,722,227 B2 | 5/2010 | Zhang et al. |
| 7,735,795 B2 | 6/2010 | Wronski |
| 7,735,798 B2 | 6/2010 | Kojima |
| 7,748,887 B2 | 7/2010 | Zampini, II et al. |
| 7,766,518 B2 | 8/2010 | Piepgras et al. |
| 7,769,192 B2 | 8/2010 | Takagi et al. |
| 7,771,082 B2 | 8/2010 | Peng |
| 7,771,094 B2 | 8/2010 | Goode |
| 7,784,754 B2 | 8/2010 | Nevers et al. |
| D624,691 S | 9/2010 | Zhang et al. |
| D624,692 S | 9/2010 | Mackin et al. |
| D625,847 S | 10/2010 | Maglica |
| D625,876 S | 10/2010 | Chen et al. |
| 7,810,775 B2 | 10/2010 | Ponte et al. |
| D627,507 S | 11/2010 | Lai et al. |
| D627,727 S | 11/2010 | Alexander et al. |
| 7,828,465 B2 | 11/2010 | Roberge et al. |
| D629,366 S | 12/2010 | Ericson et al. |
| 7,845,393 B2 | 12/2010 | Kao et al. |
| 7,857,275 B2 | 12/2010 | de la Borbolla |
| 7,871,184 B2 | 1/2011 | Peng |
| 7,874,539 B2 | 1/2011 | Wright et al. |
| 7,874,703 B2 | 1/2011 | Shastry et al. |
| 7,874,709 B1 | 1/2011 | Beadle |
| D633,224 S | 2/2011 | Lee |
| 7,909,487 B1 | 3/2011 | Venetucci et al. |
| D636,117 S | 4/2011 | Kim et al. |
| D636,118 S | 4/2011 | Kim et al. |
| D636,903 S | 4/2011 | Torenbeek |
| D637,339 S | 5/2011 | Hasan et al. |
| D637,340 S | 5/2011 | Hasan et al. |
| 7,950,832 B2 | 5/2011 | Tanaka et al. |
| D639,499 S | 6/2011 | Choi et al. |

(56) References Cited

U.S. PATENT DOCUMENTS

| | | | |
|---|---|---|---|
| D640,819 S | 6/2011 | Pan |
| 7,956,546 B2 | 6/2011 | Hasnain |
| 7,959,332 B2 | 6/2011 | Tickner et al. |
| 7,967,480 B2 | 6/2011 | Pickard et al. |
| D642,317 S | 7/2011 | Rashidi |
| 7,972,035 B2 | 7/2011 | Boyer |
| 7,972,043 B2 | 7/2011 | Schutte |
| D642,536 S | 8/2011 | Robinson |
| D643,970 S | 8/2011 | Kim et al. |
| 7,993,037 B1 | 8/2011 | Buse |
| 8,002,425 B2 | 8/2011 | Russo et al. |
| D646,011 S | 9/2011 | Rashidi |
| 8,013,243 B2 | 9/2011 | Korcz et al. |
| 8,038,113 B2 | 10/2011 | Fryzek et al. |
| D648,476 S | 11/2011 | Choi et al. |
| D648,477 S | 11/2011 | Kim et al. |
| D650,115 S | 12/2011 | Kim et al. |
| 8,070,328 B1 | 12/2011 | Knoble et al. |
| 8,096,670 B2 | 1/2012 | Trott |
| D654,205 S | 2/2012 | Rashidi |
| D655,436 S | 3/2012 | Johnson |
| D656,262 S | 3/2012 | Yoshinobu et al. |
| D656,263 S | 3/2012 | Ogawa et al. |
| 8,142,057 B2 | 3/2012 | Roos et al. |
| 8,152,334 B2 | 4/2012 | Krogman |
| D658,788 S | 5/2012 | Dudik et al. |
| D658,802 S | 5/2012 | Chen |
| D659,862 S | 5/2012 | Tsai |
| D659,879 S | 5/2012 | Rashidi |
| D660,814 S | 5/2012 | Wilson |
| 8,177,176 B2 | 5/2012 | Nguyen et al. |
| 8,182,116 B2 | 5/2012 | Zhang et al. |
| 8,201,968 B2 | 6/2012 | Maxik et al. |
| D663,058 S | 7/2012 | Pan |
| D663,466 S | 7/2012 | Rashidi |
| D664,274 S | 7/2012 | de Visser et al. |
| D664,705 S | 7/2012 | Kong et al. |
| 8,215,805 B2 | 7/2012 | Cogliano et al. |
| 8,220,970 B1 | 7/2012 | Khazi et al. |
| 8,226,270 B2 | 7/2012 | Yamamoto et al. |
| 8,235,549 B2 | 8/2012 | Gingrich, III et al. |
| 8,240,630 B2 | 8/2012 | Wronski |
| D667,155 S | 9/2012 | Rashidi |
| 8,262,255 B1 | 9/2012 | Rashidi |
| D668,372 S | 10/2012 | Renshaw et al. |
| D668,809 S | 10/2012 | Rashidi |
| D669,198 S | 10/2012 | Qiu |
| D669,199 S | 10/2012 | Chuang |
| D669,620 S | 10/2012 | Rashidi |
| 8,277,090 B2 | 10/2012 | Fryzek et al. |
| D671,668 S | 11/2012 | Rowlette, Jr. et al. |
| 8,308,322 B2 | 11/2012 | Santiago et al. |
| D672,899 S | 12/2012 | Van de Ven et al. |
| D673,869 S | 1/2013 | Yu |
| D676,263 S | 2/2013 | Birke |
| D676,814 S | 2/2013 | Paul |
| 8,376,593 B2 | 2/2013 | Bazydola et al. |
| D677,417 S | 3/2013 | Rashidi |
| D677,634 S | 3/2013 | Korcz et al. |
| D679,044 S | 3/2013 | Jeswani et al. |
| D679,047 S | 3/2013 | Tickner et al. |
| 8,403,289 B1 | 3/2013 | Rinderer |
| 8,403,533 B1 | 3/2013 | Paulsel |
| 8,403,541 B1 | 3/2013 | Rashidi |
| 8,405,947 B1 | 3/2013 | Green et al. |
| D681,259 S | 4/2013 | Kong |
| 8,408,759 B1 | 4/2013 | Rashidi |
| D682,459 S | 5/2013 | Gordin et al. |
| D683,063 S | 5/2013 | Lopez et al. |
| D683,890 S | 6/2013 | Lopez et al. |
| D684,269 S | 6/2013 | Wang et al. |
| D684,287 S | 6/2013 | Rashidi |
| D684,719 S | 6/2013 | Rashidi |
| D685,118 S | 6/2013 | Rashidi |
| D685,120 S | 6/2013 | Rashidi |
| 8,454,204 B1 | 6/2013 | Chang et al. |
| D685,507 S | 7/2013 | Sun |
| D687,586 S | 8/2013 | Rashidi |
| D687,587 S | 8/2013 | Rashidi |
| D687,588 S | 8/2013 | Rashidi |
| D687,980 S | 8/2013 | Gravely et al. |
| D688,405 S | 8/2013 | Kim et al. |
| 8,506,127 B2 | 8/2013 | Russello et al. |
| 8,506,134 B2 | 8/2013 | Wilson et al. |
| D690,049 S | 9/2013 | Rashidi |
| D690,864 S | 10/2013 | Rashidi |
| D690,865 S | 10/2013 | Rashidi |
| D690,866 S | 10/2013 | Rashidi |
| D691,314 S | 10/2013 | Rashidi |
| D691,315 S | 10/2013 | Samson |
| D691,763 S | 10/2013 | Hand et al. |
| 8,550,669 B2 | 10/2013 | Macwan et al. |
| D693,043 S | 11/2013 | Schmalfuss et al. |
| D693,517 S | 11/2013 | Davis |
| D694,456 S | 11/2013 | Rowlette, Jr. et al. |
| 8,573,816 B2 | 11/2013 | Negley et al. |
| D695,441 S | 12/2013 | Lui et al. |
| D695,941 S | 12/2013 | Rashidi |
| D696,446 S | 12/2013 | Huh |
| D696,447 S | 12/2013 | Huh |
| D696,448 S | 12/2013 | Huh |
| 8,602,601 B2 | 12/2013 | Khazi et al. |
| D698,067 S | 1/2014 | Rashidi |
| D698,068 S | 1/2014 | Rashidi |
| 8,622,361 B2 | 1/2014 | Wronski |
| 8,632,040 B2 | 1/2014 | Mass et al. |
| D698,985 S | 2/2014 | Lopez et al. |
| D699,384 S | 2/2014 | Rashidi |
| D699,687 S | 2/2014 | Baldwin et al. |
| D700,387 S | 2/2014 | Snell |
| 8,641,243 B1 | 2/2014 | Rashidi |
| 8,651,705 B2 | 2/2014 | Wilcox |
| 8,659,034 B2 | 2/2014 | Baretz et al. |
| D700,991 S | 3/2014 | Johnson et al. |
| D701,175 S | 3/2014 | Baldwin et al. |
| D701,466 S | 3/2014 | Clifford et al. |
| 8,672,518 B2 | 3/2014 | Boomgaarden et al. |
| D702,867 S | 4/2014 | Kim et al. |
| D703,843 S | 4/2014 | Cheng |
| 8,684,569 B2 | 4/2014 | Pickard et al. |
| 8,696,158 B2 | 4/2014 | Santiago et al. |
| D705,472 S | 5/2014 | Huh |
| D705,481 S | 5/2014 | Zhang et al. |
| 8,727,582 B2 | 5/2014 | Brown et al. |
| D708,381 S | 7/2014 | Rashidi |
| 8,777,449 B2 | 7/2014 | Ven et al. |
| D710,529 S | 8/2014 | Lopez et al. |
| 8,801,217 B2 | 8/2014 | Oehle et al. |
| 8,820,985 B1 | 9/2014 | Tam et al. |
| 8,833,013 B2 | 9/2014 | Harman |
| 8,845,144 B1 | 9/2014 | Davis et al. |
| D714,989 S | 10/2014 | Rowlette, Jr. et al. |
| 8,870,426 B2 | 10/2014 | Biebl et al. |
| 8,890,414 B2 | 11/2014 | Rowlette, Jr. et al. |
| D721,845 S | 1/2015 | Lui et al. |
| 8,926,133 B2 | 1/2015 | Booth |
| 8,939,418 B2 | 1/2015 | Green et al. |
| D722,296 S | 2/2015 | Taylor |
| D722,977 S | 2/2015 | Hagarty |
| D722,978 S | 2/2015 | Hagarty |
| 8,950,898 B2 | 2/2015 | Catalano |
| D723,781 S | 3/2015 | Miner |
| D723,783 S | 3/2015 | Miner |
| D725,359 S | 3/2015 | Miner |
| 8,967,575 B1 | 3/2015 | Gretz |
| D726,363 S | 4/2015 | Danesh |
| D726,949 S | 4/2015 | Redfern |
| D728,129 S | 4/2015 | Kreuzbichler |
| 9,004,435 B2 | 4/2015 | Wronski |
| 9,039,254 B2 | 5/2015 | Danesh |
| D731,689 S | 6/2015 | Bernard et al. |
| 9,062,866 B1 | 6/2015 | Christ et al. |
| 9,065,264 B2 | 6/2015 | Cooper et al. |
| 9,068,719 B2 | 6/2015 | Van De Ven et al. |

(56) References Cited

U.S. PATENT DOCUMENTS

| | | |
|---|---|---|
| 9,068,722 B2 | 6/2015 | Wronski et al. |
| D734,525 S | 7/2015 | Gordin et al. |
| D735,012 S | 7/2015 | Cowie |
| D735,142 S | 7/2015 | Hagarty |
| 9,078,299 B2 | 7/2015 | Ashdown |
| 9,109,783 B1 | 8/2015 | Davis et al. |
| D739,355 S | 9/2015 | D'Aubeterre |
| D739,590 S | 9/2015 | Redfern |
| 9,140,441 B2 | 9/2015 | Goelz et al. |
| D741,538 S | 10/2015 | Ghasabi |
| 9,151,457 B2 | 10/2015 | Pickard et al. |
| 9,151,477 B2 | 10/2015 | Pickard et al. |
| D742,325 S | 11/2015 | Leung |
| D743,079 S | 11/2015 | Adair |
| D744,723 S | 12/2015 | Yoo |
| 9,217,560 B2 | 12/2015 | Harbers et al. |
| 9,222,661 B2 | 12/2015 | Kim et al. |
| 9,239,131 B1 | 1/2016 | Wronski et al. |
| D750,317 S | 2/2016 | Lui et al. |
| 9,285,103 B2 | 3/2016 | Van De Ven et al. |
| 9,291,319 B2 | 3/2016 | Kathawate et al. |
| 9,301,362 B2 | 3/2016 | Dohn et al. |
| D754,078 S | 4/2016 | Baldwin et al. |
| D754,079 S | 4/2016 | Baldwin et al. |
| D754,605 S | 4/2016 | McMillan |
| 9,303,812 B2 | 4/2016 | Green et al. |
| 9,310,038 B2 | 4/2016 | Athalye |
| 9,322,543 B2 | 4/2016 | Hussell et al. |
| 9,347,655 B2 | 5/2016 | Boomgaarden et al. |
| 9,366,418 B2 | 6/2016 | Gifford |
| 9,371,966 B2 | 6/2016 | Rowlette, Jr. et al. |
| D762,181 S | 7/2016 | Lin |
| 9,395,051 B2 | 7/2016 | Hussell et al. |
| D762,906 S | 8/2016 | Jeswani et al. |
| D764,079 S | 8/2016 | Wu |
| 9,404,639 B2 | 8/2016 | Bailey et al. |
| 9,417,506 B1 | 8/2016 | Tirosh |
| 9,423,110 B1 | 8/2016 | Newton et al. |
| D766,185 S | 9/2016 | Hagarty |
| D767,199 S | 9/2016 | Wronski et al. |
| 9,447,917 B1 | 9/2016 | Wronski et al. |
| 9,447,953 B2 | 9/2016 | Lawlor |
| D768,325 S | 10/2016 | Xu |
| D768,326 S | 10/2016 | Guzzini |
| D769,501 S | 10/2016 | Jeswani et al. |
| D770,065 S | 10/2016 | Tittle |
| D770,076 S | 10/2016 | Li et al. |
| 9,476,552 B2 | 10/2016 | Myers et al. |
| D774,676 S | 12/2016 | Ng |
| D776,324 S | 1/2017 | Gierl et al. |
| D777,967 S | 1/2017 | Redfern |
| 9,534,751 B2 | 1/2017 | Maglica et al. |
| D778,241 S | 2/2017 | Holbrook et al. |
| D778,484 S | 2/2017 | Guzzini |
| D779,100 S | 2/2017 | Redfern |
| 9,581,302 B2 | 2/2017 | Danesh |
| 9,583,926 B2 | 2/2017 | Ye |
| 9,599,315 B1 | 3/2017 | Harpenau et al. |
| 9,605,842 B1 | 3/2017 | Davis |
| 9,605,910 B2 | 3/2017 | Swedberg et al. |
| D785,228 S | 4/2017 | Guzzini |
| D786,472 S | 5/2017 | Redfern |
| D786,473 S | 5/2017 | Dean |
| D786,474 S | 5/2017 | Fujisawa |
| D788,330 S | 5/2017 | Johnson et al. |
| D790,102 S | 6/2017 | Guzzini |
| 9,673,597 B2 | 6/2017 | Lee |
| 9,689,541 B2 | 6/2017 | Wronski |
| D791,709 S | 7/2017 | Holton |
| D791,711 S | 7/2017 | Holton |
| D791,712 S | 7/2017 | Holton |
| 9,696,021 B2 | 7/2017 | Wronski |
| 9,702,516 B1 | 7/2017 | Vasquez et al. |
| D795,820 S | 8/2017 | Wengreen |
| 9,732,904 B1 | 8/2017 | Wronski |
| 9,732,947 B1 | 8/2017 | Christ et al. |
| 9,739,464 B2 | 8/2017 | Wronski |
| D799,105 S | 10/2017 | Eder et al. |
| D800,957 S | 10/2017 | Eder et al. |
| 9,791,111 B1 | 10/2017 | Huang et al. |
| 9,797,562 B2 | 10/2017 | Dabiet et al. |
| 9,803,839 B2 | 10/2017 | Visser et al. |
| D805,660 S | 12/2017 | Creasman et al. |
| D805,881 S | 12/2017 | Nehls |
| 9,854,642 B2 | 12/2017 | Kashani |
| D809,176 S | 1/2018 | Partington |
| 9,860,961 B2 | 1/2018 | Chemel et al. |
| 9,863,619 B2 | 1/2018 | Mak |
| D809,465 S | 2/2018 | Keirstead |
| 9,903,569 B2 | 2/2018 | O'Brien et al. |
| 9,945,548 B2 | 4/2018 | Williams et al. |
| 9,964,266 B2 | 5/2018 | Danesh |
| D819,879 S | 6/2018 | Oudina et al. |
| D820,494 S | 6/2018 | Cohen |
| D821,615 S | 6/2018 | Trice |
| D821,627 S | 6/2018 | Ko |
| 9,995,441 B2 | 6/2018 | Power et al. |
| 10,006,613 B2 | 6/2018 | Oudina et al. |
| D822,505 S | 7/2018 | Gibson et al. |
| D824,494 S | 7/2018 | Martins et al. |
| D825,829 S | 8/2018 | Guo |
| 10,041,638 B2 | 8/2018 | Vasquez et al. |
| 10,054,274 B2 | 8/2018 | Athalye et al. |
| D827,903 S | 9/2018 | Wu |
| 10,072,805 B2 | 9/2018 | Bailey |
| D832,218 S | 10/2018 | Wronski et al. |
| D833,977 S | 11/2018 | Danesh et al. |
| 10,125,959 B2 | 11/2018 | Cohen |
| 10,139,059 B2 | 11/2018 | Danesh |
| D834,928 S | 12/2018 | Lu et al. |
| D836,976 S | 1/2019 | Reese et al. |
| 10,244,607 B1 | 3/2019 | Kashani |
| D847,414 S | 4/2019 | Danesh et al. |
| D847,415 S | 4/2019 | Danesh et al. |
| 10,247,390 B1 | 4/2019 | Kopitzke, IV |
| D848,375 S | 5/2019 | Danesh et al. |
| 10,281,131 B2 | 5/2019 | Cohen |
| 10,295,163 B1 | 5/2019 | Cohen |
| D850,695 S | 6/2019 | Dabiet et al. |
| D851,046 S | 6/2019 | Peng et al. |
| 10,408,395 B2 | 9/2019 | Danesh |
| 10,408,396 B2 | 9/2019 | Wronski et al. |
| 10,408,436 B2 | 9/2019 | Wronski et al. |
| D863,661 S | 10/2019 | Tian et al. |
| D864,877 S | 10/2019 | Danesh |
| D867,653 S | 11/2019 | Gorman |
| 10,488,000 B2 | 11/2019 | Danesh et al. |
| 10,541,522 B2 | 1/2020 | Lalancette |
| 10,551,044 B2 | 2/2020 | Peng et al. |
| 10,563,850 B2 | 2/2020 | Danesh |
| D877,957 S | 3/2020 | Kopitzke, IV |
| 10,591,120 B2 | 3/2020 | Bailey et al. |
| 10,609,785 B1 | 3/2020 | Fardadi et al. |
| D880,733 S | 4/2020 | Lo et al. |
| D883,562 S | 5/2020 | Hu |
| D885,648 S | 5/2020 | Zeng |
| D885,649 S | 5/2020 | McLaughlin, III et al. |
| 10,663,127 B2 | 5/2020 | Danesh et al. |
| 10,663,153 B2 | 5/2020 | Nikooyan et al. |
| D888,313 S | 6/2020 | Xie et al. |
| 10,683,994 B2 | 6/2020 | Wronski et al. |
| 10,684,003 B2 | 6/2020 | Wronski et al. |
| D890,410 S | 7/2020 | Stanford et al. |
| 10,704,745 B2 | 7/2020 | Sherry et al. |
| D892,069 S | 8/2020 | Cohen |
| 10,753,558 B2 | 8/2020 | Danesh |
| 10,808,917 B2 | 10/2020 | Harris et al. |
| 10,816,148 B2 | 10/2020 | Danesh |
| D901,398 S | 11/2020 | Danesh et al. |
| D901,745 S | 11/2020 | Yang |
| D902,871 S | 11/2020 | Danesh et al. |
| D903,605 S | 12/2020 | Danesh et al. |
| D905,327 S | 12/2020 | Williams et al. |
| D907,284 S | 1/2021 | Danesh et al. |

(56) References Cited

U.S. PATENT DOCUMENTS

| | | |
|---|---|---|
| D910,223 S | 2/2021 | Cohen |
| D917,401 S | 4/2021 | Mohamed |
| 10,975,570 B2 | 4/2021 | Shen |
| 10,982,829 B2 | 4/2021 | Danesh |
| 11,015,785 B1 | 5/2021 | Schubert |
| D922,331 S | 6/2021 | Cohen |
| 11,022,259 B2 | 6/2021 | Bailey et al. |
| 11,028,982 B2 | 6/2021 | Danesh |
| 11,047,538 B2 | 6/2021 | Danesh et al. |
| D924,467 S | 7/2021 | Danesh et al. |
| D925,109 S | 7/2021 | Danesh et al. |
| 11,060,705 B1 | 7/2021 | Danesh et al. |
| 11,067,231 B2 | 7/2021 | Lotfi et al. |
| D927,430 S | 8/2021 | Cohen et al. |
| 11,085,597 B2 | 8/2021 | Danesh |
| 11,118,768 B2 * | 9/2021 | Danesh .................. F21S 8/024 |
| D934,665 S | 11/2021 | Cronkhite et al. |
| D939,134 S | 12/2021 | Danesh et al. |
| D940,545 S | 1/2022 | Tanner et al. |
| 11,231,154 B2 | 1/2022 | Kopitzke et al. |
| D944,212 S | 2/2022 | Peng et al. |
| 11,242,983 B2 | 2/2022 | Danesh |
| 11,255,497 B2 * | 2/2022 | Danesh .................. H02G 3/08 |
| 11,274,821 B2 | 3/2022 | Danesh |
| 11,306,903 B2 | 4/2022 | Young |
| 11,391,442 B2 | 7/2022 | Danesh |
| 11,435,064 B1 | 9/2022 | Danesh |
| 11,435,066 B2 | 9/2022 | Danesh |
| 11,448,384 B2 | 9/2022 | Nikooyan et al. |
| D966,877 S | 10/2022 | Kopitzke et al. |
| D970,081 S | 11/2022 | Kopitzke et al. |
| 11,585,517 B2 | 2/2023 | Kopitzke et al. |
| D990,030 S | 6/2023 | Young et al. |
| 11,668,455 B2 | 6/2023 | Danesh et al. |
| 11,800,617 B2 | 10/2023 | Kumar et al. |
| 11,808,430 B2 | 11/2023 | Danesh |
| D1,012,864 S | 1/2024 | Danesh et al. |
| 12,000,562 B2 | 6/2024 | Danesh |
| 12,169,053 B2 | 12/2024 | Lotfi et al. |
| 12,203,631 B2 | 1/2025 | Kopitzke et al. |
| 12,209,736 B2 | 1/2025 | Yong et al. |
| 2002/0172047 A1 | 11/2002 | Ashley |
| 2003/0006353 A1 | 1/2003 | Dinh et al. |
| 2003/0016532 A1 | 1/2003 | Reed |
| 2003/0021104 A1 | 1/2003 | Tsao |
| 2003/0092323 A1 | 5/2003 | Chou |
| 2003/0161153 A1 | 8/2003 | Patti |
| 2004/0001337 A1 | 1/2004 | Defouw et al. |
| 2004/0120141 A1 | 6/2004 | Beadle |
| 2004/0156199 A1 | 8/2004 | Rivas et al. |
| 2005/0078474 A1 | 4/2005 | Whitfield |
| 2005/0121215 A1 | 6/2005 | Halbert |
| 2005/0225966 A1 | 10/2005 | Hartmann et al. |
| 2005/0227536 A1 | 10/2005 | Gamache et al. |
| 2005/0231962 A1 | 10/2005 | Koba et al. |
| 2005/0237746 A1 | 10/2005 | Yiu |
| 2006/0005988 A1 | 1/2006 | Jorgensen |
| 2006/0108137 A1 | 5/2006 | Smith |
| 2006/0158873 A1 | 7/2006 | Newbold et al. |
| 2006/0198126 A1 | 9/2006 | Jones |
| 2006/0215408 A1 | 9/2006 | Lee |
| 2006/0221620 A1 | 10/2006 | Thomas |
| 2006/0237601 A1 | 10/2006 | Rinderer |
| 2006/0243877 A1 | 11/2006 | Rippel |
| 2006/0250788 A1 | 11/2006 | Hodge et al. |
| 2006/0262536 A1 | 11/2006 | Nevers |
| 2006/0262545 A1 | 11/2006 | Piepgras et al. |
| 2007/0012847 A1 | 1/2007 | Tai |
| 2007/0035951 A1 | 2/2007 | Tseng |
| 2007/0121328 A1 | 5/2007 | Mondloch et al. |
| 2007/0131827 A1 * | 6/2007 | Nevers .................. F21V 21/04 |
| | | 248/201 |
| 2007/0185675 A1 | 8/2007 | Papamichael et al. |
| 2007/0200039 A1 | 8/2007 | Petak |
| 2007/0206374 A1 | 9/2007 | Petrakis et al. |
| 2008/0002414 A1 | 1/2008 | Miletich et al. |
| 2008/0068847 A1 | 3/2008 | Bedard |
| 2008/0112168 A1 | 5/2008 | Pickard et al. |
| 2008/0112170 A1 | 5/2008 | Trott |
| 2008/0112171 A1 | 5/2008 | Patti et al. |
| 2008/0130308 A1 | 6/2008 | Behr et al. |
| 2008/0137347 A1 | 6/2008 | Trott et al. |
| 2008/0165545 A1 | 7/2008 | O'Brien |
| 2008/0170404 A1 | 7/2008 | Steer et al. |
| 2008/0186718 A1 | 8/2008 | Magisano et al. |
| 2008/0224008 A1 * | 9/2008 | Dal Ponte ............... E04B 9/006 |
| | | 248/298.1 |
| 2008/0232116 A1 | 9/2008 | Kim |
| 2008/0247181 A1 | 10/2008 | Dixon |
| 2008/0285271 A1 | 11/2008 | Roberge et al. |
| 2009/0003009 A1 | 1/2009 | Tessnow et al. |
| 2009/0034261 A1 | 2/2009 | Grove |
| 2009/0080189 A1 | 3/2009 | Wegner |
| 2009/0086484 A1 | 4/2009 | Johnson |
| 2009/0097262 A1 | 4/2009 | Zhang et al. |
| 2009/0135613 A1 | 5/2009 | Peng |
| 2009/0141500 A1 | 6/2009 | Peng |
| 2009/0141506 A1 | 6/2009 | Lan et al. |
| 2009/0141508 A1 | 6/2009 | Peng |
| 2009/0147517 A1 | 6/2009 | Li |
| 2009/0161356 A1 | 6/2009 | Negley et al. |
| 2009/0237924 A1 | 9/2009 | Ladewig |
| 2009/0280695 A1 | 11/2009 | Sekela et al. |
| 2009/0283292 A1 | 11/2009 | Lehr |
| 2009/0290343 A1 | 11/2009 | Brown et al. |
| 2009/0310371 A1 | 12/2009 | Goode |
| 2010/0014282 A1 | 1/2010 | Danesh |
| 2010/0033095 A1 | 2/2010 | Sadwick |
| 2010/0061108 A1 | 3/2010 | Zhang et al. |
| 2010/0067226 A1 | 3/2010 | Higuchi et al. |
| 2010/0110690 A1 | 5/2010 | Hsu et al. |
| 2010/0110698 A1 | 5/2010 | Harwood et al. |
| 2010/0110699 A1 | 5/2010 | Chou |
| 2010/0148673 A1 | 6/2010 | Stewart et al. |
| 2010/0149822 A1 | 6/2010 | Cogliano et al. |
| 2010/0155497 A1 | 6/2010 | Hagaman |
| 2010/0165643 A1 | 7/2010 | Russo et al. |
| 2010/0244709 A1 | 9/2010 | Steiner et al. |
| 2010/0246172 A1 | 9/2010 | Liu |
| 2010/0259919 A1 | 10/2010 | Khazi et al. |
| 2010/0270903 A1 | 10/2010 | Jao et al. |
| 2010/0277905 A1 | 11/2010 | Janik et al. |
| 2010/0284185 A1 | 11/2010 | Ngai |
| 2010/0302778 A1 | 12/2010 | Dabiet et al. |
| 2010/0328956 A1 | 12/2010 | Zhang |
| 2011/0043040 A1 | 2/2011 | Porter et al. |
| 2011/0063831 A1 | 3/2011 | Cook |
| 2011/0068687 A1 | 3/2011 | Takahasi et al. |
| 2011/0069499 A1 | 3/2011 | Trott et al. |
| 2011/0080750 A1 | 4/2011 | Jones et al. |
| 2011/0116276 A1 | 5/2011 | Okamura et al. |
| 2011/0121756 A1 | 5/2011 | Thomas et al. |
| 2011/0134634 A1 | 6/2011 | Gingrich, III et al. |
| 2011/0134651 A1 | 6/2011 | Berman |
| 2011/0140633 A1 | 6/2011 | Archenhold |
| 2011/0170294 A1 | 7/2011 | Mier-Langner et al. |
| 2011/0194299 A1 | 8/2011 | Crooks et al. |
| 2011/0216534 A1 | 9/2011 | Tickner et al. |
| 2011/0226919 A1 | 9/2011 | Fryzek et al. |
| 2011/0255292 A1 | 10/2011 | Shen |
| 2011/0267828 A1 | 11/2011 | Bazydola et al. |
| 2011/0285314 A1 | 11/2011 | Carney et al. |
| 2012/0020104 A1 | 1/2012 | Biebl et al. |
| 2012/0074852 A1 | 3/2012 | Delnoij |
| 2012/0106176 A1 | 5/2012 | Lopez et al. |
| 2012/0113642 A1 | 5/2012 | Catalano |
| 2012/0140442 A1 | 6/2012 | Woo et al. |
| 2012/0140465 A1 | 6/2012 | Rowlette, Jr. et al. |
| 2012/0162994 A1 | 6/2012 | Wasniewski et al. |
| 2012/0182744 A1 | 7/2012 | Santiago et al. |
| 2012/0188762 A1 | 7/2012 | Joung et al. |
| 2012/0243237 A1 | 9/2012 | Toda et al. |
| 2012/0250321 A1 | 10/2012 | Blincoe et al. |
| 2012/0266449 A1 | 10/2012 | Krupa |

(56) References Cited

U.S. PATENT DOCUMENTS

| | | |
|---|---|---|
| 2012/0268688 A1 | 10/2012 | Sato et al. |
| 2012/0287625 A1 | 11/2012 | Macwan et al. |
| 2012/0305868 A1 | 12/2012 | Callahan et al. |
| 2012/0314429 A1 | 12/2012 | Plunk |
| 2013/0009552 A1 | 1/2013 | Page |
| 2013/0010476 A1 | 1/2013 | Pickard et al. |
| 2013/0016864 A1 | 1/2013 | Ivey et al. |
| 2013/0033872 A1 | 2/2013 | Randolph et al. |
| 2013/0050994 A1 | 2/2013 | Pieper |
| 2013/0051012 A1 | 2/2013 | Oehle et al. |
| 2013/0077307 A1 | 3/2013 | Yamamoto |
| 2013/0083529 A1 | 4/2013 | Gifford |
| 2013/0141913 A1 | 6/2013 | Sachsenweger |
| 2013/0155681 A1 | 6/2013 | Nall et al. |
| 2013/0163254 A1 | 6/2013 | Chang et al. |
| 2013/0170232 A1 | 7/2013 | Park et al. |
| 2013/0170233 A1 | 7/2013 | Nezu et al. |
| 2013/0201699 A1 | 8/2013 | Kato et al. |
| 2013/0227908 A1 | 9/2013 | Gulbrandsen et al. |
| 2013/0258677 A1 | 10/2013 | Fryzek et al. |
| 2013/0265750 A1 | 10/2013 | Pickard et al. |
| 2013/0271989 A1 | 10/2013 | Hussell et al. |
| 2013/0292149 A1 | 11/2013 | Cooper |
| 2013/0294084 A1 | 11/2013 | Kathawate et al. |
| 2013/0301252 A1 | 11/2013 | Hussell et al. |
| 2013/0322084 A1 | 12/2013 | Ebisawa |
| 2013/0335980 A1 | 12/2013 | Nakasuji et al. |
| 2014/0029262 A1 | 1/2014 | Maxik et al. |
| 2014/0036497 A1 | 2/2014 | Hussell et al. |
| 2014/0049957 A1 | 2/2014 | Goelz et al. |
| 2014/0063776 A1 | 3/2014 | Clark et al. |
| 2014/0063818 A1 | 3/2014 | Randolph et al. |
| 2014/0071679 A1 | 3/2014 | Booth |
| 2014/0071687 A1 | 3/2014 | Tickner et al. |
| 2014/0140490 A1 | 5/2014 | Roberts et al. |
| 2014/0233246 A1 | 8/2014 | Lafreniere et al. |
| 2014/0254177 A1 | 9/2014 | Danesh |
| 2014/0268836 A1 | 9/2014 | Thompson |
| 2014/0268869 A1 | 9/2014 | Blessitt et al. |
| 2014/0299730 A1 | 10/2014 | Green et al. |
| 2014/0301092 A1 | 10/2014 | Wronski |
| 2014/0313775 A1 | 10/2014 | Myers et al. |
| 2014/0321122 A1 | 10/2014 | Domagala et al. |
| 2014/0347848 A1 | 11/2014 | Pisavadia et al. |
| 2015/0029732 A1 | 1/2015 | Hatch |
| 2015/0078008 A1 | 3/2015 | He |
| 2015/0085495 A1 | 3/2015 | Seki |
| 2015/0085500 A1 | 3/2015 | Cooper et al. |
| 2015/0092449 A1 | 4/2015 | Demuynck et al. |
| 2015/0131301 A1 | 5/2015 | Ho |
| 2015/0138779 A1 | 5/2015 | Livesay et al. |
| 2015/0153635 A1 | 6/2015 | Chen et al. |
| 2015/0176823 A1 | 6/2015 | Leshniak et al. |
| 2015/0184837 A1 | 7/2015 | Zhang et al. |
| 2015/0198324 A1 | 7/2015 | O'Brien et al. |
| 2015/0204491 A1 | 7/2015 | Yuan et al. |
| 2015/0219317 A1 | 8/2015 | Gatof et al. |
| 2015/0241039 A1 | 8/2015 | Fryzek |
| 2015/0263497 A1 | 9/2015 | Korcz et al. |
| 2015/0276185 A1 | 10/2015 | Bailey et al. |
| 2015/0308662 A1 | 10/2015 | Vice et al. |
| 2015/0345761 A1 | 12/2015 | Lawlor |
| 2015/0362159 A1 | 12/2015 | Ludyjan |
| 2016/0084488 A1 | 3/2016 | Wu et al. |
| 2016/0178181 A1 | 6/2016 | LaDuca |
| 2016/0209007 A1 | 7/2016 | Belmonte et al. |
| 2016/0230969 A1 | 8/2016 | Pelletier et al. |
| 2016/0238225 A1 | 8/2016 | Rashidi Doust |
| 2016/0308342 A1 | 10/2016 | Witherbee et al. |
| 2016/0348860 A1 | 12/2016 | Danesh |
| 2016/0366738 A1 | 12/2016 | Boulanger et al. |
| 2017/0003007 A1 | 1/2017 | Wronski |
| 2017/0005460 A1 | 1/2017 | Lee |
| 2017/0045213 A1 | 2/2017 | Williams et al. |
| 2017/0059135 A1 | 3/2017 | Jones |
| 2017/0138581 A1 | 5/2017 | Doust |
| 2017/0167672 A1 | 6/2017 | Stauner et al. |
| 2017/0167699 A1 | 6/2017 | Schubert et al. |
| 2017/0198896 A1 | 7/2017 | May |
| 2017/0284616 A1 | 10/2017 | Coakley et al. |
| 2017/0307188 A1 | 10/2017 | Oudina et al. |
| 2017/0307198 A1 | 10/2017 | Shah et al. |
| 2018/0112857 A1 | 4/2018 | Wronski et al. |
| 2018/0119907 A1 | 5/2018 | O'Brien et al. |
| 2018/0123351 A1 | 5/2018 | Andrews et al. |
| 2018/0142871 A1 | 5/2018 | Morales |
| 2018/0156431 A1 | 6/2018 | Zhuang et al. |
| 2018/0216809 A1 | 8/2018 | Cohen |
| 2018/0224095 A1 | 8/2018 | Cohen |
| 2018/0283677 A1 | 10/2018 | Cohen |
| 2019/0032874 A1 | 1/2019 | Bonnetto et al. |
| 2019/0041050 A1 | 2/2019 | Cairns et al. |
| 2019/0063724 A1 | 2/2019 | Vice, Jr. et al. |
| 2019/0086043 A1 | 3/2019 | Wronski |
| 2019/0195475 A1 | 6/2019 | Jones |
| 2019/0195479 A1 | 6/2019 | Bonne |
| 2019/0249852 A1 | 8/2019 | Kim |
| 2019/0301710 A1 | 10/2019 | Harris |
| 2019/0353341 A1 | 11/2019 | Spiro |
| 2020/0049326 A1 | 2/2020 | Brown et al. |
| 2020/0182420 A1 | 6/2020 | Cohen et al. |
| 2020/0323073 A1 | 10/2020 | Cartrette et al. |
| 2020/0355334 A1 | 11/2020 | Shen et al. |
| 2021/0010647 A1 | 1/2021 | Danesh et al. |
| 2021/0045221 A1 | 2/2021 | Dejonge et al. |
| 2021/0071833 A1 | 3/2021 | Hou et al. |
| 2021/0080081 A1 | 3/2021 | Cohen |
| 2021/0080084 A1 | 3/2021 | Danesh et al. |
| 2021/0364139 A1 | 11/2021 | Danesh |
| 2022/0018522 A1 | 1/2022 | Kopitzke et al. |
| 2022/0018523 A1 | 1/2022 | Vinh et al. |
| 2022/0034488 A1 | 2/2022 | Cohen |
| 2022/0042664 A1 | 2/2022 | Lotfi et al. |
| 2022/0085610 A1 | 3/2022 | Dejonge et al. |
| 2022/0243883 A1 | 8/2022 | Cohen |
| 2023/0040032 A1 | 2/2023 | Danesh et al. |
| 2023/0125086 A1 | 4/2023 | Ungaro |
| 2024/0035643 A1 | 2/2024 | Kopitzke et al. |

FOREIGN PATENT DOCUMENTS

| | | |
|---|---|---|
| CA | 2691480 C | 4/2012 |
| CA | 2734369 A1 | 10/2013 |
| CA | 2561459 A1 | 11/2013 |
| CA | 2815067 | 11/2013 |
| CA | 2848289 A1 | 10/2014 |
| CA | 2998173 | 7/2018 |
| CN | 2182475 Y | 11/1994 |
| CN | 2406574 Y | 11/2000 |
| CN | 1309618 A | 8/2001 |
| CN | 201059503 Y | 5/2008 |
| CN | 201259125 Y | 6/2009 |
| CN | 101608781 A | 12/2009 |
| CN | 101859057 A | 10/2010 |
| CN | 201636626 U | 11/2010 |
| CN | 102062373 A | 5/2011 |
| CN | 202014067 U | 10/2011 |
| CN | 202392473 U | 8/2012 |
| CN | 202733693 U | 2/2013 |
| CN | 103307518 A | 9/2013 |
| CN | 103322476 A | 9/2013 |
| CN | 203202661 U | 9/2013 |
| CN | 203215483 U | 9/2013 |
| CN | 101498411 B | 11/2013 |
| CN | 203273663 U | 11/2013 |
| CN | 203297980 U | 11/2013 |
| CN | 203628464 U | 6/2014 |
| CN | 203641919 U | 6/2014 |
| CN | 204120631 U | 1/2015 |
| CN | 204300818 U | 4/2015 |
| CN | 104654142 A | 5/2015 |
| CN | 204513161 U | 7/2015 |
| CN | 204611541 U | 9/2015 |
| CN | 204786225 U | 11/2015 |

(56) References Cited

FOREIGN PATENT DOCUMENTS

| | | |
|---|---|---|
| CN | 204829578 U | 12/2015 |
| CN | 103712135 B | 4/2016 |
| CN | 205606362 U | 9/2016 |
| CN | 206130742 U | 4/2017 |
| CN | 103154606 B | 5/2017 |
| CN | 206222112 U | 6/2017 |
| CN | 107013845 A | 8/2017 |
| CN | 107084343 A | 8/2017 |
| CN | 110671657 A | 1/2020 |
| CN | 210536989 U | 5/2020 |
| DE | 9109828 U1 | 2/1992 |
| DE | 199 47 208 | 5/2001 |
| EP | 1 589 289 | 10/2005 |
| EP | 1 672 155 A1 | 6/2006 |
| EP | 1688663 A2 | 8/2006 |
| EP | 2 306 072 A1 | 4/2011 |
| EP | 2 453 169 A2 | 5/2012 |
| EP | 2 193 309 B1 | 7/2012 |
| EP | 2 735 787 A1 | 5/2014 |
| EP | 3 104 024 A1 | 12/2016 |
| GB | 2325728 A | 12/1998 |
| GB | 2427020 A | 12/2006 |
| GB | 2466875 A | 7/2010 |
| GB | 2471929 A | 1/2014 |
| GB | 2509772 A | 7/2014 |
| JP | H02113002 U | 9/1990 |
| JP | 2007091052 A | 4/2007 |
| JP | 2007265961 A | 10/2007 |
| JP | 2011060450 A2 | 3/2011 |
| JP | 2012064551 A2 | 3/2012 |
| JP | 2015002027 A2 | 1/2015 |
| JP | 2015002028 A2 | 1/2015 |
| JP | 2016219335 A | 12/2016 |
| JP | 2017107699 A2 | 6/2017 |
| KR | 1020110008796 A | 1/2011 |
| KR | 1020120061625 A | 6/2012 |
| MX | 2011002947 A | 9/2011 |
| TW | 474382 U | 1/2002 |
| WO | WO 2013/128896 A1 | 9/2013 |
| WO | WO 2015/000212 A1 | 1/2015 |
| WO | WO 2016152166 A2 | 9/2016 |
| WO | WO 2022/056180 | 3/2022 |

OTHER PUBLICATIONS

Acrich COB Zhaga Module, Product Description, Seoul Semiconductor, Nov. 11, 2016, 39 pages.
<https://www.zhagastandard.org/books/book18/>, Mar. 2017, 5 pages. Accessed on May 14, 2018.
BXUV.GuideInfo, Fire Resistance Ratings—ANSI/UL 263, UL Online Certifications Directory, last updated Nov. 3, 2016, 27 pages.
CEYY.GuideInfo, Outlet Boxes and Fittings Certified for Fire Resistance, UL Online Certifications Directory, last updated May 16, 2013, 2 pages.
Canadian Office Action dated Dec. 23, 2013 from Canadian Application No. 2,778,581, 3 pages.
Canadian Office Action dated Mar. 22, 2016 from Canadian Application No. 2,879,629, 4 pages.
Canadian Office Action dated Dec. 6, 2016 from Canadian Application No. 2,879,629, 3 pages.
Canadian Office Action dated Mar. 9, 2017 from Canadian Application No. 2,931,588, 5 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Aug. 11, 2017 from Canadian Application No. 2,941,051, 4 pages.
Cree LED Lamp Family Sales Sheet—Better light is beautiful light , Apr. 24, 2017, 2 pages.
DME Series Installation Instructions, Oct. 18, 2011, 2 pages.
DMF, Inc., "dmfLighting: LED Recessed Lighting Solutions," Info sheets, Mar. 15, 2012, 4 pages.
DMF, Inc., "dmfLighting: LED Recessed Downlighting," DRD2 Product Brochure, Oct. 23, 2014, 50 pages.
DMF, Inc., "dmfLighting: LED Recessed Downlighting," Product Catalog, Aug. 2012, 68 pages.
Halo, Halo LED H4 H7 Collection, SustainabLEDesign, Cooper Lighting, (emphasis on p. 18 "H7 Collection LED Modules—Halo LED H7 Module Features,") Mar. 28, 2012, 52 pages.
Halo, H7 LED Downlight Trims 49x Series, 6-inch LED Trims for Use with MI7x LED Modules, Cooper Lighting, ADV110422, rev. Aug. 12, 2011, 15 pages.
Halo, LED Module ML706x, Cooper Lighting, General Installation for All Modules/p. 1; Tether Installation/pp. 2-3; Installation into Halo H750x Series LED—only (Non-Screw Based), Recessed Fixture, p. 4, Oct. 20, 2009, 4 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title Page Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance mailed Aug. 23, 2017 from Canadian Application No. 2,879,629, 1 page.
"Outlet Boxes for Use in Fire Rated Assemblies," https://www.ul.com/wp-content/uploads/2014/04/UI_outletboxes.pdf, Apr. 2007, 2 pages.
"Advanced LED Solutions," Imtra Marine Lighting. Jun. 17, 2011, 40 pages.
"Portland Bi-Color, Warm White/Red," item: ILIM30941.Imtra Marine Products. 2012. 3 pages. Accessed athttp://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.
"Cree LMH2 LED Modules Design Guide," Cree Product Design Guide. 2011. 20 pages.
"Undercabinet Pucks, Xyris Mini LED Puck Light," ELCO Lighting. Sep. 2018. 1 page.
"LED Undercabinet Pocket Guide," ELCO Lighting. Nov. 2, 2016. 12 pages.
"VERSI LED Mini Flush," Lithonia Lghting. Sep. 2013. 6 pages.
OneFrame Recessed LED Downlight. Dmflighting.com. Published Jun. 6, 2018. Retrieved at https://www.dmflighting.com/product/oneframe on Jun. 6, 2018. 11 pages.
International Search Report and Written Opinion in PCT/US2018/048357 mailed Nov. 14, 2018, 13 pages.
International Search Report and Written Opinion in International Patent Application No. PCT/US18/39048 mailed Dec. 14, 2018. 24 pages.
RACO 4 i+A882:C958n. Octagon Welded Concrete Ring, 3½ in. Deep with ½ and ¾ in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
RACO 4 in. Octagon Welded Concrete Ring, 6 in. Deep with ½ and ¾ in. Knockouts (10-Pack). Model #276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
International Search Report and Written Opinion in International Patent Application No. PCT/US18/62868 mailed Mar. 14, 2019, 13 pages.
CS&E PCT Collaborative Search and Examination Pilot Upload Peer Contribution in International Patent Application No. PCT/US18/62868 mailed Mar. 14, 2019, 61 pages.

(56) References Cited

OTHER PUBLICATIONS

International Search Report and Written Opinion in International Patent Application No. PCT/US18/67614 mailed Apr. 25, 2019, 20 pages.
CS&E PCT Collaborative Search and Examination Pilot Upload Peer Contribution in International Patent Application No. PCT/US18/67614 mailed Apr. 24, 2019, 53 pages.
Specification & Features 4" Octagonal Concrete Box Covers. Orbit Industries, Inc. Accessed at https://www.orbitelectric.com on May 6, 2019. 1 page.
4" Octagon Concrete Boxes and Back Plates. Appleton. Accessed at www.appletonelec.com on May 6, 2019. 1 page.
RACO Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Cooper Lighting Halo ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
KWIKBRACE® New Construction Braces for Lighting Fixtures or Ceiling Fans 1½ in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019, 4 pages.
International Search Report and Written Opinion in International Patent Application No. PCT/US19/32281 mailed Aug. 2, 2019, 18 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Cree® LMR2 LED Module. Product Family Data Sheet Cree 2011. 3 pages.
International Search Report and Written Opinion in International Patent Application No. PCT/US2019/036477 mailed Oct. 17, 2019, 15 pages.
ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.
Switch and Outlet Boxes and Covers Brochure. Appelton 2010. 77 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT1805 Maxim Main Catalog 2018 p. 639.
Maxim Wafer. LMXCAT1805 Maxim Main Catalog 2018 pp. 636-638.
Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 mailed Feb. 24, 2020, 23 pages.
LED Book Price Guide 2012. DMF Light. Issued Jun. 26, 2013. 3 pages.
DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.

3 & 4" DLE Series LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
Maxim Lighting International, "Wafer LED 7" RD 3000K Wall/Flush Mount", undated. 1 page.
Maxim Lighting International, "Convert LED Flush Mount", undated. 1 page.
Maxim Lighting International, "Views of the Wafer Flush Mount", undated. 1 page.
Maxim Lighting International, "Product/Drawing Specification Sheet" undated. 1 page.
International Search Report and Written Opinion in PCT/US2020/017331 mailed Jun. 22, 2020, 16 pages.
Taiwan Office Action and translation thereof dated Jun. 12, 2020 from Taiwan Application No. 108116564, 8 pages.
Access Lighting Installation Instructions. No. 20870LEDD/20871LEDD/20872LEDD. Dec. 16, 2019. 2 pages.
Model No. 20870LEDD-WH/ACR Infinite Specification Sheet. Access Lighting. Apr. 9, 2020. 1 page.
Dmf DRD2 Recessed LED Downlight General Retrofit Junction Box Dated: Dec. 18, 2015 Downloaded Jul. 28, 2018, from https://www.a Iconlighting.com/specsheets/DMF/DRD2-Junction-Box-Retrofit-Spec-Sheet.pdf, 6 pages.
Dmf DRD2 Recessed LED Downlight General New Construction 4", 5", 6" Aperture Dated Aug. 31, 2016 Downloaded Jul. 28, 2018, from https://www.cansandfans.com/sites/default/files/DRD2-General-New-Construction-Spec-Sheet_7_0 .pdf , 9 pages.
Mar. 5, 2016—The DMF Lighting DRD2 Recessed LED Downlight General Retrofit Junction Box—Wet Location Rated is the ideal solution for Commercial LED recessed lighting retrofit applications. web cache https://www.alconlighting.com/dmf-drd2m.html (downloaded Jul. 28, 2018), 6 pages.
LED modules advance in performance, standardization questions persist (Magazine). LEDs Magazine. Oct. 29, 2013. Accessed at https://www.ledsmagazine.com/leds-ssl-design/modular-light-engines/article/16695073/led-modules-advance-in-performance-standardization-questions-persist-magazine. 9 pages.
Octagon Concrete Box Cover with (3) ½ in. & (2) ¾ in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b_4BRCMARIsADMUlypJc0K80UHdDTI9C5m4BDzR3U87PRYV1NdQIBFxEWQ2I_3otTCTqEkaAi_DEALw_wcB on Jul. 20, 2020. 1 page.
Canadian Office Action in Application No. 2931588 dated Aug. 13, 2020, 5 pages.
International Search Report and Written Opinion in PCT/US2020/050767 mailed Dec. 9, 2020, 25 pages.
Canadian Office Action in Application No. 2941051 dated Dec. 8, 2020, 5 pages.
"Electrical Boxes" accessed at http://electrical-inspector.blogspot.com/2013/06/electrical-boxes.html Jun. 22, 2013 retrieved from Wayback Machine Archive.org on Jan. 25, 2021. 12 pages.
"Electrical Boxes Volume and Fill Calculations" accessed at http://electrical-inspector.blogspot.com/2013/06/electrical-boxes-Volume-and-Fill-Calculations.html Jun. 22, 2013 retrieved from Wayback Machine Archive.org on Jan. 25, 2021. 8 pages.
U.S. Appl. No. 61/881,162, filed Sep. 23, 2013. Priority application to US Publication No. 2015/0085500 to Cooper et al. 31 pages.
Chinese Office Action and English Translation Thereof in Chinese Patent Application No. 201880088009.9 dated Jun. 30, 2021, 18 pages.
Canadian Notice of Allowance dated Nov. 23, 2022 from Canadian App. No. 3,102,022 1 page.

(56) References Cited

OTHER PUBLICATIONS

Canadian Office Action dated Dec. 19, 2022 from Canadian Application No. 3,135,470, 5 pages.
Canadian Office Action dated Dec. 16, 2022 from Canadian Application No. 3,130,524, 6 pages.
Whaling Museum Chooses Imtra LED Lighting for Popular Exhibit, LEDs Magazine Sep. 17, 2010; https://www.ledsmagazine.com/company-newsfeed/article/16690837/whaling-museum-chooses-imtra-led-lighting-for-popular-exhibit, 3 pages.
Imtra supplied its LED lighting to USA. Whaling Museum; LEDinside, Sep. 20, 2010, https://www.ledinside.com/news/2010/9/news_Imtra_LED_20100920, 1 page.
International Search Report and Written Opinion in PCT/US 23/65292 dated Nov. 6, 2023, 31 pages.
Canadian Office Action in Canadian App. No. 3,125,954 dated Mar. 27, 2024, 13 pages.
Canadian Office Action in Canadian App. No. 3,130,524 dated Apr. 10, 2024, 7 pages.
Final Office Action mailed Apr. 27, 2016 from U.S. Appl. No. 14/184,601, 19 pages.
Final Office Action mailed Jul. 26, 2017 from U.S. Appl. No. 14/184,601, 18 pages.
Final Office Action mailed Jan. 29, 2016 from U.S. Appl. No. 14/183,424, 21 pages.
Final Office Action mailed Jun. 23, 2016 from U.S. Appl. No. 13/484,901, 18 pages.
Final Office Action mailed Apr. 2, 2015 from U.S. Appl. No. 13/484,901, 13 pages.
Notice of Allowance mailed Mar. 26, 2018 for U.S. Appl. No. 14/184,601, 10 pages.
Non-Final Office Action mailed Mar. 15, 2010 from U.S. Appl. No. 12/100,148, 8 pages.
Non-Final Office Action mailed Apr. 30, 2010 from U.S. Appl. No. 12/173,232, 13 pages.
Non-Final Office Action mailed Sep. 5, 2014 from U.S. Appl. No. 13/791,087, 8 pages.
Non-Final Office Action mailed Jul. 20, 2015 from U.S. Appl. No. 14/184,601, 16 pages.
Non-Final Office Action mailed Dec. 15, 2016 from U.S. Appl. No. 14/184,601, 18 pages.
Non-Final Office Action mailed Feb. 6, 2018 from U.S. Appl. No. 15/167,682, 9 pages.
Non-Final Office Action mailed Sep. 15, 2015 from U.S. Appl. No. 13/484,901, 16 pages.
Non-Final Office Action mailed Oct. 16, 2014 from U.S. Appl. No. 13/484,901, 11 pages.
Non-Final Office Action mailed Sep. 6, 2017 from U.S. Appl. No. 14/726,064, 8 pages.
Non-Final Office Action mailed May 17, 2017 from U.S. Appl. No. 14/183,424, 20 pages.
Non-Final Office Action mailed Jun. 2, 2015 from U.S. Appl. No. 14/183,424, 20 pages.
Non-Final Office Action mailed Apr. 12, 2018 for U.S. Appl. No. 29/638,259, 5 pages.
Non-Final Office Action mailed May 16, 2018 for U.S. Appl. No. 15/132,875, 18 pages.
Notice of Allowance mailed Jan. 30, 2015 from U.S. Appl. No. 13/791,087, 9 pages.
Notice of Allowance mailed Jan. 16, 2015 from U.S. Appl. No. 29/467,026, 9 pages.
Notice of Allowance mailed Oct. 21, 2016 from U.S. Appl. No. 13/484,901, 7 pages.
Notice of Allowance mailed Mar. 24, 2016 from U.S. Appl. No. 14/247,149, 8 pages.
Notice of Allowance mailed May 22, 2018 from U.S. Appl. No. 14/183,424, 9 pages.
Notice of Allowance mailed May 10, 2018 from U.S. Appl. No. 14/726,064, 7 pages.
Notice of Allowance mailed Sep. 21, 2018 from U.S. Appl. No. 29/645,941, 5 pages.
Notice of Allowance mailed Oct. 4, 2018 from U.S. Appl. No. 15/947,065, 9 pages.
Notice of Allowance mailed Sep. 19, 2018 from U.S. Appl. No. 15/167,682, 7 pages.
Non-Final Office Action mailed Jun. 25, 2018 for U.S. Appl. No. 29/541,565, 10 pages.
Non-Final Office Action mailed Oct. 24, 2018 for U.S. Appl. No. 15/688,266, 14 pages.
Notice of Allowance mailed Oct. 9, 2018 from U.S. Appl. No. 29/653,142, 7 pages.
Notice of Allowance mailed Nov. 27, 2018 from U.S. Appl. No. 15/167,682, 11 pages.
Non-Final Office Action mailed Dec. 5, 2018 from U.S. Appl. No. 14/942,937, 13 pages.
Notice of Allowance mailed Jan. 2, 2019 from U.S. Appl. No. 29/541,565, 6 pages.
Notice of Allowance mailed Feb. 8, 2019 from U.S. Appl. No. 29/541,565, 5 pages.
Non-Final Office Action mailed Feb. 7, 2019 from U.S. Appl. No. 16/200,393, 32 pages.
Notice of Allowance mailed Jan. 28, 2019 from U.S. Appl. No. 29/664,471, 8 pages.
Non-Final Office Action mailed Jul. 24, 2018 from U.S. Appl. No. 29/638,259, 5 pages.
Final Office Action mailed Mar. 15, 2019 from U.S. Appl. No. 15/132,875,15 pages.
Notice of Allowance mailed Apr. 1, 2019 from U.S. Appl. No. 15/167,682, 7 pages.
Non-Final Office Action mailed Apr. 4, 2019 from U.S. Appl. No. 29/678,482, 8 pages.
Notice of Allowance mailed Apr. 8, 2019 from U.S. Appl. No. 29/653,142, 8 pages.
Notice of Allowance mailed Apr. 17, 2019 from U.S. Appl. No. 29/678,478, 7 pages.
Final Office Action mailed Jun. 6, 2019 from U.S. Appl. No. 15/688,266, 7 pages.
Non-Final Office Action mailed Jun. 11, 2019 from U.S. Appl. No. 15/901,738, 6 pages.
Notice of Allowance mailed Jun. 12, 2019 from U.S. Appl. No. 16/016,040, 8 pages.
Ex-Parte Quayle Action mailed Jun. 27, 2019 from U.S. Appl. No. 29/683,730, 5 pages.
Notice of Allowance mailed Jul. 31, 2019 from U.S. Appl. No. 15/167,682 , 7 pages.
Supplemental Notice of Allowance mailed Aug. 5, 2019 from U.S. Appl. No. 15/947,065, 2 pages.
Notice of Allowance mailed Sep. 11, 2019 from U.S. Appl. No. 29/653,142, 6 pages.
Notice of Allowance mailed Sep. 19, 2019 from U.S. Appl. No. 16/016,040, 7 pages.
Corrected Notice of Allowance mailed Sep. 27, 2019 from U.S. Appl. No. 15/167,682 , 2 pages.
Final Office Action mailed Sep. 27, 2019 from U.S. Appl. No. 16/200,393, 34 pages.
Notice of Allowance mailed Feb. 15, 2019 from U.S. Appl. No. 15/947,065, 9 pages.
Notice of Allowance mailed Oct. 1, 2019 from U.S. Appl. No. 14/942,937, 7 pages.
Final Office Action mailed Oct. 3, 2019 from U.S. Appl. No. 29/678,482, 6 pages.
Corrected Notice of Allowance mailed Oct. 10, 2019 from U.S. Appl. No. 16/016,040, 2 pages.
Notice of Allowance mailed Oct. 16, 2019 from U.S. Appl. No. 15/132,875, 12 pages.
Non-Final Office Action mailed Dec. 30, 2019 from U.S. Appl. No. 16/653,497, 8 pages.
Notice of Allowance mailed Feb. 5, 2020 from U.S. Appl. No. 15/901,738, 8 pages.
Notice of Allowance mailed Feb. 5, 2020 from U.S. Appl. No. 29/678,482, 13 pages.
Final Office Action mailed Mar. 17, 2020 for U.S. Appl. No. 29/653,142, 13 pages.

(56) References Cited

OTHER PUBLICATIONS

Non-Final Office Action mailed Apr. 2, 2020 for U.S. Appl. No. 16/522,275, 21 pages.
Notice of Allowance mailed May 18, 2020 from U.S. Appl. No. 15/901,738, 7 pages.
Non-Final Office Action mailed May 20, 2020 for U.S. Appl. No. 15/688,266, 6 pages.
Non-Final Office Action mailed May 26, 2020 for U.S. Appl. No. 16/719,361, 10 pages.
Notice of Allowance mailed Apr. 9, 2020 from U.S. Appl. No. 16/653,497, 7 pages.
Notice of Allowance mailed Jul. 10, 2020 from U.S. Appl. No. 29/694,475, 6 pages.
Corrected Notice of Allowability mailed Oct. 25, 2018 from U.S. Appl. No. 14/183,424, 3 pages.
Ex Parte Quayle Office Action mailed Oct. 16, 2018 for U.S. Appl. No. 29/663,037, 7 pages.
Notice of Allowance mailed Nov. 19, 2018 from U.S. Appl. No. 29/663,037, 5 pages.
Notice of Allowance mailed Nov. 15, 2018 from U.S. Appl. No. 29/663,040, 5 pages.
Notice of Allowance mailed Jul. 20, 2020 from U.S. Appl. No. 29/648,046, 5 pages.
Notice of Allowance mailed Jul. 28, 2020 from U.S. Appl. No. 16/719,361, 8 pages.
Notice of Allowance mailed Jul. 29, 2020 from U.S. Appl. No. 16/522,275, 8 pages.
Non-Final Office Action mailed Aug. 19, 2020 for U.S. Appl. No. 16/886,365, 16 pages.
Notice of Allowance mailed Sep. 8, 2020 from U.S. Appl. No. 29/678,482, 5 pages.
Corrected Notice of Allowance mailed Sep. 11, 2020 from U.S. Appl. No. 16/719,361, 2 pages.
Corrected Notice of Allowance mailed Sep. 14, 2020 from U.S. Appl. No. 16/522,275, 2 pages.
Notice of Allowance mailed Sep. 22, 2020 from U.S. Appl. No. 29/683,730, 6 pages.
Notice of Allowance mailed Sep. 22, 2020 from U.S. Appl. No. 29/653,142, 6 pages.
Notice of Allowance mailed Oct. 27, 2020 from U.S. Appl. No. 29/648,046, 5 pages.
Notice of Allowance mailed Oct. 27, 2020 from U.S. Appl. No. 29/694,475, 5 pages.
Notice of Allowance mailed Nov. 10, 2020 from U.S. Appl. No. 29/688,143, 6 pages.
Notice of Allowance mailed Nov. 10, 2020 from U.S. Appl. No. 29/688,172, 6 pages.
Non-Final Office Action mailed Nov. 30, 2020 from U.S. Appl. No. 17/000,702, 7 pages.
Notice of Allowance mailed Dec. 2, 2020 from U.S. Appl. No. 29/746,262, 6 pages.
Non-Final Office Action mailed Dec. 16, 2020 from U.S. Appl. No. 17/080,080, 28 pages.
Final Office Action mailed Jan. 11, 2021 from U.S. Appl. No. 15/688,266, 7 pages.
Non-Final Office Action mailed Jan. 11, 2021 from U.S. Appl. No. 16/725,606, 7 pages.
Non-Final Office Action mailed Jan. 13, 2021 from U.S. Appl. No. 17/085,636, 14 pages.
Notice of Allowance mailed Jan. 15, 2021 from U.S. Appl. No. 17/000,702, 7 pages.
Notice of Allowance mailed Jan. 22, 2021 from U.S. Appl. No. 17/080,080, 14 pages.
Notice of Allowance mailed Jan. 22, 2021 from U.S. Appl. No. 16/886,365, 7 pages.
Final Office Action mailed Feb. 5, 2021 from U.S. Appl. No. 16/200,393, 7 pages.
Non-Final Office Action mailed Jan. 19, 2021 from U.S. Appl. No. 17/099,650, 15 pages.
Supplemental Notice of Allowance mailed Mar. 10, 2021 from U.S. Appl. No. 16/886,365, 2 pages.
Notice of Allowance mailed Apr. 6, 2021 from U.S. Appl. No. 16/200,393, 11 pages.
Non-Final Office Action mailed Apr. 12, 2021 from U.S. Appl. No. 29/694,475, 11 pages.
Notice of Allowance mailed Apr. 13, 2021 from U.S. Appl. No. 16/725,606, 7 pages.
Notice of Allowance mailed Apr. 26, 2021 from U.S. Appl. No. 17/080,080, 11 pages.
Corrected Notice of Allowance mailed Apr. 28, 2021 from U.S. Appl. No. 16/725,606, 2 pages.
Notice of Allowance mailed May 5, 2021 from U.S. Appl. No. 17/085,636, 8 pages.
Notice of Allowance mailed May 14, 2021 from U.S. Appl. No. 16/881,686, 8 pages.
Notice of Allowance mailed May 17, 2021 from U.S. Appl. No. 15/688,266, 9 pages.
Notice of Allowance mailed May 24, 2021 from U.S. Appl. No. 29/688,143, 6 pages.
Notice of Allowance mailed May 24, 2021 from U.S. Appl. No. 29/688,172, 6 pages.
Notice of Allowance mailed May 27, 2021 from U.S. Appl. No. 16/779,865, 9 pages.
Notice of Allowance mailed May 28, 2021 from U.S. Appl. No. 16/779,824, 11 pages.
Notice of Allowance mailed Jun. 1, 2021 from U.S. Appl. No. 16/719,361, 7 pages.
Corrected Notice of Allowance mailed Jun. 21, 2021 from U.S. Appl. No. 16/779,865, 3 pages.
Non-Final Office Action mailed Jul. 14, 2021 from U.S. Appl. No. 17/118,742, 11 pages.
Notice of Allowance mailed Jul. 21, 2021 from U.S. Appl. No. 17/318, 13 pages.
Supplemental Notice of Allowance mailed Aug. 13, 2021 1 from U.S. Appl. No. 16/779,824, 3 pages.
Supplemental Notice of Allowance mailed Aug. 19, 2021 1 from U.S. Appl. No. 17/318,193, 4 pages.
Notice of Allowance mailed Aug. 20, 2021 1 from U.S. Appl. No. 29/764,875, 5 pages.
Notice of Allowance mailed Sep. 16, 2021 from U.S. Appl. No. 16/779,865, 9 pages.
Non-Final Office Action mailed Oct. 18, 2021 from U.S. Appl. No. 29/696,830, 8 pages.
Notice of Allowance mailed Nov. 3, 2021 from U.S. Appl. No. 17/220,779, 7 pages.
Notice of Allowance mailed Nov. 5, 2021 1 from U.S. Appl. No. 17/318,193, 11 pages.
Non-Final Office Action mailed Nov. 5, 2021 from U.S. Appl. No. 17/379,748, 8 pages.
Notice of Allowance mailed Nov. 8, 2021 1 from U.S. Appl. No. 29/764,875, 5 pages.
Non-Final Office Action mailed Nov. 15, 2021 from U.S. Appl. No. 17/374,674, 7 pages.
Final Office Action mailed Nov. 16, 2021 from U.S. Appl. No. 17/099,650, 14 pages.
Notice of Allowance mailed Nov. 22, 2021 from U.S. Appl. No. 29/694,475, 7 pages.
Notice of Allowance mailed Nov. 24, 2021 from U.S. Appl. No. 17/234,421, 9 pages.
Non-Final Office Action mailed Nov. 30, 2021 from U.S. Appl. No. 17/395,522, 28 pages.
Non-Final Office Action mailed Dec. 1, 2021 from U.S. Appl. No. 16/883,144, 23 pages.
Corrected Notice of Allowance mailed Dec. 10, 2021 from U.S. Appl. No. 17/234,421, 2 pages.
Non-Final Office Action mailed Dec. 13, 2021 from U.S. Appl. No. 29/711,198, 8 pages.
Corrected Notice of Allowance mailed Jan. 11, 2022 from U.S. Appl. No. 29/694,475, 2 pages.
Corrected Notice of Allowance mailed Jan. 12, 2022 from U.S. Appl. No. 16/779,865, 9 pages.

(56) References Cited

OTHER PUBLICATIONS

Non-Final Office Action mailed Jan. 21, 2022 from U.S. Appl. No. 17/229,668, 5 pages.
Notice of Allowance from U.S. Appl. No. 17/379,748 mailed Feb. 16, 2022, 5 pages.
Non-Final Office Action mailed Feb. 16, 2022 from U.S. Appl. No. 29/743,066, 6 pages.
Notice of Allowance mailed Feb. 14, 2022 from U.S. Appl. No. 17/473,934, 9 pages.
Non-Final Office Action mailed Feb. 25, 2022 from U.S. Appl. No. 17/384,564 28 pages.
Notice of Allowance mailed Mar. 11, 2022 from U.S. Appl. No. 17/118,742 13 pages.
Notice of Allowance Mailed Apr. 27, 2022 from U.S. Appl. No. 16/883,144, 11 pages.
Notice of Allowance Mailed Apr. 27, 2022 from U.S. Appl. No. 17/374,674, 7 pages.
Notice of Allowance Mailed Apr. 27, 2022 from U.S. Appl. No. 17/473,934, 9 pages.
Notice of Allowance Mailed Jun. 7, 2022 from U.S. Appl. No. 29/683,638, 7 pages.
Non-Final Office Action mailed Jun. 20, 2022 from U.S. Appl. No. 17/381,147, 4 Pages.
Non-Final Office Action mailed Jun. 22, 2022 from U.S. Appl. No. 29/759,492, 6 Pages.
Notice of Allowance mailed Jul. 11, 2022 from U.S. Appl. No. 29/696,830, 5 Pages.
Final Office Action from U.S. Appl. No. 29/711,198 , 7 Pages.
Non-Final Office Action dated Oct. 25, 2022 from U.S. Appl. No. 17/099,650, 10 Pages.
Final Office Action dated Dec. 15, 2022 from U.S. Appl. No. 29/743,066, 16 pages.
Supplemental Notice of Allowance mailed Jan. 17, 2023 from U.S. Appl. No. 17/384,564 2 pages.
Office Action dated Jan. 24, 2023 from U.S. Appl. No. 17/677,300, 5 pages.
Notice of Allowance mailed Mar. 1, 2023 from U.S. Appl. No. 29/711,198, 7 pages.
Non-Final Office Action mailed Mar. 17, 2023 from U.S. Appl. No. 17/723,370, 5 pages.
Non-Final Office Action mailed Mar. 23, 2023 from U.S. Appl. No. 17/694,489, 9 pages.
Notice of Allowance mailed Mar. 29, 2023 from U.S. Appl. No. 17/666,441, 9 pages.
Notice of Allowance mailed Apr. 10, 2023 from U.S. Appl. No. 29/743,066, 7 pages.
Final Office Action mailed Apr. 12, 2023 from U.S. Appl. No. 29/759,492, 8 Pages.
Non-Final Office Action dated May 8, 2023 from U.S. Appl. No. 17/677,300 , 7 Pages.
Non-Final Office Action dated Jul. 7, 2023 from U.S. Appl. No. 17/826,847, 8 Pages.
Non-Final Office Action dated Aug. 31, 2023 from U.S. Appl. No. 17/379,489, 11 Pages.
Non-Final Office Action dated Oct. 5, 2023 from U.S. Appl. No. 17/328,214, 12 Pages.
Final Office Action dated Oct. 12, 2023 from U.S. Appl. No. 17/723,370, 25 Pages.
Non-Final Office Action dated Oct. 16, 2023 from U.S. Appl. No. 17/694,489, 17 Pages.
Non-Final Office Action dated Oct. 23, 2023 from U.S. Appl. No. 17/381,147, 4 Pages.
Notice of Allowance dated Feb. 5, 2024 from U.S. Appl. No. 17/826,848, 8 Pages.
Petition for Inter Partes Review of U.S. Pat. No. 9,964,266 Pursuant to 37 C.F.R. § 42.100 et seq. *AMP Plus Inc.* dbd *ELCO Lighting* v. *DMF, Inc*, IPR2019-01094 filed May 17, 2019. 108 pages.
IPR2019-01094 Exhibit 1001. U.S. Pat. No. 9,964,266 ("the '266 Patent"). 14 pages.
IPR2019-01094 Exhibit 1002. Declaration of Eric Bretschneider, Ph.D. ("Bretschneider"). 107 pages.
IPR2019-01094 Exhibit 1003. Curriculum Vitae of Dr. Bretschneider. 11 pages.
IPR2019-01094 Exhibit 1004. Excerpts from the File History of U.S. Pat. No. 9,964,266. 105 pages.
IPR2019-01094 Exhibit 1005. Imtra 2011 Marine Lighting Catalog—Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages.
IPR2019-01094 Exhibit 1008. Declaration of Colby Chevalier ("Chevalier"). 89 pages.
IPR2019-01094 Exhibit 1009. U.S. Pat. No. 7,102,172 ("Lynch"). 41 pages.
IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL-8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page.
IPR2019-01094 Exhibit 1013. Illuminating Engineering Society of North America, IES Lighting Handbook (John E. Kaufman and Howard Haynes eds., Application vol. 1981) ("Lighting Handbook"). 5 pages.
IPR2019-01094 Exhibit 1014. California Energy Commission, Pier Lighting Research Program: Project 2.3 Low-profile LED Luminaires Final Report (Prepared by Lighting Research Center, Jan. 2005) ("Pier LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, Luxeon Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages.
IPR2019-01094 Exhibit 1019. U.S. Department of Energy, CALiPER Benchmark Report: Performance of Incandescent A-Type and Decorative Lamps and LED Replacements (prepared by Pacific National Laboratory, Nov. 2008) ("CALiPER 2008"). 25 pages.
IPR2019-01094 Exhibit 1020. U.S. Pat. No. 3,836,766 ("Auerbach"). 13 pages.
IPR2019-01094 Exhibit 1021. U.S. Department of Energy, CALiPER Application Summary Report 16: LED BR30 and R30 Lamps (prepared by Pacific Northwest National Laboratory, Jul. 2012) ("CALiPER 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.
IPR2019-01094 Exhibit 1023. Sylvania, Post Top Street Light LED Retrofit Kit Specification, LED40Post (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year Program Plan FY'07-FY'12 (prepared by Navigant Consulting, Inc., Mar. 2006) ("DOE 2006"). 129 pages.

(56) References Cited

OTHER PUBLICATIONS

IPR2019-01094 Exhibit 1028. U.S. Department of Energy, Solid-State Lighting ResearA1023:C1043elopment: Multi-Year Program Plan (Apr. 2013) ("DOE 2013"). 89 pages.
Declaration of Colby Chevalier from Central District of California Civil Docket for Case #: 2:18-cv-07090-CAS-GJS filed Jun. 3, 2019, signed Jun. 3, 2019. 2 pages.
Docket Listing in Inter Partes Review of U.S. Pat. No. 9,964,266. Docket *Navegator AMP Plus, Inc. d/b/a Elco Lighting et al v. DMF, Inc.* PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd ELCO Lighting v. DMF, Inc*, PTAB-IPR2019-01500 filed Aug. 14, 2019. 99 pages.
Docket Listing in Inter Partes Review of U.S. Pat. No. 9,964,266 . *AMP Plus, Inc. d/b/a ELCO Lighting et al v. DMF, Inc.* PTAB-IPR2019-01500. Downloaded Mar. 25, 2020. 3 pages.
Civil Action No. 2:18-cv-07090. Complaint for Infringement and Unfair Competition. *DMF, Inc. v. AMP Plus, Inc. d/b/a ELCO Lighting.* 52 pages. Dated Aug. 15, 2018.
Docket Listing in Civil Action No. 2:18-cv-07090. *DMF, Inc. v. AMP Plus, Inc. d/b/a ELCO Lighting et al* CDCA-2-18-cv-07090. Downloaded on Mar. 25, 2020. 39 pages.
Civil Action No. 2:19-cv-4519.Complaint for Patent Infringement. *DMF, Inc. v. AMP Plus, Inc. d/b/a ELCO Lighting.* 23 pages dated May 22, 2019.
Docket Listing in Civil Action No. 2:19-cv-4519. *DMF Inc v. AMP Plus, Inc. d/b/a ELCO Lighting et al* CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant to 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.
Declaration of Eric Bretschneider, Ph.D in Support of Amp Plus, Inc.'s Opposition to Dmf, Inc.'s Motion for Partial Summary Judgment in Civil Action No. 2:18-cv-07090-CAS-GJS filed Feb. 10, 2020. 210 pages.
Plaintiff DMF's Reply in Support of Motion for Partial Summary Judgment in Civil Action No. 2:18-cv-07090-CAS-GJS filed Feb. 18, 2020. 33 pages.
Declaration of James R. Benya in Support of Plaintiff DMF's Motion for Summary Judgment in Civil Action No. 2:18-cv-07090-CAS-GJS filed Feb. 3, 2020. 193 pages.
Underwriters Laboratories Inc. Standard for Safely. UL 1598. Luminaires Feb. 11, 2020. 12 pages.
Exceptional LED Lighting Technology Product Portfolio. LightingScience 2012. 11 pages.
"Cree LMH2 LED Modules," Mouser Electronics. Sep. 9, 2012. 4 pages.
Slim Line Disc. Eye LEDs Specification Sheet 2012. 2 pages.
HiBay LED Heat Sink. Wakefield-vette. Dec. 11, 2017. 1 pages.
Thermal Management of Cree® XLamp® LEDs. Cree Application Note. 2004. 19 pages.
Imtra Marine Lighting Fall 2007 Catalog. 32 pages.
Cree LMH2 LED Modules Product Family Data Sheet. Cree 2011-2014, 18 pages.
Cree LMH2 LED Modules Design Guide. Cree 2011-2015, 23 pages.
Brochure of Elco EL49A, EL49ICA, EL49RA modules. Elco Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS dated Sep. 15, 2020, 37 pages.
Defendant AMP Plus, Inc. D/B/A Elco Lighting's Supplemental Responses to Plaintiff DMF, Inc.'s First Set of Interrogatories (Nos. 1-16) in C.A. No. 2:19-CV-4519-CAS, Redacted, dated Jul. 29, 2020. 13 pages.
Final Written Decision in IPR2019-01094 dated Nov. 19, 2020, 58 pages.
Opinion from the Fed. Ct. of App. in *Amp Plus, Inc. v. DMF, Inc.* in case Nos. 2021-1595, 2021-1636 (Appeals from the PTAB in IPR2019-01094) decided on Nov. 10, 2022, 15 pages.
Notice of Allowance dated Jun. 12, 2024 in U.S. Appl. No. 17/694,489, 11 Pages.
Final Office Action dated Jun. 13, 2024 in U.S. Appl. No. 17/379,489, 12 Pages.
U.S. Appl. No. 15/897,955, filed Feb. 15, 2018, Fardadi et al.
U.S. Appl. No. 29/648,937, filed May 24, 2018, Kopitzke.
U.S. Appl. No. 15/637,742, filed Jun. 29, 2017, Kopitzke, IV.
U.S. Appl. No. 15/853,400, filed Dec. 22, 2017, Kashani.
U.S. Appl. No. 14/184,601, filed Feb. 19, 2014, Danesh.
U.S. Appl. No. 15/947,065, filed Apr. 6, 2018, Danesh.
U.S. Appl. No. 16/522,275, filed Jul. 25, 2019, Danesh.
U.S. Appl. No. 17/080,080, filed Oct. 26, 2020, Danesh.
U.S. Appl. No. 17/395,522, filed Aug. 6, 2021, Danesh.
U.S. Appl. No. 17/826,847, filed May 27, 2022, Danesh.
U.S. Appl. No. 18/678,652, filed May 30, 2024, Danesh.
U.S. Appl. No. 29/663,037, filed Sep. 11, 2018, Danesh et al.
U.S. Appl. No. 29/688,143, filed Apr. 18, 2019, Danesh et al.
U.S. Appl. No. 15/167,682, filed May 27, 2016, Bailey et al.
U.S. Appl. No. 16/725,606, filed Dec. 23, 2019, Bailey et al.
U.S. Appl. No. 29/638,259, filed Feb. 26, 2018, Danesh.
U.S. Appl. No. 29/663,040, filed Sep. 11, 2018, Danesh et al.
U.S. Appl. No. 29/688,172, filed Apr. 18, 2019, Danesh et al.
U.S. Appl. No. 29/746,262, filed Aug. 12, 2020, Danesh et al.
U.S. Appl. No. 29/764,875, filed Jan. 4, 2021, Danesh et al.
U.S. Appl. No. 29/820,189, filed Dec. 20, 2021, Danesh et al.
U.S. Appl. No. 14/183,424, filed Feb. 18, 2014, Danesh.
U.S. Appl. No. 16/200,393, filed Nov. 26, 2018, Danesh.
U.S. Appl. No. 15/132,875, filed Apr. 19, 2016, Danesh.
U.S. Appl. No. 16/779,824, filed Feb. 3, 2020, Danesh.
U.S. Appl. No. 17/473,934, filed Sep. 13, 2021, Danesh et al.
U.S. Appl. No. 17/902,469, filed Sep. 2, 2022, Danesh.
U.S. Appl. No. 14/942,937, filed Nov. 16, 2015, Peng et al.
U.S. Appl. No. 16/779,865, filed Feb. 3, 2020, Danesh et al.
U.S. Appl. No. 17/666,441, filed Feb. 7, 2022, Danesh et al.
U.S. Appl. No. 15/688,266, filed Aug. 28, 2017, Lofti et al.
U.S. Appl. No. 17/381,147, filed Jul. 20, 2021, Lotfi et al.
U.S. Appl. No. 18/068,639, filed Dec. 20, 2022, Danesh et al.
U.S. Appl. No. 29/541,565, filed Oct. 5, 2015, Peng.
U.S. Appl. No. 29/645,941, filed Apr. 30, 2018, Danesh et al.
U.S. Appl. No. 29/664,471, filed Sep. 25, 2018, Danesh et al.
U.S. Appl. No. 29/694,475, filed Jun. 11, 2019, Peng et al.
U.S. Appl. No. 29/752,046, filed Sep. 24, 2020, Peng et al.
U.S. Appl. No. 17/099,650, filed Nov. 16, 2020, Danesh et al.
U.S. Appl. No. 29/648,046, filed May 17, 2018, Williams.
U.S. Appl. No. 29/762,016, filed Dec. 14, 2020, Williams et al.
U.S. Appl. No. 16/016,040, filed Jun. 22, 2018, Danesh.
U.S. Appl. No. 16/653,497, filed Oct. 15, 2019, Danesh et al.
U.S. Appl. No. 16/881,686, filed May 22, 2020, Danesh et al.
U.S. Appl. No. 17/085,636, filed Oct. 30, 2020, Danesh et al.
U.S. Appl. No. 29/653,142, filed Jun. 11, 2018, Danesh et al.
U.S. Appl. No. 29/683,730, filed Mar. 15, 2019, Danesh et al.
U.S. Appl. No. 29/759,492, filed Nov. 23, 2020, Danesh et al.
U.S. Appl. No. 29/678,478, filed Jan. 29, 2019, Danesh et al.
U.S. Appl. No. 29/711,198, filed Nov. 29, 2019, Danesh et al.
U.S. Appl. No. 29/678,482, filed Jan. 29, 2019, Danesh et al.
U.S. Appl. No. 29/757,754, filed Nov. 9, 2020, Danesh et al.
U.S. Appl. No. 17/118,742, filed Dec. 11, 2020, Danesh et al.
U.S. Appl. No. 17/867,522, filed Jul. 18, 2022, Danesh et al.
U.S. Appl. No. 15/901,738, filed Feb. 21, 2018, Danesh.
U.S. Appl. No. 17/000,702, filed Aug. 24, 2020, Danesh.
U.S. Appl. No. 17/234,421, filed Apr. 19, 2021, Danesh.
U.S. Appl. No. 17/677,300, filed Feb. 22, 2022, Danesh.
U.S. Appl. No. 16/690,970, filed Nov. 21, 2019, Nikooyan et al.
U.S. Appl. No. 16/883,144, filed May 26, 2020, Nikooyan et al.

(56) References Cited

OTHER PUBLICATIONS

U.S. Appl. No. 17/933,257, filed Sep. 19, 2022, Danesh et al.
U.S. Appl. No. 17/384,564, filed Jul. 23, 2021, Kopitzke et al.
U.S. Appl. No. 18/171,379, filed Feb. 20, 2023, Kopitzke et al.
U.S. Appl. No. 16/886,365, filed May 28, 2020, Shen.
U.S. Appl. No. 17/229,668, filed Apr. 13, 2021, Shen.
U.S. Appl. No. 17/318,193, filed May 12, 2021, Danesh et al.
U.S. Appl. No. 17/694,489, filed Mar. 14, 2022, Danesh et al.
U.S. Appl. No. 13/484,901, filed May 31, 2012, Danesh.
U.S. Appl. No. 16/719,361, filed Dec. 18, 2019, Danesh et al.
U.S. Appl. No. 17/374,674, filed Jul. 13, 2021, Danesh.
U.S. Appl. No. 17/902,474, filed Sep. 2, 2022, Danesh.
U.S. Appl. No. 17/379,489, filed Jul. 19, 2021, Vinh et al.
U.S. Appl. No. 18/055,070, filed Nov. 14, 2022, Kumar.
U.S. Appl. No. 18/488,145, filed Oct. 17, 2023, Kumar, et al.
U.S. Appl. No. 29/743,066, filed Jul. 17, 2020, Young et al.
U.S. Appl. No. 17/379,748, filed Jul. 19, 2021, Young et al.
U.S. Appl. No. 17/723,370, filed Apr. 18, 2022, Young et al.
U.S. Appl. No. 16/182,481, filed Nov. 6, 2018, Kopitzke.
U.S. Appl. No. 17/385,766, filed Jul. 26, 2021, Kopitzke.
U.S. Appl. No. 17/378,214, filed Jul. 16, 2021, Kopitzke et al.
U.S. Appl. No. 16/033,122, filed Jul. 11, 2018, Fardadi et al.
U.S. Appl. No. 29/867,928, filed Nov. 14, 2022, Kopitzke.
U.S. Appl. No. 29/696,830, filed Jul. 1, 2019, Kopitzke.
U.S. Appl. No. 14/726,064, filed May 29, 2015, Bailey et al.
U.S. Appl. No. 29/683,638, filed Mar. 14, 2019, Kopitzke et al.
U.S. Appl. No. 29/867,213, filed Oct. 14, 2022, Kopitzke et al.
U.S. Appl. No. 17/220,779, filed Apr. 1, 2021, Kopitzke et al.
U.S. Appl. No. 17/582,921, filed Jan. 24, 2022, Kopitzke et al.
U.S. Appl. No. 15/158,538, filed May 18, 2016, Kashani.
U.S. Appl. No. 14/791,249, filed Jul. 2, 2015, Lee.
U.S. Appl. No. 29/467,026, filed Sep. 13, 2013, Danesh et al.
U.S. Appl. No. 14/823,410, filed Aug. 11, 2015, Williams et al.
*DMF, Inc.* v. *AMP Plus, Inc. d/b/a ELCO Lighting et al*, CDCA-2-18-cv-07090.
*DMF, Inc.* v. *AMP Plus, Inc. d/b/a ELCO Lighting et al*, CDCA-2-19-cv-04519.
*AMP Plus, Inc. d/b/a Elco Lighting et al* v. *DMF, Inc.* PTAB-IPR2019-01094.
*AMP Plus, Inc. d/b/a Elco Lighting et al* v. *DMF, Inc.* PTAB-IPR2019-01500.
Notice of Allowance dated Jul. 25, 2024 in U.S. Appl. No. 17/378,214, 16 Pages.
Non-Final Office Action dated Aug. 8, 2024 in U.S. Appl. No. 29/752,046, 9 pages.
Notice of Allowance dated Aug. 12, 2024 in U.S. Appl. No. 17/381,147, 8 pages.
Notice of Allowance dated Sep. 17, 2024 in U.S. Appl. No. 17/723,370, 9 pages.
Ex Parte Quayle Office Action mailed Dec. 5, 2024 for U.S. Appl. No. 17/694,489, 8 pages.
Non-Final Office Action dated Jan. 10, 2025 in U.S. Appl. No. 18/678,652, 6 pages.
Canadian Office Action in Canadian App. No. 3,073,988 dated Jan. 20, 2025, 7 pages.
Canadian Office Action in Canadian App. No. 3,115,146 dated Mar. 26, 2024, 4 pages.
Canadian Office Action in Canadian App. No. 3,115,146 dated Feb. 19, 2025, 4 pages.
Redacted Findings of Fact and Conclusion in U.S. Dist. Ct. of California, CV 2:18-CV-07090-CA5CJS, Jul. 29, 2024, 67 pages.

* cited by examiner

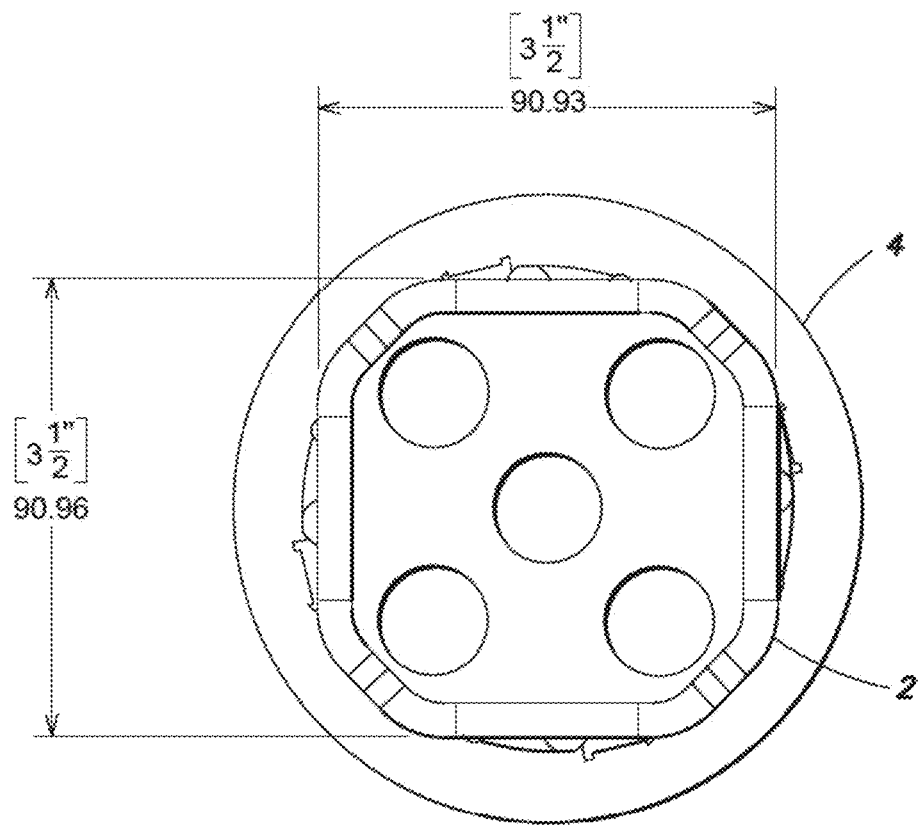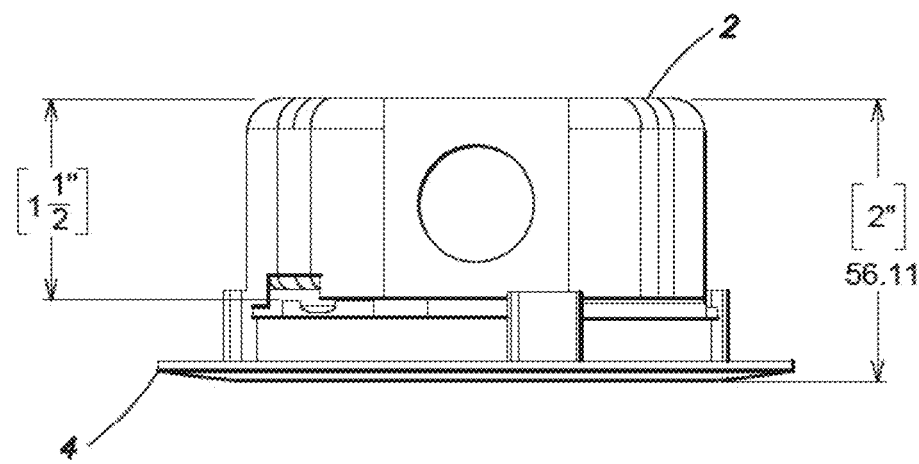
FIG. 3

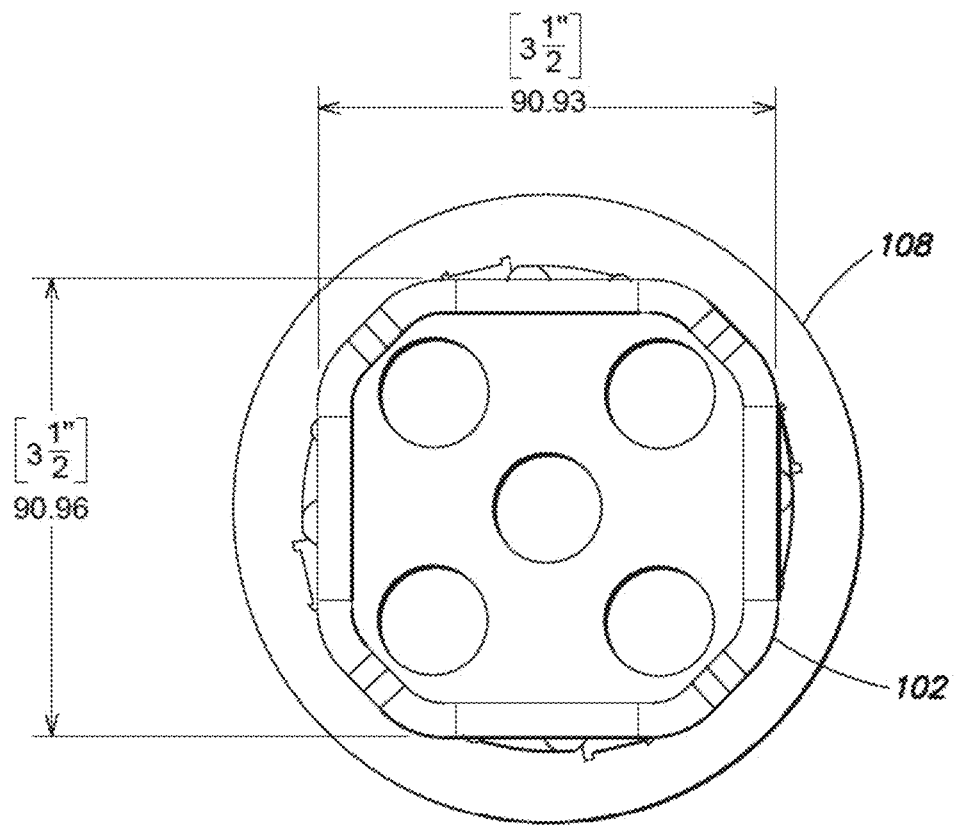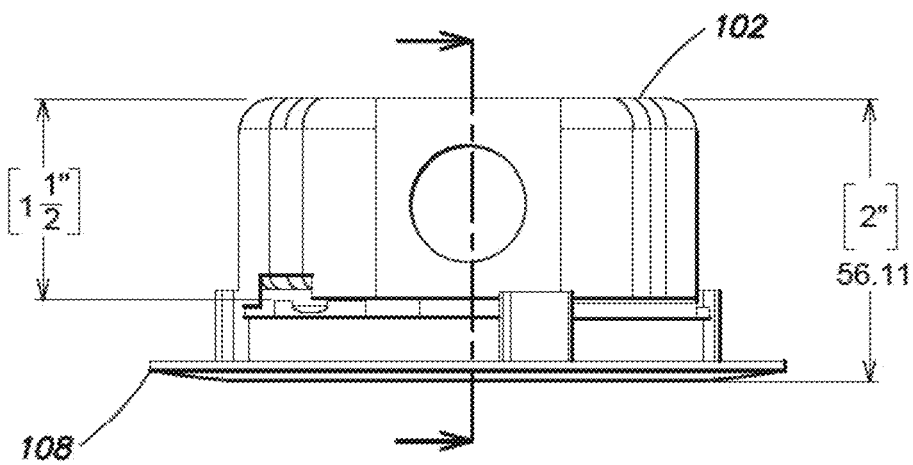
FIG. 9

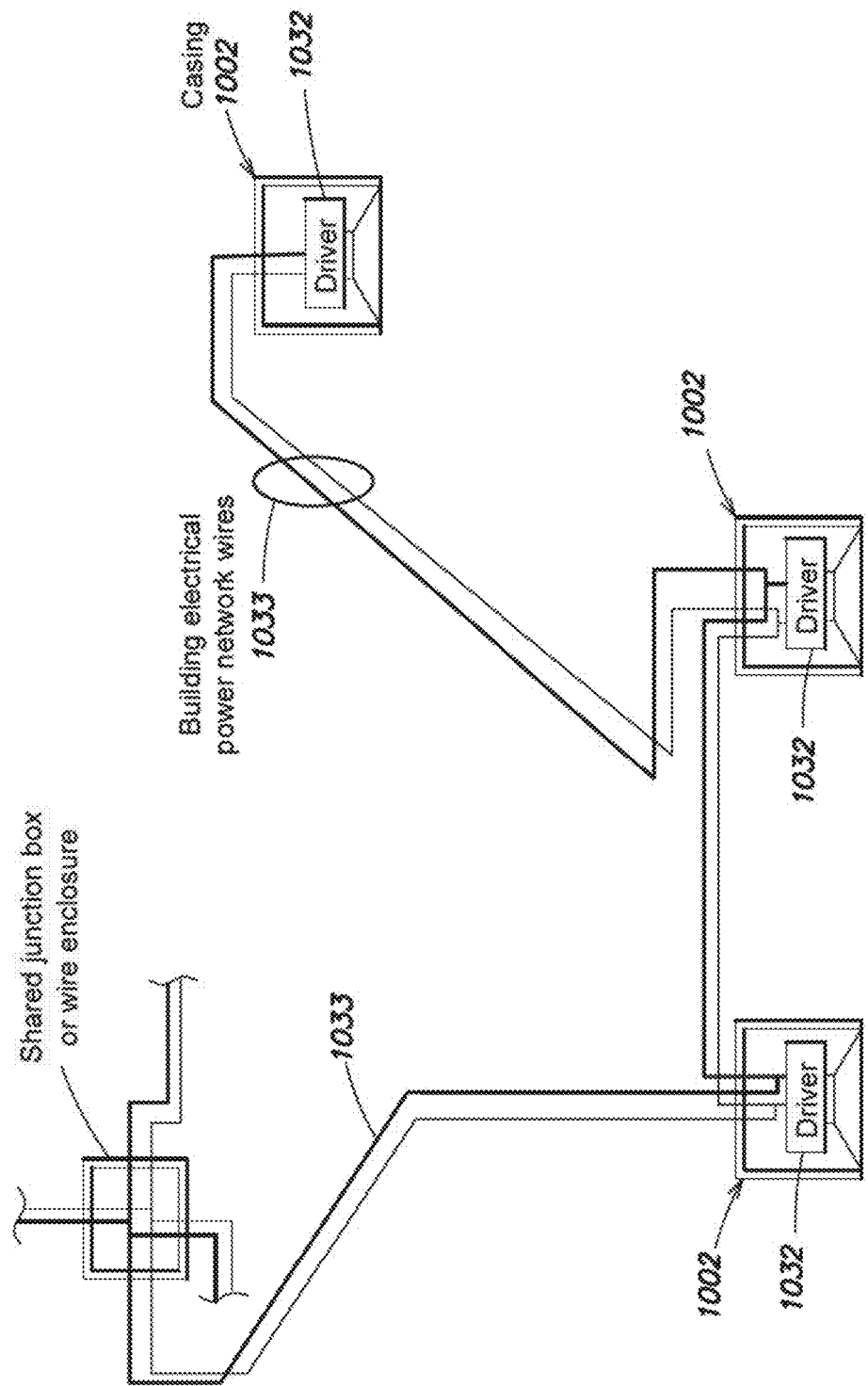

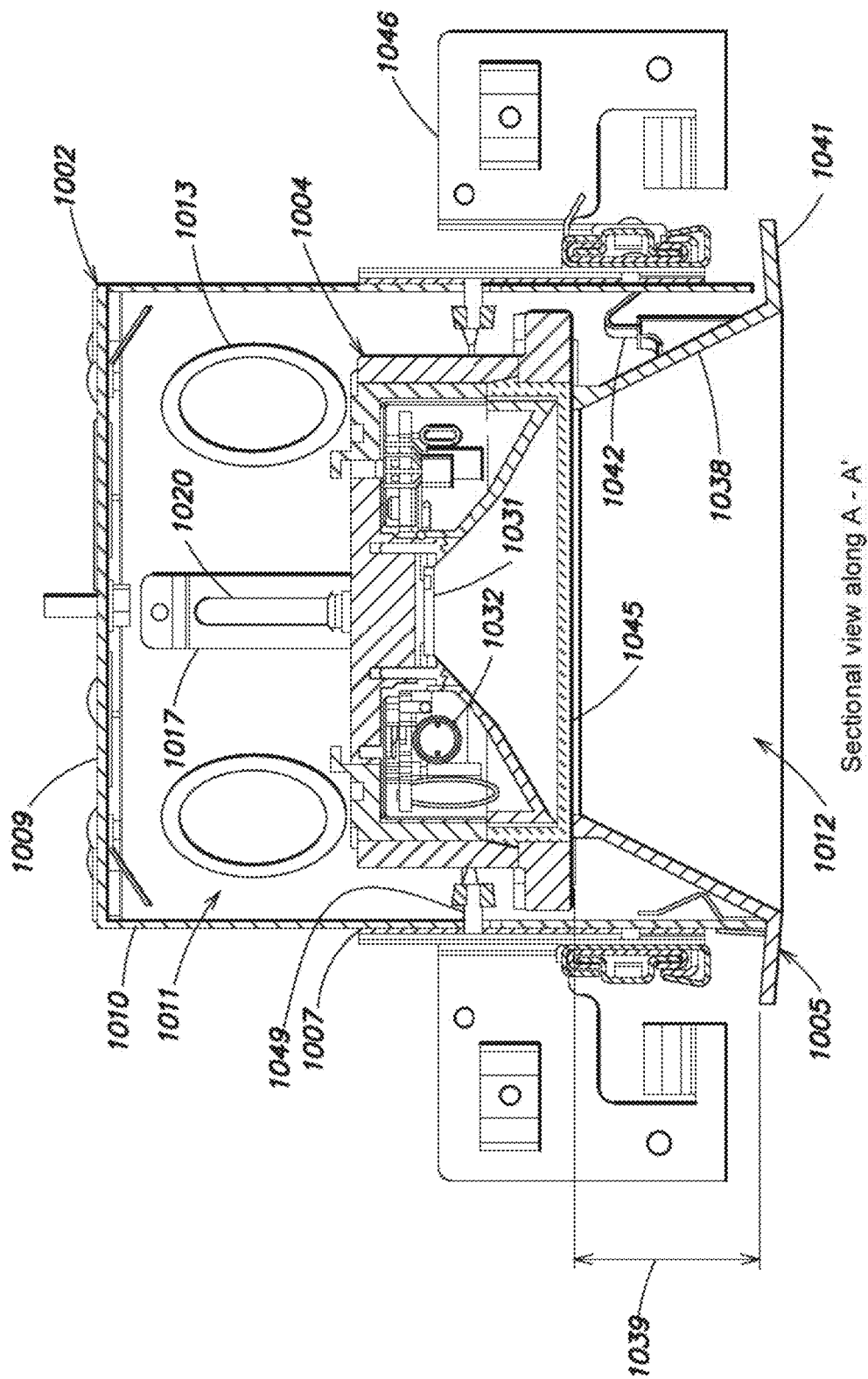
FIG. 27  Sectional view along A - A'

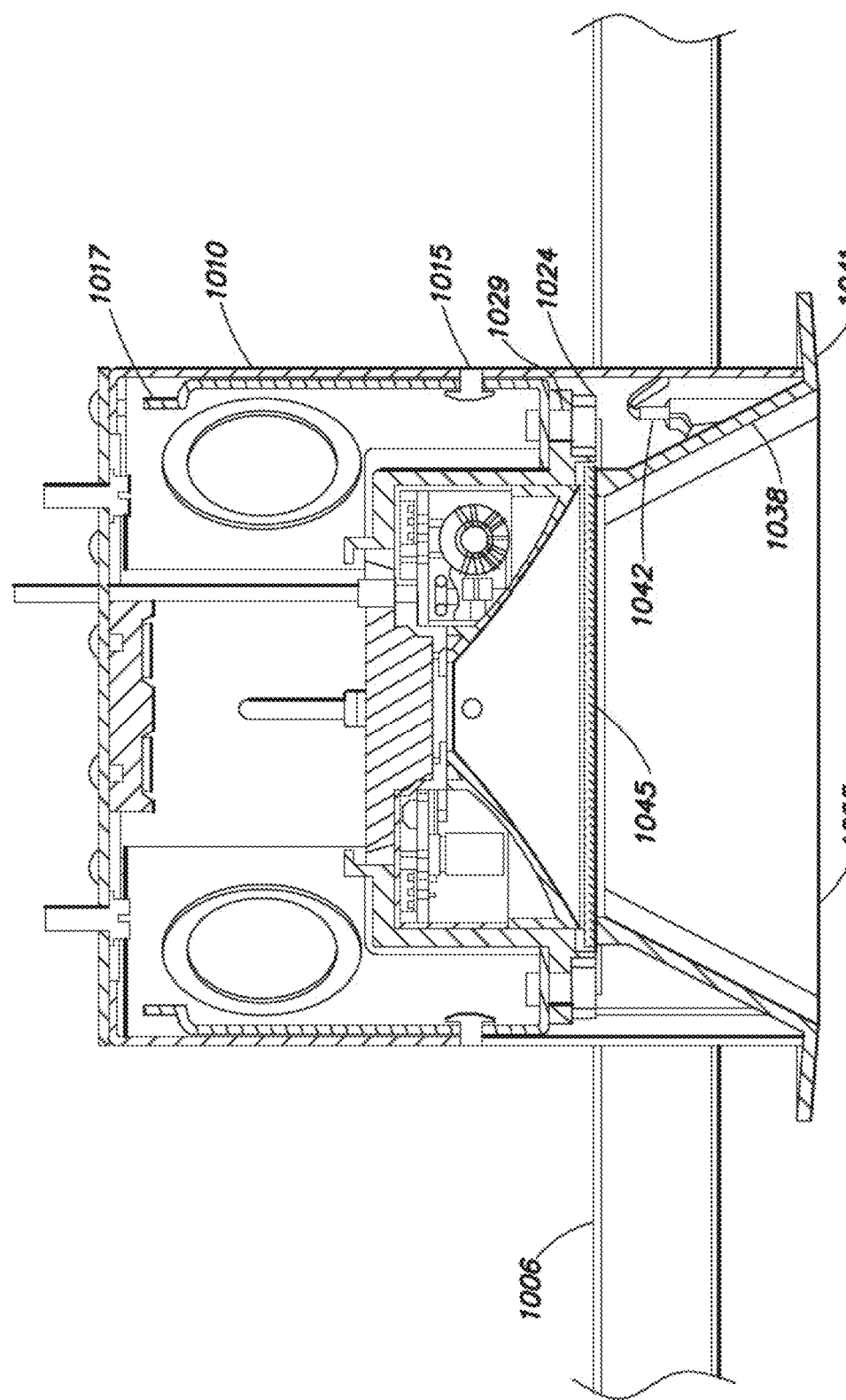

ADJUSTABLE ELECTRICAL APPARATUS WITH HANGAR BARS FOR INSTALLATION IN A BUILDING

CROSS-REFERENCES TO RELATED APPLICATIONS

This application is a continuation (CON) of U.S. patent application Ser. No. 17/677,300, filed Feb. 22, 2022, entitled "ADJUSTABLE ELECTRICAL APPARATUS WITH HANGAR BARS FOR INSTALLATION IN A BUILDING," which is a continuation (CON) of U.S. patent application Ser. No. 17/234,421, filed Apr. 19, 2021, entitled "ADJUSTABLE ELECTRICAL APPARATUS WITH HANGAR BARS FOR INSTALLATION IN A BUILDING," which is a continuation (CON) of U.S. patent application Ser. No. 17/000,702, filed Aug. 24, 2020, entitled "ADJUSTABLE ELECTRICAL APPARATUS WITH HANGAR BARS FOR INSTALLATION IN A BUILDING," which is a continuation (CON) of U.S. patent application Ser. No. 15/901,738, filed Feb. 21, 2018, entitled "LIGHTING APPARATUS AND METHODS," which is a continuation-in-part (CIP) of U.S. patent application Ser. No. 14/183,424, filed Feb. 18, 2014, entitled "ADJUSTABLE COMPACT RECESSED LIGHTING ASSEMBLY WITH HANGAR BARS"; Ser. No. 15/901,738 is also a continuation-in-part (CIP) of U.S. patent application Ser. No. 14/184,601, filed Feb. 19, 2014, entitled "UNIFIED DRIVER AND LIGHT SOURCE ASSEMBLY FOR RECESSED LIGHTING," which in turn claims priority to and the benefit of U.S. Provisional Pat. App. Ser. No. 61/843,278, filed Jul. 5, 2013, entitled "UNIFIED DRIVER AND LIGHT SOURCE ASSEMBLY FOR RECESSED LIGHTING"; Ser. No. 15/901,738 is also a continuation-in-part (CIP) of U.S. patent application Ser. No. 14/942,937, filed Nov. 16, 2015, entitled "RECESSED LIGHTING ASSEMBLY"; Ser. No. 15/901,738 is also a continuation-in-part (CIP) of U.S. patent application Ser. No. 15/132,875, filed Apr. 19, 2016, entitled "OUTER CASING FOR A RECESSED LIGHTING FIXTURE," which in turn claims priority to and the benefit of U.S. Provisional Pat. App. Ser. No. 62/151,308, filed Apr. 22, 2015, entitled "OUTER CASING FOR A RECESSED LIGHTING FIXTURE"; Ser. No. 15/901,738 is also a continuation-in-part (CIP) of U.S. patent application Ser. No. 15/167,682, filed May 27, 2016, entitled "LIGHTING MODULE FOR RECESSED LIGHTING SYSTEMS," which in turn claims priority to and the benefit of U.S. Provisional Pat. App. Ser. No. 62/168,510, filed May 29, 2015, entitled "RECESSED LIGHTING SYSTEM WITH PACKAGING OF POWER SUPPLY CIRCUITRY AND OPTICS"; the entirety of each of the aforementioned applications is hereby expressly incorporated by reference for all purposes.

BACKGROUND

Recessed lighting systems are typically installed or mounted into an opening in a ceiling or a wall.

BRIEF DESCRIPTION OF THE DRAWINGS

The embodiments of the disclosure are illustrated by way of example and not by way of limitation in the figures of the accompanying drawings. It should be noted that references to "an" or "one" embodiment of the in this disclosure are not necessarily to the same embodiment, and they mean at least one.

FIG. 3 shows top and side views of a junction box according to one embodiment.

FIG. 9 shows top and side views of a junction box according to one embodiment.

FIG. 26B depicts part an illumination network in which several of the recessed light units are connected directly without the use of dedicated junction boxes.

FIG. 27 shows a side cross section view of the embodiment of FIG. 26A along the cut A-A'.

FIG. 28 shows a front cross section view of the embodiment of FIG. 26A along the cut B-B'.

DETAILED DESCRIPTION

Several embodiments are described with reference to the appended drawings are now explained. While numerous details are set forth, it is understood that some embodiments of the disclosure may be practiced without these details. In other instances, well-known circuits, structures, and techniques have not been shown in detail so as not to obscure the understanding of this description. According to some embodiments, an apparatus is disclosed, the apparatus comprising a compact recessed lighting module, the compact recessed lighting module configured to be housed in and attachable to a junction box, the compact recessed lighting module including a monolithically formed unified casting, the unified casting having a cavity defined therein, a light source module disposed within the cavity, the light source module configured to emit light, and a driver configured to power the light source module; the monolithically formed unified casting having a plurality of fins defined in the outer surface thereof and a plurality of twist and lock tabs defined therein.

Figure 1A:
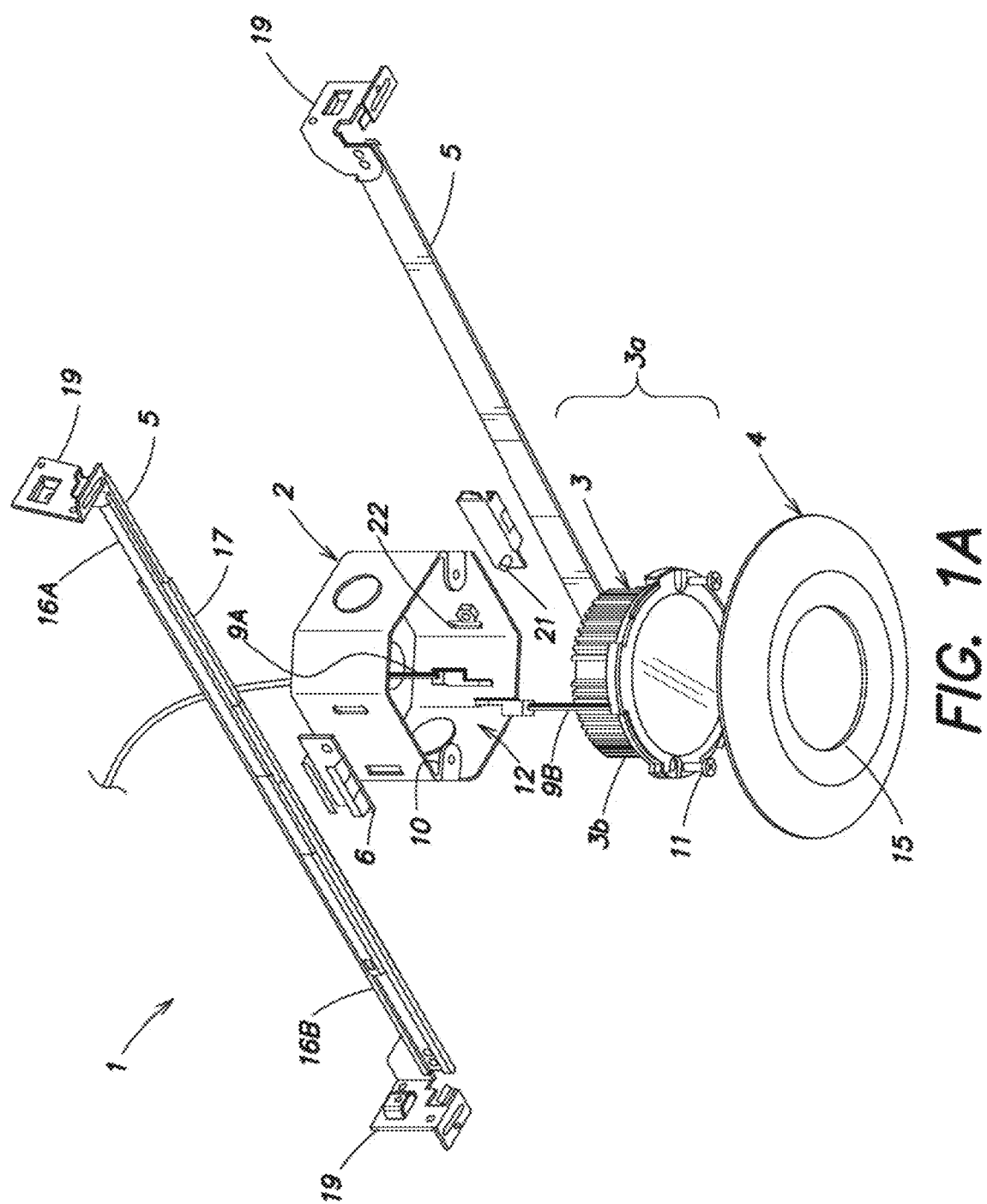
FIG. 1A shows an exploded view of an example recessed lighting system incorporating a compact recessed lighting module according to some embodiments of the disclosure.
Figure 2:
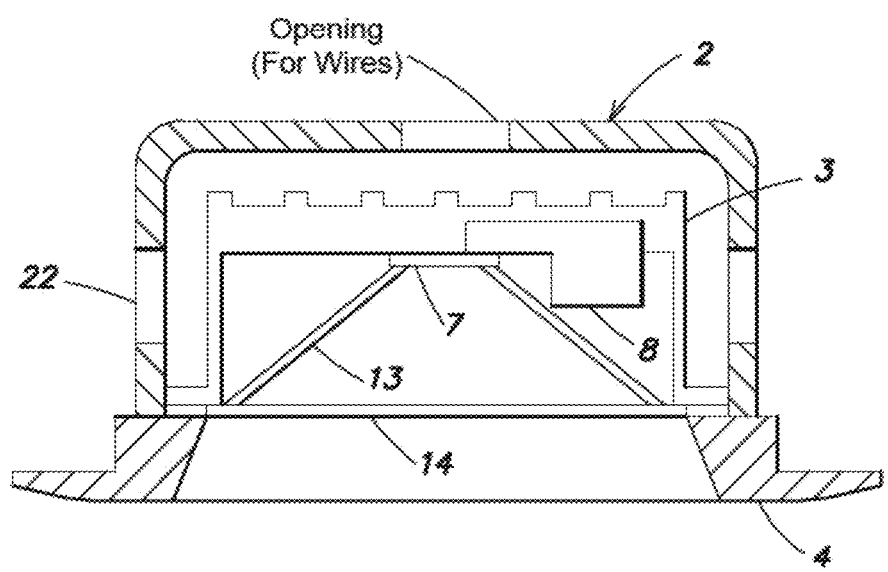
FIG. 2 shows a side view of a combined junction box, light source module, driver, unified casting, and trim of the recessed lighting system according to one embodiment.

FIG. 1A shows an exploded view of a recessed lighting system 1. The recessed lighting system 1 may include a junction box 2, a compact recessed lighting module 3a (in some embodiments, including a unified casting or housing 3, and generally referred to as "compact recessed lighting module", although it is noted the unified casting/housing 3 can be a component or part of a compact recessed lighting module 3a), a trim 4, a set of hangar bars 5, and a set of hangar holders 6. In some embodiments, the compact recessed lighting module 3a/unified casting 3 can include a light source module 7 and a driver 8 in a single compact unit as shown in FIG. 2. As will be described in further detail below, the recessed lighting system 1 provides a more compact and cost effective design that allows the compact recessed lighting module 3a to be moved and adjusted while complying with various building and safety codes/regulations. Each of the elements of the recessed lighting system 1 will be explained by way of example below.

The junction box 2 is a structure that separates the inner components of the recessed lighting system 1, including electrical wires/cables, from the items inside a ceiling or crawl space (e.g., insulation) in which the junction box 2 has been installed. In one embodiment, the junction box 2 may be a single or double gang box with a fire rating of up to two hours as described in the National Electrical Code (NEC) and by the Underwriters Laboratories (UL). The junction box 2 may receive electrical wires 9A from an electrical system (e.g., 120 VAC or 277 VAC) within a building or structure in which the recessed lighting system 1 is installed. The electrical wires 9A from the structure may be connected to corresponding wires 9B of the compact recessed lighting module 3a, as will be described in greater detail below.

In one embodiment, the junction box 2 may include one or more tabs 10 for coupling the junction box 2 to the compact recessed lighting module/unified casting 3. The tabs 10 may be any device/component for receiving corresponding elements 11 of the compact recessed lighting module 3a/unified casting 3 to firmly hold the weight of the compact recessed lighting module/unified casting 3, including the light source module 7 and the driver 8 which may be contained in the unified casting 3. The trim 4 may also be attached to the junction box 2 to hide at least the periphery of the junction box from view. As shown in FIG. 1A, the tabs 10 can include holes for receiving screws or bolts; however, in other embodiments the tabs 10 may facilitate a twist-and-lock friction connection with corresponding elements 11 of the compact recessed lighting module/unified casting 3 and without the use of separate tools or other devices. In still other embodiments, friction or tension clips may be utilized to retain the compact recessed lighting module/unified casting 3 inside the junction box 2.

In one embodiment, the junction box 2 acts as a heat barrier to block heat emitted by the light source module 7 and the driver 8 (See FIG. 2) from reaching possibly flammable items inside a ceiling or crawl space. Accordingly, the compact design may provide fire rating up to two hours. In these embodiments, the junction box 2 may be formed of metals, polymers, metal alloys, and/or other heat insulating materials. As shown in FIG. 1A, the junction box 2 may be a polyhedron that defines a cavity 12 therein. However, in other embodiments, the side wall of the junction box 2 may be curved and have any suitable shape, including an ellipsoid, cone, or cylinder, so that the box is still capable of receiving therein the compact recessed lighting module 3a/unified casting 3. The cavity 12 that is formed in the junction box 2 is larger than the compact recessed lighting module 3a such that the compact recessed lighting module 3a easily fits into the cavity 12, preferably without coming into direct contact with the side walls of the junction box 2. However, in other embodiments, the compact recessed lighting module 3a can be sized to come into direct contact with the side walls of the junction box 2. The size of the cavity 12 may be pursuant to popular industry specifications for junction boxes and in compliance with any applicable building and safety codes/regulations. For example, as shown in the top and side views of FIG. 3, the junction box 2 may have a length of 3½ inches, a width of 3½ inches and a depth of 1½ inches. When coupled together, the combined junction box 2, compact recessed lighting module 3a, and trim 4 may have a height/depth of about 2 inches, e.g., no more than 3 inches, according to some implementations. In one embodiment, the combined junction box 2, compact recessed lighting module 3a, and trim 4 may have a height/depth between 2-3 inches.

The unified casting 3 of the compact recessed lighting module 3a can comprise and/or include a shell and/or enclosure that further prevents the exposure of heat from the light source module 7 and the driver 8 to the items inside a ceiling or crawl space (e.g., insulation) in which the recessed lighting system 1 has been installed. The unified casting 3 and/or compact recessed lighting module 3a can include and/or be formed of metals, polymers, metal alloys, and/or other heat insulating materials. As shown in FIG. 1A, the compact recessed lighting module 3a/unified casting 3 can be a cylindrical structure; however, in other embodiments, the compact recessed lighting module/unified casting can be any suitable shape, including an ellipsoid, cone, or polyhedron, with a top portion or surface that is angled, partially flat, beveled or rounded (e.g., FIG. 11A, FIG. 12A); cone-shaped, pyramidal, or frustum (e.g., FIG. 12B); flat (e.g., FIG. 11B); variations and combinations thereof (e.g., FIG. 10), etc., such that it that is configured for and capable of housing the light source module 7 and the driver 8 therein.

In one embodiment, the electrical wires 9A received by the junction box 2 from the electrical system of a building or structure may be coupled to the electrical wires 9B of the casting 3. As shown, the electrical wires 9A and 9B are connected together through the use of interlocking connectors that may be contained within the box 2 (together with the casting 3). However, in other embodiments, the electrical wires 9A may be coupled to the electrical wires 9B through the use of electrical caps or other devices, and that may be kept outside the box 2 (while the unified casting 3 is retained inside). The electrical wires 9B of the unified casting 3 may terminate in a connection with the driver 8 installed within the unified casting 3. When the wires 9A and 9B are connected, electricity may pass from the electrical system of the building or structure to the driver 8 to enable the driver 8 to power the light source module 7.

In one embodiment, the unified casting 3 includes one or more fins and/or ribs 3b formed in or on the unified casting 3. The fins and/or ribs 3b can be configured as heat sinks to dissipate heat generated by the light source module 7 and/or the driver 8. The fins/ribs shown can act as passive components, in some embodiments passive heat dissipation components that cool the compact recessed lighting module 3a/combined unified casting 3, light source module 7, and driver 8 by dissipating heat into the surrounding air. In some embodiments, active heat sinks (e.g., fans) can additionally or alternatively be used. In one embodiment, a set of fins or ribs 3b formed in and/or surrounding the unified casting 3. The fins or ribs can be composed of one or more of a variety of materials, including thermally conductive materials. For example, the fins or ribs can be made of aluminium alloys, copper, copper-tungsten pseudoalloy, AlSiC (silicon carbide in aluminium matrix), Dymalloy (diamond in copper-silver alloy matrix), E-Material (beryllium oxide in beryllium matrix), and/or thermally conductive plastics or ceramics. In some embodiments, the fins/ribs 3b are defined in and/or integrally formed with the unified casting 3, and thus comprise the same material. In some embodiments, the fins/ribs 3b and unified casting 3 are monolithically formed.

As described above, the recessed lighting system 1 may include the driver 8. The driver 8 is an electronic circuit or device that supplies and/or regulates electrical energy to the light source module 7 and thus powers the light source module 7 to emit light. The driver 8 may be any type of power supply, including power supplies that deliver an alternating current (AC) or a direct current (DC) voltage to the light source module 7. Upon receiving electricity, the driver 8 may regulate current or voltage to supply a stable voltage or current within the operating parameters of the light source module 7. The driver 8 receives an input current from the electrical system of the building or structure in which the recessed lighting system 1 is installed and may drop the voltage of the input current to an acceptable level for the light source module 7 (e.g., from 120V-240V to 36V-48V). The driver 8 may transfer electricity to the light source module 7 through an electrical connector. For example, the driver 8 may deliver electricity to the light source module 7 through an electrical cable coupled between the light source module 7 and the driver 8 through removable or permanent connectors or soldered leads originating from the driver 8. Although shown with magnetic transformer, the driver 8 may include additional or alternative circuitry for voltage conversion and for regulating the input current or voltage to the light source module 7.

The light source module 7 may be any electro-optical device or combination of devices for emitting light. For example, the light source module 7 may have as a single light source a light emitting diode (LED), organic light-emitting diode (OLED), or polymer light-emitting diode (PLED). In some embodiments, the light source module 7 may have multiple light sources (e.g., LEDs, OLEDs, and/or PLEDs). The light source module 7 receives electricity from the driver 8, as described above, such that the light source module 7 may emit a controlled beam of light into a room or surrounding area. The driver 8 is designed to ensure that the appropriate voltage and current are fed to the light source module 7 to enable the emission of light by the one or more light sources within the light source module 7.

The light source module 7 and the driver 8 may be coupled to the casting 3 using any connecting mechanism, including screws, resins, clips, or clamps. For example, in one embodiment, the light source module 7 and the driver 8 may be coupled to the unified casting 3 using friction or tension clips.

Figure 1B:
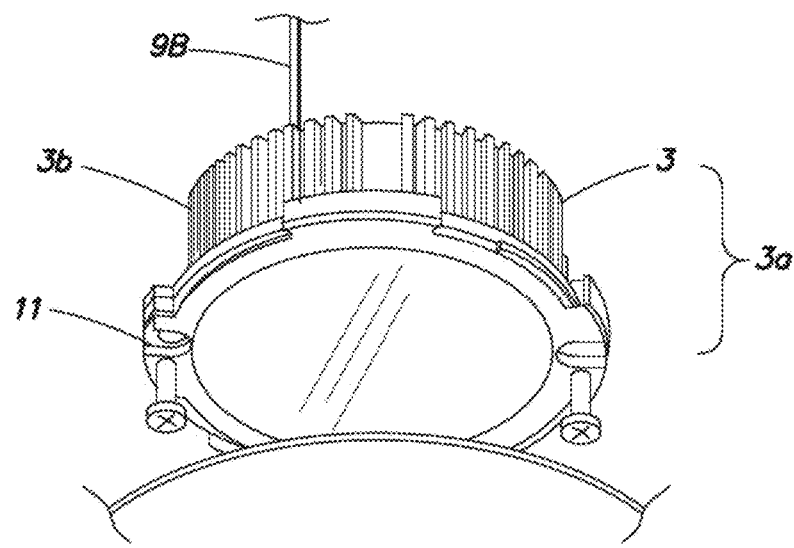
FIG. 1B provides an enlarged perspective view of a recessed lighting module according to some embodiments of the disclosure, FIG. 1C provides a rear perspective view thereof.
Figure 1C:
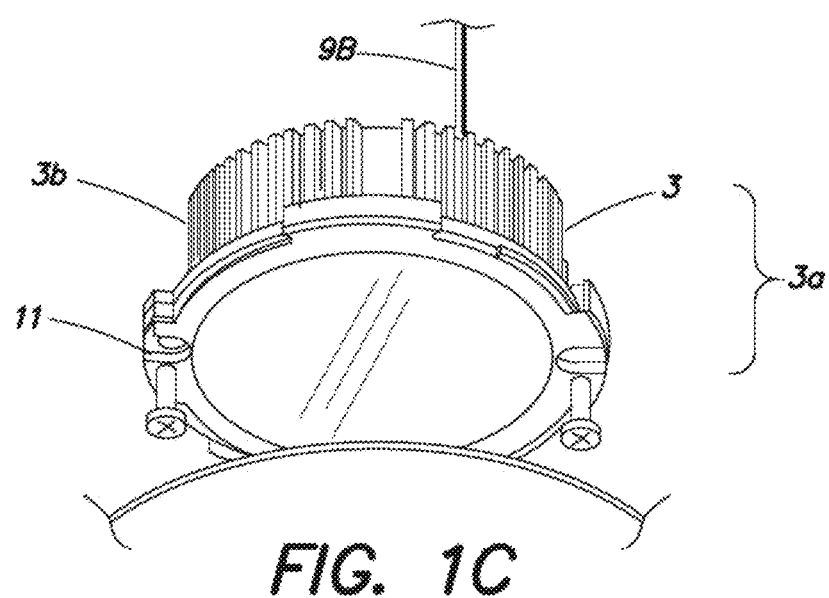
FIG. 1D and FIG. 1E provide complementary perspective views of a recessed lighting module according to some embodiments of the disclosure.
FIG. 1F provides a front view of a recessed lighting module according to some embodiments of the disclosure, with FIG. 1G providing a rotated view thereof.

FIG. 1B provides an enlarged perspective view of a recessed lighting module according to some embodiments of the disclosure, FIG. 1C provides a rear perspective view thereof.

Figure 1D:
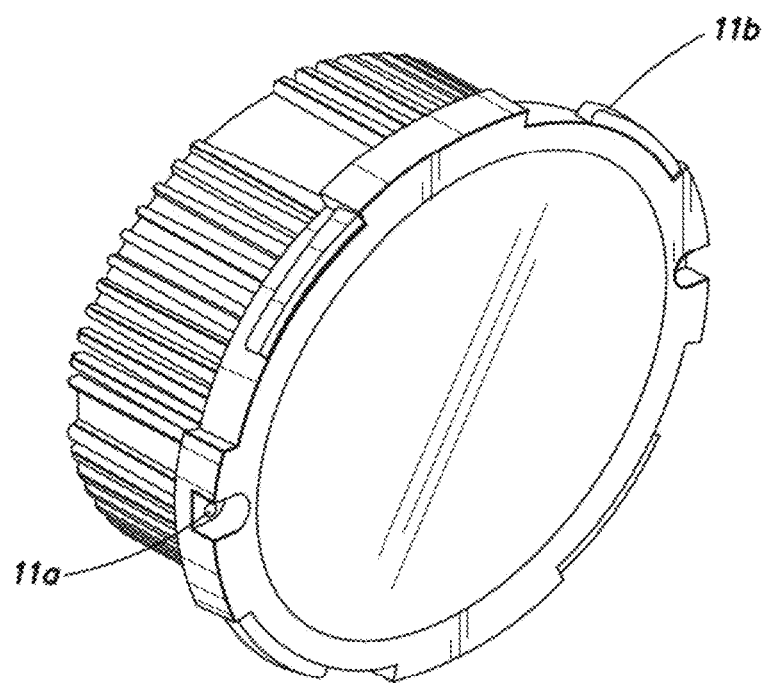
Figure 1E:
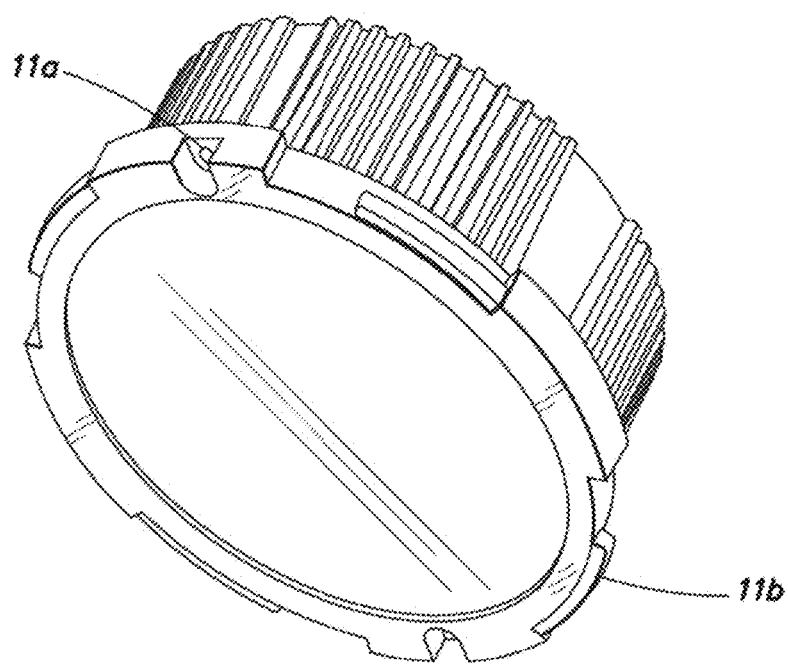
Figure 1F:
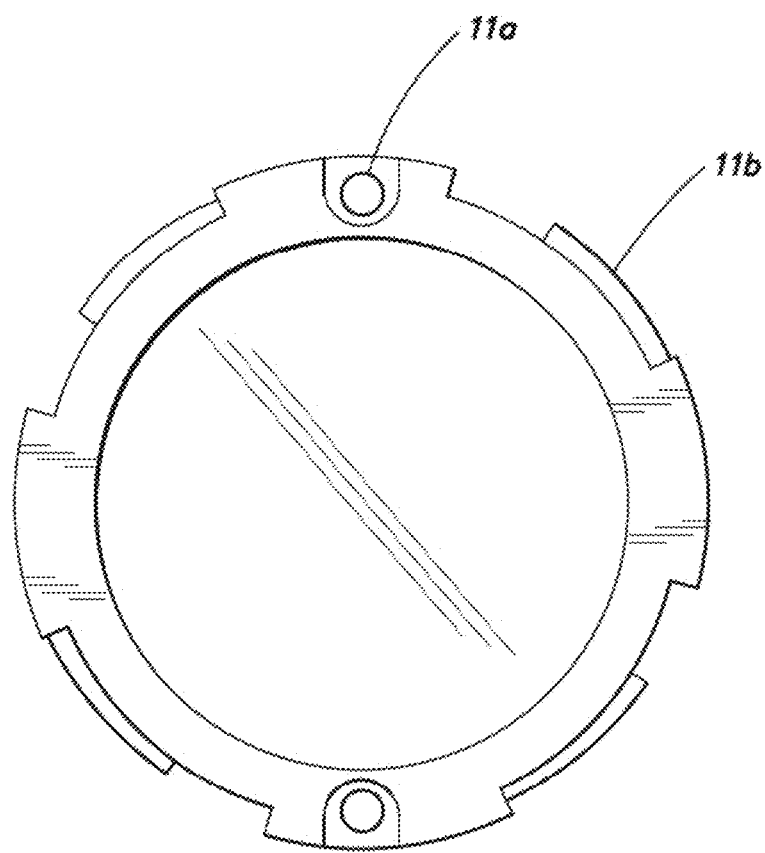
Figure 1G:
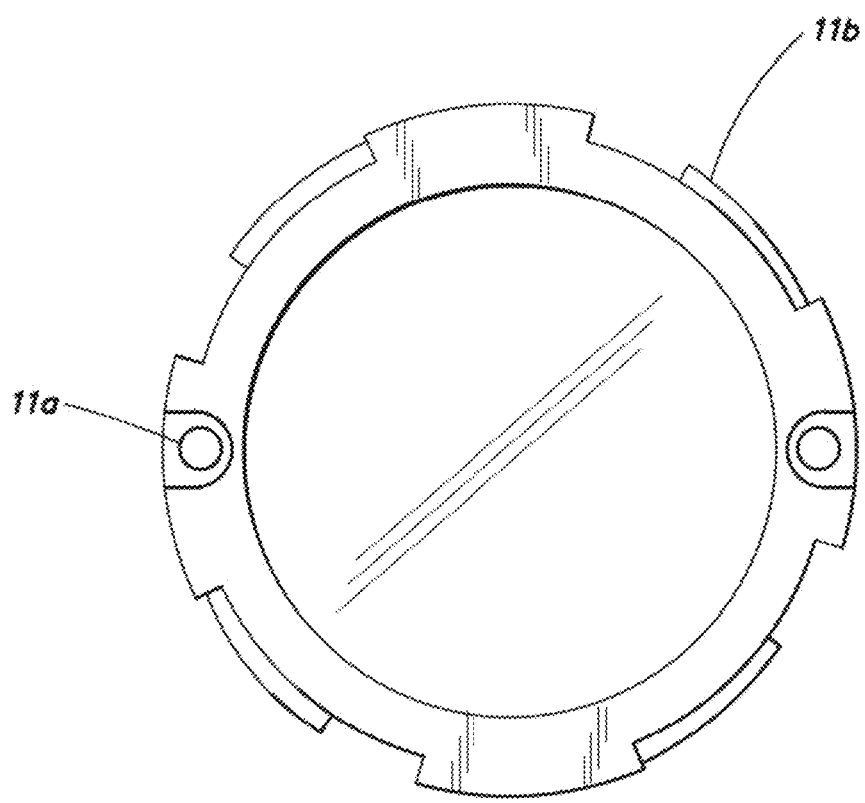

FIG. 1D and FIG. 1E provide complementary perspective views of a recessed lighting module, further illustrating example screw holes (e.g., 11a) and twist and lock/friction fit attachment tabs or members (e.g., 11b) according to some embodiments of the disclosure, with FIG. 1F providing a front view of a recessed lighting module according to some embodiments of the disclosure, with FIG. 1G providing a rotated view thereof. FIG. 32A to FIG. 35B show views of additional embodiments according to some implementations of recessed lighting modules according to some embodiments of the disclosure.

FIGS. 11A-11D provide views of further implementations of the showing twist and lock/friction fit attachment tabs or members (e.g., 11b).

In some embodiments, the recessed lighting system 1 may include a reflector 13 (See, e.g., FIG. 2). The reflector 13 may surround the light source module 7, or just a light source of the light source module 7, to adjust the way light emitted by the light source module 7 is focused inside a room or surrounding area. In one embodiment, the reflector 13 surrounds the light source module 7 and also separates the light source module 7 from the driver 8. This separation allows light from the light source module 7 to be emitted into a room or surrounding area, while shielding the driver 8 from being exposed to the room or surrounding area. For example, in one embodiment, the reflector 13 and the unified casting 3 may together create a sealed structure to shield the driver 8 from the outside environment and the light source module 7. By shielding the driver 8 from the outside environment, the reflector 13 might reduce the risk of fire or other dangers and ensures the recessed lighting system 1 complies with building and safety codes/regulations. The reflector 13 may be formed of any fire retardant material, including steel, aluminum, metal alloys, calcium silicate, and other similar materials.

Although shown as frusto conical, the reflector 13 may be formed in any shape that can direct and/or focus light. For example, the reflector 13 may be parabolic or spherical. In one embodiment, the front surface of the reflector 13 may be coated with a reflecting material or include one or more reflecting elements that assists in the adjustment of light emitted by the light source module 7. For example, the reflector 13 can be coated with a shiny enamel or include one or more mirrors or retroreflectors or a microcellular polyethylene terephthalate (MCPET) material to adjust the focus of light emitted by the light module 7. In other embodiments, the reflector 13 can include various other optic elements to assist in the focusing of light emitted by the light source module 7.

In one embodiment, the recessed lighting system 1 may include a lens 14 (See FIG. 2). The lens 14 may be formed to converge or diverge light emitted by the light source module 7. The lens 14 may be a simple lens comprised of a single optical element or a compound lens comprised of an array of simple lenses (elements) with a common axis. In one embodiment, the lens 14 also provides a protective barrier for the light source module 7 and shields the light source module 7 from moisture or inclement weather. The lens 14 may also assist in the diffusion of light and increase the uniformity of light over the surface of the recessed lighting system 1. The lens 14 may be made of any at least partially transparent material, including glass and hard plastics. In one embodiment, the lens 14 and the reflector 13 are contained in a single indivisible unit to work in conjunction to focus and adjust light emitted by the light source module 7. In other embodiments, the lens 14 and the reflector 13 may be separate, divisible elements.

In one embodiment, the recessed lighting system 1 may include a trim 4. The trim 4 can serves the purpose of covering the exposed edge of the ceiling or wall where a hole is formed in which the recessed lighting system 1 resides while still allowing light from the compact recessed lighting module 3a to be emitted into a room through an aperture 15. In doing so, the trim 4 helps the recessed lighting system 1 appear seamlessly integrated into the ceiling or wall. In one embodiment, the trim 4 is to be attached to the unified casting 3 while in other embodiments the trim 4 is to be attached to the junction box 2. The trim 4 may couple to the casting 3 and/or the junction box 2 using any connecting mechanism, including resins, clips, screws, bolts, or clamps. In one embodiment, the trim 4 may include grooves and/or slots to couple to corresponding grooves and/or slots of the unified casting 3 and/or the junction box 2 using a twist-and-lock friction connection and without the use of separate tools or other devices.

In one embodiment, different diameter trims 4 may be capable of being coupled to the compact recessed lighting module 3a, unified casting 3, and/or the junction box 2. The size and design of the trims 4 may depend on the size of the hole in which the recessed lighting system 1 has been fitted to conceal the exposed wall or ceiling edge that defines the hole. As well, the trim 4 may need to meet the aesthetic demands of the consumer. The trim 4 may be made of aluminum plastic polymers, alloys, copper, copper-tungsten pseudoalloy, AlSiC (silicon carbide in aluminum matrix), Dymalloy (diamond in copper-silver alloy matrix), and E-Material (beryllium oxide in beryllium matrix).

In one embodiment, the recessed lighting system 1 may include a set of hangar bars 5 as shown in FIG. 1A. The hangar bars 5 may be rigid, elongated members that are connected between adjacent joists and/or beams in the walls or ceilings of a structure (See FIG. 5). In one embodiment, each of the hangar bars 5 may be telescoping such that each hangar bar 5 may be extended or retracted to meet the gap between the joists and/or beams. In this embodiment, each hangar bar 5 may include an inner bar element 16A and an outer bar element 16B. The inner bar element 16A may be inserted and then held inside a railing structure 17 formed on the outer bar element 16B. In this configuration, the inner bar element 16A may slide in relation to the outer bar element 16B to vary the total length of each hangar bar 5. In one embodiment, the railing structure 17 within the outer bar element 16B may be formed by a set of guides. The guides may be bent pieces of the outer bar element 16B or tabs that are coupled to the outer bar element 16B. In this fashion, the railing structure 17 forms a channel for the inner bar element 16A.

In one embodiment, each of the hangar bars 5 may include a set of mounting blocks 19. The mounting blocks 19 may be used to couple the hangar bars 5 to the joists and/or beams in the walls or ceilings of a structure. For example, as shown in FIG. 1A, the mounting blocks 19 may include holes for receiving screws and/or nails or other fasteners that enable the hangar bars 5 to be securely attached to a building structure. Although shown in FIG. 1A and described above in relation to holes and screws, in other embodiments, other mechanisms of attachment may be used in conjunction with the mounting blocks 19, including resins, clips, or clamps to attached the bars 5 to the building structure. In one embodiment, the mounting blocks 19 may be integrated in one indivisible structure along with the inner bar element 16A and the outer bar element 16B, while in other embodiments, as shown in FIG. 1A, the mounting blocks 19 may be coupled to the inner bar element 16A and the outer bar element 16B through the use of one or more attachment mechanisms (e.g., screws, bolts, resins, clips, or clamps). Using the above telescoping and mounting features, the recessed lighting system 1 may be installed in almost all the 2"×2" through 2"×16" wood joist constructions, metal stud constructions, and t-bar ceiling constructions.

Figure 4:
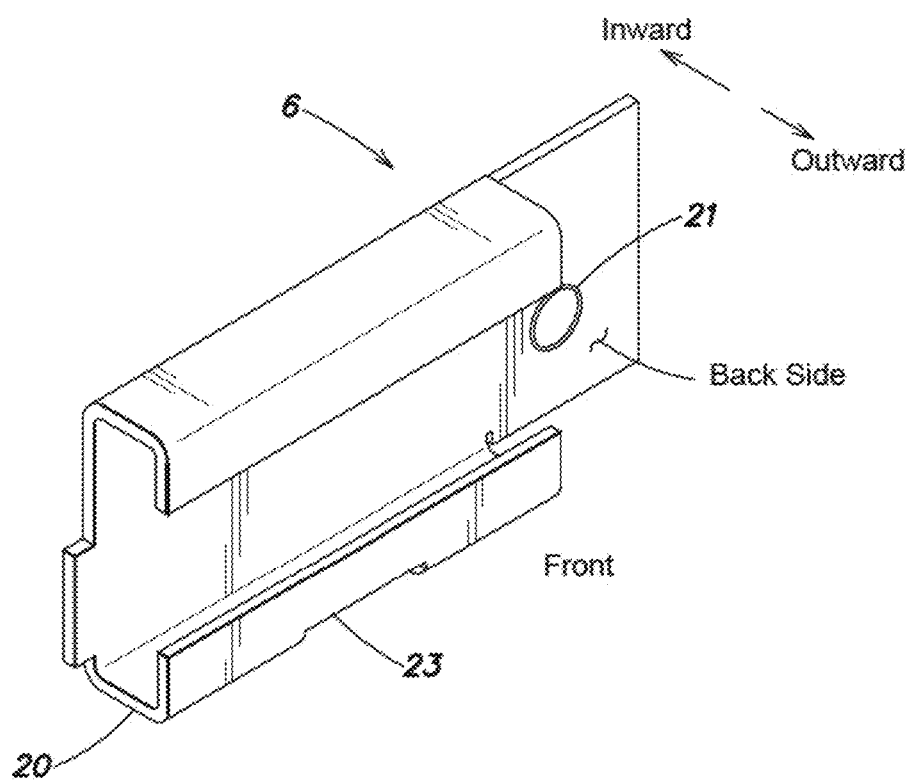
FIG. 4 shows a perspective view of a hangar holder according to one embodiment.

In one embodiment, the recessed lighting system 1 may include a set of hangar holders 6. The hangar holders 6 may be configured to slide or otherwise move along corresponding hangar bars 5. For example, FIG. 4 shows a perspective view of a hangar holder 6 according to one embodiment. As shown in FIG. 4, the hangar holder 6 may form a railing structure 20 to meet the dimensions of the hangar bars 5. Similar to the railing structure 17 of the outer arm elements 16B, the railing structure 20 of the hangar holders 6 may be formed by a set of guides. The guides may be bent pieces of the hangar holders 6 or tabs that are coupled to the hangar holders 6. As described above, the railing structure 20 of the hangar holder 6 allows the hangar holders 6 to slide along the hangar bars 5.

Figure 5:
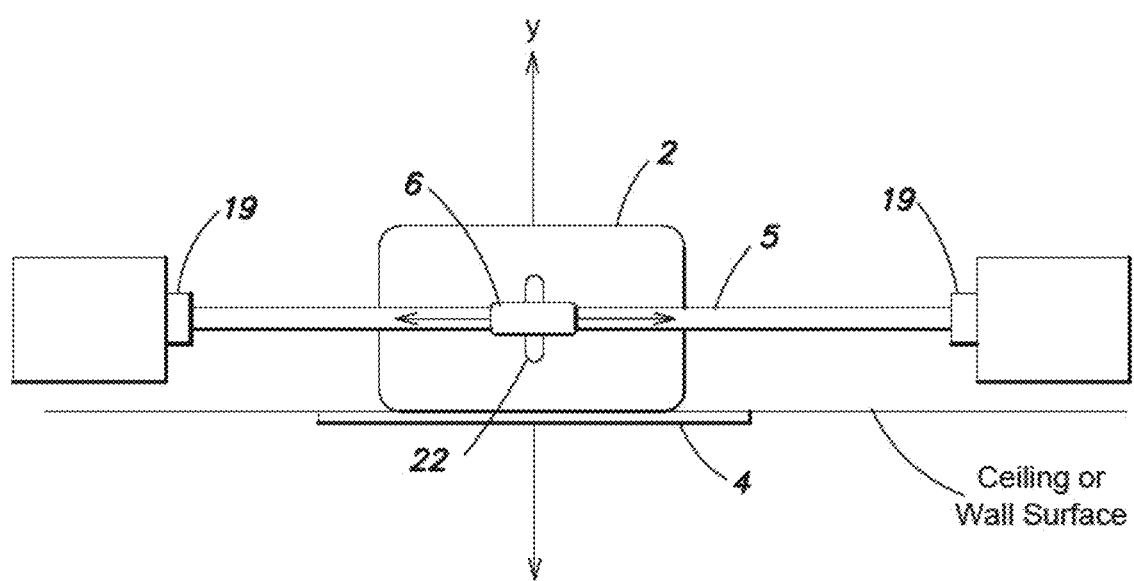
FIG. 5 shows how the junction box and hangar holders can be moved and positioned horizontally along hangar bars and vertically along the axis Y according to one embodiment.

In one embodiment, the hangar holders 6 may include an attachment mechanism 21 for coupling with the junction box 2. The attachment mechanism 21 may be any mechanism that allows the junction box 2 to be removably connected to the hangar bars 5. For example, as shown in FIG. 1A and FIG. 4, the attachment mechanism 21 may be a hole that is to receive a screw or bolt therein. However, in other embodiments, the attachment mechanism 21 may include resins, clips, and/or clamps that allow the hangar holders 6 to be coupled to the junction box 2. By being coupled to the hangar holders 6, the junction box 2, along with the light source module 7 and the driver 8 therein, may be moved across the hangar bars 5 to a desired location as shown in FIG. 5. Accordingly, during installation of the recessed lighting system 1, the hangar bars 5 may be installed inside a gap between beams within a structure by affixing the mounting blocks 19 to the beams, and then the junction box 2, along with the light source module 7 and the driver 8 therein, may be moved by the installer to a desired location along the hangar bars 5 and within the gap.

Figure 6:
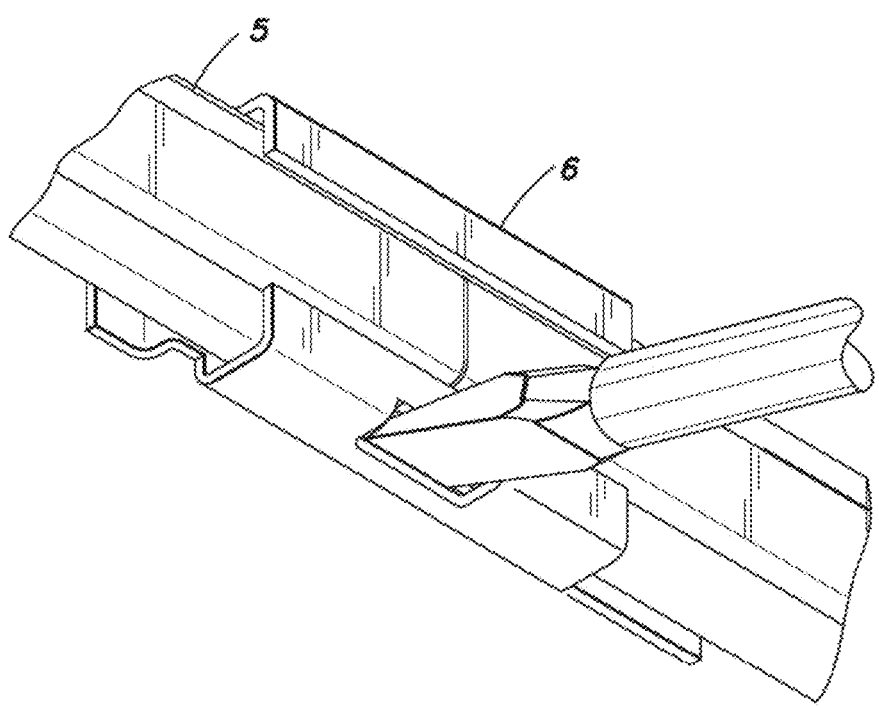
FIG. 6 shows a perspective view of a screwdriver bending a tab of a hangar holder to lock the hangar holder in a position along the hangar bars according to one embodiment.

In one embodiment, the recessed lighting system 1 may include a hangar holder lock 23, which locks the hangar holder 6 at a certain position along the hangar bar 5. The hangar holder lock 23 may be any device or mechanism that locks or secures the hangar holder 6 at a certain position along the hangar bar 5. For example, in one embodiment, one or both of the hangar holder 6 may include a tab, which acts as the hangar holder lock 23. The tab may be bent (e.g., using a screwdriver as shown in FIG. 6) through an opening such that the tab is forced against its corresponding hangar bar 5, or alternatively a portion of the bar 5 is bent and forced against the holder 6, like a pinching action. This friction/tension caused by bending the tab or by bending the bar 5 locks or secures the hangar holder 6 in a desired position along the hangar bar 5.

Referring back to FIG. 1A, in one embodiment, the junction box 2 may include a complimentary slot 22 to engage with the attachment mechanism 21 of the hangar holder 6 (FIG. 4). The slot 22 allows the junction box 2 to be coupled to the hangar holder 6 in one of a number of positions along the bar 5. In this case, the slot 22 is oriented parallel to an axis that is perpendicular to the hangar bars 5 (e.g., a Y-axis). For example, the junction box 2 may be moved along the axis Y as shown in FIG. 5 before being locked in a particular position. In this embodiment, the axis Y may be perpendicular as shown in FIG. 5 but more generally it may be not parallel to the longitudinal axis of the hangar bar 5. Accordingly, the junction box 2, along with the light source module 7 and the driver 8, may be moved and/or adjusted in another direction. This adjustment may assist in ensuring that the frontmost surface of the light source module 7 that is attached inside the junction box 2 is flush or sufficiently close to the ceiling or wall during installation. In one embodiment, as shown in FIG. 1A, the attachment mechanism 21 may form a pin for insertion into the slot 22. In this embodiment, the pin may be sized to slide along the length of the slot 22 and the pin may include a hole for receiving a screw or bolt such that the hangar holder 6 may be securely coupled to the junction box 2.

Figure 7:
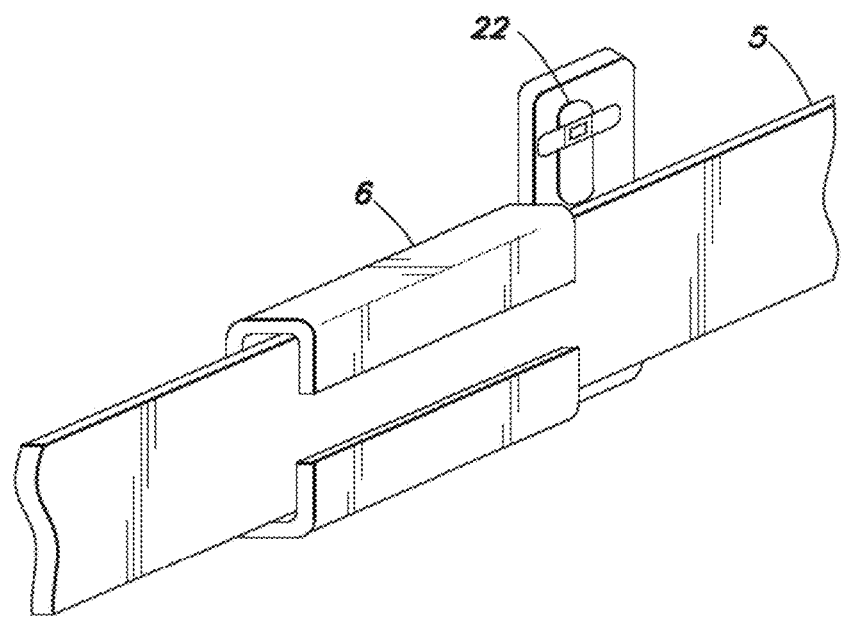
FIG. 7 shows a perspective view of a hangar holder according to another embodiment.

Although described as being part of the junction box 2, in some embodiments the slot 22 may be part of the hangar holder 6. For example, as shown in FIG. 7, the slot 22 is formed on the back side of the hangar holder 6 rather than in the sidewall of the junction box 2. In this embodiment, the attachment mechanism 21 may be moved to the junction box 2.

The locking of the junction box 2 in a position along the movement axis may be performed using any locking mechanism. In one embodiment, as seen in FIG. 1A, the junction box 2 may be locked into a position along the axis Y by tightening a nut on a respective screw or bolt that links the attachment mechanism 21 and the slot 22. The nut may be accessible through the cavity 12 of the junction box 2, such that the junction box 2 may be easily locked at a particular position along the axis Y during installation of the recessed lighting system 1 inside a ceiling or wall of a structure.

As described above, traditional recessed lighting systems provide a separation between a driver and a light source module. This separation adds to the combined size of the recessed lighting system. In particular, a junction box and a can, which respectively house the driver and light source module in these traditional recessed lighting systems must be separately mounted on the hangar bars. This separate mounting requires additional hardware and bulk. Further, movement and/or adjustment of the light source module may be difficult in these recessed lighting systems as the combined junction box and driver are static As described above, the hangar holders 6 described herein allow the junction box 2 to be moved in a direction parallel to a longitudinal axis of the hangar bars 5 and in a direction not parallel (e.g., perpendicular) to the hangar bars 5 (e.g., the axis Y). Accordingly, the junction box 2 may be moved to a preferred location between a set of joists or beams in a structure and at a desired height before the being locked into position using the mechanisms 21 and 22. The casting 3 is then positioned inside the box 2 as shown. By being configured such that the junction box 2, along with the light source module 7 and the driver 8 therein, is coupled to a unified set of moveable elements that assist in positioning the combined structure, the recessed lighting system 1 eliminates the added bulk and size of traditional recessed lighting systems. In particular, the recessed lighting system 1 allows adjustment of the position of the light source module 7 between joists or beams without the need for a compartment or can dedicated to housing the light source module 7 and a separate compartment dedicated to housing the driver 8. Instead, the light source module 7 may be housed along with the driver 8 in a shared junction box 2 that jointly moves these elements to a desired position. This compact design provides an affordable design by cutting the cost of raw materials and other components and reduces shipping costs by reducing bulk. Also, by having the driver 8 and the light source module 7 placed in the junction box 2, serviceability and replacement of the driver 8 will be easier to perform and more convenient. In contrast, traditional housings have the driver 8 mounted on the junction box 2 and contractors are forced to spend a significant amount of time removing parts to gain access to the junction box 2 and the driver 8.

Some embodiments disclose a compact recessed lighting system, comprising: a junction box for housing a light source module for emitting light and a driver for powering the light source module to emit light; and a plurality of hangar bars for holding the junction box, along with the light source module and driver housed therein, in a gap between beams in a structure, wherein the junction box is moveably coupled to the hangar bars such that the junction box may slide along the hangar bars and move along an axis perpendicular to the hangar bars. According to some embodiments, further comprising: a plurality of hangar holders for coupling the junction box, along with the light source module and driver, to the hangar bars, wherein each of the hangar holders include a hangar holder railing structure that slides along a corresponding hangar bar; according to some embodiments, wherein the junction box includes a plurality of slots each for receiving an attachment mechanism of a respective one of the plurality of hangar holders, wherein the attachment mechanism allows the junction box, along with the light source module and driver, to move along the axis perpendicular to the hangar bars; according to some embodiments, wherein the attachment mechanism includes 1) a hole in each of the hangar holders, 2) a screw that passes through the hole of a hangar holder and one slot of the plurality of slots of the junction box, and 3) a nut that attaches to the screw on an inside cavity of the junction box; according to some embodiments, wherein the screw slides inside the slot to allow the junction box, along with the light source module and driver, to move along the axis perpendicular to the hangar bars. According to some embodiments, each of the hangar holders includes a hangar holder lock to secure the hangar holders at a position along the hangar bars. According to some embodiments, each hangar bar in the plurality of hangar bars, comprises: an inner bar element; and an outer bar element that includes a hangar bar railing structure for receiving the inner bar element, wherein the inner bar element slides along the railing structure to retract within the outer bar element or telescope from the outer bar element. According to some embodiments, each hangar bar in the plurality of hangar bars, comprises: a pair of mounting blocks, wherein each of the mounting blocks includes attachment mechanisms for coupling to a structure. According to some embodiments, the light source module and the driver are enclosed within the unified casting and the unified casting is coupled within the junction box; in some embodiments, the junction box has a depth between 2-3 inches and the unified casting, along with the light source module and the driver installed therein, fits within the junction box; in some embodiments, the unified casting mounts to the junction box through the use of tension of fastening mechanisms; in some embodiments, further comprising a trim coupled to the unified casting for covering a hole in which the compact recessed lighting system is placed within.

According to some embodiments, a compact recessed lighting system is provided. The recessed lighting system can include a light source module and a driver coupled to a unified casting and within a shared junction box. The junction box may be coupled to a set of hangar holders that are movably coupled to a corresponding set of hangar bars. The junction box, including the light source module and driver installed therein, may move both 1) along the hangar bars and 2) along an axis perpendicular to the hangar bars. Accordingly, the junction box may be moved to rest in preferred location between a set of joists or beams in a structure. By being configured such that the junction box, along with the light source module and driver, is coupled to a unified set of moveable elements that position the combined structure, the recessed lighting system eliminates the added bulk and size of traditional recessed lighting systems.

Figure 8:
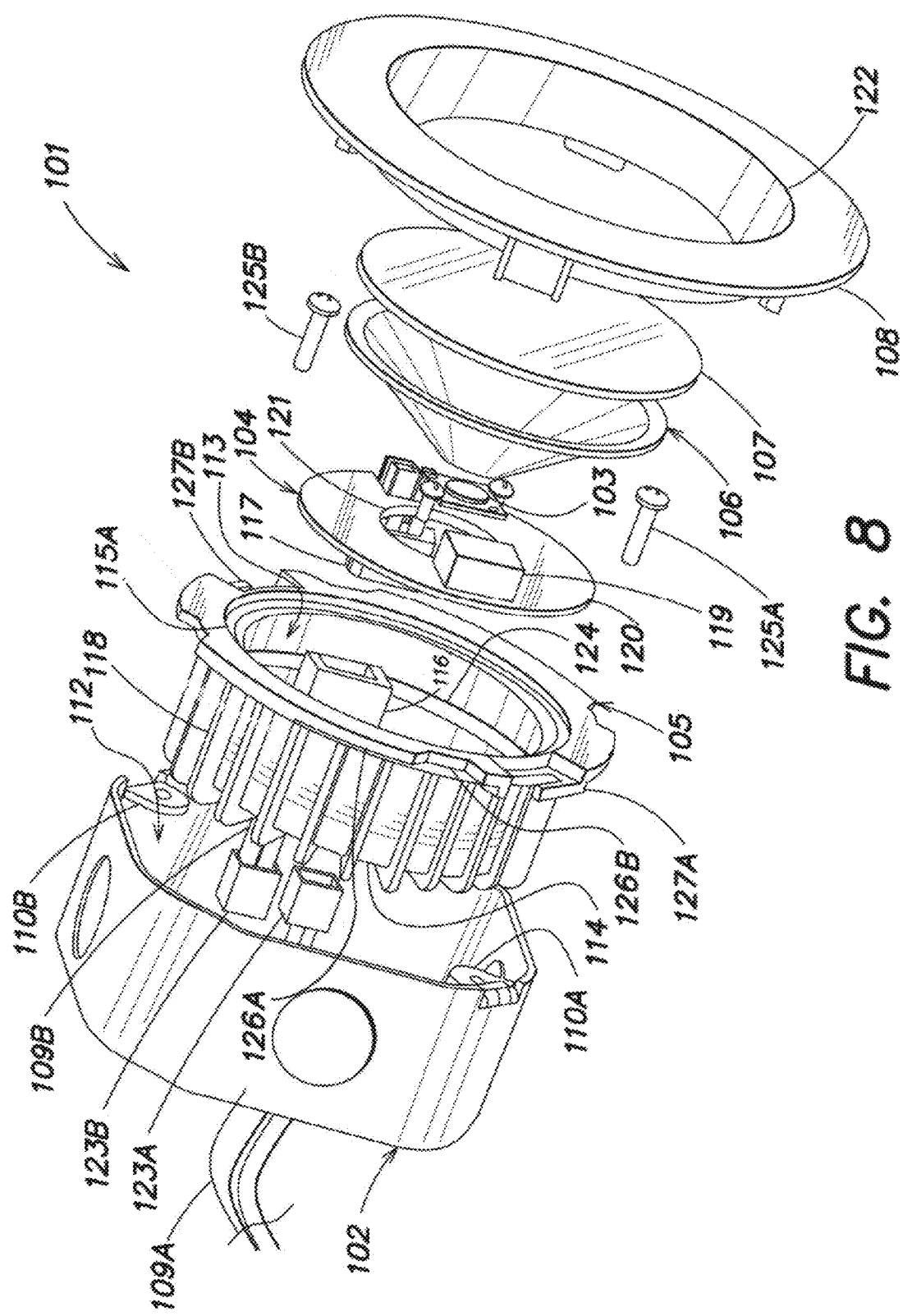
FIG. 8 shows an exploded view of a recessed lighting system according to one embodiment.

FIG. 8 shows an exploded view of an example of a recessed lighting system 101. The recessed lighting system 101 may include a junction box 102, a light source module 103, a driver (e.g., a power supply) 104, a unified casting 105 (similar to the unified casting 3 of FIG. 1A discussed above), a reflector 106, a lens 107, and a trim 108. As will be described in further detail below, the recessed lighting system 101 provides a more compact and cost effective design while complying with all building and safety codes/regulations. Although shown with a single junction box 102 and trim 108, the light source module 103, the driver 104, the unified casting 105, the reflector 106, and the lens 107 can be similarly used with different sized junction boxes 102 and trims 108. Each of the elements of the recessed lighting system 101 will be explained by way of example below.

The junction box 102 is a structure that separates the inner components of the recessed lighting system 101, including electrical wires/cables, from the items inside a ceiling or crawl space (e.g., insulation) in which the junction box 102 has been installed. In one embodiment, the junction box 102 is directly coupled to a stud, beam, or other structural member inside the ceiling or crawl space through the use of resins, clips, screws, bolts, clamps, or any other type of connecting mechanism. The junction box 102 may be equipped with one or more bar-hangers to assist installation when the junction box 102 needs to be located between two studs or joists. In one embodiment, the junction box 102 may be a single or double gang box with a fire rating of up to two hours as described in the National Electrical Code (NEC) and by the Underwriters Laboratories (UL). The junction box 102 may receive electrical wires 109A from an electrical system (e.g., 120 VAC or 277 VAC) within a building or structure in which the recessed lighting system 101 is installed. The electrical wires 109A from the structure may be connected to corresponding wires 109B of the unified casting 105, as will be described in greater detail below.

In one embodiment, the junction box 102 may include one or more tabs 110A, 110B for coupling the junction box 102 to the unified casting 105. The tabs 110A, 110B may be any device/component for receiving corresponding elements 127A, 127B of the casting 105 to firmly hold the weight of the unified casting 105, the light source module 103, the driver 104, the reflector 106, the lens 107, and/or the trim 108 up against the junction box 102. As shown in FIG. 8, the tabs 110A, 110B include holes for receiving screws or bolts 125A, 125B through the corresponding elements 127A, 127B; in other embodiments the tabs 110A, 110B can, additionally or alternatively, be configured to facilitate a twist-and-lock friction connection with corresponding elements 127A, 127B of the unified casting 105 and without the use of separate tools or other devices. In still other embodiments, friction or tension clips may be utilized to couple the unified casting 105 to the junction box 102.

In one embodiment, the junction box 102 acts as a heat barrier to block heat emitted by the light source module 103 and the driver 104 from reaching possibly flammable items inside a ceiling or crawl space. In these embodiments, the junction box 102 may be formed of metals, polymers, metal alloys, and/or other heat insulating materials. As shown in FIG. 8, the junction box 102 may be a polygon that defines a cavity 112 therein. However, in other embodiments, the junction box 102 may be any suitable shape, including an ellipsoid, cone, or cylinder that is capable of receiving therein the casting 105. The cavity 112 that is formed in the junction box 102 may be larger than the casting 105 such that the casting 105 may easily fit into the cavity 112 without coming into direct contact with the walls of the cavity 112. However, in other embodiments, the casting 105 may be sized to come into direct contact with the walls of the cavity 112. The size of the cavity 112 may be pursuant to popular industry specifications for junction boxes and in compliance with all applicable building and safety codes/regulations. For example, as shown in FIG. 9, the junction box 102 may have a length of 3½ inches, a width of 3½ inches and a depth of 1½ inches. When coupled together, the combined junction box 102, light source module 103, driver 104, casting 105, reflector 106, lens 107, and trim 108 may have a height/depth of 2 inches.

Figure 10:
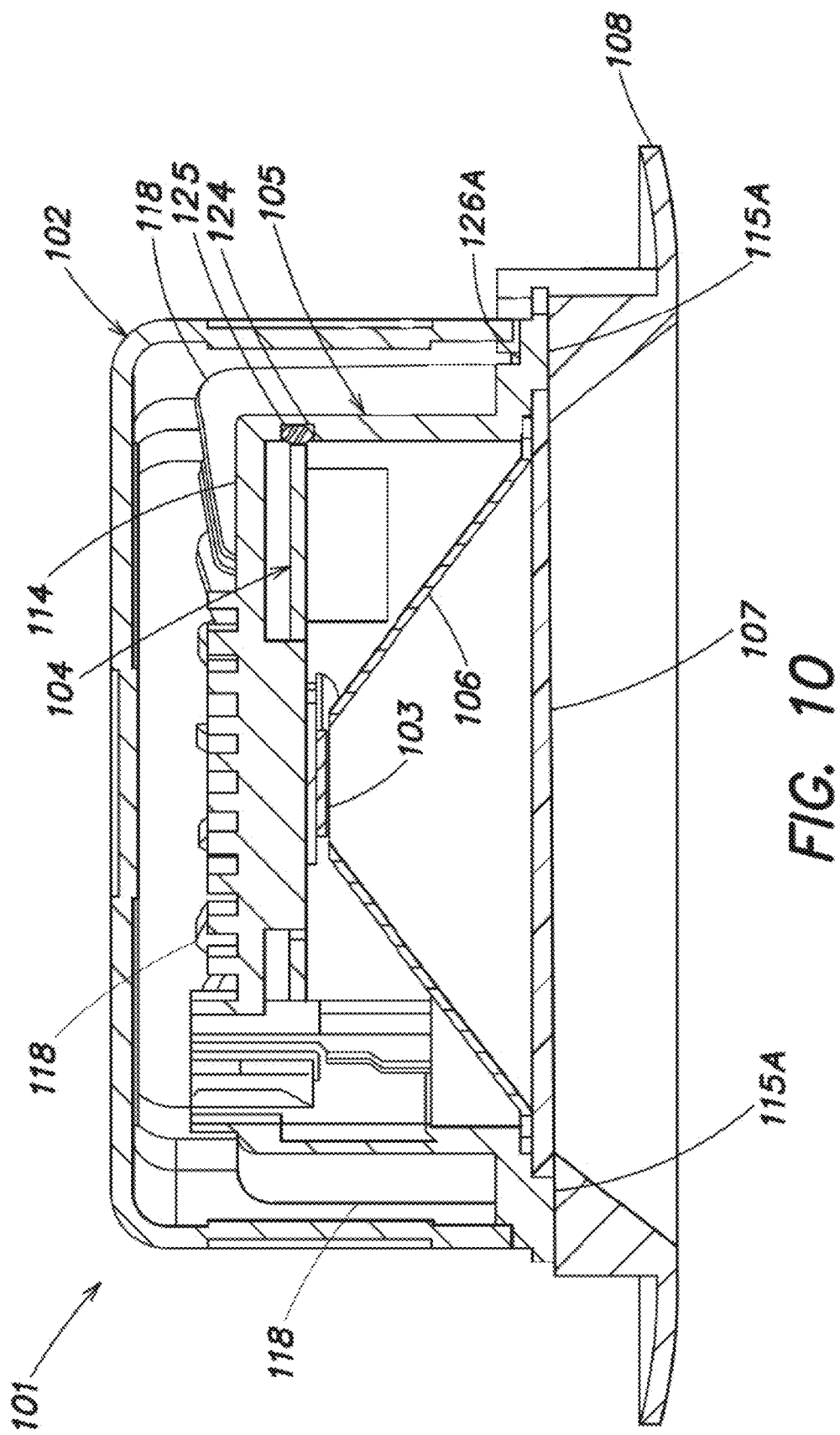
FIG. 10 shows a side view of the recessed lighting system according to one embodiment.
Figure 11A:
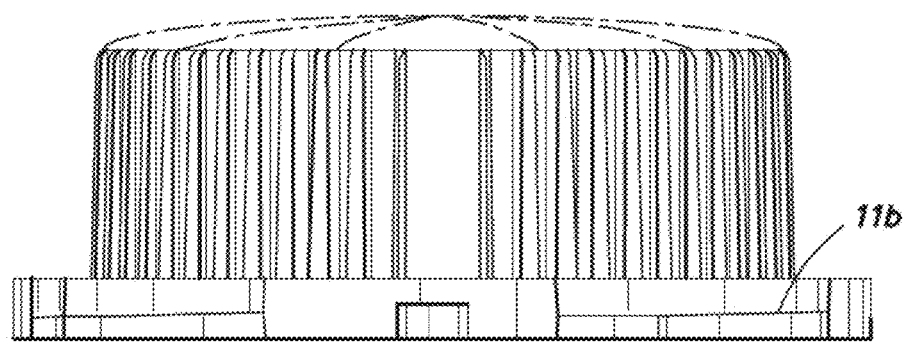
FIG. 11A shows a side view of a recessed lighting module/unified casting according to some embodiments of the disclosure.
Figure 11B:
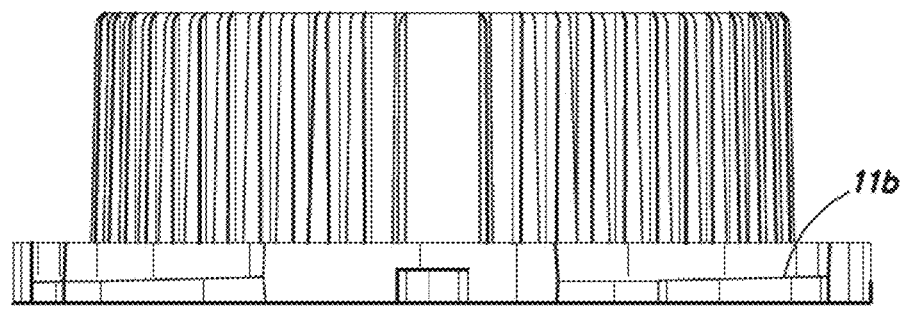
FIG. 11B shows a side view of a recessed lighting module/unified casting according to some embodiments of the disclosure.
Figure 11C:
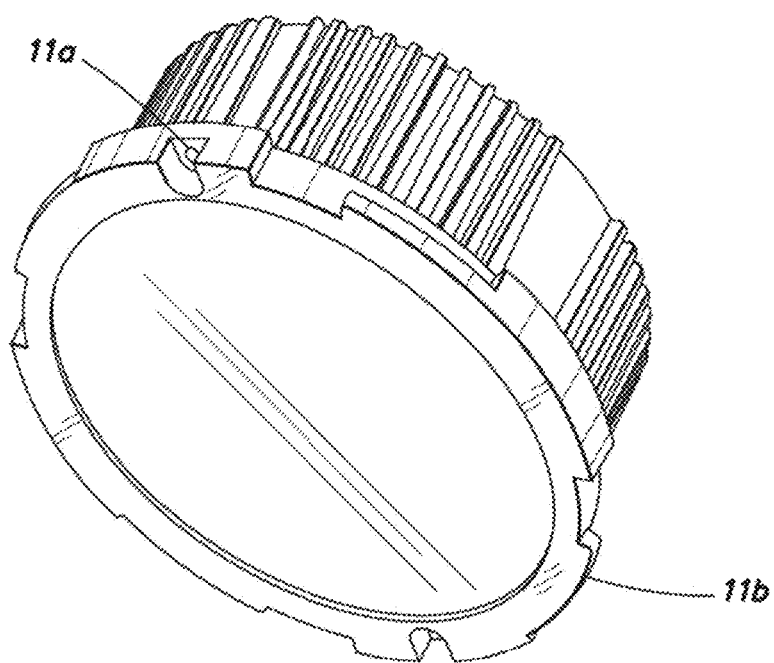
FIG. 11C and FIG. 11D provide complementary perspective views of a recessed lighting module according to some embodiments of the disclosure.
Figure 11D:
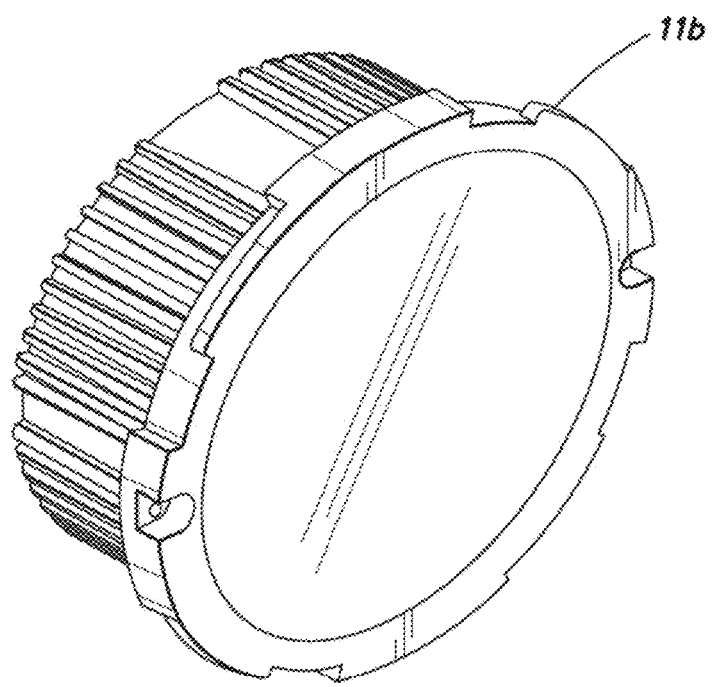

The junction box 102 can be shell, housing, and/or enclosure that further prevents the exposure of heat from the light source module 103 and the driver 104 to the items inside a ceiling or crawl space (e.g., insulation) in which the recessed lighting system 101 has been installed. The unified casting 105 may be formed of metals, polymers, metal alloys, and/or other materials. As shown in FIG. 8, the unified casting 105 can be a cylindrical structure/substantially cylindrical that defines a casting cavity 113 therein. However, in other embodiments, the casting 105 (and/or casting side walls and/or casting top/bottom wall(s)) can be configured as one of a variety of suitable shapes, including, by way of non-limiting example, an ellipsoid, cone, polygon, or polyhedron, with a top portion or surface that is flat, angled, beveled, partially flat, rounded, cone-shaped, pyramidal, frustum, etc., such that is configured for and capable of housing the light source module 103 and the driver 104. As shown in FIGS. 8 and 10, the cavity 113 is to receive therein the light source module 103 and the driver 104.

In one embodiment, the unified casting 105 includes a closed (or substantially closed) rear face 114 (i.e., top surface) and an open front face 115A. The closed rear face 114 allows the light source module 103 and the driver 104 to be securely mounted to/within the unified casting 105, while the open front face 115A provides/defines an aperture to allow light emitted by the light source module 103 to be exposed to an outside environment surrounding the recessed lighting system 101 (e.g., into a room). In some embodiments, the rear face 114 of the unified casting 105 can include one or more apertures, hooks, cleats, and/or mounting elements, for example, configured to receive and securely hold the light source module 103 and the driver 104. In some embodiments, the mounting elements can be holes, flaps, and/or other structures designed to receive the light source module 103 and the driver 104. The mounting elements can be configured to receive resins, clips, screws, bolts, clamps, or any other type of connecting mechanism such that the light source module 103 and the driver 104 may be securely coupled inside the cavity 113 on the rear face 114 of the casting 105. In some embodiments, the light source module 103 and the driver 104 are removably coupled to the unified casting 105 while in other embodiments one or more of the light source module 103 and the driver 104 form a single continuous and indivisible component with the unified casting 105.

Although described as a casting 105, the casting 105 can be formed through processes other than traditional casting techniques. For example, the casting 105 can be milled, deposited, molded, formed through an extrusion process, formed through the welding of metal sheets to form a structure, etc. Further, although described as an enclosed assembly, in some embodiment, the casting 105 can be one or more of a variety of heat conducting structures to which the light source module 103 and the driver 104 are mounted and which can be mounted, using any type of fasteners or mounting elements, to the junction box 102.

In some embodiments, the electrical wires 109A received by the junction box 102 from the electrical system of a building or structure can be coupled to the electrical wires 109B of the casting 105 (and/or through one or more aperture(s) defined in the unified casting 105). The electrical wires 109A can be coupled to the electrical wires 109B through the use of electrical caps or other devices. For example, as shown in FIG. 8, the electrical wires 109A and 109B can be connected using the connectors 123A and 123B. The connectors 123A and 123B can be complimentary, keyed or interlocking connectors. The electrical wires 109B of the casting 105 can terminate in a connector holder 116 configured to receive a corresponding connector 117 of the driver 104. In one embodiment, the connectors 116 and 117 are complimentary, keyed or interlocking connectors similar to the connectors 123A and 123B described above. When the connectors 116 and 117 are engaged, electricity can pass from the electrical system of the building or structure to the driver 104.

In some embodiments, the unified casting 105 includes one or more fins, ribs, or heat sinks 118, in some implementations, configured to dissipate heat generated by the light source module 103 and/or the driver 104. Although the heat sinks 118 are shown as passive components that cool the combined casting 105, light source module 103, and driver 104 by dissipating heat into the surrounding air, active heat sinks (e.g., fans) can also be used. In some embodiments, the heat sinks 118 are defined by a set of fins surrounding the casting 105, formed on the casting 105, defined in the casting 105, and/or monolithically formed with the casting 105. The heat sinks 118 can be on/disposed on the exterior wall(s) (e.g., external cylindrical surface) of the unified casting 105, and can continue on the top surface (s)/rear face(s) 114, for example extending generally radially inward (relative to the cylindrical wall), across a portion or part of the top surface(s), the top surface(s) configured as one or a combination of flat, rounded, conical, frustum, etc., as discussed above. The heat sinks 118 can include one or more materials, especially thermally conductive materials. For example, the heat sinks 118 can be made of aluminum alloys, copper, copper-tungsten pseudoalloy, AlSiC (silicon carbide in aluminum matrix), Dymalloy (diamond in copper-silver alloy matrix), E-Material (beryllium oxide in beryllium matrix), thermally conductive plastics or ceramics, and/or combinations thereof.

As described above, the recessed lighting system 101 can include the driver 104. The driver 104 is an electronic device that supplies and/or regulates electrical energy to the light source module 103 and thus powers the light source module 103 to emit light. The driver 104 can be any type of power supply, including power supplies that deliver an alternating current (AC) or a direct current (DC) voltage to the light source module 103. In one embodiment, the driver 104 receives electricity from the unified casting 105 via a connector. In one embodiment, the connector 117 is coupled to the connector holder 116 of the casting 105 such that electrical wires are not protruding from the unified casting 105. In this embodiment, the supply connection from the driver 104 terminates in connector 117, which is force-fitted into connector holder 116. In another embodiment, the driver 104 may connect to the supply wires, 109A, via wire nuts.

Upon receiving electricity, the driver 104 may regulate current or voltage to supply a stable voltage or current within the operating parameters of the light source module 103. The driver 104 receives an input current from the electrical system of the building or structure in which the recessed lighting system 101 is installed and drops the voltage of the input current to an acceptable level for the light source module 103 (e.g., from 120V-240V to 36V-48V). The driver 104 may transfer electricity to the light source module 103 through an electrical connector. For example, the driver 104 may deliver electricity to the light source module 103 through an electrical cable coupled between the light source module 103 and the driver 104 through removable or permanent connectors or soldered leads originating from the driver 104. Although shown with magnetic transformer 119, the driver 104 may include additional circuitry for regulating current to the light source module 103.

As shown in FIG. 8, the driver 104 may also include the board 120 for holding the magnetic transformer 119 and other circuitry. In one embodiment, the board 120 is formed in a "donut", torus, or "C" shape with an opening 121. The outside edge of the board 120 is coupled to the casting 105, while the opening 121 formed by the board 120 allows the light source module 103 to be directly coupled to the casting 105 without coming into direct contact with the driver 104. By forming a structure with the opening 121, the driver 104 allows the light source module 103 to avoid the driver 104, eliminating shadows or interference from the driver 104, and allows the light source module 103 to directly contact the casting 105, assisting the casting 105 to dissipate heat generated by the light source module 103. This compact structure allows the light source module 103 and the driver 104 to be contained within the unified casting 105, which in turn may fit inside a standard junction box (i.e., junction box 102) and/or a 4-8 inch recessed lighting fixture (both incandescent and non-incandescent). Accordingly, the recessed lighting system 101 can operate without the use of a "can" housing structure. This simplified and more compact structure reduces the cost and complexity of installing the recessed lighting structure 101 into an existing/pre-installed junction box or a newly installed junction box. Further, this configuration allows the recessed lighting system 101 to achieve a UL fire-rating of at least two hours.

In one embodiment, the board 120 may be a printed circuit board. The driver 104 may be coupled to the casting 105 using any connecting mechanism, including resins, clips, screws, bolts, or clamps. For example, in one embodiment, the driver 104 may be coupled to the casting 105 using friction or tension clips.

The light source module 103 may be any electro-optical device or combination of devices for emitting light. For example, the light source module 103 may have as a single light source a light emitting diode (LED), organic light-emitting diode (OLED), or polymer light-emitting diode (PLED). In some embodiments, the light source module 103 may have multiple light sources (e.g., LEDs, OLEDs, and/or PLEDs). The light source module 103 receives electricity from the driver 104, as described above, such that the light source module 103 may emit a controlled beam of light into a room or surrounding area. The driver 104 is designed to ensure that the approximate voltage and current are fed to the light source module 103 to enable the emission of light by the one or more light sources within the light source module 103.

As described above and shown in FIG. 8, the light source module 103 is coupled to the casting 105 in the opening 121 formed by the board 120. As described above, by positioning the light source module 103 in the opening 121, the light source module 103 may avoid the driver 104, thus eliminating shadows or interference from the driver 104, and allowing the light source module 103 to directly contact the casting 105, such that the casting 105 can dissipate heat generated by the light source module 103. Further, this compact design allows the recessed lighting system 101 to utilize a standard sized junction box (e.g., junction box 102) instead of a "can" housing structure. As shown in FIG. 8, the light source module 103 is coupled to the casting 105 using screws; however, in other embodiments, the light source module 103 may be coupled to the casting 105 using any connecting mechanism, including resins, clips, screws, bolts, or clamps. For example, in one embodiment, the light source module 103 may be coupled to the casting 105 using friction or tension clips. In one embodiment, the casting 105 may include an insulating gasket 125 that separates the board 120 and the casting 105. The insulating gasket 125 may be placed on a groove 124 that encircles the casting cavity 113 of the casting 105. The insulating gasket 125 may be formed of materials that provide some degree of malleability and/or flexibility such that the gasket 125 is able to deform and tightly fit within the groove 124, including any slight irregularities. For example, the insulating gasket 125 may be formed of plastic, rubber, metal, and/or ceramic materials. The insulating gasket 125 assists in insulating the driver 104 from the outside environment.

In some embodiments, the recessed lighting system 101 may include the reflector 106. The reflector 106 may surround the light source module 103 and/or a light source of the light source module 103 to adjust the way light emitted by the light source module 103 is focused inside a room or surrounding area. In one embodiment, the reflector 106 surrounds the light source module 103 and separates the light source module 103 from the driver 104. This separation allows light from the light source module 103 to be emitted into a room or surrounding area while further shielding the driver 104 from being exposed to the room or surrounding area. For example, in one embodiment, the reflector 106 and the casting 105 may be coupled together such that the combined assembly may create a sealed structure to shield the driver 104 from the outside environment and the light source module 103. By shielding the driver 104 from the outside environment, the reflector 106 reduces the risk of fire or other dangers and ensures the recessed lighting system 101 complies with building and safety codes/regulations. The reflector 106 may be formed of any fire retardant material, including steel, aluminum, metal alloys, calcium silicate, and other similar materials.

In one embodiment, the reflector 106 can be coupled to the casting 105 using screws, rivets or other fasteners. The reflector 106 can also be designed as a snap fit into the casting 105.

Although shown as conical, the reflector 106 can be formed in any shape that can direct and/or focus light. For example, the reflector 106 can be parabolic, spherical, or a frusto-conical shape that is positioned over the light source module 103 while shielding the driver 104. In one embodiment, the reflector 106 can be coated with a reflecting material or include one or more reflecting elements that assist in the adjustment of light emitted by the light source module 103. For example, the reflector 106 can be coated with a shiny enamel or include one or more mirrors or retroreflectors or a microcellular polyethylene terephthalate (MCPET) material to adjust the focus of light emitted by the light module 103. In other embodiments, the reflector 106 can include various other optic elements to assist in the focusing of light emitted by the light source module 103.

In one embodiment, the recessed lighting system 101 can include a lens 107. The lens 107 can be formed to converge or diverge light emitted by the light source module 103. The lens 107 can be a lens comprised of a single optical element or a compound lens comprised of an array of simple lenses (elements) with a common axis. In one embodiment, the lens 107 also provides a protective barrier for the light source module 103 and shields the light source module 103 from moisture or inclement weather. The lens 107 can also assist in the diffusion of light and increase the uniformity of light over the surface of the recessed lighting system 101. The lens 107 can be made of any at least partially transparent material, including glass and hard plastics. In one embodiment, the lens 107 and the reflector 106 are contained in a single indivisible unit to work in conjunction to focus and adjust light emitted by the light source module 103. In other embodiments, the lens 107 and the reflector 106 are separate, divisible elements as shown in FIG. 8.

In one embodiment, the recessed lighting system 101 can include a trim 108. The trim 108 serves the primary purpose of covering the exposed edge of the ceiling or wall where a hole is formed in which the recessed lighting system 101 resides while still allowing light from the light source module 103 to be emitted into a room through an aperture 122. In doing so, the trim 108 helps the recessed lighting system 101 appear seamlessly integrated into the ceiling or wall. In one embodiment, the trim 108 is capable of coupling to the casting 105 while in other embodiments the trim 108 is capable of coupling to the junction box 102. The trim 108 can couple to the casting 105 and/or the junction box 102 using any connecting mechanism, including resins, clips, screws, bolts, or clamps. In one embodiment, the trim 108 can include grooves and/or slots to couple to corresponding grooves 126A and/or slots 126B of the casting 105 and/or the junction box 102 using a twist-and-lock friction connection and without the use of separate tools or other devices.

In one embodiment, different diameter trims 108 can be configured to be coupled to the casting 105 and/or the junction box 102. The size and design of the trims 108 can depend on the size of the hole in which the recessed lighting system 101 has been fitted and that the trim 108 must conceal, as well as the aesthetic decisions of the consumer. The trims 108 can be made of a variety of materials, for example, one or more of aluminum plastic polymers, alloys, copper, copper-tungsten pseudoalloy, AlSiC (silicon carbide in aluminum matrix), Dymalloy (diamond in copper-silver alloy matrix), E-Material (beryllium oxide in beryllium matrix), etc.

As described above, the light source module 103 and the driver 104 can be integrated into the unified casting 105 while shielding the driver 104 from exposure to outside elements through the use of the reflector 106 or the lens 107. Based on this configuration, the compact recessed lighting system 101 provides a more compact design that allows the combined unified casting 105, light source module 103, driver 104, and reflector 106 to be installed in a standard junction box instead of a "can" housing structure to reduce the overall cost of the recessed lighting system 101 while still complying with all building and safety codes/regulations. This configuration can also allow the recessed lighting system 101 to achieve a UL fire-rating of at least two hours.

Figure 12A:
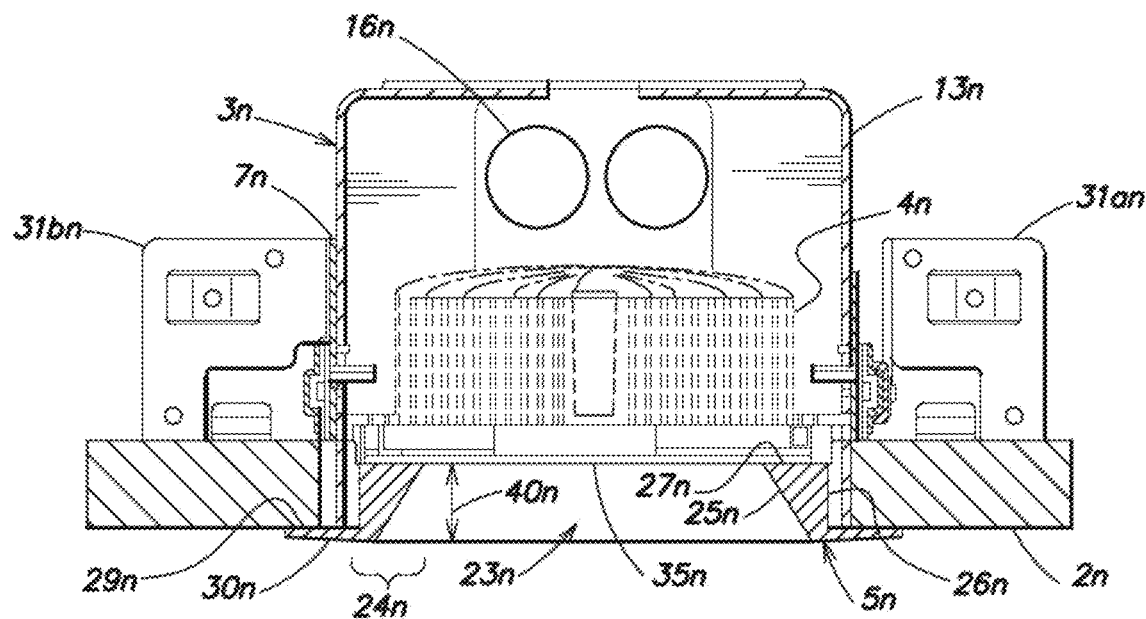
FIG. 12A shows a cross-section view of an outer casing, with an implementation of a unified casting/recessed lighting module, according to some embodiments, illustrating the unified casting/recessed lighting module disposed within the outer casing.
Figure 12B:
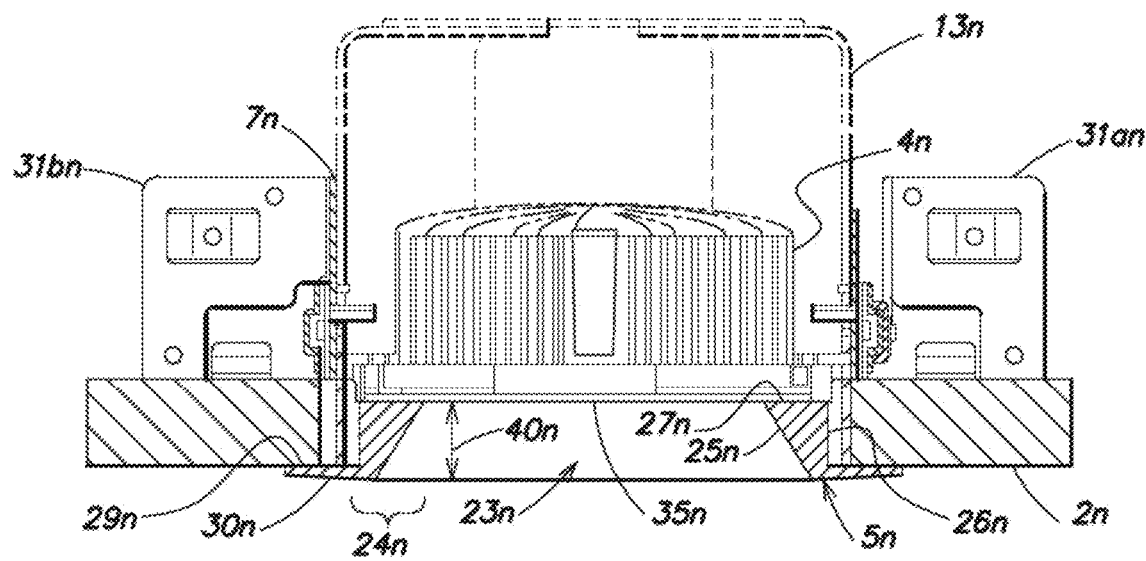
FIG. 12B provides a cross-section view of an outer casing, with another implementation of a unified casting/recessed lighting module, according to some embodiments, disposed within the outer casing.
Figure 12C:
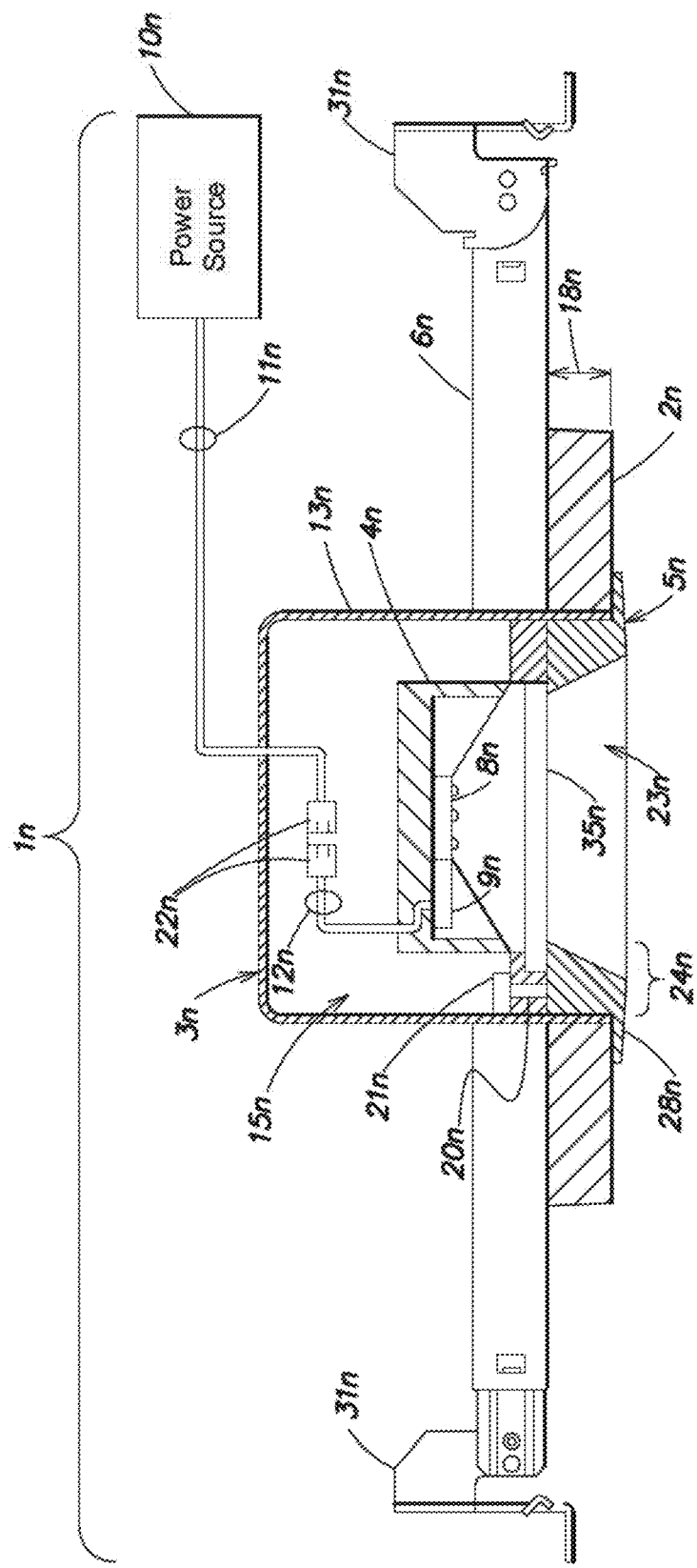
FIG. 12C shows a front cross-section view of an outer casing, with a recessed lighting module/unified casting positioned inside the outer casing, coupled to hangar bars according to one embodiment.

FIG. 12A shows a cross-section view of an outer casing, with an implementation of a unified casting/recessed lighting module, according to some embodiments, illustrating the unified casting/recessed lighting module disposed within the outer casing. FIG. 12B provides a cross-section view of an outer casing, with another implementation of a unified casting/recessed lighting module, according to some embodiments, disposed within the outer casing. FIG. 12C shows a cross-section view of a recessed lighting fixture or system 1n installed so that the exposed edge of the ceiling or wall 2n, where a hole is formed, is covered. The recessed lighting fixture 1n can include an outer casing 3n, a unified casting 4n, a trim 5n, a set of hangar bars 6n, and a set of hangar holders 7n (shown in a side view in FIG. 12D and also in FIG. 14). The unified casting 4n can house both a light source module 8n (e.g. a module of several LED elements) and a driver 9n in a single compact unit. The trim 5n serves the primary purpose of covering the exposed edge of the ceiling or wall where a hole is formed in which the recessed lighting fixture 1n resides while still allowing light from a light source module 8n to be emitted into a room through an aperture 23n of the trim 5n to illuminate the room. In doing so, the trim 5n helps the recessed lighting fixture 1n appear seamlessly integrated into the ceiling or wall. The trim 5n can be attached to the outer casing 3n also to hide at least the periphery at the bottom edge of the outer casing 3n from view. This can be seen, for example, in FIG. 12C where a flange 28n extends outward from a trim base 24n so as to hide from view (below the light fixture) the bottom edge of the casing 3n. As will be described in further detail below, the recessed lighting fixture 1n provides a more compact and cost effective design that also allows the outer casing 3n to be moved so that its position relative to the hangar bars 6n can be adjusted, while complying with various building and safety codes/regulations. Each of the elements of the recessed lighting fixture 1n will be explained by way of example below.

Instead of using a junction box that is mounted along with a can to a horizontal platform (which is in turn attached to a joist or other structural member behind the ceiling or wall 2n), the outer casing 3n can be used in such a way that obviates the need for a separate junction box and that also eliminates the horizontal platform. As seen FIG. 12D and in FIG. 13, the outer casing 3n, and in particular its sidewall 13n, is directly attached to a hangar bar 6n via a hangar holder 7n. The hangar bar 6n is in turn attached directly to a joist, beam, or other structural member behind the ceiling or wall 2n at a mounting block 31an, 31bn, so that the aperture 23n of the trim 5n will be aligned with and covers the hole in the wall 2n. The outer casing 3n can serve as both a protective barrier between wall insulation materials and wiring junctions inside its cavity, and as a luminaire enclosure. As shown in FIG. 12C, the outer casing 3n is a structure that separates the inner components of the recessed lighting fixture 1n, i.e., those that are located inside the outer casing 3n, including electrical wires/cables 11n, 12n and connectors 22n that electrically connect a driver 9n in the unified casting 4n to an external power source 10n, from items such as thermal/heat insulation materials and the power source 10n that are outside of the outer casing 3n and inside a ceiling or crawl space in which the outer casing has been installed. In one embodiment, the outer casing 3n can accommodate a wall thickness 18n of the ceiling or wall 2n of ½ inch to 2½ inches. The outer casing 3n can have a fire rating of up to two hours without any need for modification, where the fire rating is described in the National Electrical Code (NEC) and by the Underwriters Laboratories (UL) such as specified in UL 263. The outer casing 3n can receive electrical wires 11n into its cavity 15n from the power source 10n, such as an electrical power distribution system (e.g., 120 VAC or 277 VAC) within a building or structure in which the recessed lighting fixture 1n is installed. There can be one or more wire connectors 22n inside the outer casing 3n that join one or more wires 11n which carry 120/277 VAC power and that extend into the casing, to deliver 120/277 VAC power from a circuit breaker or wall switch to the driver 9n. The electrical wires 11n from the power source 10n can thus be connected inside the outer casing 3n to corresponding wires 12n of the driver 9n which is inside the unified casting 4n, as will be described in greater detail below.

Figure 14:
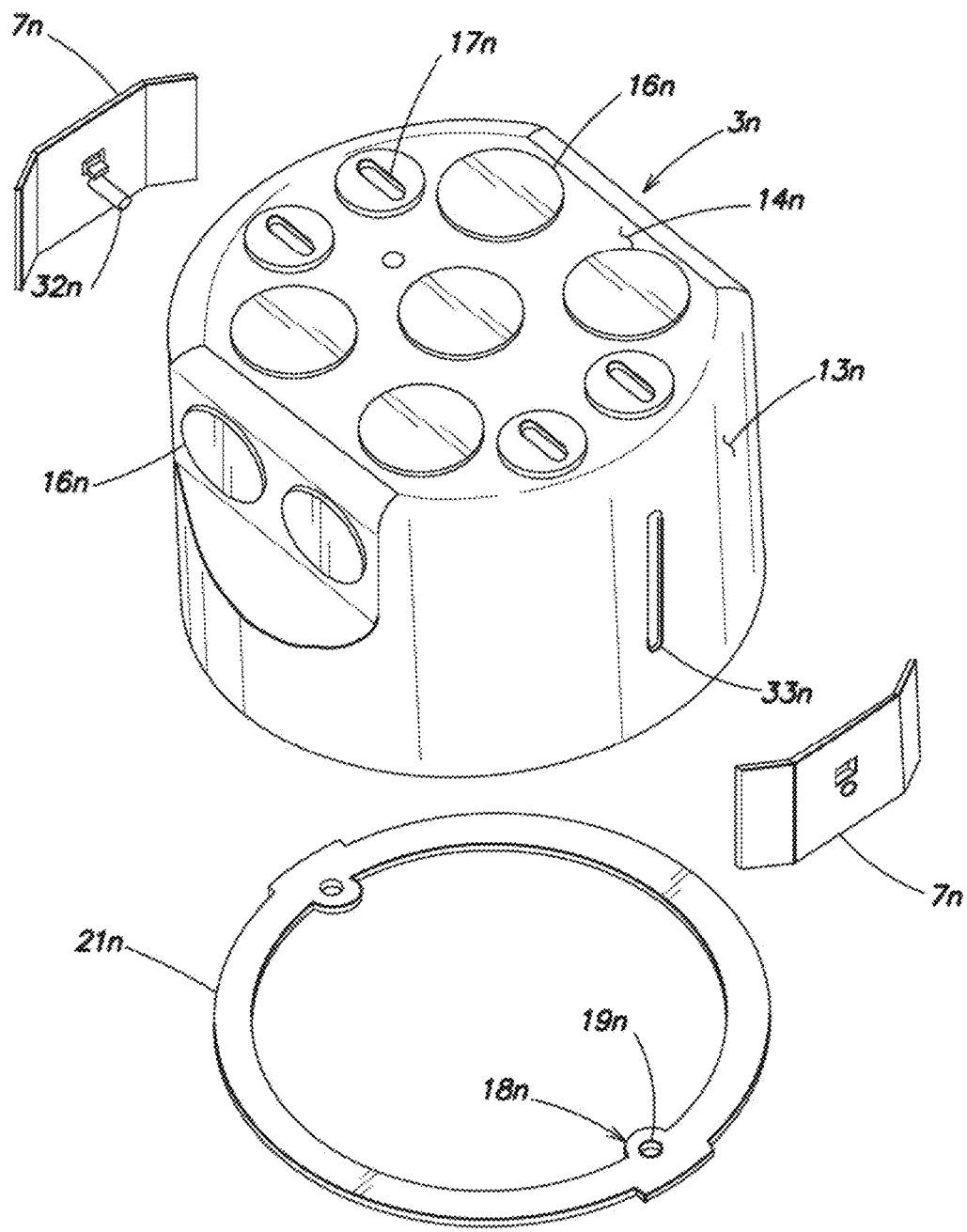
FIG. 14 shows an overhead perspective view of an outer casing, hangar holders, and a ring according to one embodiment.
Figure 15:
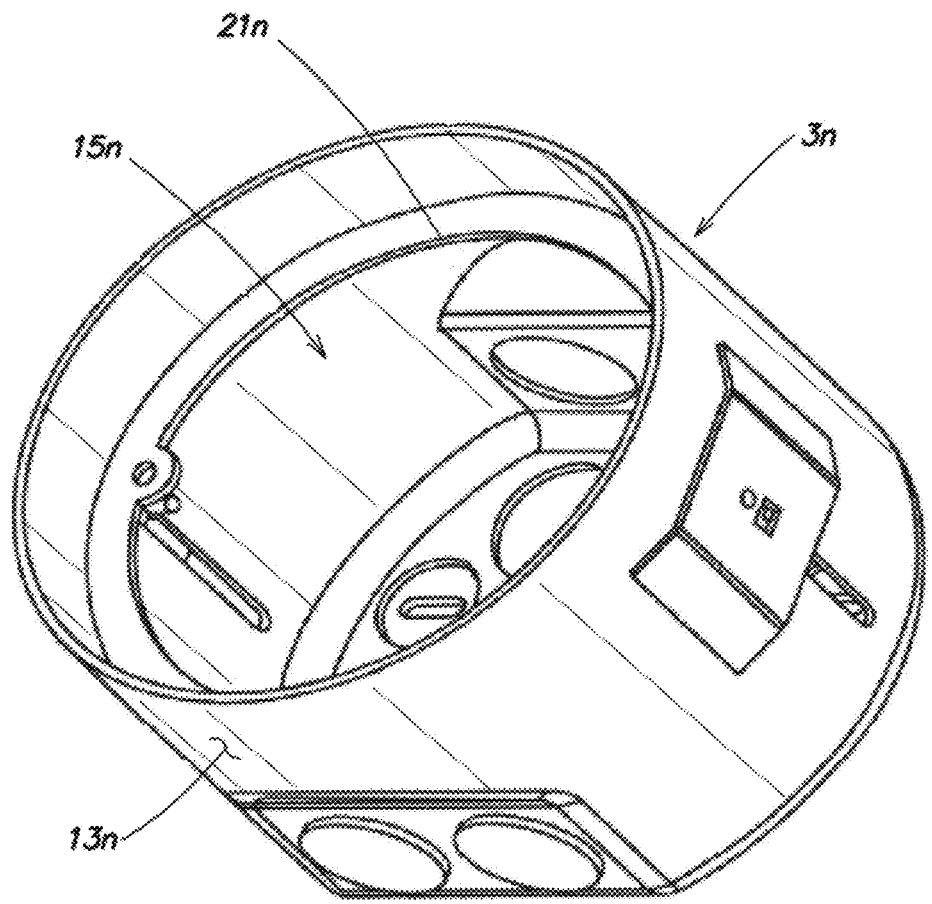
FIG. 15 shows an underneath perspective view of the embodiment of FIG. 14 with the ring inserted into the cavity of the outer casing.

As shown in FIG. 14, the outer casing 3n can have a side wall 13n that extends from and is joined at its upper edge (or upper end) to a closed base end 14n, which together define a cavity 15n therein (see FIG. 12C and FIG. 15). The side wall 13n can surround the cavity 15n, with its lower edge (or lower end) defining the perimeter of an opening through which various components can be placed inside the cavity 15n, including for example, a ring 21n, the unified casting 4n, and the trim 5n, as shown in FIG. 14, FIG. 15, and in FIG. 12C. In one embodiment, as shown in FIG. 15, the lower edge (lower end) of the sidewall 13n is devoid of any tabs that extend inward (towards a center vertical axis that is shown as a dotted line). While the side wall 13n is depicted in the relevant figures here as being cylindrical, in other embodiments the side wall 13n of the outer casing 3n have any suitable shape, including a polyhedron, ellipsoid, frusto-conical, or otherwise curved. The cavity 15n that is formed in the outer casing 3n is larger than the outside dimensions of the unified casting 4n such that the entirety of the unified casting 4n fits into the cavity 15n—see the front and side views in FIG. 12C and FIG. 12D. The unified casting 4n may or may not come into direct contact with the side wall 13 of the outer casing 3n. The outer casing 3n is less than 5 inches in height between its base end and the other end of its sidewall.

As seen in FIG. 14, the outer casing 3n can, in some embodiments, have on its base end 14n one or more knockouts 16n as shown. The knockouts 16n may be punched through and removed to leave an opening behind on the base end 14n, for electrical wires 11n or 12n to be inserted through the opening (which wires serve to deliver power to the driver 9n). As shown in the top view of FIG. 13, one or more knockouts 16n can also have smaller openings 17n in them (e.g., a slit, slot, etc., that is smaller than the opening that results when the knockout 16n has been removed from the base end 14n) that can allow the electrical wires 11n or 12n to be inserted through without the need to punch through the knockouts 16n. The knockout 16n may be more than ½ inch in diameter. In one embodiment, one or more of the knockouts 16n allow for the installation therethrough of a non-metallic sheathed cable (as the wires 11n). As shown in FIG. 14, one or more of the knockouts 16n may also be positioned on the side wall 13n of the outer casing 3n.

In one embodiment, as shown in FIG. 12C, the electrical wires 11n received by the outer casing 3n from a power source 10n (e.g. the electrical system of a building or structure) may be connected to the electrical wires 12n of the unified casting 4n. As shown, the electrical wires 11n and 12n are connected together through the use of connectors 22n that may be contained within the outer casing 3n (together with the unified casting 4n). The term "connector" here is used broadly to not just interlocking or mating connector pairs but also cover wire terminal blocks and wire caps or other devices. In one embodiment, the connectors 22n may be kept outside the outer casing 3n (while the unified casting 4n is retained inside) if the wires 12n are long enough to reach outside of the casing 3n. The electrical wires 12n of the unified casting 4n may terminate in a connection with the driver 9n installed within the unified casting 4n. When the wires 11n and 12n are connected to each other, electricity may pass from the power source 10n to the driver 9n to enable the driver 9n to power the light source module 8n. In one embodiment, the driver 9n has three or more current carrying electrical wires 12n.

Figure 16:
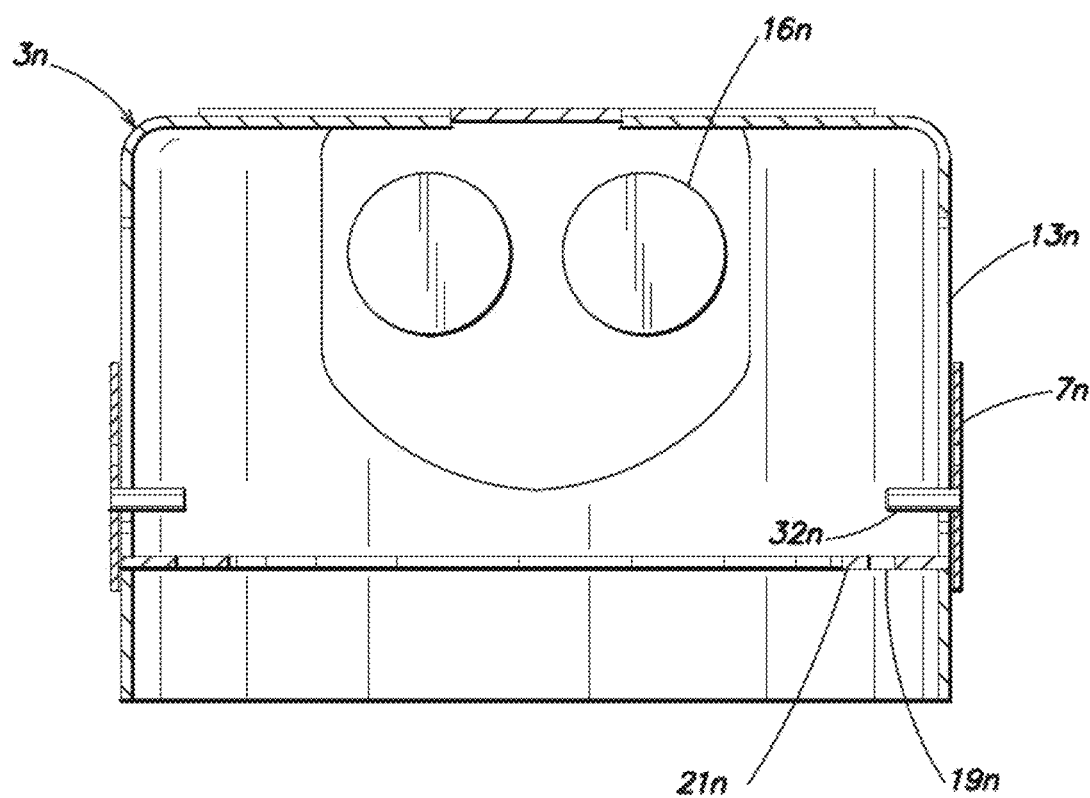
FIG. 16 shows a side cross-section view of an outer casing with hangar holders and a ring according to one embodiment.
Figure 17:
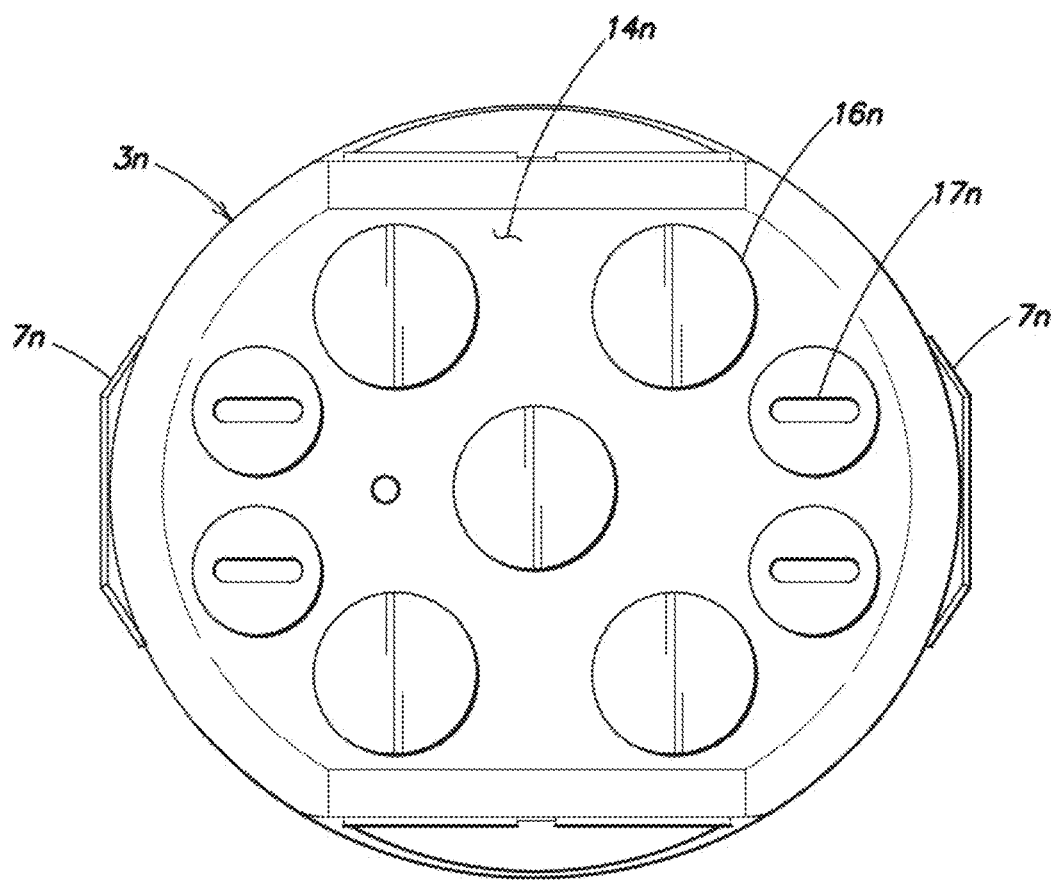
FIG. 17 shows a top view of the embodiment of FIG. 16.

As seen in FIG. 15, the outer casing 3n may have within its cavity 15n a ring 21n. The ring 21n maybe shaped as a circle (shown), a polygon, or an ellipsoid, where it conforms to the sidewall 13n of outer casing 3n. The ring 21n may be inserted into the cavity 15n of the outer casing 3n through the open end of the side wall 13n, and then secured to the inner surface of the side wall 13n of the outer casing 3n as seen in FIG. 16. Once the ring 21n has been secured, the unified casting 4n may be inserted into the cavity 21n (through the same open end of the side wall 13n) and then attached to the ring 21n so as to secure the unified casting 4n to the outer casing 3n and prevent the unified casting 4n from falling out of the outer casing. The ring 21n has one or more tabs 18n formed as a flat segment of the ring, each having an opening 19n that passes through the ring 21n (from one face to the other face)—see FIG. 14 and FIG. 16. These are used for coupling (fastening) the outer casing 3n to the unified casting 4n—see FIG. 12C. In the embodiment of FIG. 14, there are two tabs 18n located diametrically opposite each other (along the circumference of the ring). When the ring 21n is fitted inside the casing 3n (as seen in FIG. 15), each tab 18n may extend inward from and is perpendicular to an inner surface of the side wall 13n of the outer casing 3n. Each tab 18n and its opening 19n serves to receive a fastener 20n, so as to firmly hold the weight of the unified casting 4n including the light source module 8n and the driver 9n contained in the unified casting 4n. The fastener 20n may be a screw, bolt, pin, or the like. In other embodiments, the tabs 18n may incorporate other types of fastening mechanisms (to fasten the unified casting 4n to the outer casing 3n), such as a twist-and-lock friction connection that does not require the use of separate tools or other devices. The ring 21n should be affixed inside the cavity so that its tabs 18n may be further recessed inside the cavity 15n, towards the base end 14n, so that the unified casting 4n and trim 5n may also be further recessed inside the outer casing 3n.

In another embodiment, the tab 18n is formed as a portion of the sidewall 13n that has been bent inward, without the need for a ring 21n. In this embodiment, the ring 21n is not necessary, as long as the unified casting 4n can otherwise be secured to the outer casing 3n via the tab 18n, so as to be prevented from falling out of the outer casing 3n.

Figure 18:
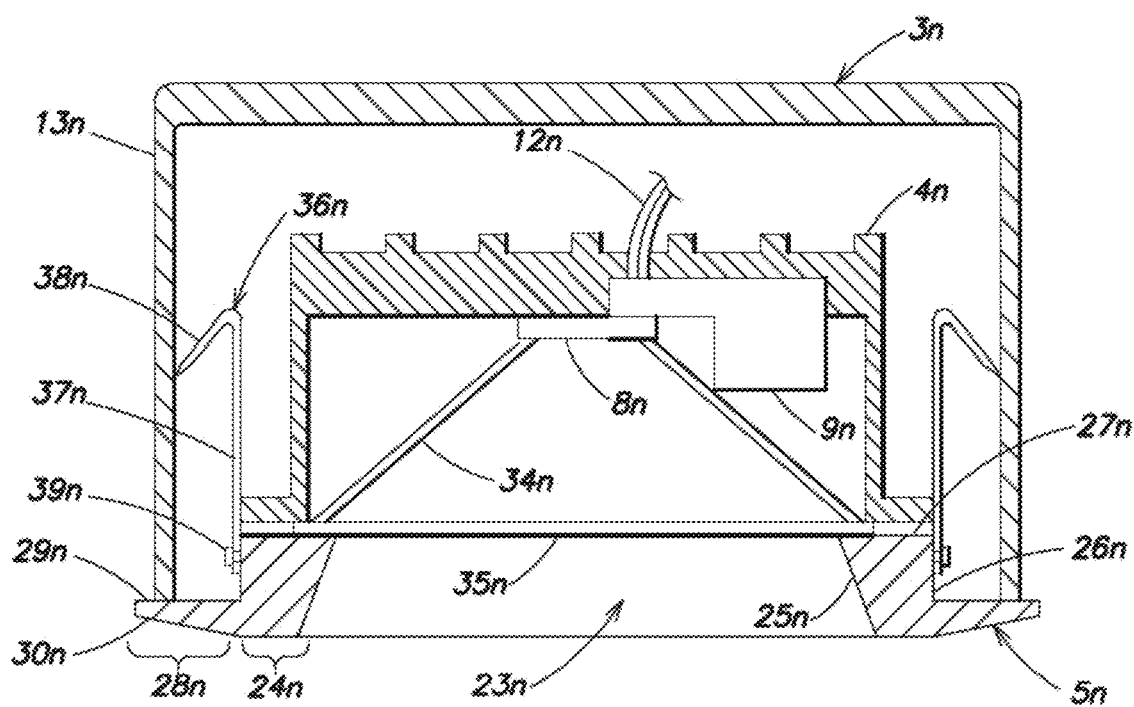
FIG. 18 shows a side cross section view of an outer casing, unified casting, trim, and two friction clips according to one embodiment.
Figure 19A:
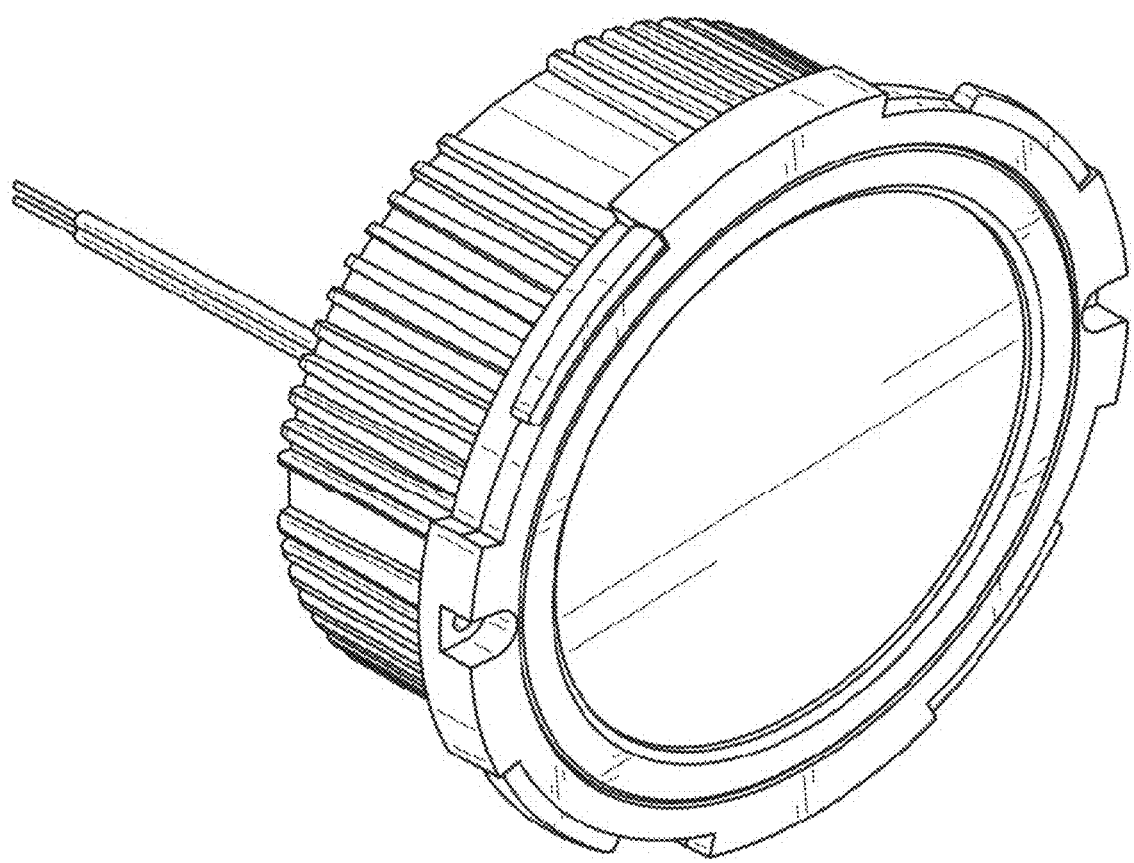
FIG. 19A-FIG. 19R show views of additional implementations and embodiments, according to the disclosure.
Figure 19B:
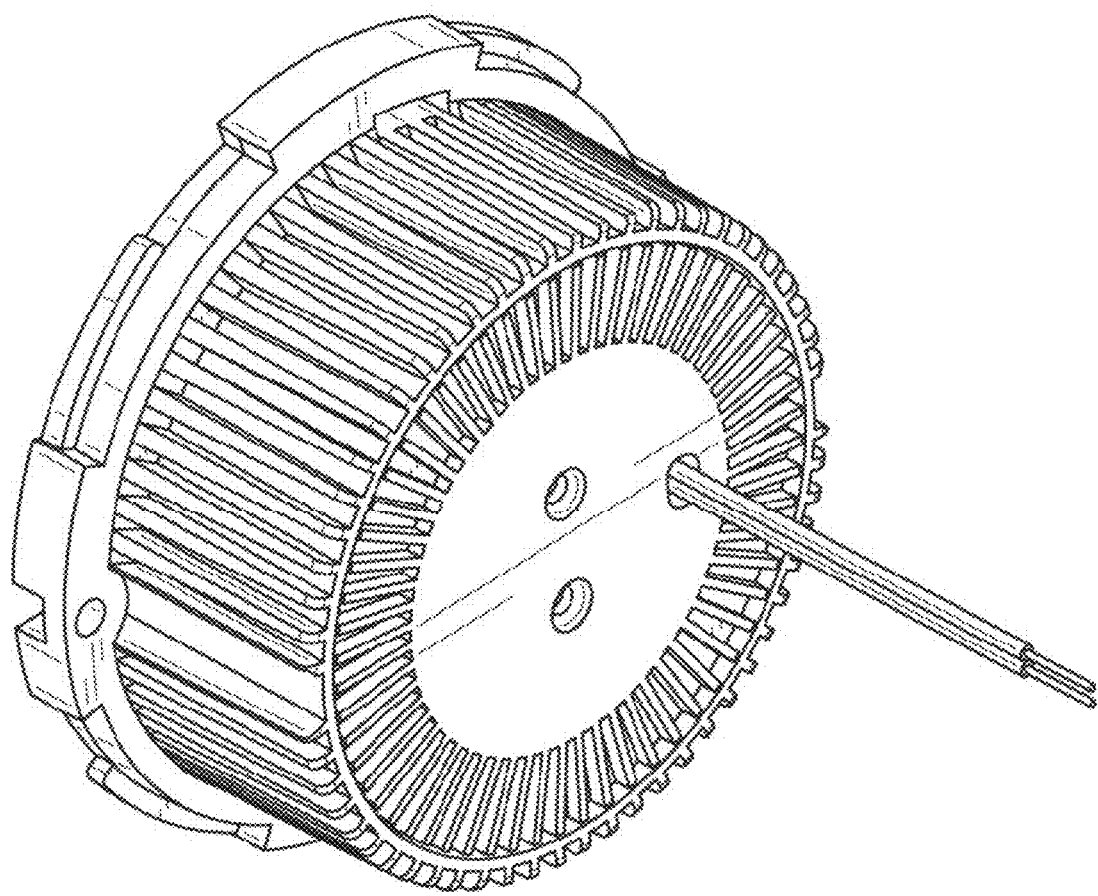
Figure 19C:
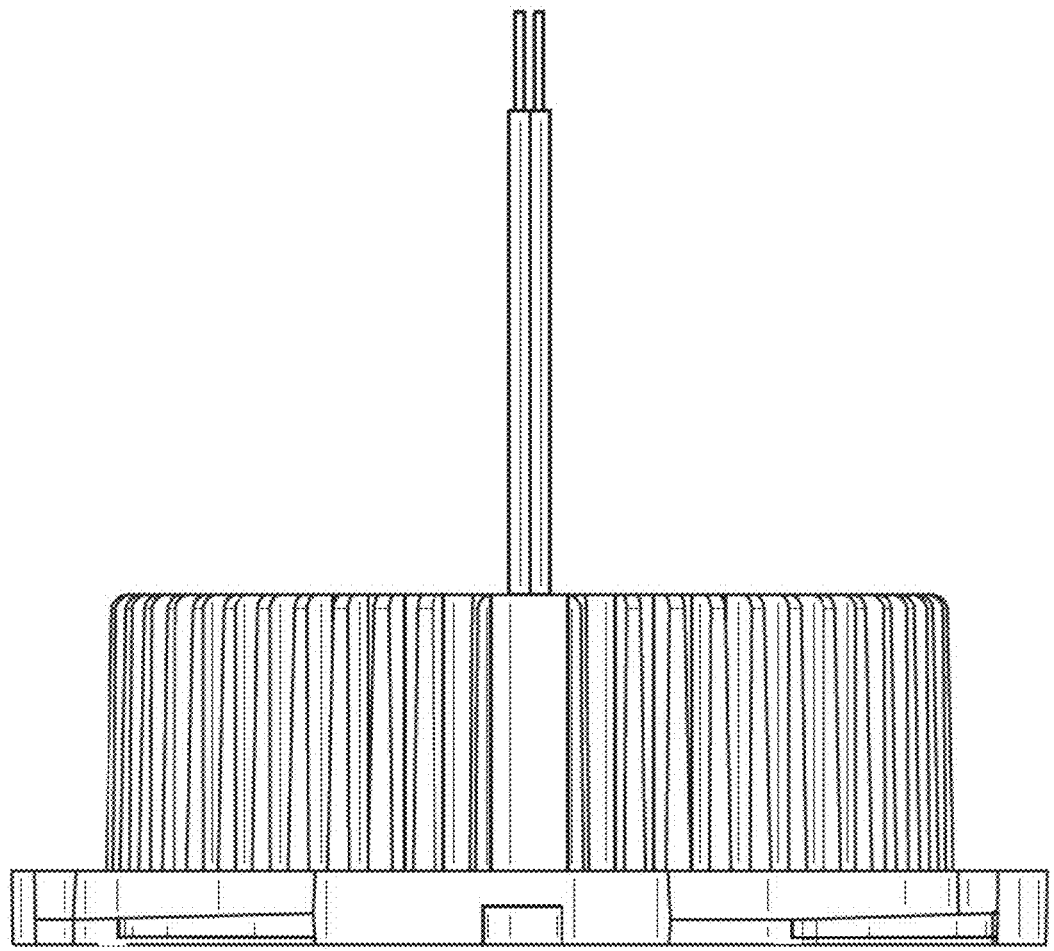
Figure 19D:
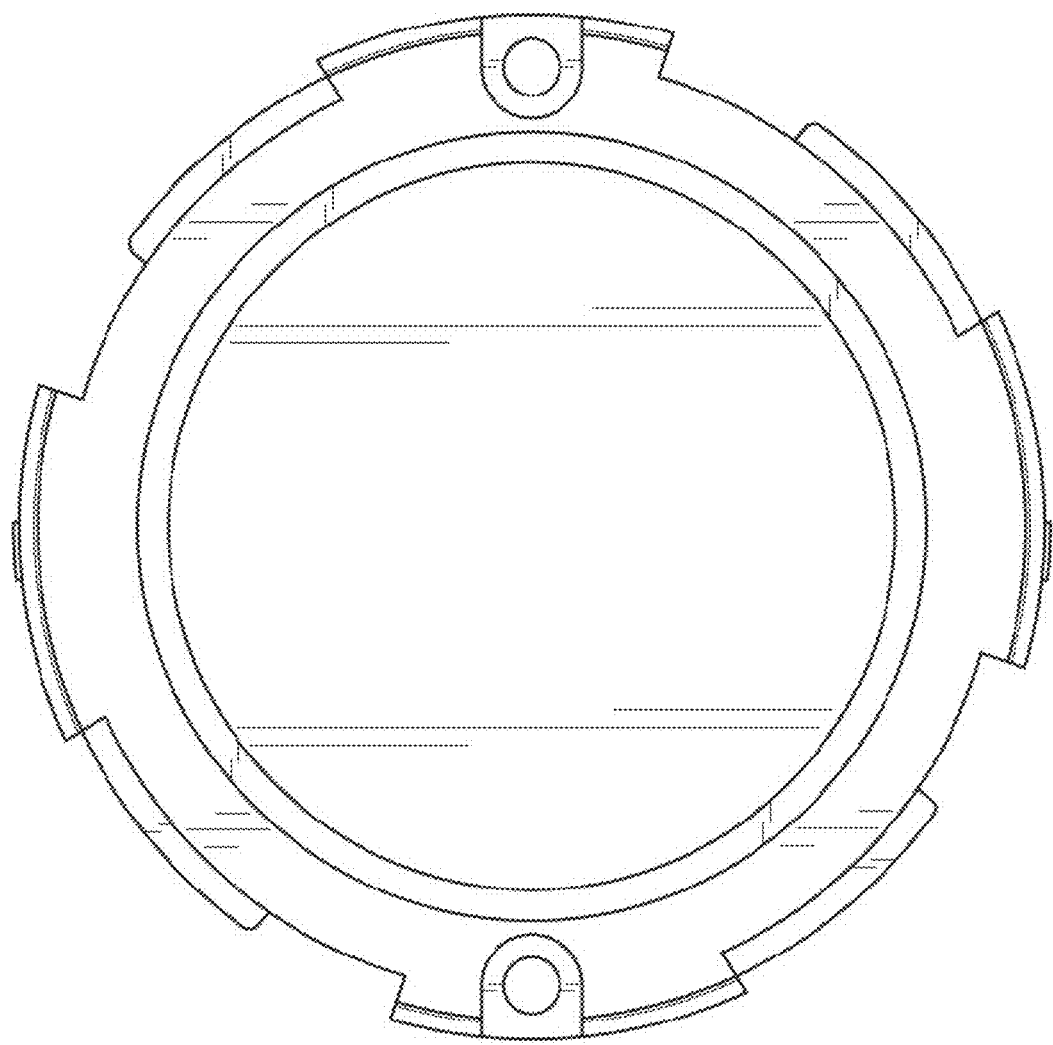
Figure 19E:
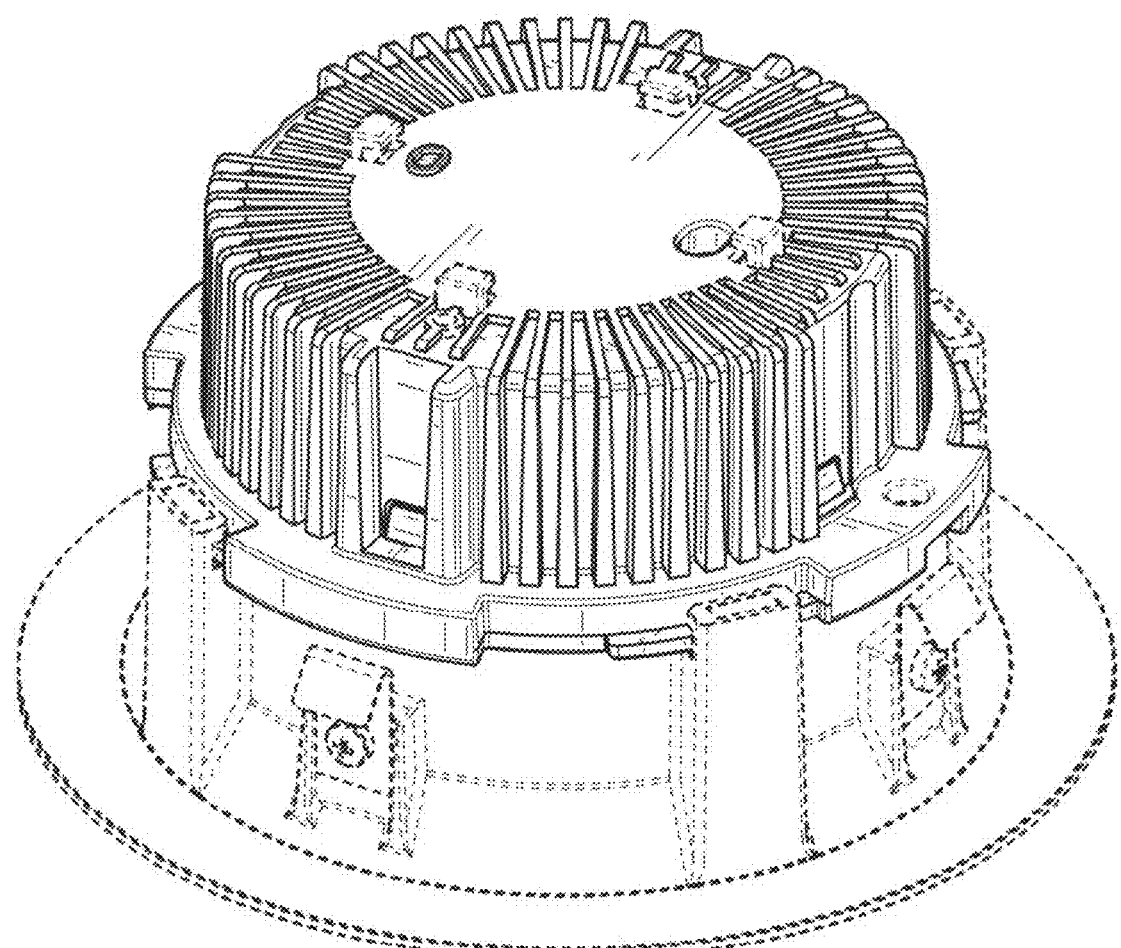
Figure 19F:
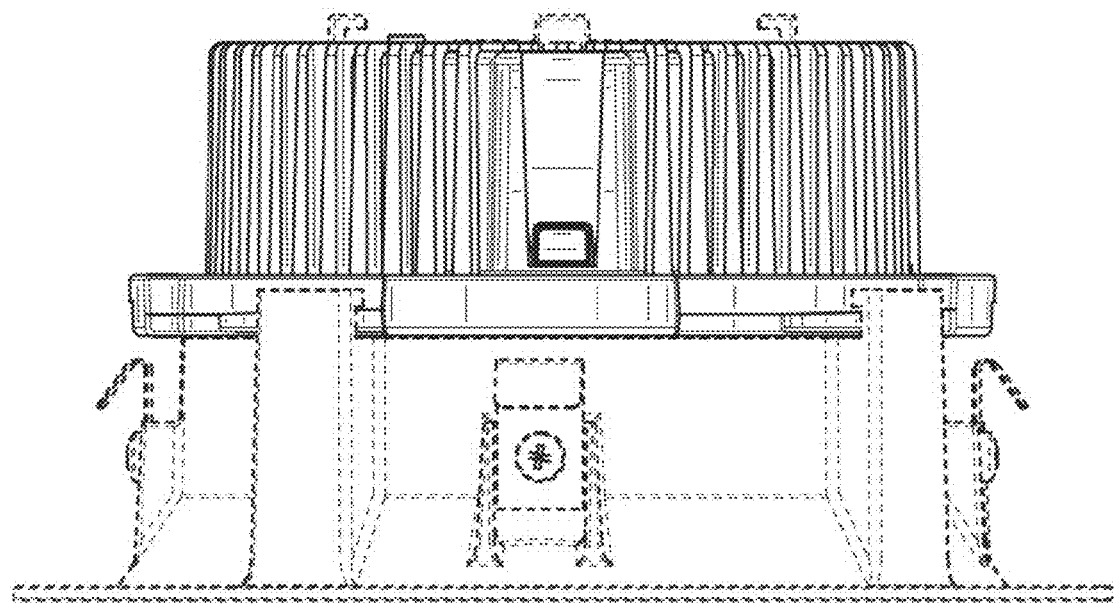
Figure 19G:
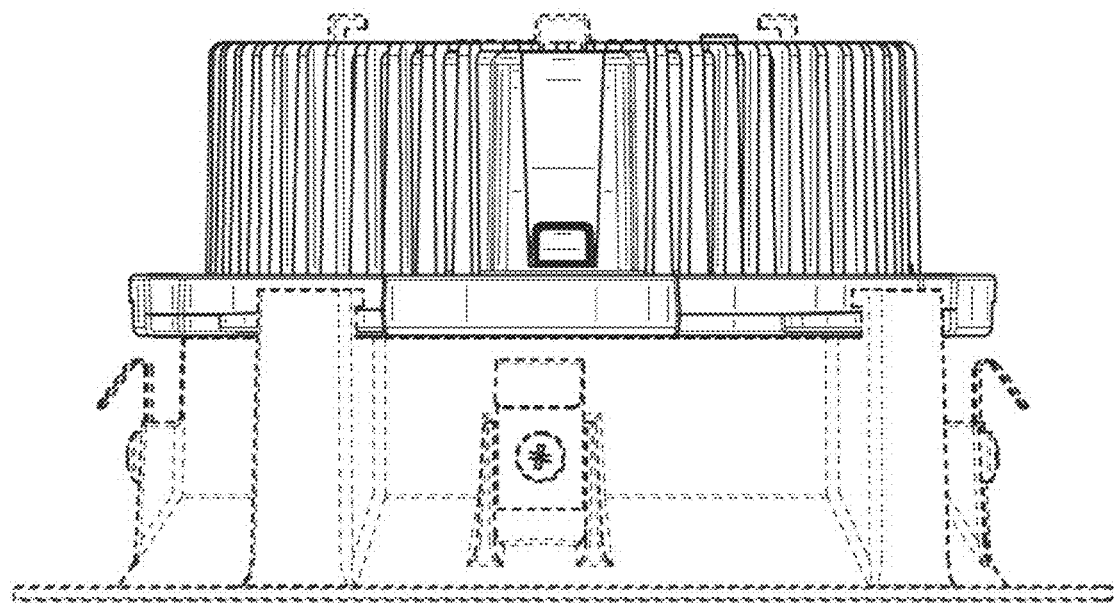
Figure 19H:
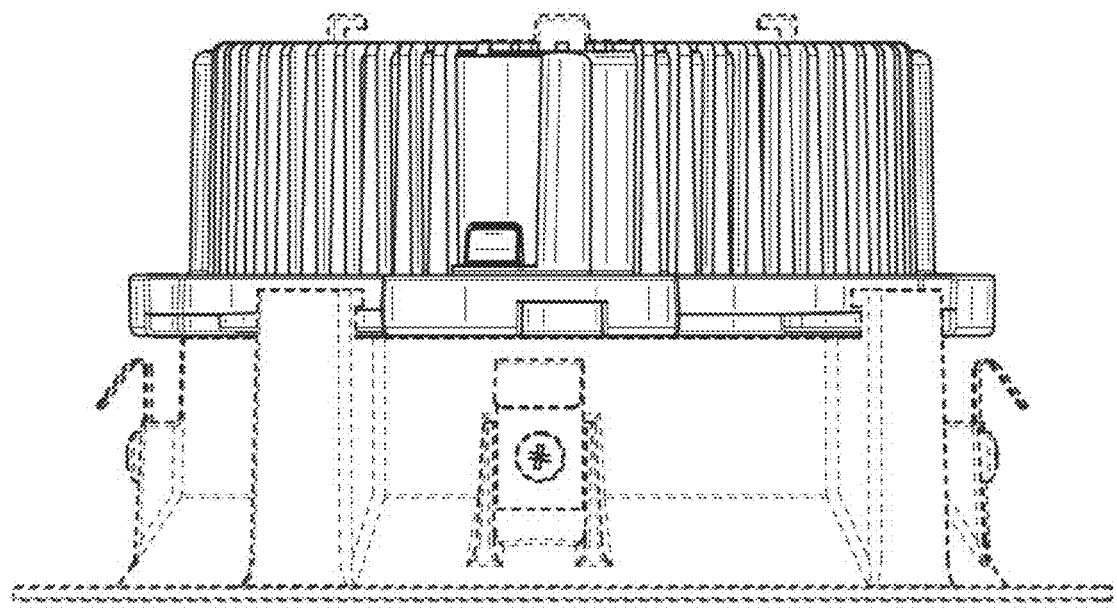
Figure 19I:
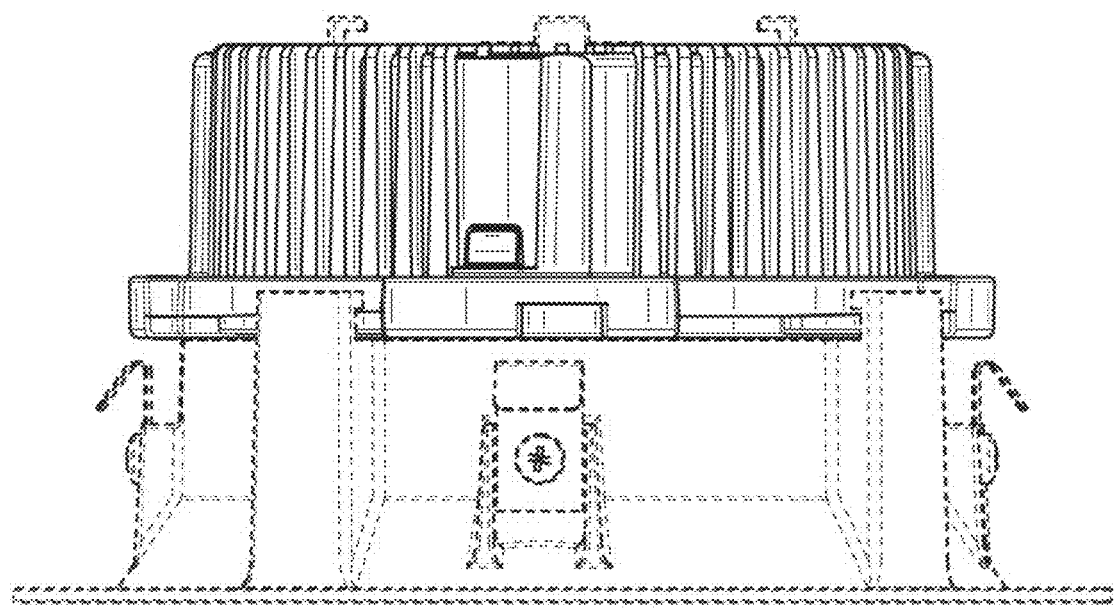
Figure 19J:
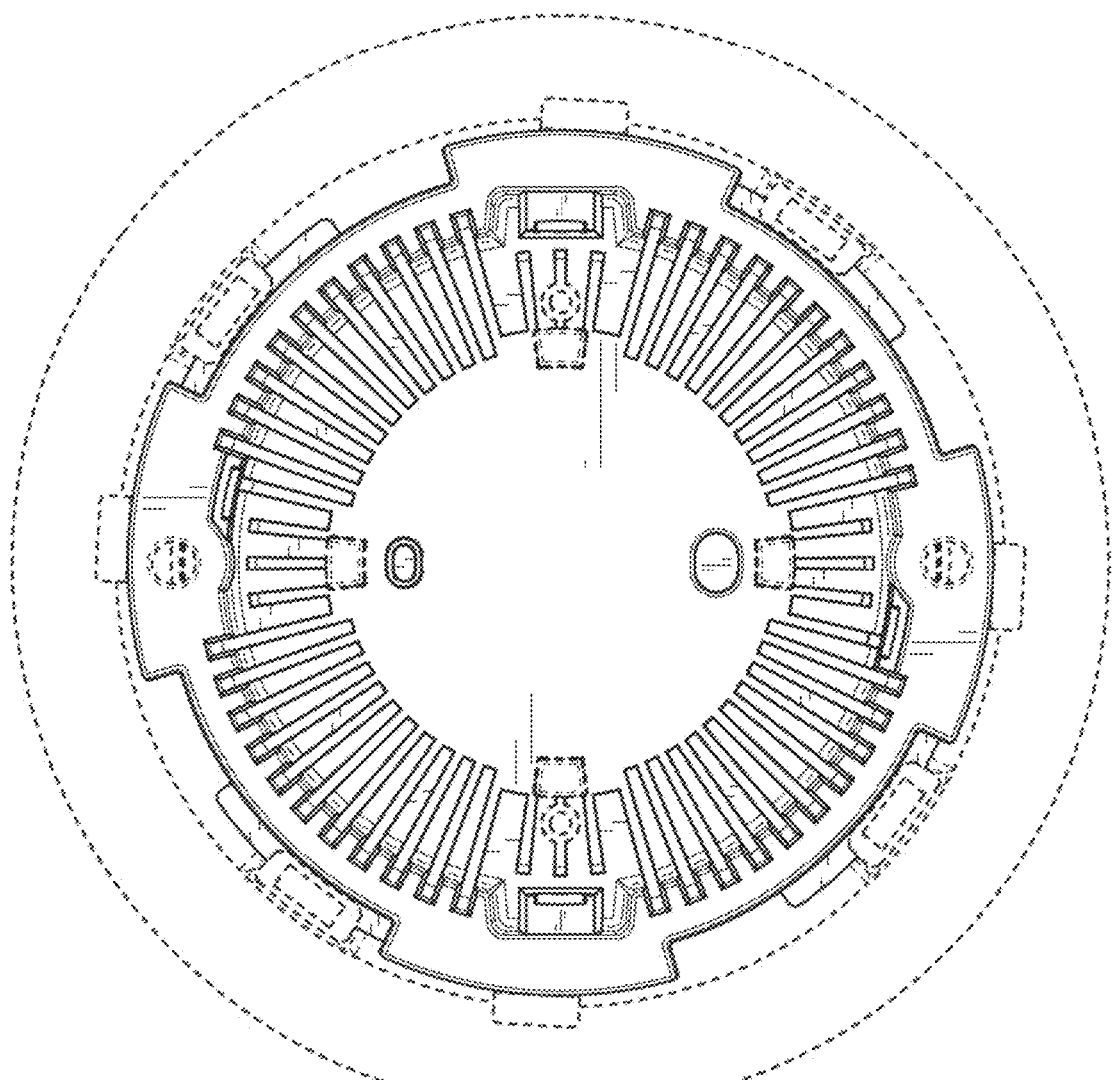
Figure 19K:
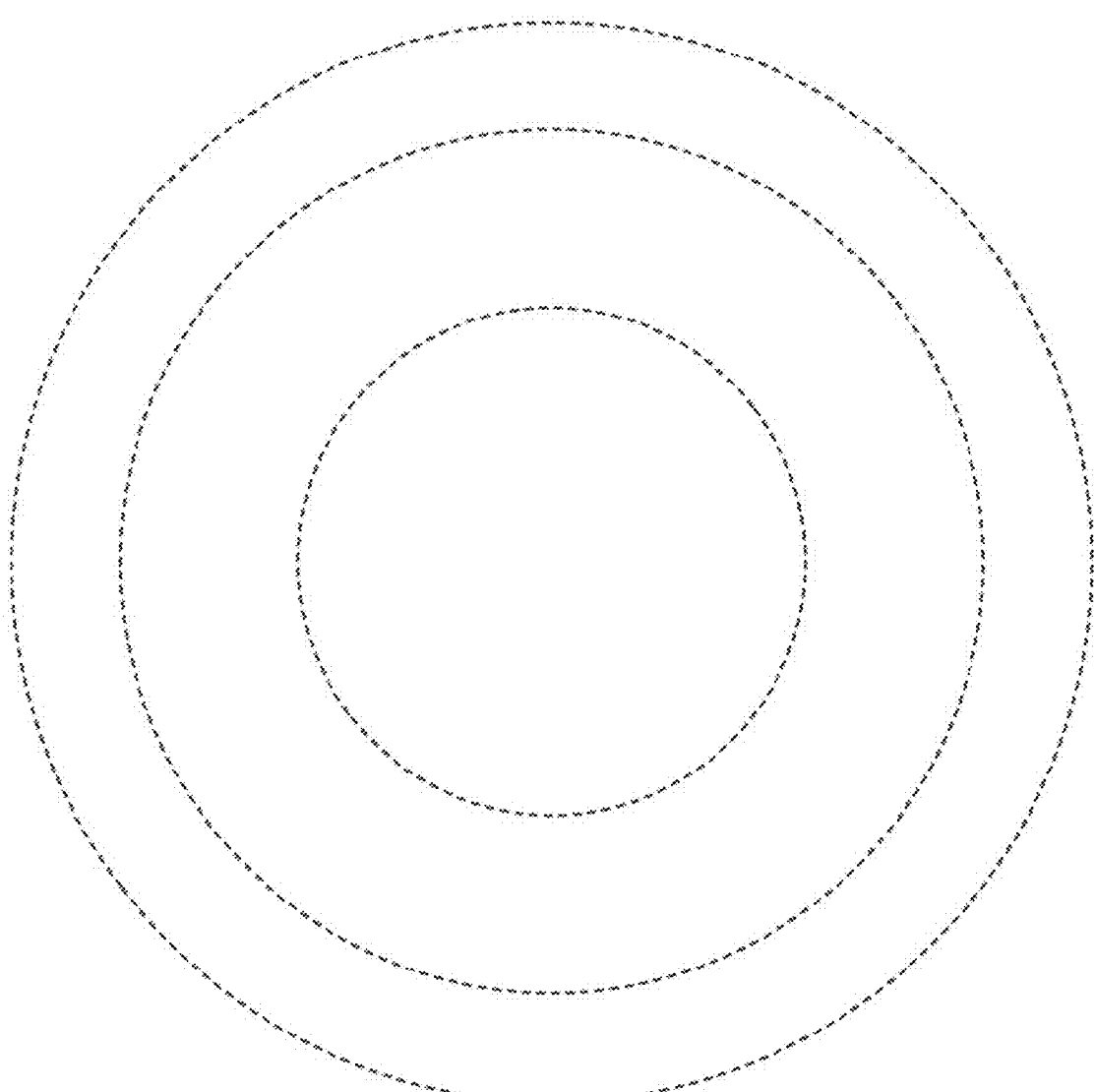
Figure 19L:
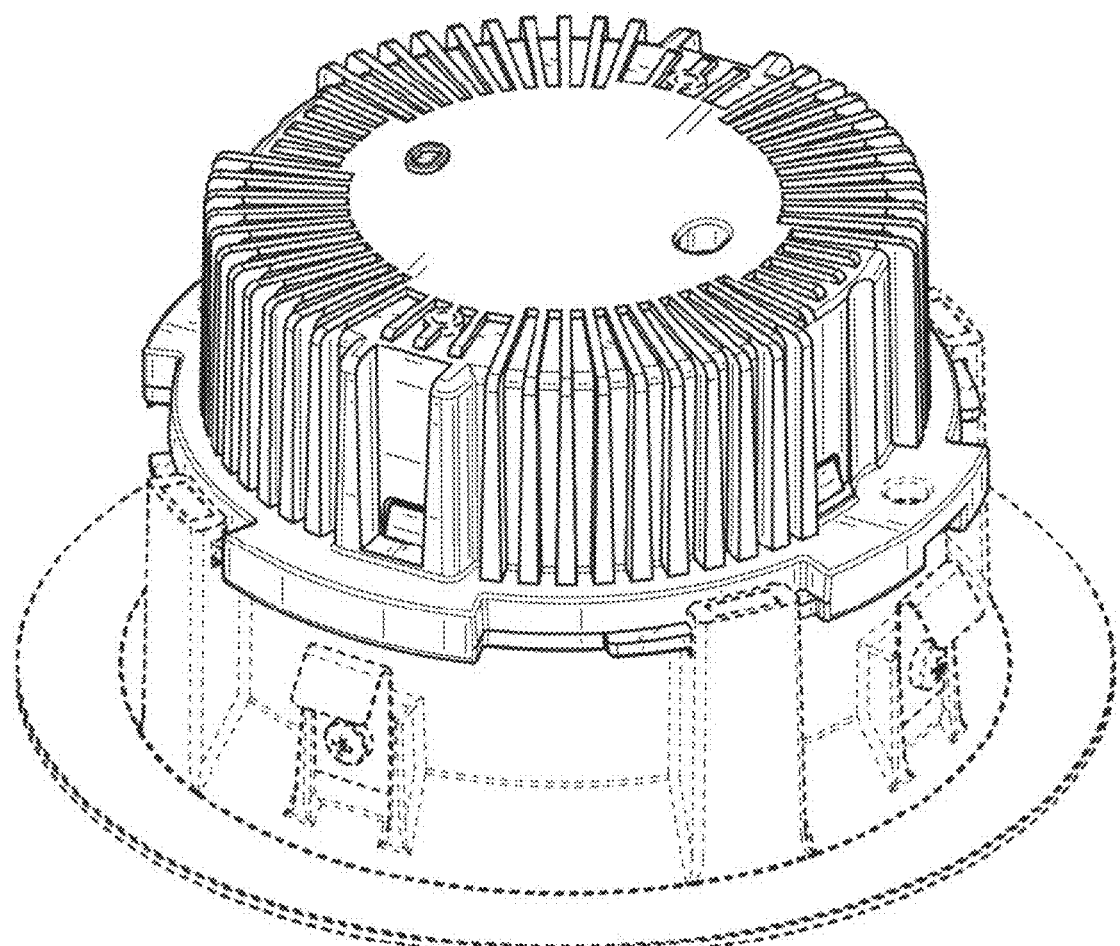
Figure 19M:
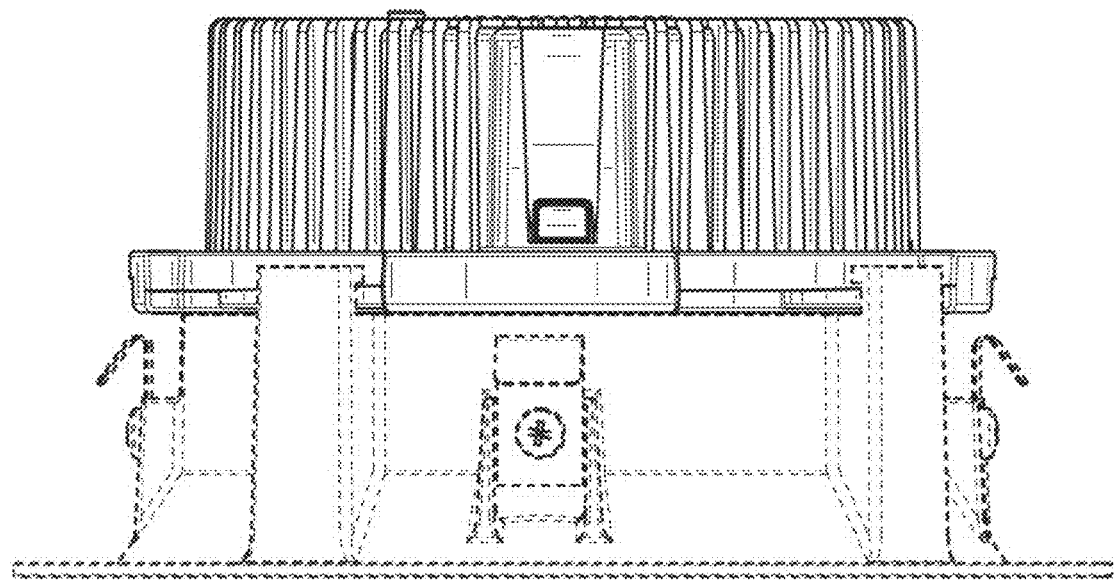
Figure 19N:
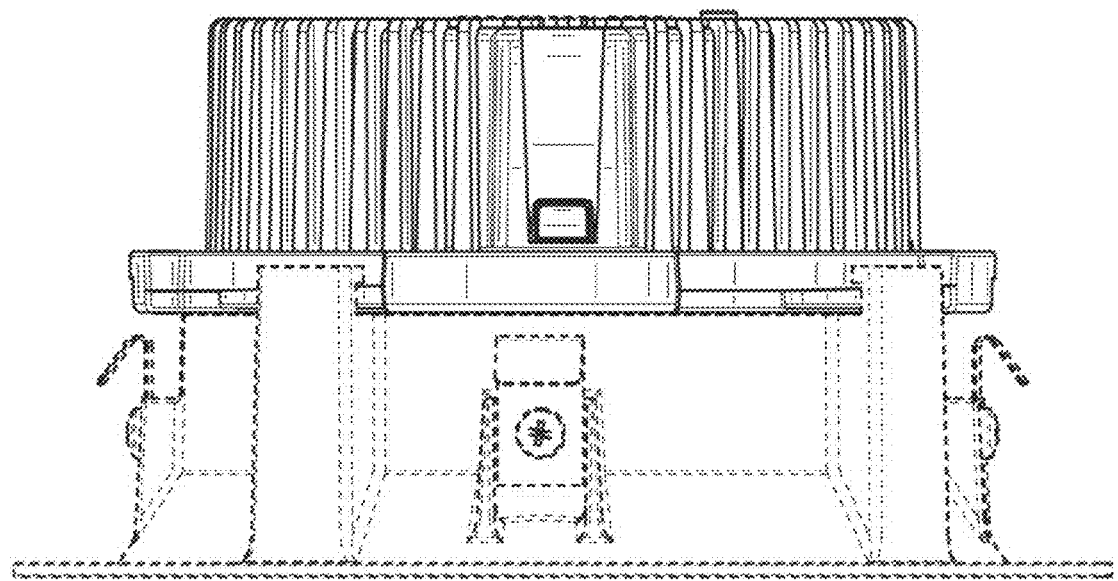
Figure 19O:
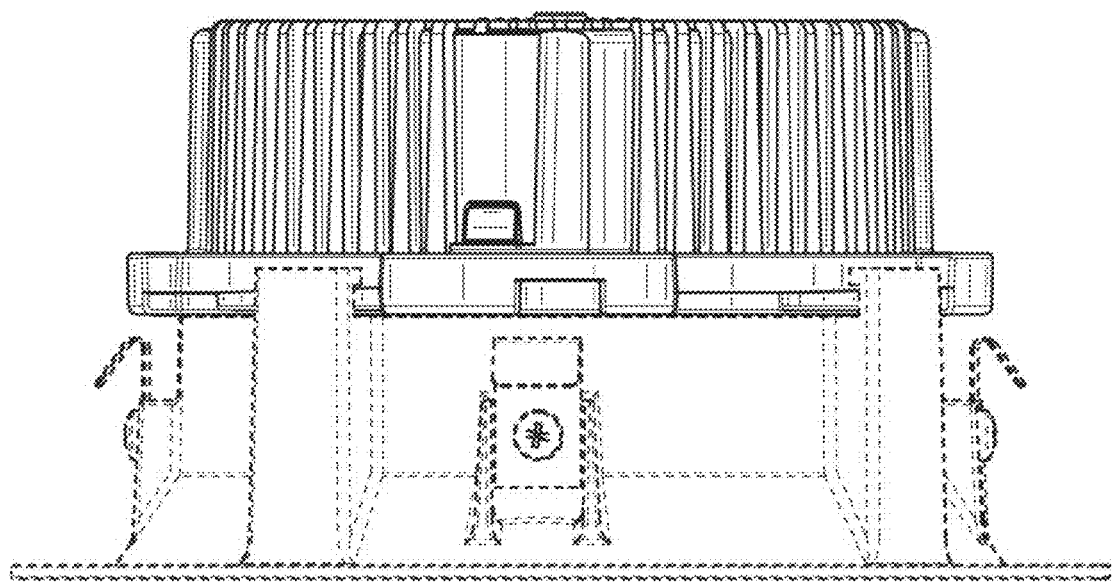
Figure 19P:
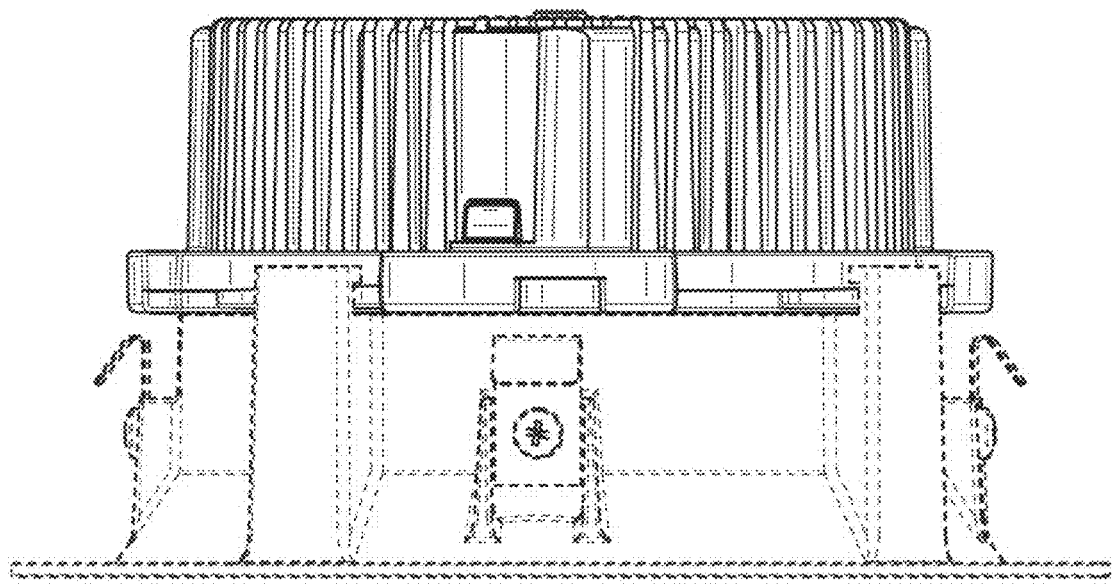
Figure 19Q:
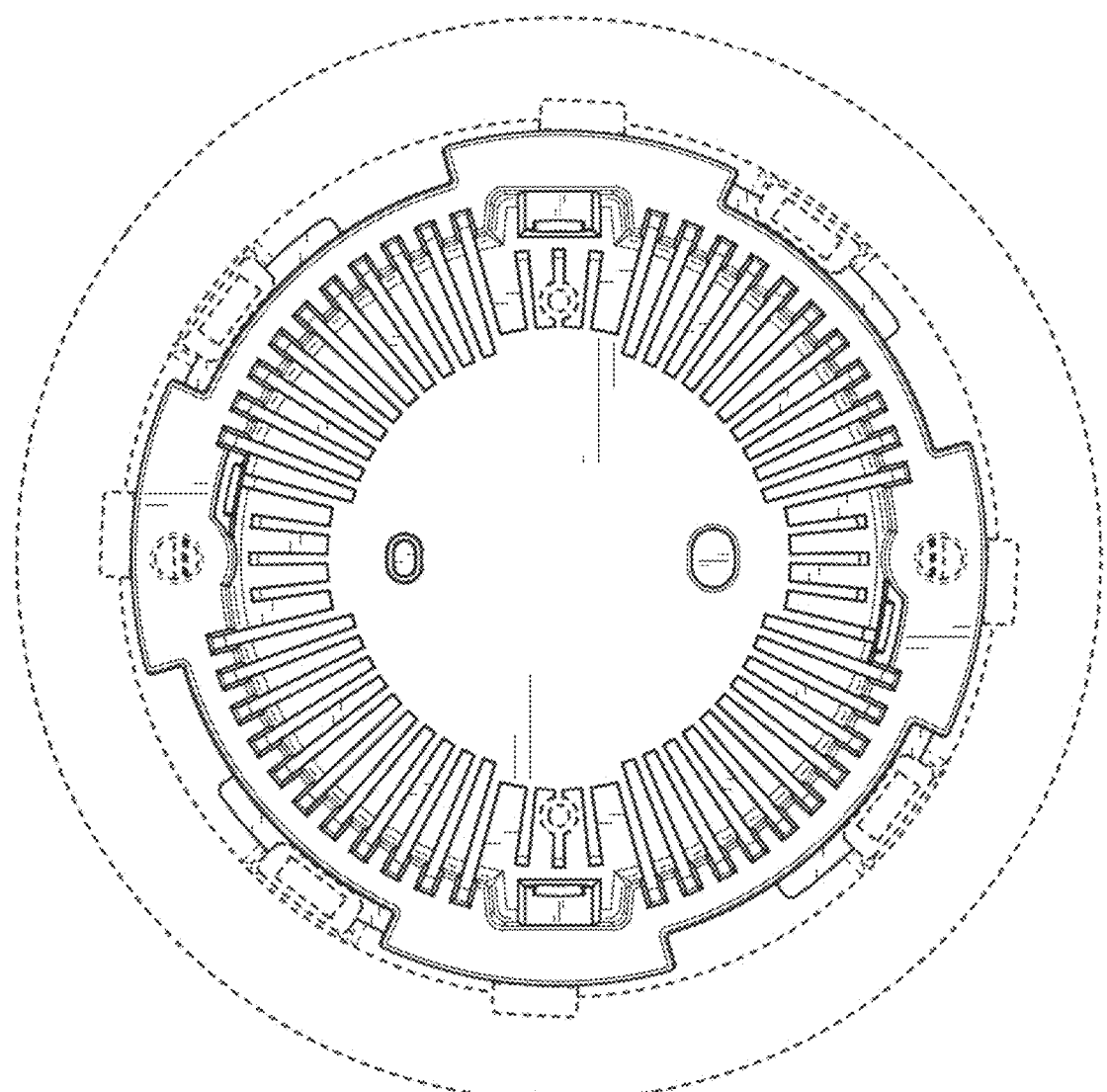
Figure 19R:
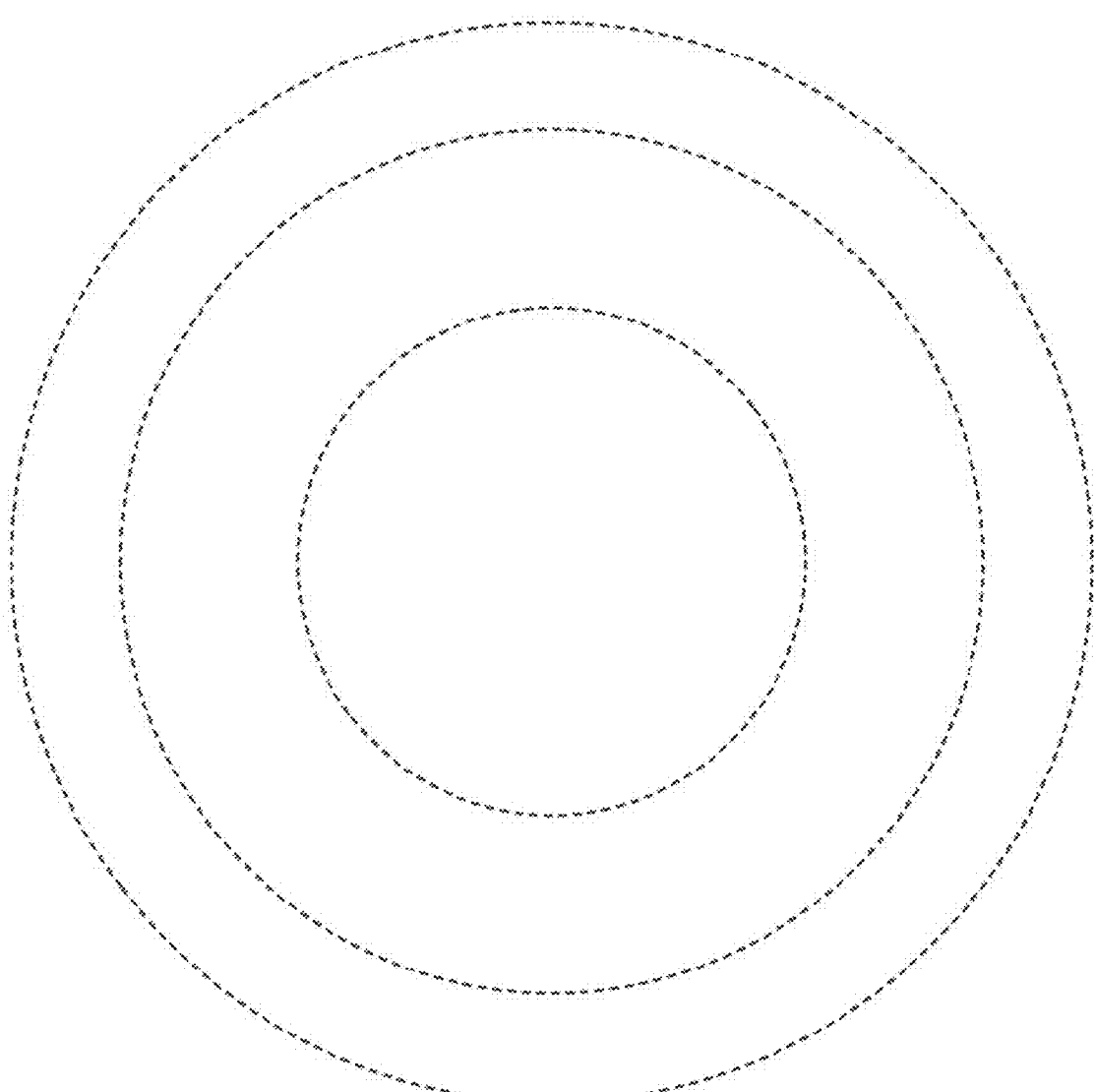
Figure 20A:
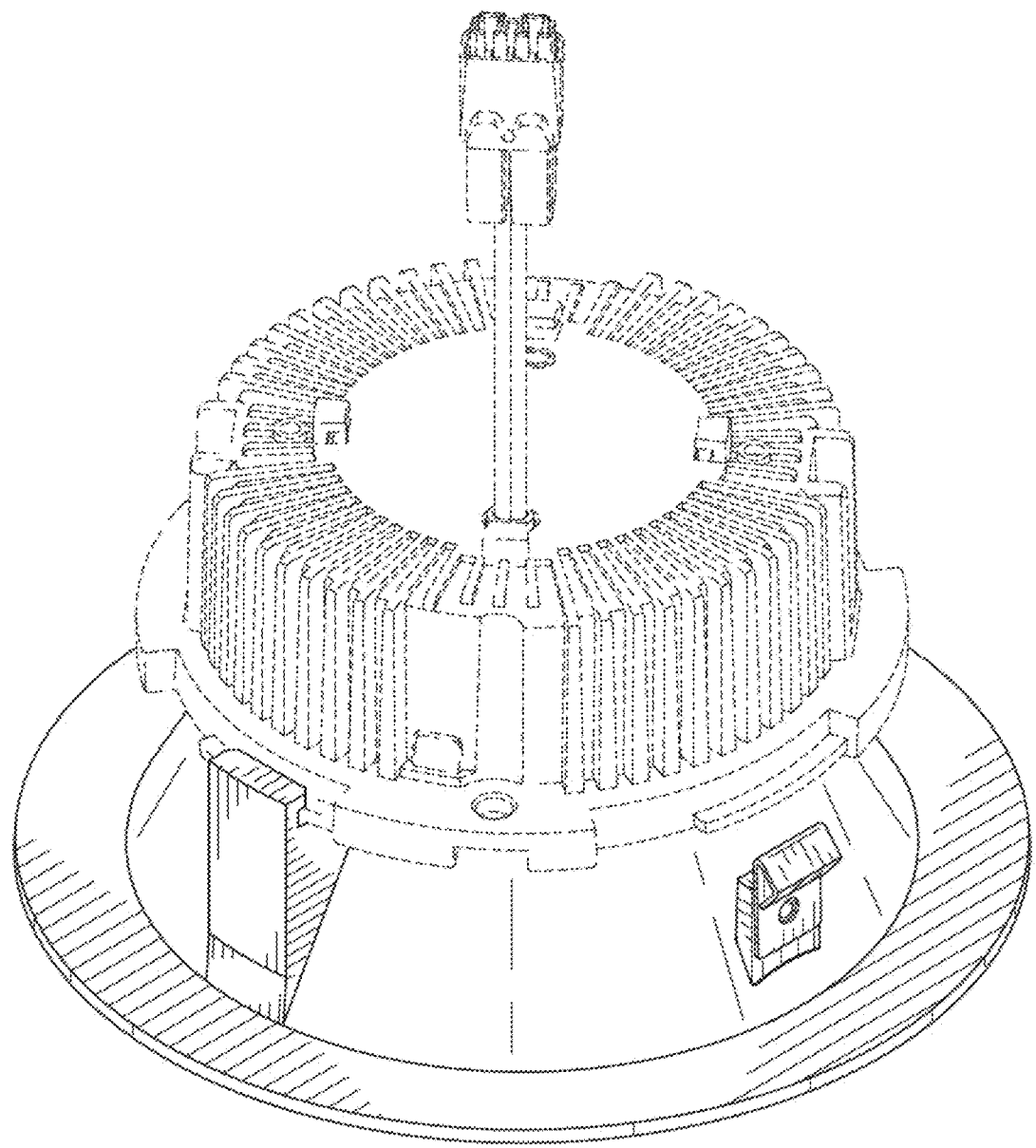
FIG. 20A-FIG. 20L show views of additional implementations and configurations, according to some embodiments of the disclosure.
Figure 20B:
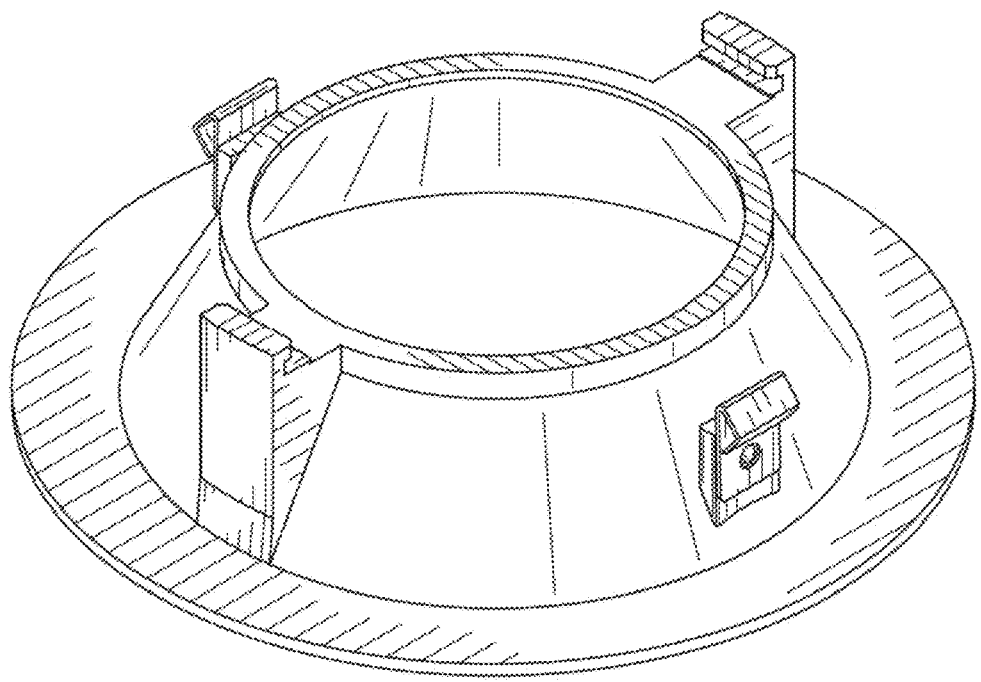
Figure 20C:
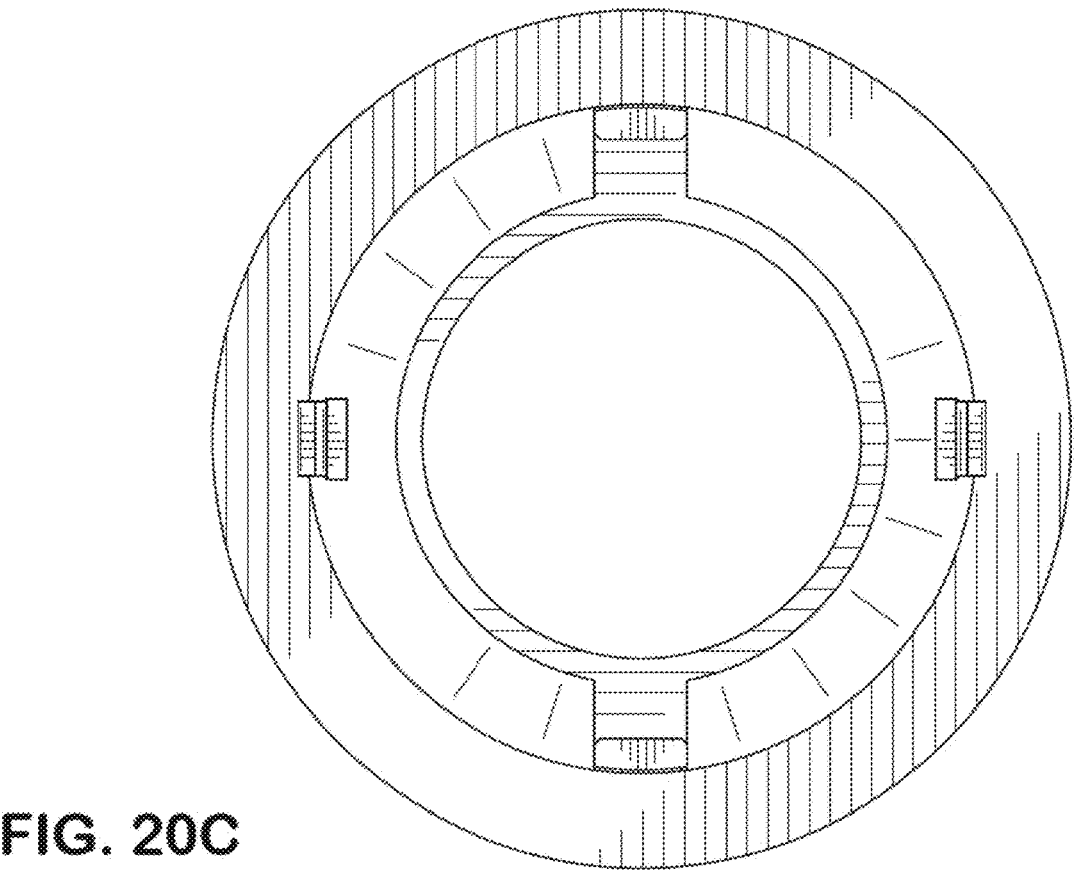
Figure 20D:
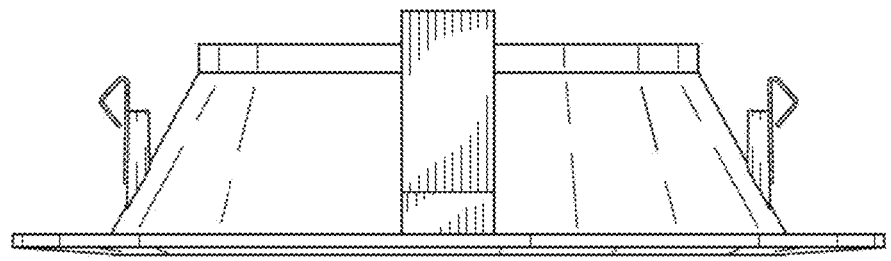
Figure 20E:
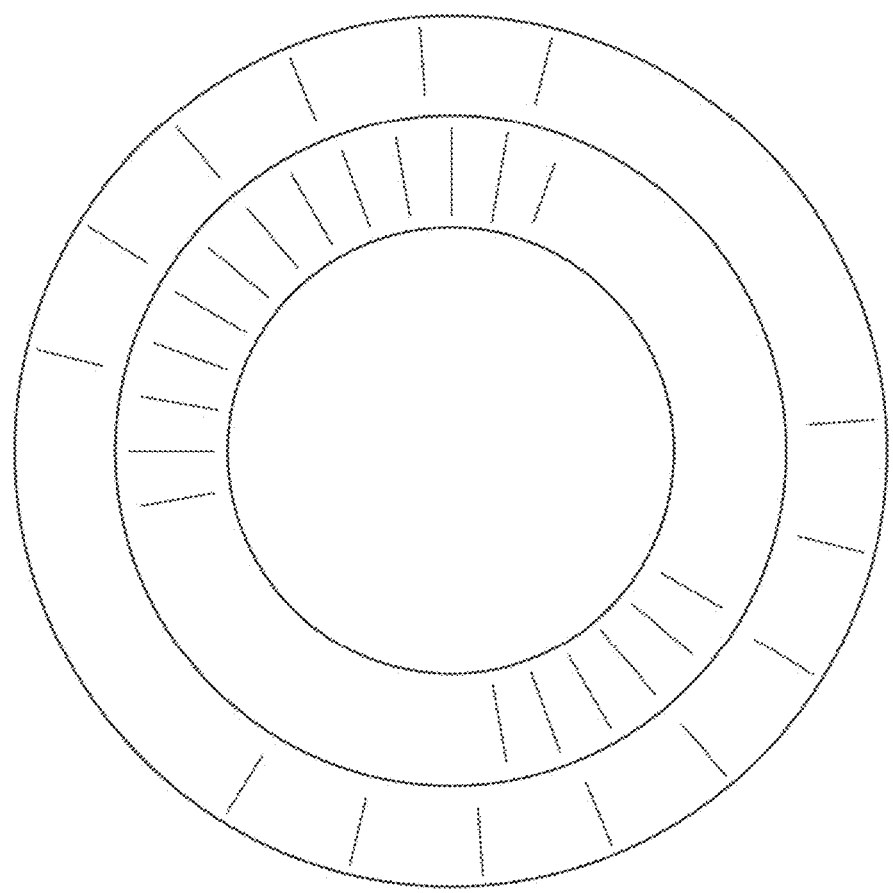
Figure 20F:
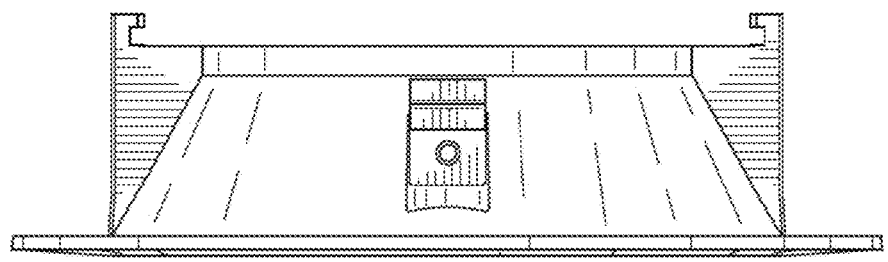
Figure 20G:
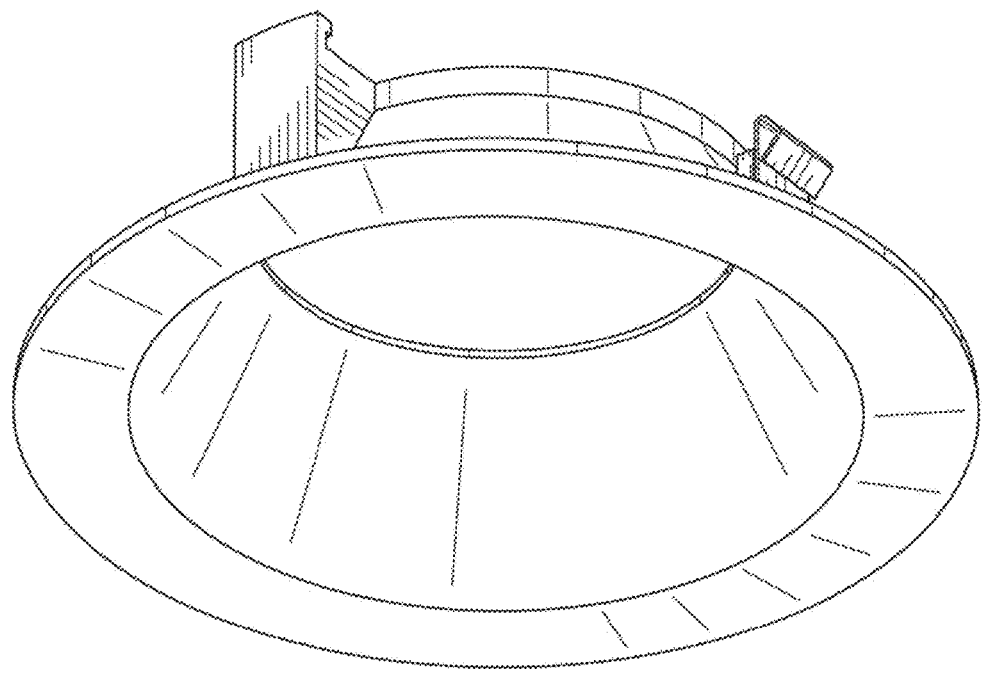
Figure 20H:
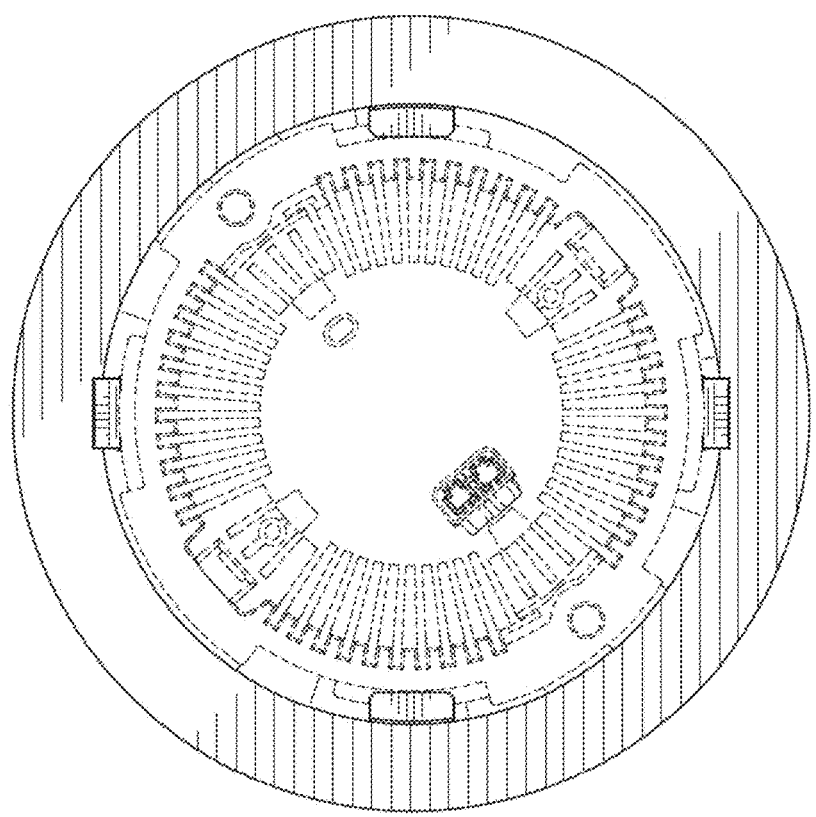
Figure 20I:
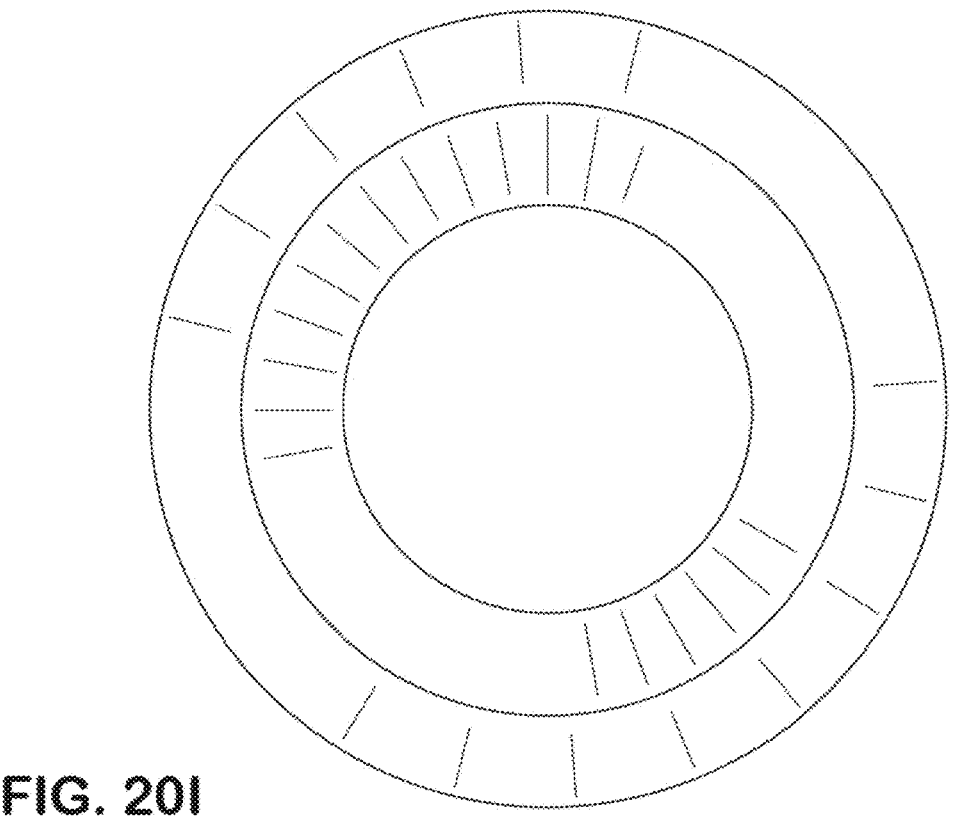
Figure 20J:
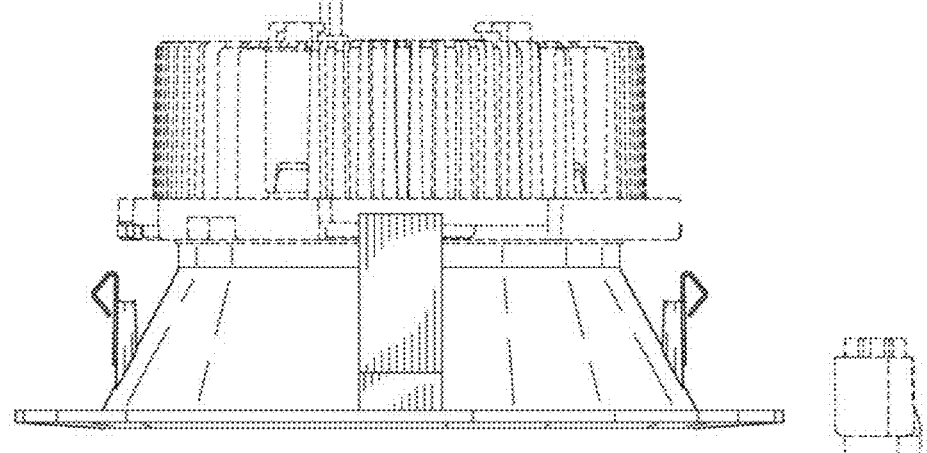
Figure 20K:
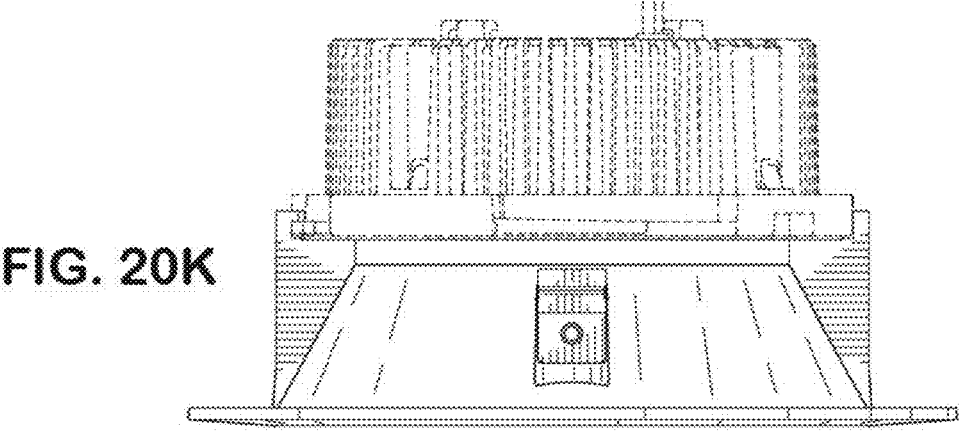
Figure 20L:
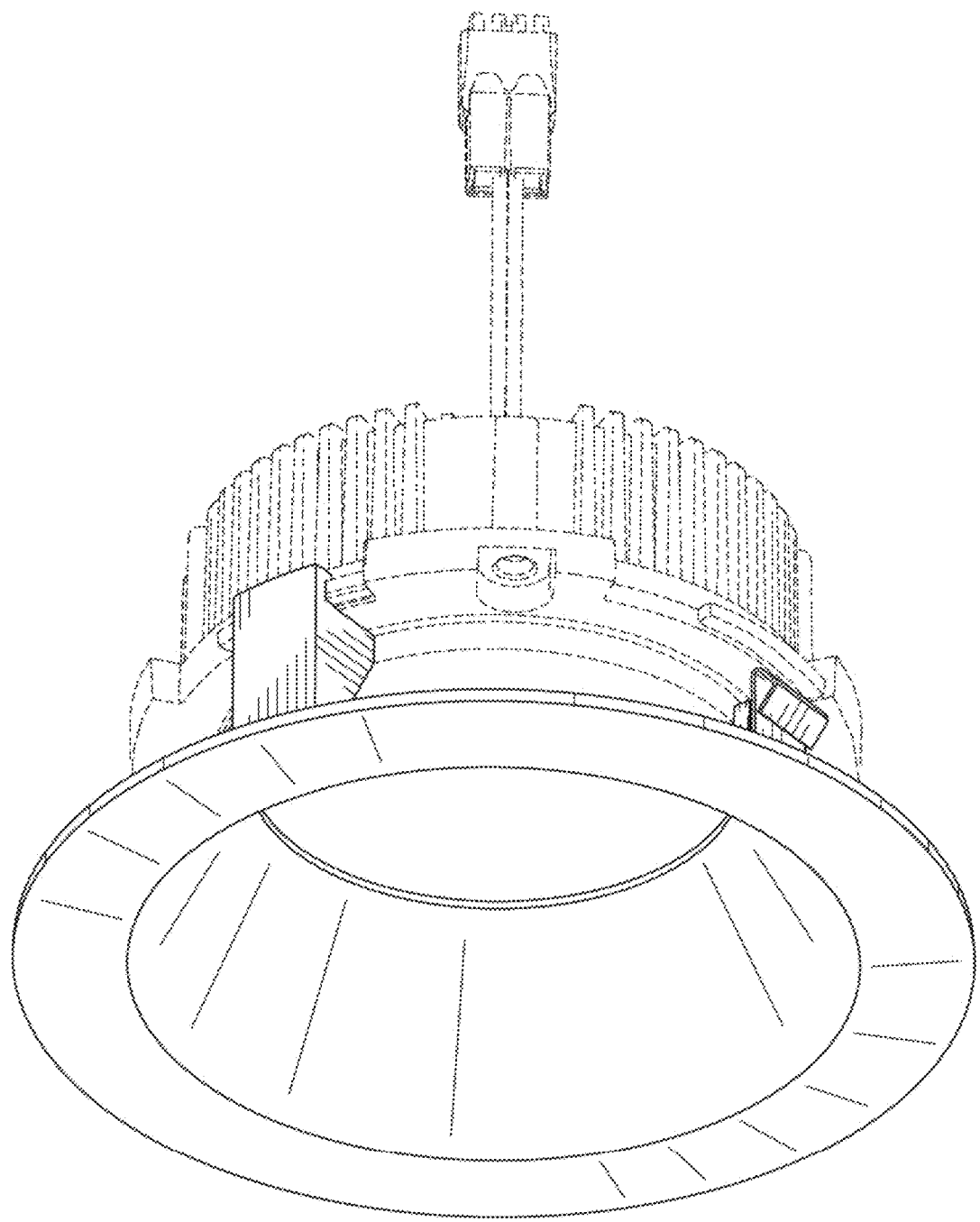

In other embodiments, as shown in FIG. 18, the unified casting 4n may be held inside the outer casing 3n, without being directly fastened to any tabs 18n. Friction clips 36n (or tension clips) may be utilized to retain the unified casting 4n inside the outer casing 3n. Each friction clip 36n may be attached via a screw 39n (or other fastening mechanism such as a bolt, resin, glue, or the like) to a trim base 24n of the trim 5n, or directly to the unified casting 4n. The friction clip 36n may be flexible and resilient. The friction clip 36 may be a piece of metal that has a straight portion 37n extending from the screw 39n and is then bent backward to form a bent portion 38n. The bent portion 38n of the friction clip 36n may directly contact the inner surface of the side wall 13n of the outer casing 3n, as shown, preventing the unified casting 4n and the trim 5n from falling out of the outer casing 3n.

The unified casting 4n is a shell and/or enclosure that further prevents the exposure of heat from the light source module 8n and the driver 9n to the items inside a ceiling or crawl space (e.g., insulation) in which the recessed lighting fixture 1n has been installed. The unified casting 4n may be formed of metals, polymers, metal alloys, and/or other heat insulating materials. As shown in FIG. 12C, the unified casting 4n may be a cylindrical structure; however, in other embodiments, the unified casting 4n may be any suitable shape, including an ellipsoid, cone, or polyhedron that is capable of housing the light source module 8n and the driver 9n.

In one embodiment, the unified casting 4n includes one or more heat sinks to dissipate heat generated by the light source module 8n and/or the driver 9n. Although the heat sinks are shown as fins (in FIG. 12D and FIG. 18) which are passive components (formed on the outer surface of the end wall and/or the side wall of the unified casting 4n) that cool the combined unified casting 4n, light source module 8n, and driver 9n, by dissipating heat into the surrounding air, active heat sinks (e.g., fans) may also be used. In one embodiment, the heat sinks are defined by a set of fins surrounding the unified casting 4n, which are formed in the same casting (manufacturing) process that results in the unified casting 4n being formed. The heat sinks may be composed of any thermally conductive material. For example, the heat sinks may be made of aluminium alloys, copper, copper-tungsten pseudoalloy, Al SiC (silicon carbide in aluminium matrix), Dymalloy (diamond in copper-silver alloy matrix), E-Material (beryllium oxide in beryllium matrix), and/or thermally conductive plastics or ceramics.

Still referring to FIG. 18, the recessed lighting fixture 1n may include the driver 9n contained within the unified casting 4n. The driver 9n is an electronic circuit or device that supplies and/or regulates electrical energy to the light source module 8n and thus powers the light source module 8n to emit light. The light source module 8n and the driver 9n may be coupled to the end wall of the unified casting 4n as shown in FIG. 18, using any suitable connecting mechanism, including screws, resins, clips, or clamps. The driver 9n may be any type of electrical power supply, including power supplies that deliver an alternating current (AC) or a direct current (DC) voltage to the light source module 8n. Upon receiving electricity through the wires 12n, the driver 9n may regulate current or voltage to supply a stable voltage or current within the operating parameters of the light source module 8n. The driver 9n receives an input current from the power source 10n and may drop the voltage of the input current to an acceptable level for the light source module 8n (e.g., from 120V-277V to 36V-48V). The driver 9n may transfer electrical power to the light source module 8n through an electrical connector (not shown). For example, the driver 9n may deliver electricity to the light source module 8n through an electrical cable (not shown) coupled between the light source module 8n and the driver 9n through removable or permanent connectors or soldered leads originating from the driver 9n. The driver 8n may include a magnetic transformer or additional or alternative circuitry for voltage conversion and for regulating the input current or voltage to the light source module 8n.

The light source module 8n may be any electro-optical device or combination of devices for emitting light. For example, the light source module 8n may have a single type of light emitting element, as a light emitting diode (LED), organic light-emitting diode (OLED), or polymer light-emitting diode (PLED). In some embodiments, the light source module 8n may have multiple light emitting elements (e.g., LEDs, OLEDs, and/or PLEDs). The light source module 8n receives electricity from the driver 9n, as described above, such that the light source module 8n may emit a controlled beam of light into a room or surrounding area. The driver 9n is designed to ensure that the appropriate voltage and current are fed to the light source module 8n to enable the emission of light by the one or more light sources within the light source module 8n.

In some embodiments, the recessed lighting fixture 1n may include a reflector 34n contained in the unified casting 4n, as shown in FIG. 18. The reflector 34n may surround the entire light source module 8n as shown, or it may surround just a light emitting element of the light source module 8n, to adjust the way light emitted by the light source module 8n is directed into a room or surrounding area. In one embodiment, the reflector 34n surrounds the entirety of the light source module 8n and also separates the light source module 8n from the driver 9n. This separation allows light from the light source module 8n to be emitted into a room or surrounding area, while shielding the driver 9n from being exposed to the room or surrounding area. For example, in one embodiment, the reflector 34n and the unified casting 4n may together create a sealed structure to shield the driver 9n from the outside environment and the light source module 8n. By shielding the driver 9n from the outside environment, the reflector 34n might reduce the risk of fire or other dangers and may help ensure the recessed lighting fixture 1n complies with building and safety codes/regulations. The reflector 34n may be formed of any fire retardant material, including steel, aluminum, metal alloys, calcium silicate, and other similar materials.

The reflector 34n may be formed in any shape that may direct and/or focus light. For example, the reflector 34n may be parabolic or spherical. In one embodiment, the front surface of the reflector 34n may be coated with a reflecting material or include one or more reflecting elements that assists in the adjustment of light emitted by the light source module 8n. For example, the reflector 34n may be coated with a shiny enamel or include one or more mirrors or retroreflectors or a microcellular polyethylene terephthalate (MCPET) material to adjust the focus of light emitted by the light module 8n. In other embodiments, the reflector 34n may include various other optic elements to assist in the focusing of light emitted by the light source module 8n.

Still referring to FIG. 18, in one embodiment, the recessed lighting fixture 1n may include a lens 35n. The lens 35n may be formed to converge or diverge light emitted by the light source module 8n. The lens 35n may be a simple lens 35n comprised of a single optical element or a compound lens 35n comprised of an array of simple lenses 35n (elements) with a common axis. In one embodiment, the lens 35n also provides a protective barrier for the light source module 8n and shields the light source module 8n from moisture or inclement weather. The lens 35n may also assist in the diffusion of light and increase the uniformity of light over the surface of the recessed lighting fixture 1n. The lens 35n may be made of any at least partially transparent material, including glass and hard plastics. In one embodiment, the lens 35n and the reflector 34n are contained in a single indivisible unit of the unified casting 4n, to work in conjunction to focus and adjust light emitted by the light source module 8n. In one embodiment, the reflector and the lens are housed together with the driver and the light source module in the unified casting 4n as a single, indivisible unit. In other embodiments, the lens 35n and the reflector 34n may be separate, divisible elements.

Still referring to FIG. 18, in one embodiment, the recessed lighting fixture 1n may include a trim 5n. The trim 5n may be attached directly to the unified casting 4n as well as to the outer casing 3n as shown, while in other embodiments the trim 5n is to only be attached to the outer casing 3n (where in that case the unified casting 4n is separately attached to the casing 3n, as in FIG. 12C for example). The trim 5n may be attached to the unified casting 4n and/or the outer casing 3n using any suitable connecting mechanism, including resins, clips, screws, bolts, or clamps. In one embodiment, the trim 5n may include grooves and/or slots that are designed to engage with corresponding bumps or tabs of the unified casting 4n and/or the outer casing 3n to form a rotate and lock (or friction lock) connection which prevents axial separation (in FIG. 18, in the vertical or longitudinal direction) of the trim 5n and the outer casing 4n, and without the use of separate tools or other devices.

Figure 12D:
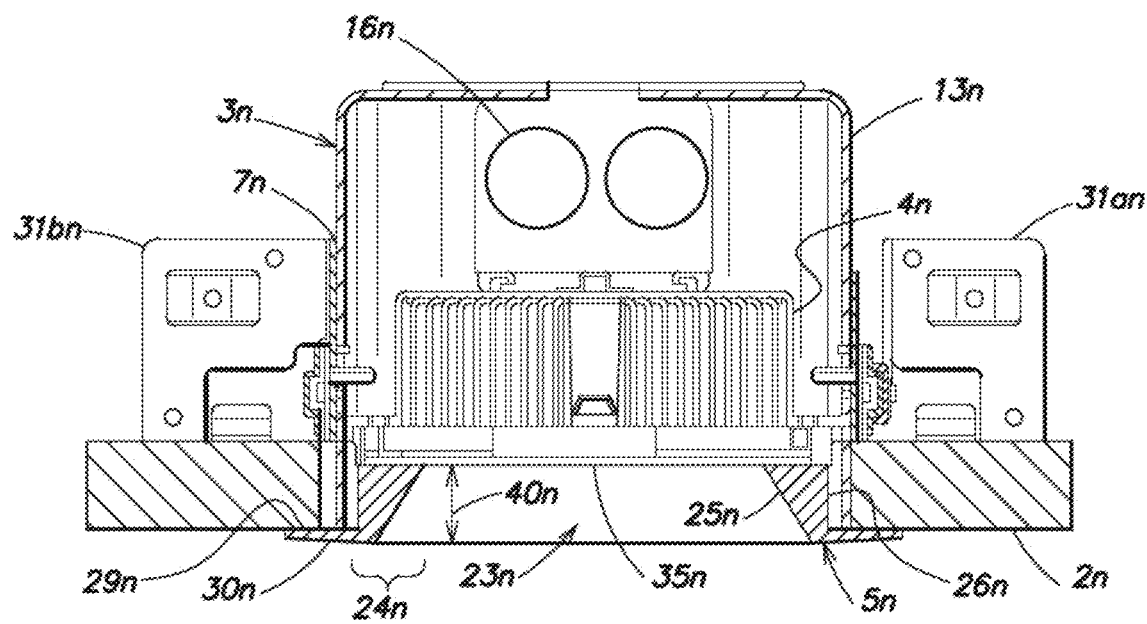
FIG. 12D shows a side cross-section view of the embodiment of FIG. 12C.
Figure 13:
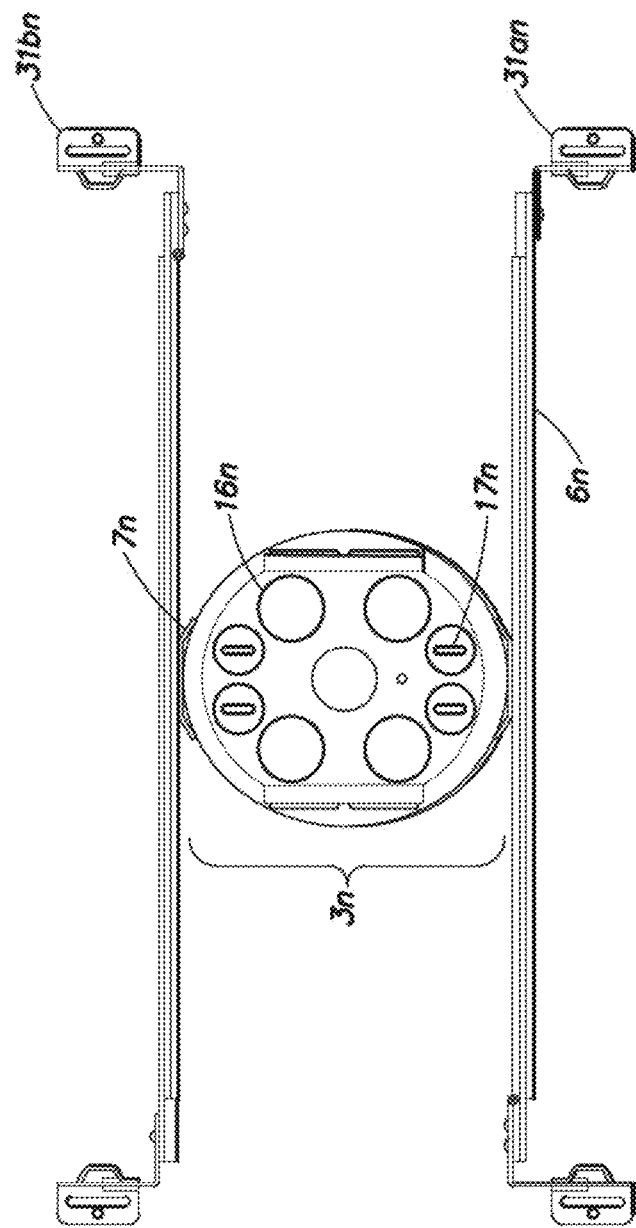
FIG. 13 shows a top view of the embodiment of FIG. 12C.

In one embodiment, the entire height 40n of the trim 5n, which may or may not be attached to the casting 4n, may be inserted into the cavity 15n of the outer casing 3n. This is where the unified casting 4n is positioned further (deeper) into the outer casing 3n so that glare from the emitted light is reduced. As seen in FIG. 12C and FIG. 12D, for example, the trim 5n may have a trim base 24n (an annular segment) having a height 40n, with an inner circumferential surface 25n that is open to the central, light passing aperture 23n and an outer circumferential surface 26n that is closer to the side wall 13n of the outer casing 3n. The trim base 24n may have a top surface 27n that extends, in a lateral or horizontal direction, from the inner surface 25n to the outer surface 26n and may be in contact with the lower most surface of the unified casing 4n. The height 40n of the trim base 24n may be increased so as to position the lens 35n further into the outer casing 3n. It is preferred that the height 40n of the trim base 24n is less than. The trim 5n may have a flange 28n that extends laterally outward from the base 24n, with a top surface 29n and a bottom surface 30n as shown. In one embodiment, referring now back to FIG. 12C, the trim base 24n may be shaped and sized such that the outer surface 26n thereof conforms to an inner surface of the side wall 13n of the outer casing 3n so that the trim 5n and the outer casing 3n are in direct contact. In one embodiment, the trim 5n may be fitted tightly to the side wall 13n of the outer casing 3n (friction fit) so that the trim 5n does not fall out of the outer casing 3n (when the trim 5n is not also separately attached to the unified casting 4n). In another embodiment, the outer surface 26n of the trim base 24n of the trim 5n may be attached to the inner surface of the side wall 13n of the outer casing 3n through any connecting mechanism. The trim 5n may be pushed into the outer casing 3n so that the bottom end or edge of the side wall 13n of the outer casing 3n comes into direct contact with the top surface 29n of the flange 28n of the trim 5n, for a tight, snug fit as shown in FIGS. 12C and 12D. However, it is not necessary for the end of the side wall 13n of the outer casing 3n to directly contact the top surface 29n of the flange 28n of the trim 5n. In yet another embodiment, the outer surface 26n of the trim base 24n need not contact the inner surface of the side wall 13n of the outer casing 3n (e.g., when friction clips 36n are used as shown in FIG. 18).

In one embodiment, different diameter trims 5n may be capable of being coupled to the same unified casting 4n and/or the same outer casing 3n, where the diameter is measured at the periphery of the flange 28n. The size and design of the trims n5 may depend on the size of the hole the wall 2n in which the recessed lighting fixture 1n has been fitted to conceal the exposed wall or ceiling edge that defines the hole. The recessed lighting system 1n may include two or more trims 5n of different sizes to cover ceiling or wall openings of different sizes. The trim 5n may need to meet the aesthetic demands of the consumer. The trim 5n may be made of aluminum plastic polymers, alloys, copper, copper-tungsten pseudoalloy, Al SiC (silicon carbide in aluminum matrix), Dymalloy (diamond in copper-silver alloy matrix), and E-Material (beryllium oxide in beryllium matrix).

In one embodiment, the recessed lighting fixture 1n may include a set of hangar bars 6n as shown in FIG. 12C. The hangar bars 6n may be rigid, elongated members that are connected to adjacent joists and/or beams in the walls or ceilings of a structure. In one embodiment, each of the hangar bars 6n may be telescoping such that each hangar bar on may be extended or retracted to meet the gap between the joists and/or beams. In one embodiment, each of the hangar bars on may include a set of mounting blocks 31n. The mounting blocks 31n may be used to directly attach the hangar bars 6n to the joists and/or beams in the walls or ceilings of a structure. For example, as shown in FIG. 12C, the mounting blocks 31n may include holes for receiving screws and/or nails or other fasteners that enable the hangar bars 6n to be securely attached to a building structure. Although shown in FIG. 12C and described above in relation to holes and screws, in other embodiments, other mechanisms of attachment may be used in conjunction with the mounting blocks 31n, including resins, clips, or clamps to attached the bars 6n to the building structure. In one embodiment, the mounting blocks 31n may be integrated in one indivisible structure along with the hangar bars 6n, while in other embodiments, as shown in FIG. 12C, the mounting blocks 31n may be coupled to the hangar bars 6n through the use of one or more attachment mechanisms (e.g., screws, bolts, resins, clips, or clamps). Using the above telescoping and mounting features, the recessed lighting fixture 1n may be installed in almost all the 2"×2" through 2"×18" wood joist constructions, metal stud constructions, and t-bar ceiling constructions.

In one embodiment, referring back to FIG. 13, the recessed lighting fixture 1n may have a mounting mechanism that includes a set of hangar holders 7n (two are shown) that couple the outer casing 3n to the hangar bars 6n, respectively. The hangar holder 7n may be a plate that is configured to slide substantially horizontally or otherwise move along the length of a corresponding hangar bar 6n that has a fixed length. Alternatively, the hangar holder 7n may be fixed to a telescoping section of the hangar bar (having a variable length).

FIG. 14 shows a perspective view of the hangar holder 7n according to one embodiment. The hangar holder 7n has an attachment mechanism 32n for coupling with the outer casing 3n, so that the outer casing 3n can be coupled to a hangar bar 6n, as seen in FIG. 16. The attachment mechanism 32n may be a pin attached to and extending inward from the inner face of the plate of hangar holder 7n. The attachment mechanism 32n may be inserted into an elongated opening 33n (e.g. slot, slit, etc.) in the side wall 13n of the outer casing 3n. The opening 33n may be vertically or substantially vertically oriented (parallel to the direction of the wall thickness 18n, or perpendicular to the longitudinal axis of the hangar bar 6n—see FIG. 12C) so that when the outer casing 3n is coupled to the hangar holder 7n, the outer casing 3n may be moved up or down as desired (while restricted in the sideways or lateral direction due to the attachment mechanism 32n being captured within the elongated opening 33n). The outer casing 3n may be moved along the length of the elongated opening 33n before being locked in a particular position. It is preferred that the elevation of the casing 3n behind the ceiling or wall 2n be adjusted in this manner so that the flange 28n of the trim 5n is flush with the ceiling or wall 2n as seen, e.g., in FIG. 12C.

In another embodiment, the attachment mechanism 32n may be a screw that couples the hangar holder 7n to the outer casing 3n. When the screw is inserted into the opening 33n of the outer casing 3n and turned, the outer casing 3n may move up or down relative to the hangar bar 6n depending on the direction the screw is turned. Accordingly, the outer casing 3n, along with the light source module 8n and the driver 9n, may be moved and adjusted so that the flange 28n is flush or sufficiently close to the ceiling or wall during installation. In yet another embodiment, the location of the attachment mechanism 32n and the elongated opening 33n are reversed, so that the opening 33n is formed in the hangar holder 7n rather than in the side wall 13n of the outer casing 3n, and the attachment mechanism 32n is affixed to and extending outward from the outside surface of the sidewall 13n of the casing 3n.

By being moveably coupled to the hangar holders 7n, the outer casing 3n, along with the light source module 8n and the driver 9n therein, may be moved in a length direction of the hangar bars 6n to a desired location. The outer casing 3n may also be moved substantially vertically relative to the hangar bars 6n. For example, the outer casing 3n may be adjusted vertically more than one inch upwards and one inch downwards. The hangar holders 7n may then be fixed to the hangar bars 6n so that they no longer move substantially horizontally or vertically relative to the hangar bars 6n.

As described above, the combination of a hangar bar 6n and a hangar holder 7n allows the outer casing 3n to be moved in a direction parallel to a longitudinal axis of the hangar bar 6n, as well as in a direction not parallel (e.g., perpendicular) to the hangar bar 6n. Accordingly, the outer casing 3n may be moved to a preferred location between a set of joists or beams in a structure and at a desired height before the being locked into position using the attachment mechanism 32n. The unified casting 4n is then positioned inside the outer casing 3n, by being inserted into the cavity 15n through the opening defined by the lower end, edge or periphery of the side wall 13n. By being configured such that the outer casing 3n, along with the light source module 8n and the driver 9n therein, is coupled to a unified set of moveable elements that assist in positioning the combined structure, the recessed lighting fixture 1n eliminates the added bulk and size of traditional recessed lighting fixtures. In particular, the recessed lighting fixture 1n allows adjustment of the position of the light source module 8n between joists or beams, without the need for both a compartment or can that is dedicated to housing the light source module 8n and a separate compartment that is dedicated to housing the driver 9n. Instead, the light source module 8n may be housed along with the driver 9n in the same cavity 15n of the outer casing 3n, where the latter itself can be directly moved to a desired position. This compact design provides an affordable design by cutting the cost of raw materials and other components and reduces shipping costs by reducing bulk. Also, by having the driver 9n and the light source module 8n placed in the same cavity of the outer casing 3n, serviceability and replacement of the driver 9n will be easier to perform and more convenient. In contrast, traditional housings have the driver 9n mounted on the outer casing 3n and contractors are forced to spend a significant amount of time removing parts to gain access to the outer casing 3n and the driver 9n.

Figure 24:
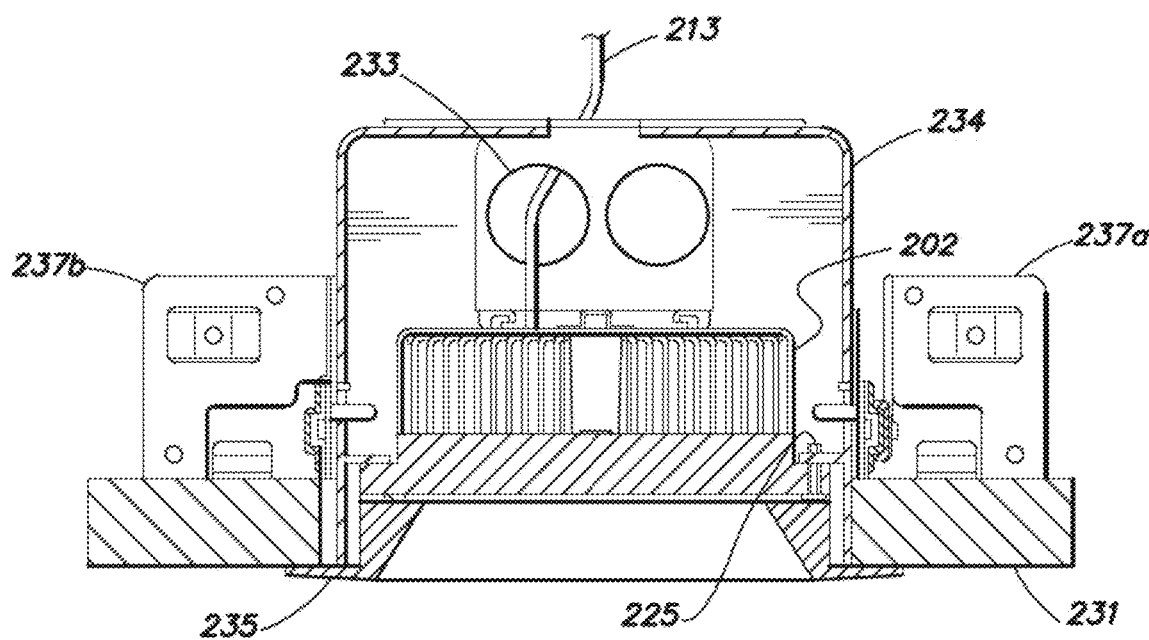
FIG. 24 shows a lighting module installed as part of an example recessed lighting system, according to some embodiments.

An embodiment of the recessed lighting system described here is shown in a section view in FIG. 24. The system serves to illuminate a room, and is located behind a ceiling or a wall 231 of the room. The system has a lighting module whose housing 202 has been installed, for this particular example only, within a junction box 234 that is secured to joists of the building, behind the wall 231, by a pair of mounting blocks 237a, 237b. Electrical wires 213 that are behind the wall 231 serve to bring mains electricity power into the housing 202 of the lighting module, through the rear end of the housing 202. In this example, the wires 213 are routed through a knockout 233 of the junction box 234. The recessed lighting system in this example also includes a trim 235 that is affixed to front end of the housing 202 of the lighting module. The trim 235 covers the exposed edge of the ceiling or wall 231 where an opening is formed for light to emerge from the front end of the housing 202. Other applications of the lighting module include its installation within a legacy incandescent can or other enclosure, and the use of attachment mechanisms other than the mounting blocks 237a, 237b to secure the system to other building structural members.

FIG. 19A through FIG. 19R and FIG. 20A through FIG. 20L show views of additional implementations and embodiments, according to the disclosure, including various configurations and illustrating optional ornamental features thereof. It is to be understood that features illustrated can be applied to other embodiments and be within the scope of the disclosure.

Figure 21:
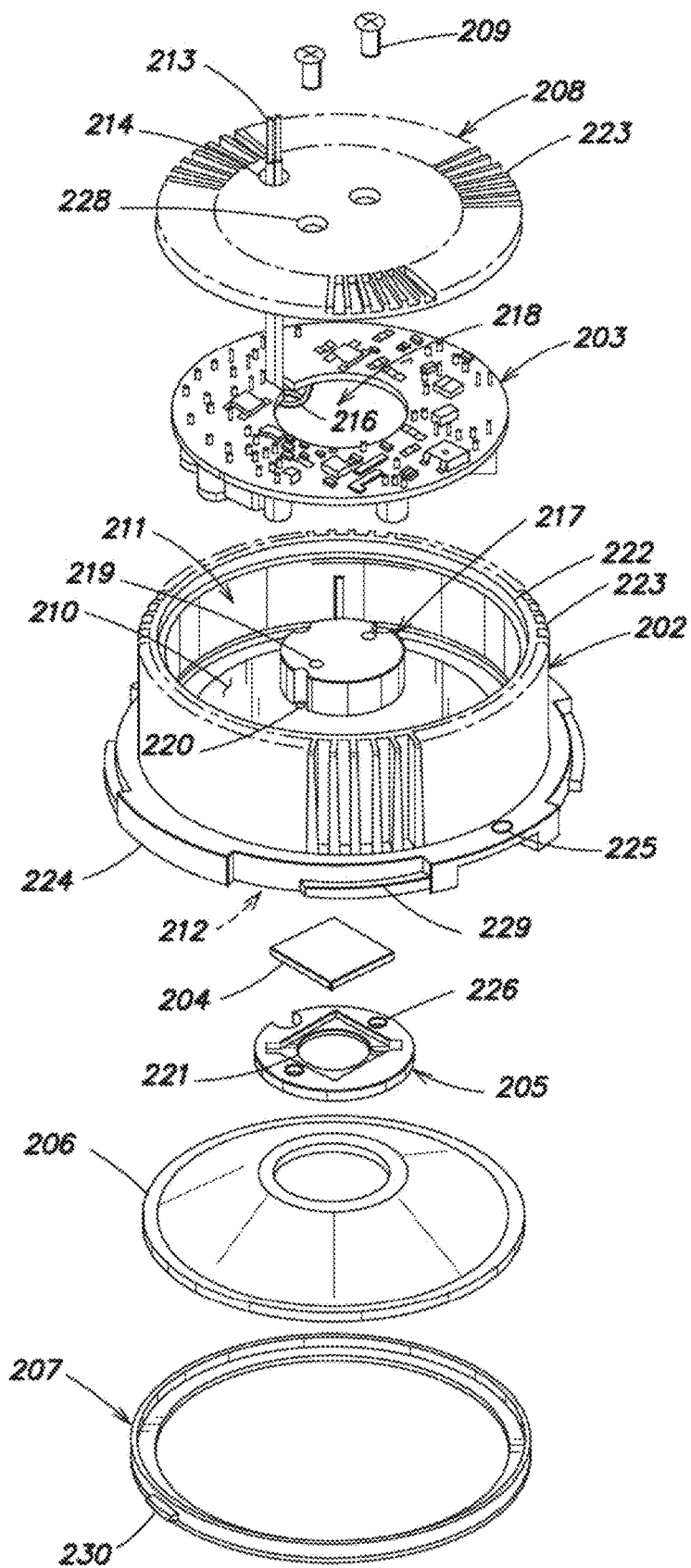
FIG. 21 shows an exploded view of a lighting module for recessed lighting systems, according to one embodiment of the disclosure.

FIG. 21 shows an exploded view of the lighting module, in accordance with an embodiment of the disclosure. Not shown are the trim and the mechanism by which the recessed lighting system can be installed behind a wall or ceiling-such aspects may be entirely conventional as discussed above in connection with the example of FIG. 24, e.g. through the use of a legacy incandescent can and platform with hangar bars, or other suitable attachment mechanism. In one embodiment, the lighting module has a housing 202, a power supply circuit board 203, a light source 204, a light source holder 205, an optic 206, a retaining ring 207, a cover 208, and one or more screws 209. Not all of these components however are necessary for every embodiment of the disclosure, as discussed below. The housing 202 can be composed of any thermally conductive material, e.g., aluminum alloys, copper, copper-tungsten pseudoalloy, AlSiC (silicon carbide in aluminum matrix), Dymalloy (diamond in copper-silver alloy matrix), E-Material (beryllium oxide in beryllium matrix), and/or thermally conductive plastics or ceramics. The housing 202 is generally cylindrical with an open rear end and an open front end that are defined at opposite ends of a sidewall 222 that forms a closed loop as shown (surrounding an interior cavity). Note however that while FIG. 21 shows the sidewall 222 as having a circular cross-section, other shapes are possible including elliptical and polygonal. The exterior or outside surface of the sidewall 222 can include features that improve a heat sink function, such as fins 223 that can entirely surround the housing 202 as shown. These fins 223 are passive components that serve to cool the housing 202 and any nearby heat producing or heat sensitive components such as the power supply circuit board 203, the light source 204 and the optic 206. The fins 223 can be integrally formed, e.g., manufactured by being cast into the housing 202.

Figure 22:
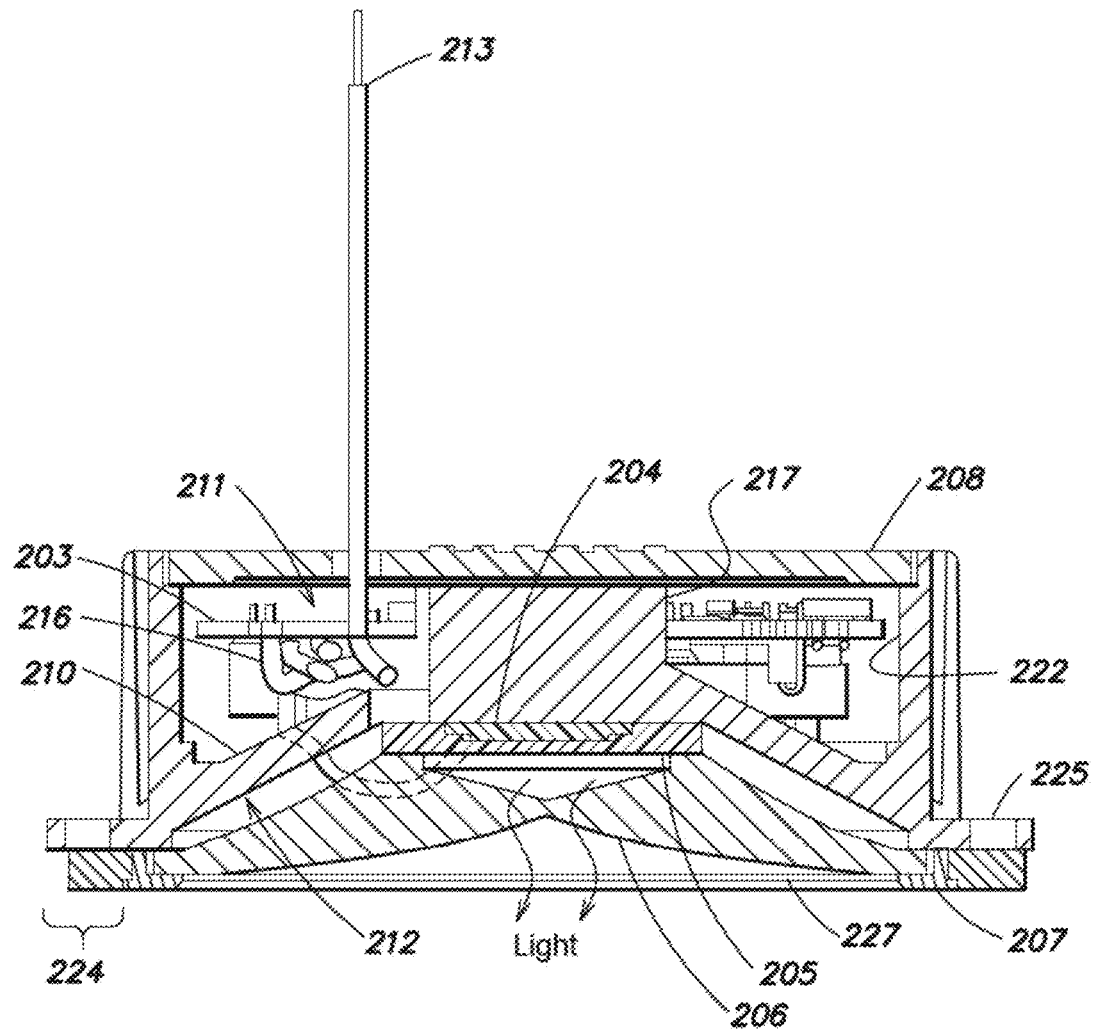
FIG. 22 shows a side cross-section view of the embodiment if FIG. 21.

As also seen in the cross-section view of the module in FIG. 22, the interior cavity of the housing 202 is divided, in a longitudinal direction (up/down), into two chambers or portions, namely a rear or top cavity 211 that is directly above a front or bottom cavity 212, by a partition 210 that extends in a lateral direction (left/right) joining a left portion of the sidewall 222 to a right portion thereof. The top cavity 211 extends to the open rear end, while the bottom cavity extends to the open front end of the housing 202. Inside the top cavity 211 there is a power supply circuit board 203 that has an input, which is connected to a number of electrical wires 213 (e.g., at least a pair) which emerge from the housing 202 and serve to deliver mains electricity power.

The wires 213 serve to deliver mains electricity power, for example 120V/240 VAC power, to the power supply input of the power supply circuit board 203. The power supply circuit board 203 also has a power supply output. A number of electrical wires 216 (e.g., at least a pair) are connected at one end to the power supply output, and at another other end to the light source 204, and in between those ends the wires 216 are routed through an opening (not shown) in the partition 210.

In one embodiment, once the power supply circuit board 203 is positioned inside the top cavity 211 through the open rear end of the housing 202, the cover 208 can be placed on top of the sidewall 222, to thereby completely enclose the top cavity 211 (with the power supply circuit board 203 inside.) The cover 208 can be a plate that is shaped to entirely cover the open rear end of the housing. In one embodiment the cover 208 is attached to the housing 202, by being directly fastened to the island 217 which may be viewed as an extension of the housing 202, as shown in FIG. 22. In that case, the cover 208 can be entirely solid except for one or more screw hole openings 228 (two are shown, only as an example) and a wire opening 214. The screws 209, respectively, are inserted through the openings 228 for securing the cover 208 to the top of the island 217 (although other fasteners or other mechanisms that serve to retain the cover 208 in the closed position as shown can be alternatively used, including an arrangement that only requires one screw for example.) The electrical wires 213 are routed through the opening 214, from one end of their connections at the power supply circuit board 203 inside the top cavity 211 to another end that is outside of the housing 202 and connected to a power source (e.g. building electrical power grid.) Also, in the case where the cover 208 is to be relied upon as a further heat sink element of the lighting module, a number fins 223 can be formed on the outside (or top) face of the cover 208 to enhance the heat sink function.

As shown in FIG. 22, the partition 210 serves as a physical barrier between a) the power supply circuit board 203 and b) the light source 204 and the optic 206. In the example shown, the partition 210 is not entirely flat or horizontal, but instead has a central portion from which the rest slopes downward as shown. In one embodiment, the partition 210 is entirely solid and completely isolates the top cavity 211 from the bottom cavity 212 except for an opening (not shown) through which the wires 216 pass (and which carry electrical power from an output of the power supply circuit board 203 to the light source 204.) This provides a fire barrier within the hole that is formed in the ceiling or wall (for the recessed lighting system), between the room and the building space between walls and ceilings, which is a typical requirement with recessed lighting systems that need to comply with building and safety codes/regulations. In addition, the partition 210 can reduce the risk of electrical shock when a user is reaching into the housing 202 through the open front end, because any conductors in the power supply circuit board 203 that carry for example 120/240 Vac are shielded against by the partition 210.

In one embodiment, the island 217 is provided to enhance the heat sink function of the lighting module and to secure the cover 208 to the housing 202. The island 217 is joined to, and protrudes or rises into the top cavity 211 from, the rear face of the partition 210 (as shown.) The island 217 can have a variety of shapes (e.g., circular cylinder, polygon cylinder, oval cylinder, etc.). In one embodiment (as shown in FIG. 21), the island 217 is a circular cylinder with a flat top, and that is received (height-wise or lengthwise) into and extends past a face-to-face opening 218 of the power supply circuit board 203. The face-to-face opening 218 can be a hole that has been cut through the opposing faces of the board 203, resulting in a structure that looks like a washer. The island 217 has one or more screw holes 219 in its top that are to be aligned with the openings 228 in the cover 208, to receive one or more screws 209 (or other fasteners), respectively, to fasten the cover 208 to the island 217. Other ways of fastening the cover 208 to the partition 210 are possible.

In one embodiment, the island 217 can be formed integrally with the partition 210, e.g., as a single cast metal piece, and wherein the periphery of the partition 210 can be attached, e.g., bonded, to the inside surface of the sidewall 222. Alternatively, the partition 210 and the island 217 can both be integrally formed with the sidewall 222, as a single-piece housing 202 (e.g., as a single cast metal piece.) The island 217 can be located at the center of the housing 202 as shown, or at the common center axis of the housing 202 (which center axis is shared by the open rear end and by the open front end of the housing 202.) The island 217 can serve to enhance the heat sink function of the lighting module, by conducting the heat that has been generated by the power supply circuit board 203 and/or by the light source 204, through the partition 210 and then outward to the sidewall 222. In addition, in one embodiment, the island 217 is tall enough so that its top abuts the bottom face of the cover 208, so that the island 217 can perform heat transfer directly to the cover 208, e.g., through a thermal paste layer that joins or is directly sandwiched between the top (or top surface) of the island 217 and the inside (or bottom) face of the cover 208.

The power supply circuit board 203 has the needed light source driver circuit components installed thereon, that are designed to ensure that the appropriate voltage and current are fed to the light source 204 to enable the emission of light by one or more light emitting elements of the light source 204. The components of the driver circuit can be installed on both the top and bottom faces of the board 203 as shown. The driver circuit draws and converts power through the wires 213, and then supplies its output power through the wires 216, to the light source 204 (and thus powers the light source 204 to emit light.) The driver can be any type of electrical power supply circuit, including power supplies that deliver an alternating current (AC) or a direct current (DC) voltage to the light source 204. For example, the driver can drop the voltage of its input power to an acceptable, safe for a human touch level in its output power, for operating the light source 204 (e.g., from 120V-277 Vac to 36Vdc-48Vdc). The output power can be delivered to the light source 204 through a removable connector, a permanent connector, or soldered leads, at the power supply circuit board 203 and on a carrier or substrate of the light source 204.

As shown in FIG. 21, the power supply circuit board 203 has a face-to-face opening 218 therein that can be entirely surrounded by the driver circuit components of the printed circuit board 203 (as opposed to being located at the edge or periphery of the board 203). In one embodiment, the opening 218 is shaped and sized so that when the island 217 is passed through it, the fit between the side surface of the island 217 and the inner edge of the board 213 along the opening 218 prevents the board 203 from moving laterally (left/right), inside the housing 202, to thereby prevent the outer edge of the board (along the periphery) from touching the inside surface of the sidewall 222.

In one embodiment, where the cover 208 is to be used to close off the open rear end of the housing 202, at least two electrically insulating spacers (not shown) can be mounted to the top face of the power supply circuit board 203. Another two or more electrically insulating spacers (not shown) can be mounted to the bottom face of the board 203. The cover 208 can then be installed over the open rear end and secured to housing 202, resulting in the spacers being compressed between the partition 210 at one end and the cover 208 at another end, which fixes the height position (in the up/down direction) of the board 203 within the upper cavity 211 of the housing 202, at a desired height between the partition 210 and the cover 208.

Figure 25:
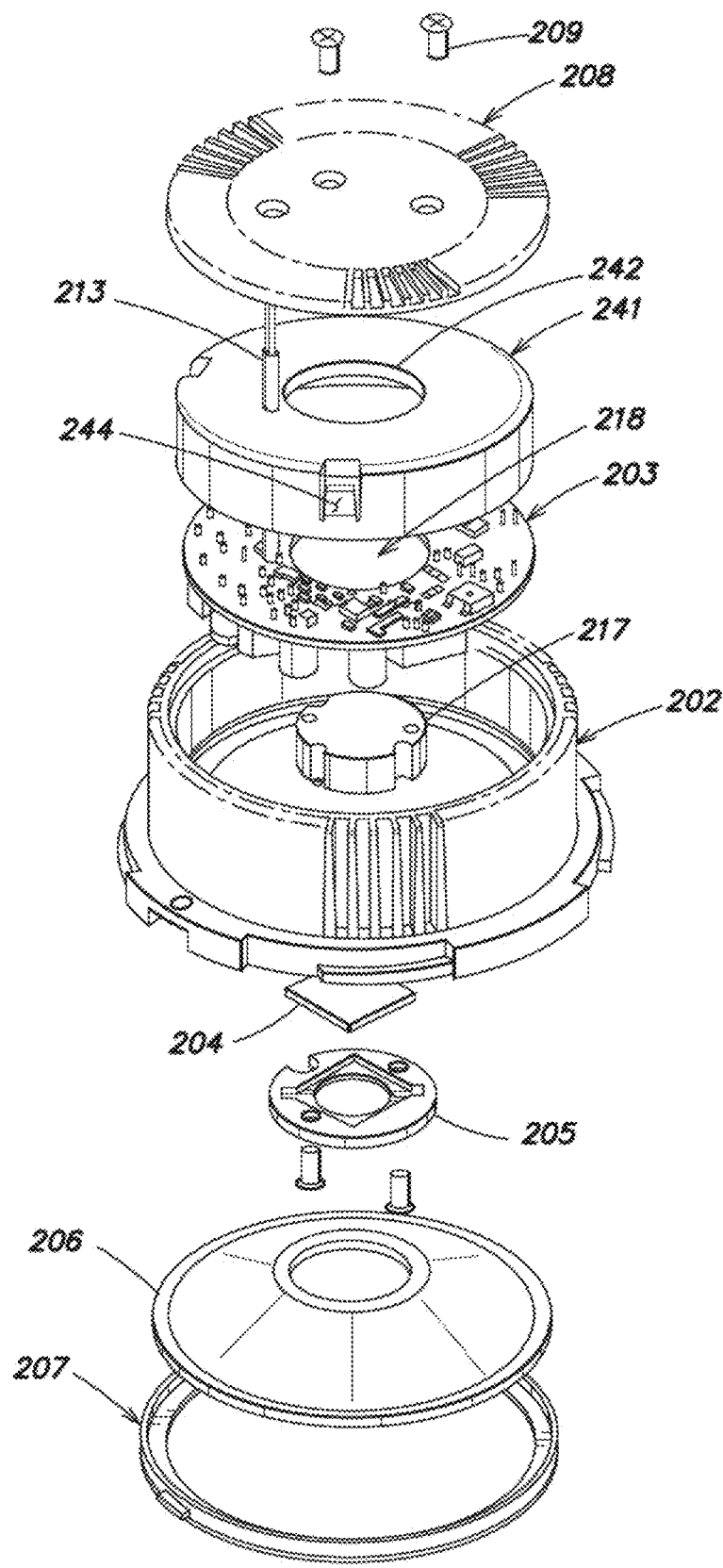
FIG. 25 is an exploded view of a lighting module in accordance with another embodiment.

Another embodiment of the lighting module is shown in the exploded view of FIG. 25 in which all of the elements shown can be similar to those in FIG. 21 and in FIG. 22, except for the addition of a cup 241. In this embodiment, there can be a gap between the side surface or sidewall of the island 217 and the inner edge of the power supply circuit board 203 that defines the opening 218 which could allow the board 203 to move around inside the housing so as to possibly touch the sidewall 222, the partition 210, or the cover 208 (if the latter is being used.) The cup 241 is provided to limit such movement of the board 203, both longitudinally (up/down) as well as laterally (left/right or sideways.) The cup 241 can be made of an electrically insulating material, such as plastic or polycarbonate, which can serve to insulate the board 203 from the housing 202 and the cover 208, especially when the latter are made of a conductive material such as a metal (e.g., as a cast, aluminum piece.) The outside height of the cup 241 can be less than the height of the sidewall 222 that is between the top surface of the partition 210 and the top of the sidewall 222, so that the cup 241 can fit entirely inside the upper cavity 211 of the housing 202 (in the orientation shown.) The inside width of the cup 241 can be the same as or slightly greater than the outer width of the board 203, so as to allow the board 203 to be inserted into the cup 241 through its mouth (in the orientation shown in FIG. 25.) At least two separate openings can be formed in the base of the cup 241, namely one through which the wires 213 are passed, and another opening 242 that is large enough for the island 217 to be inserted therein (in the height direction as shown.) For example, the opening 242 can have the same shape and be about the same size as the opening 218 in the board 203. The opening 242 is located in the base of the cup 241 so that when the board 203 is inserted into the cup 241 the opening 218 of the board 203 is aligned with the opening 242.

The wall of the cup 241 has a snap lock (or snap fit) mechanism formed therein, to retain the board 203 in position. For example, at least two flaps 244 can be formed in the wall and that are positioned in the same plane but at different radial positions about the center longitudinal axis of the cup 241. As an example, each flap 244 can be formed as a partial, generally rectangular or square cut out portion of the wall such that the flap 244 remains connected with the wall on one of its sides while its other three sides are not. The flap 244 as formed is angled inward, i.e. towards the center longitudinal axis of the cup. As the board 203 is inserted into the cup (in the orientation shown), its top face at its outer periphery pushes against and pivots the flap 244 outward until the outer periphery clears the flap 244, at which point the flap 244 "pops" back (inward) and over the bottom face of the board 203. The flap 244 then stays in that inward position, by virtue of being made of a semirigid material for example, thereby holding the board 203 fixed in the height direction (up/down direction) between the flap 244 and the base of the cup 241. The cup 241 with the board 203 held therein is then inserted "upside down" into the upper cavity 211, in the orientation shown, through the open rear end of the housing 202, until for example the brim of the cup 241 lands on the top face of the partition 210. In one embodiment, the flaps 244 are positioned at a height such that the tallest electronic circuit components that are mounted onto the bottom face of the board 3 do not touch the top face of the partition 210, when the cup 241 has been inserted into the housing 202 to the full extent. In one embodiment, the height of the cup 241 can be defined so that when the brim of the cup is resting against the partition 210, the outside of the base of the cup is only slightly below the top of the island 217. This allows the cover 208 to then be placed into position covering the open rear end of the housing 202, with the bottom face of the cover 208 being joined to the top of the island 217 (e.g., through a layer of thermal paste) to promote heat transfer between the island 217 and the cover 208, and then secured in that position by installing the screw 209 (through the cover 208 and into its corresponding hole 219 in the island 217.)

In yet another embodiment, the island 217 is not provided. In that case, to secure the cover 208 to the housing 202, a snap lock mechanism, a thread type, or a twist and lock mechanism can be provided on the sidewall 222 of the housing 202 (while a complementary portion is provided on the cover 208.) In that case, the cup 241 (which serves as an insulator and holder for the board 203) would not need to have the opening 242 in it. Also, the power supply circuit board 203 would not have to have the opening 218 in it. The board 203 could still be held inside the cup 241 in the manner described above (e.g., using the flaps 244), and the cup 241 could still be held by compression between the cover 208 and the partition 210. In that case, centering of the board 203 inside the upper cavity 211 would depend on centering the cup 241, by for example making the cup 241 to have just the right width to fit inside the upper cavity 211 while lightly abutting the inside surface of the sidewall 222.

Assembly of the lighting module (as shown in FIG. 21 or in FIG. 25) may continue with inserting the light source 204 into the bottom cavity 212, through the open front end of the housing 202. The light source 204 may be composed of a carrier or substrate on the bottom face of which one or more light emitting devices are installed. The light emitting devices may be any electro-optical device, or combination of different electro-optical devices, for emitting visible light to illuminate a room, whose required voltage levels are "safe" even if any of their exposed terminals come into incidental contact with a human. For example, the light emitting devices may be "low voltage" light emitting diode (LED) elements, e.g., LED devices, organic LED (OLED) devices, and polymer LED (PLED) devices. In some embodiments, the light source 204 may have multiple LED elements connected in series, yet is still deemed a low voltage LED-based light source. The light source 204 receives electricity from the board 203, as described above, such that the light source 204 may emit a controlled beam of light into a room or surrounding area. The driver circuitry (in the power supply circuit board 203) is designed to ensure that the appropriate voltage and current are fed to the light source 204. In one embodiment, light emitted by the light source 204 through the open front end of the housing, to illuminate a room, is produced only by light emitting diode (LED) elements of the light source 204 that require input power at less than 50 Volts.

The light source 204 may be attached to the partition 210 by being held or captured between a light source holder 205 and a portion of the bottom face of the partition 210, which portion may be directly underneath the island 217 as shown. An indented region may be formed on the back face of the holder 205, as best seen in FIG. 21, into which the light source 204 is fitted as shown, so as to limit the compression forces that may be imparted on the carrier of the light source 204 (as it is sandwiched between the holder 205 and the bottom face of the partition 210.) A layer of thermal paste may be applied directly to the portion of the bottom face of the partition 210 or to the top face of the carrier of the light source 204, so as to enhance heat transfer from the light source 204 to the island 217. The light source holder 205 may be affixed to the partition 210 using screws or other fasteners, a snap lock mechanism, a twist and lock mechanism, or glue. In the example shown here, screws can be inserted through the two holes 226 in the holder 205 which are aligned with the two holes 220, respectively, in the partition 210. The light source holder 205 has an opening 221 that is positioned inward of the holes 226, and through which light from the emitting devices will emerge (and then enter the room through the optic 206 that is secured to the housing 202 in front of the holder 205.) The light source holder 205 may also have an open portion (that may be shared with the opening 221) through which the proximal ends of the wires 216 can be electrically connected (e.g., soldered) to electrical terminals that are exposed on the bottom face of the carrier of the light source 204. The carrier has wire traces (not shown) that route electrical power from the terminals to the one or more light emitting devices that are installed on the bottom face of the carrier. The distal ends of the wires 216 are electrically connected to the outputs of the power supply circuit board 203. There may be an opening (not shown) in the partition 210 through which the electrical wires 216 are led, from their electrical connection at the light source 204 (in the bottom cavity 212 of the housing 202), to their electrical connection at the power supply circuit board 203 that is in the top cavity 211.

The housing 202 also has a flange or lip 224 that may extend laterally outward from the sidewall 222 and surrounds the open front end of the housing 202 as shown. The lip 224 includes features that serve to couple the housing 202 to a trim (not shown), especially via a twist and lock mechanism that does not require the use of separate tools or other devices. The trim may have features that that are complementary to the features of the lip 224 shown in FIG. 22, that form the twist and lock mechanism. The twist and lock mechanism features may include a groove or slot 229 on the lip 224 of the housing 202, which is designed to produce a friction fit against corresponding or mating structures of the trim, to create a twist-and-lock friction connection. In other embodiments, however, the trim may be coupled to the housing 202 using a resin (a permanent attachment), clips, screws, bolts, or clamps. In one embodiment, different diameter trims may be capable of being coupled to the housing 202. The size and design of the trims may depend on the size of the ceiling or wall hole behind which the recessed lighting system is to be fitted, to conceal the exposed wall or ceiling edge that defines the hole. The recessed lighting system may include two or more trims of different sizes to cover ceiling or wall openings of different sizes. The trim may need to meet the aesthetic demands of the consumer. The trim may be made of aluminum plastic polymers, alloys, copper, copper-tungsten pseudoalloy, AlSiC (silicon carbide in aluminum matrix), Dymalloy (diamond in copper-silver alloy matrix), and E-Material (beryllium oxide in beryllium matrix).

Still referring to the housing 202, the lip 224 of the housing 202 may also have one or more fastener openings 225 formed therein that allow the housing 202 to be attached to a junction box (e.g., an octagonal junction box) or another suitable enclosure, using screws or other suitable fasteners. The top end of the housing 202 (where the cover 208 has been attached) may be inserted into the junction box while the one or more openings 225 of the lip 224 are aligned with corresponding screw holes of the junction box, and then screws can be inserted into the openings 225 and screw holes of the junction box to fasten the housing 202 to the junction box.

As shown in FIG. 21, the recessed lighting system may include an optic 206 that is positioned in the optical path of the emitted light from the light source 204, and may adjust the way light emitted by the light source 204 is directed into or focused inside the room in which the system is installed. In one embodiment, the optic 206 may be a separate piece, i.e., separate from the housing 202 and separate from a retaining ring 207 which is used to attached the optic 206 to the housing 202 (as described further below.) The optic 206 includes a reflector portion as shown, that has a closed, curved surface which is ring-like or annular, with a central opening that is aligned with the light source 204. The rear face of the reflector portion along its inner periphery may abut the bottom (or front) face of the light source holder 205. The reflector portion may be formed of any fire retardant material, including steel, aluminum, metal alloy, calcium silicate, or other similar materials. The reflector portion may be formed to redirect the emitted light and can have any shape that serves this purpose. For example, the shortest path along the closed, curved surface of the reflector portion between its inner periphery (that defines the central opening) and its outer periphery may be a straight line or it may be a curved line (e.g., a elliptic curve, a parabolic curve, circular curve. The front surface of the reflector portion (facing the room) which lies between the inner and outer peripheries may be coated with a reflective material or include one or more reflecting elements that assist in the adjustment of light emitted by the light source 204. For example, the reflective portion may be coated with a shiny enamel or include one or more mirrors or retroreflectors or a microcellular polyethylene terephthalate (MCPET) material to adjust the path of the light emitted by the light source 204.

Figure 23:
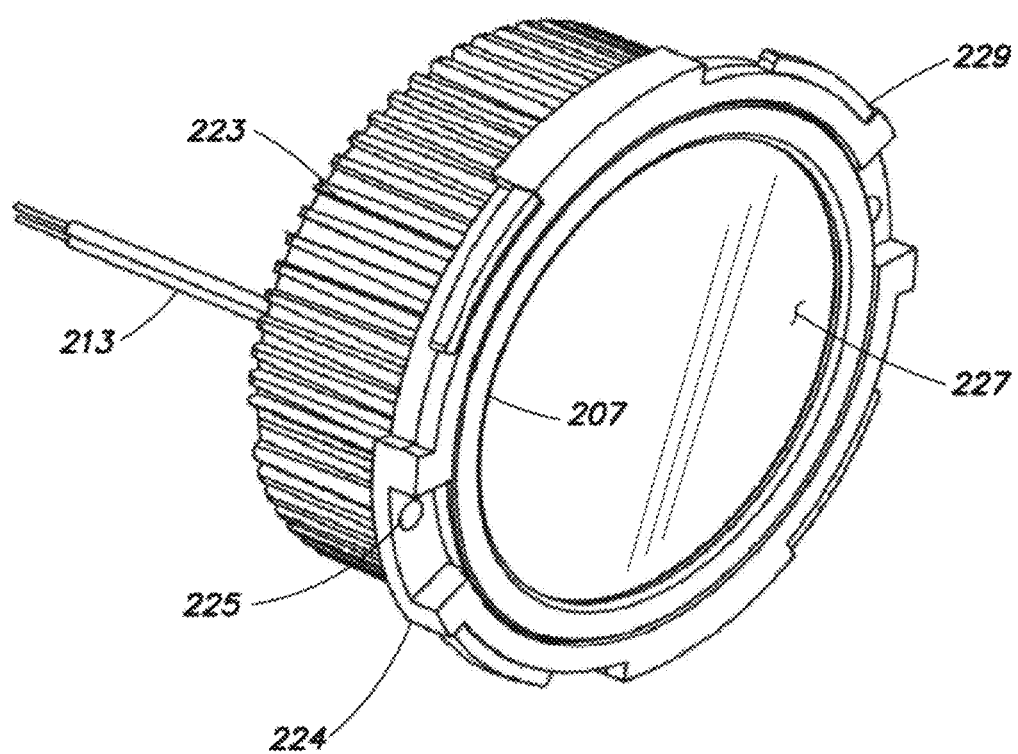
FIG. 23 shows a perspective view of the embodiment of FIG. 21.

In one embodiment, a lens/filter 227 which may be a lens only, a filter only, or a combination of the two, is attached to the outer periphery of the reflector portion—see also FIG. 23. The lens/filter 227 may serve as a protective barrier for the light source 204, and may shield the light source 204 from moisture or inclement weather. The lens/filter 227 also adjusts the emitted light that illuminates the room, via focusing and/or diffusion for example. The lens/filter 227 may be made of any at least partially transparent material, including glass and hard plastics. The reflector portion and the attached lens/filter 227 may form a single, indivisible unit of the optic 206. In one embodiment, the optic 206 may be interchangeable so that an adjustable light spread can be had in the field, by detaching the retaining ring 207 and then replacing the optic 206 with a different one. Different instances of the optic 206 may be produced, where each instance has a different combination of the lens/filter 227 and the reflector portion, so as to change the spread, angle, or other optical characteristics associated with the optic 206. The optic 206 may also have adjustable alignment features in which the orientation or position of the reflector portion or the lens/filter 227 can be changed in the field.

As shown in FIG. 21 and in FIG. 22 (and also in FIG. 25), the retaining ring 207 is attached to the housing 202, at the open front end of the housing 202, so as to hold or retain the optic 206 within the bottom cavity 212 of the housing 202. The mechanism for attaching the retaining ring 207 to the housing may be a twist and lock mechanism, with complementary features of the twist and lock mechanism being formed on a) the outside of the ring 207, such as a boss 230 as shown in FIG. 21, and b) the portion of the inside surface of the housing 202 that is next to the extended lip portion 224, as best seen in FIG. 22. In this manner, the ring 207, and thus the optic 206, may be installed into and removed from the housing 202 without requiring any tools. In one embodiment, where otherwise the optic 206 might, in one embodiment, fall out of the housing 202 due to gravity alone).

Figure 26A:
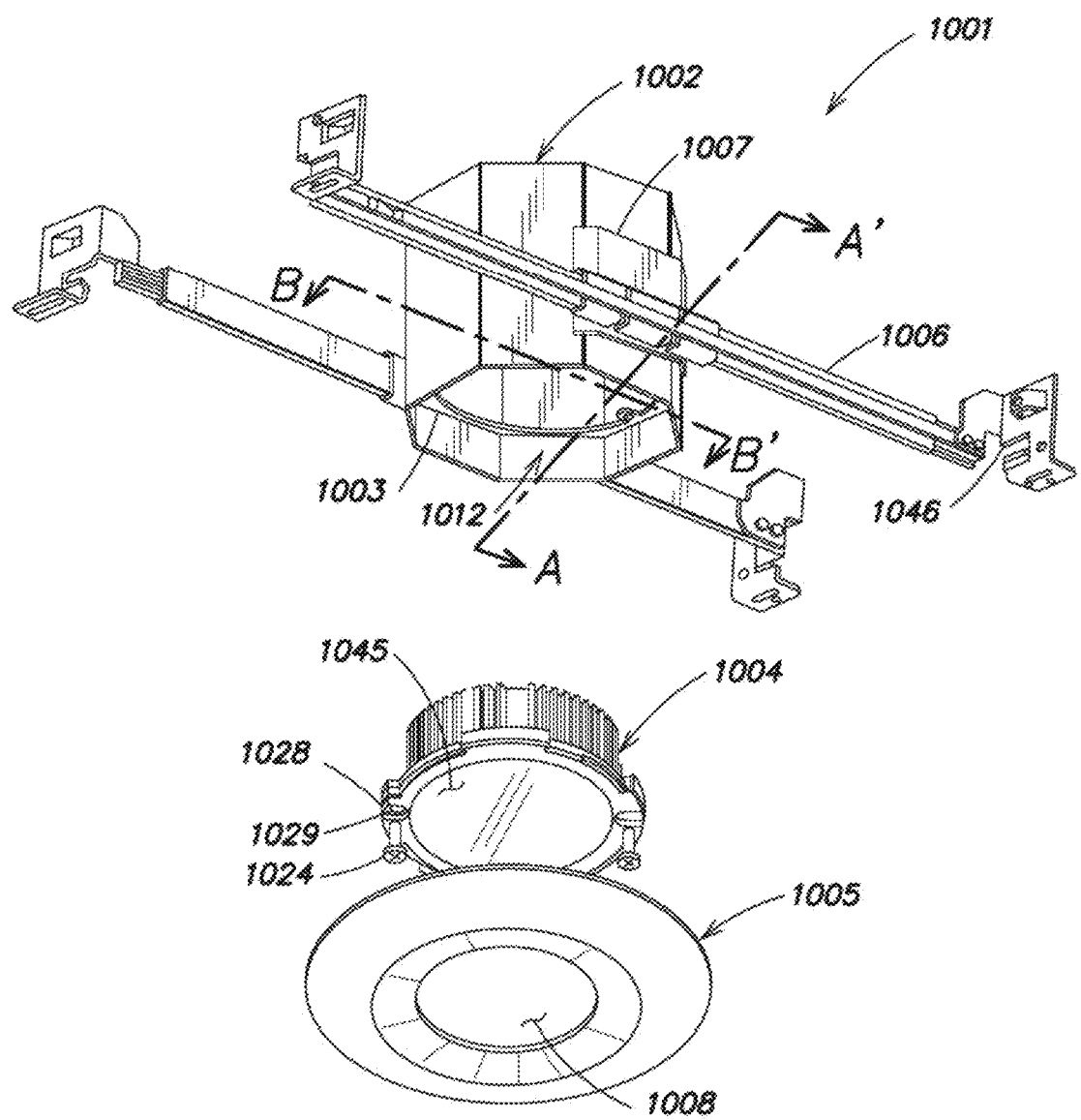
FIG. 26A shows a perspective view of a recessed lighting unit according to one embodiment.

FIG. 26A shows a perspective view of an embodiment of a recessed lighting unit 1001, which may be installed within a wall or a ceiling. The recessed lighting unit 1001 may include a casing 1002, a holding bracket 1003 (which may also be referred as a yoke) inside the casing 1002, a light source module 1004 inside the casing 1002, a trim 1005, hangar bars 1006, and casing holders 1007. The recessed lighting unit 1001 is positioned behind a ceiling or a wall so that the casing 1002 is aligned with a hole in the ceiling or wall (not shown) through which the room is illuminated by the module 1004. The light source module 1004 as will be described below in more detail is contained inside the casing 1002. The trim 1005 serves the primary purpose of covering the exposed edge of the ceiling or wall where the recessed lighting unit 1001 resides and where the hole is formed, while still allowing light from the light source module 1004 to be emitted into a room through a trim opening 1008. The trim 1005 may also serve to hide the bottom edge of the casing 1002 from view. In doing so, the trim 1005 helps the recessed lighting unit 1001 appear seamlessly integrated into the ceiling or wall. The trim 1005 is attached to the light source module 1004 (e.g., via a twist and lock mechanism, for example, or a snap fit mechanism), and also directly to the casing 1002 (e.g. via friction clips, tension clips (tension grips), or magnets). The section views of the recessed lighting unit in FIG. 27 and FIG. 28 show the assembly with the trim 1005 attached to the light source module 1004, where a top of the crown 1038 of the trim 1005 is abutting the front surface of a lens 1045, where the latter has been fitted into position covering the bottom opening of the housing of the module 1004.

The casing 1002 of the present disclosure is advantageous in that it is compact, cost-effective, and fire resistant. The casing 1002 obviates the need for a traditional junction box attached to an incandescent "can," which may be bulky and expensive. The casing 1002 may be made of galvanized steel, injection molded plastic, or ceramic, which is also advantageous over the traditional, non-fire resistant incandescent can. The casing 1002 may be fire-resistant in that it has a fire rating of up to two hours without any need for modification, where the fire rating is described in the National Electrical Code (NEC) and by the Underwriters Laboratories (UL) such as specified in UL 263 Standard for Fire Tests of Building Construction and Materials. The fixture may also be designed to attenuate airborne sound by the building partition (ceiling) in which it is installed; in one embodiment, the casing 1002 can maintain a minimum Sound Transmission Class (STC) rating of 50; this alleviates the need for enclosing the casing 1002 with any additional element in order to maintain a minimum 50 STC rating.

In one embodiment, as shown in the section view of FIG. 27, the casing 1002 may have a closed top end 1009, and a side wall 1010 that surrounds a cavity 1011 and defines a bottom end opening 1012. The closed top end 1009 and the sidewall 1010 may have one or more knockouts 1013. A knockout 1013 may be punched through and removed to leave an opening in the closed top end 1009 or the side wall 1010, for building electrical power wires (e.g. non-metallic sheathed cable, or to receive metal flexible conduit) to be inserted through the opening. A knockout 1013 may also have a smaller opening in it (e.g., a slit, slot, etc., that is smaller than the opening that results when the knockout 1013 has been removed from the closed top end 1009 or the side wall 1010) that may allow the installer to pry-out the knockout with a flathead screwdriver. The knockout 1013 may be more than ½ inch in its smallest diameter (as its shape may be elliptical as shown, having a minor diameter and a major diameter). The casing 1002 may have a horizontal cross section that is shaped as a polygon. For example, the horizontal cross section of the casing 1002 may be square, rectangle, pentagon, hexagon, heptagon, octagon, nonagon, or decagon. The casing 1002 may be made from a flat sheet of metal that is folded into a polygonal cylinder to form the sidewall 1010. The casing 1002 may also be ellipsoid, frusto-conical, or otherwise curved.

Held inside the light source cavity 1011 is the light source module 1004, which has a housing in which a light source 1031 and a driver 1032 are installed. The building electrical power wires that are routed into the casing 1002 are connected to a set of driver wires that merge from the module 1004, within the cavity 1011. These electrical wires may be connected together through the use of interlocking connectors that may be contained within the cavity 1011 of the casing 1002. In other embodiments, the electrical wires may be coupled to each other through the use of electrical caps or other devices (inside the cavity 1011 of the casing 1002). When the wires are connected, electricity may pass from the building electrical power wiring network to the driver 1032 to enable the driver 1032 to power the light source 1031 (and thereby illuminate the room). In one embodiment, where there is a network of such recessed lighting units 1001 installed within a building, as depicted in FIG. 26B, the electrical wires that come into the casing 1002 (through the knockout 1013 for example) can be routed directly from their "adjacent" connection at another recessed lighting unit 1002 (that may be installed behind the same ceiling or wall, or a nearby one in the same building.) In other words, the building electrical wires coming into the casing 1002 (to supply power to operate the light source module) can be directly routed from the inside of another, nearby recessed lighting unit or from a shared junction box as shown in FIG. 26B. In other words, the casing 1002 has two or more driver wires 1033 that emerge from the light source module 1004 (see FIG. 29) and that are electrically connected to the two or more building electrical power wires, respectively, inside the cavity 1011 of the casing 1002. This obviates the need to add a separate junction box to make such a connection, in part because the casing 1002 is also fire-rated to be a protective housing for the connection between i) the driver wires that emerge from or terminate in the driver 1032 and ii) the building wires that come into the casing 1002 and that are directly connected to power another recessed lighting unit in the same building.

The driver 1032 is an electronic circuit or device that supplies and/or regulates electrical energy to the light source 1031 and thus powers the light source 1031 to emit light. The driver 1032 may be any type of power supply circuit, including one that delivers an alternating current (AC) or a direct current (DC) voltage to the light source 1031. Upon receiving electricity, the driver 1032 may regulate current or voltage to supply a stable voltage or current within the operating parameters of the light source 1031. The driver 1032 receives an input current from the building electrical power wiring network of the building or structure in which the recessed lighting unit 1001 is installed, and may drop the voltage of the input current to an acceptable level for the light source 1031 (e.g., from 120V-277V to 36V-48V).

The light source 1031 may be any electro-optical device or combination of devices for emitting light. For example, the light source 1031 may have one or more light emitting diodes (LEDs), organic light-emitting diode (OLEDs), or polymer light-emitting diode (PLEDs). The light source 1031 receives electricity from the driver 1032, as described above, such that the light source 1031 can emit a controlled beam of light into a room or surrounding area of the recessed lighting unit 1001 (as installed behind a ceiling or wall).

In one embodiment, the light source module 1004 may also include a lens 1045. The lens 1045 may be formed to converge or diverge, or simply filter, the light emitted by the light source 1031. The lens 1045 may be a simple lens comprised of a single optical element or a compound lens comprised of an array of simple lenses (elements) with a common axis. In one embodiment, the lens 1045 also provides a protective barrier for the light source 1031 and shields the light source 1031 from moisture or inclement weather. The lens 1045 may be made of any at least partially transparent material, including glass and hard plastics, and may be sized and shaped to be snap fitted into position covering the main opening at the bottom of the module 1004 as shown. In one embodiment, the lens 1045, the light source 1031, and the driver 1032 are contained in a single indivisible unit, the light source module 1004, to work in conjunction to focus and adjust light emitted by the light source 1031.

The light source module 1004 may, or may not, be attached to a trim 1005. The trim 1005 has a crown 1038 (as seen in FIG. 27 and FIG. 28), also referred to here as an annular region, whose central opening 1008 allows light from the light source module 1004 to pass through and illuminate the room or environment beyond the wall or ceiling. A brim 1041 may surround the base of the crown 1038, serving to hide or cover an edge of the wall or ceiling in which a hole for emitting light into the room is formed. Although not shown, that edge may surround the sidewall of the casing 1002 (once the lighting unit 1001 has been installed.) The crown 1038 may be frusto-conical around the opening 1008, and its height (crown height 1039) may be in the range of 1 inch to 2.5 inches measured vertically from a top surface of the brim 1041 (that may abut the ceiling or wall) to a top of the crown 1038. This may define the height of the trim 1005; as mentioned above, trims of different height that are designed to be attached to the same light source module 1004 and to the casing 1002 can be used (interchangeably).

In one embodiment, the crown 1038 may be pushed deep into the casing 1002 so that the brim 1041 comes into contact with (abuts or is flush against) the edge of the sidewall that defines the bottom opening 1012 of the casing 1002. In another embodiment, where the edge of the casing 1002 might not be aligned flush with the bottom surface of the wall or ceiling (e.g., where the bottom opening 1012 of the casing 1002 lies above or behind of the wall or ceiling), the crown 1038 is pushed into the casing 1002 but cannot be as deep, even though the brim 1041 is still flush with the wall or ceiling.

Figure 29:
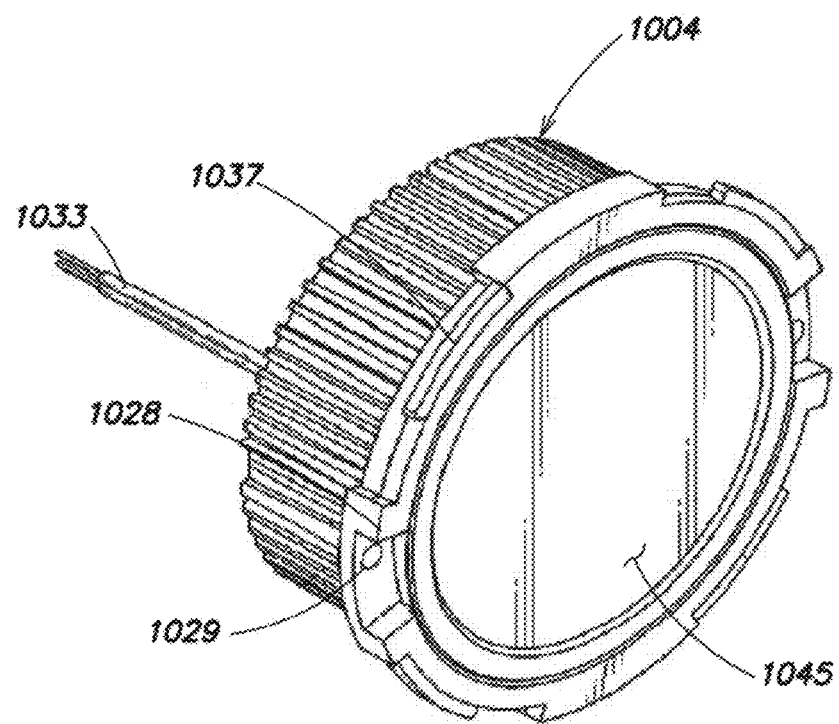
FIG. 29 shows a perspective view of a light source module.

In one embodiment, referring now to FIG. 29, the light source module 1004 as shown therein may be rigidly attached to the trim 1005 via a twist and lock mechanism. One half of the twist and lock mechanism being a bump or a hook that is formed at the top (of the crown 1038) of the trim 1005, while the other half is a tapered portion 1037 that is formed on a lip 1028 of the light source module 1004; the user rotates the trim 1005 and the module 1004 relative to each other until the bump or hook of the trim 1005 is aligned with the slot that is formed in the lip 1028 next to the tapered portion 1037 and then pushes the two parts towards each other while "twisting" so that the bump or hook and the tapered portion 1037 engage each other until they are "locked" through friction. This provides a tool-free way to couple the trim 1005 to the light source module 1004. Other suitable means for attaching the top of the crown 1038 to the light source module 1004 may be possible, including a threaded fastener (e.g., screw, or a nut and bolt combination), a snap fit mechanism, a clip, an adhesive, and clamp that clamp the lip 1028 to a flat top surface of the crown 1038.

Returning to FIGS. 26A, 27, 28, once the trim 1005 is attached to the light source module 1004, and the electrical connection between the driver wires and the building wires inside the casing 1002 has been made, the assembly of the light source module 1004 and the trim 1005 may be pushed upwards or inward into the cavity of the casing 1002, through the hole in the ceiling or wall, until the brim 1041 sits flush against the ceiling or wall. This may complete the installation of the recessed lighting unit 1001.

Any suitable means for attaching the assembly of the light source module 1004 and trim 1005 to the sidewall of the casing can be used, in order to hold the trim 1005 flush against the ceiling or wall. In one embodiment, as seen in the section view of FIG. 27, one or more friction clip 1042 may be utilized to secure the assembly to the casing 1002, which also allows the trim 1005 to slide upward along the sidewall of the casing 1002 as it is pushed by the user, to eventually lie flush against the ceiling or wall. As shown in the embodiment of FIG. 27, the friction clip 1042 may be attached at its anchored end (via screw, bolt, resin, glue, or the like) to the crown 1038 of the trim 1005, while at their flexible or resilient end they will engage the sidewall of the housing 1002. Alternatively, the friction clip 1042 may be anchored to the light source module 1004, or to a frame 1018 of the holding bracket 1003 as described below. As seen in the embodiment of FIG. 27, the friction clip 1042 may be composed of a generally V-shaped piece (e.g., of metal) that is oriented upside down as shown, with one segment of the V being anchored to the top surface of the frustum of the crown 1038 (the bottom surface of the crown serving to reflect the light emitted from the module 1004 into the room) while the other segment of the V comes into direct frictional contact with the inner surface of the sidewall 1010 of the casing 1002. The stiffness (when squeezing the two segments of the V towards each other) of the clip 1042 provides sufficient friction that overcomes the combined weight of the light source module 1004 and the trim 1005, thereby preventing the assembly from falling out of the casing 1002 (e.g. under the force of gravity.) Other means for attaching the light source module-trim assembly to the casing 1002 include the use of one or more magnets that may be fixed on the trim 1005, or on the light source module 1004, and that are attracted to the casing 1002 through magnetic force to hold the assembly in the casing 1002, while still allowing the assembly to be slid upwards by the user (until the trim lies flush against the ceiling.)

Figure 31:
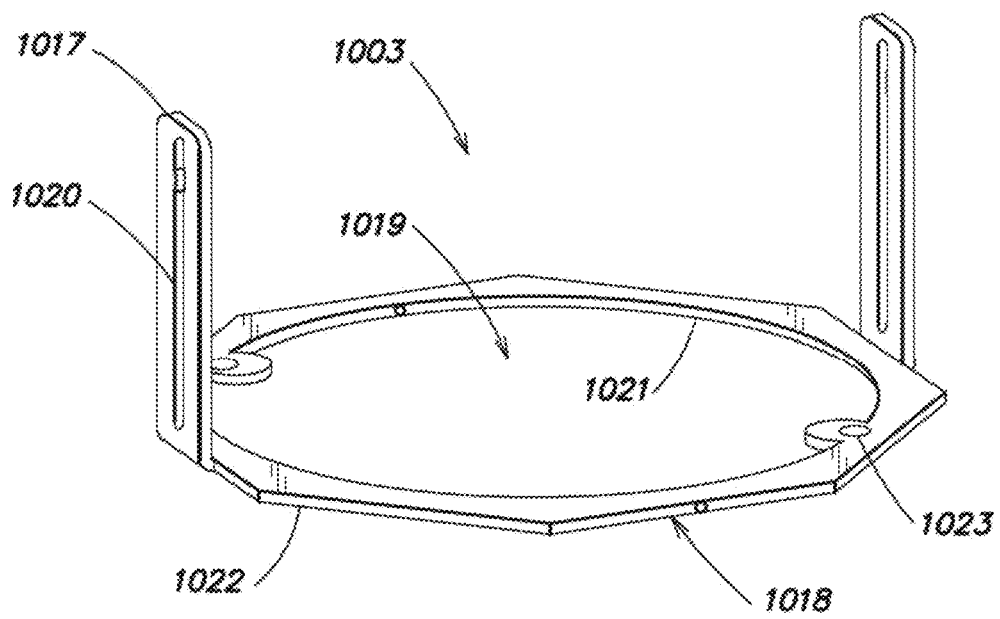
FIG. 31 shows a perspective view of a holding bracket, according to some embodiments.
Figure 32A:
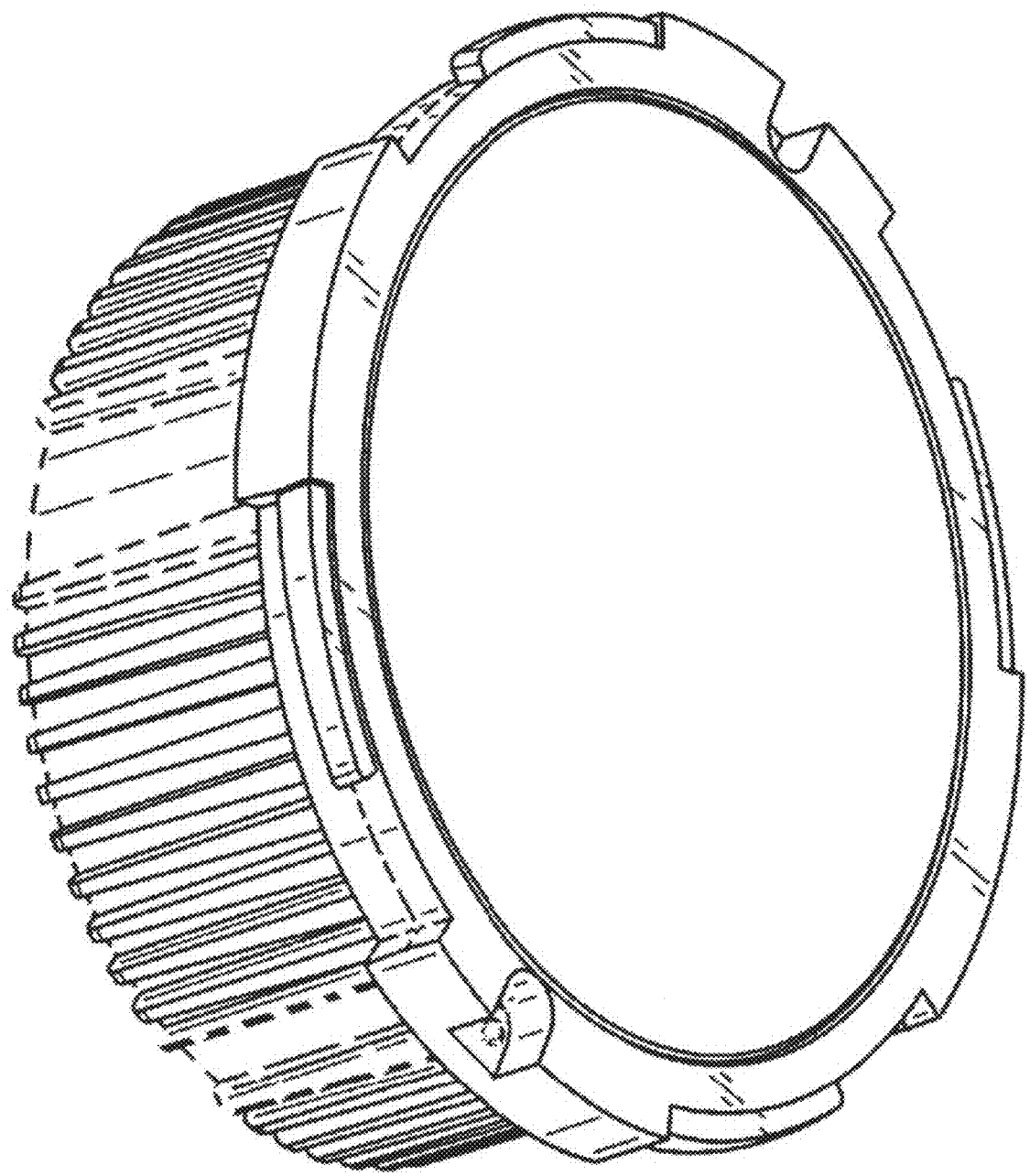
FIG. 32A to FIG. 35B show views of additional implementations according to some embodiments of the disclosure.
Figure 32B:
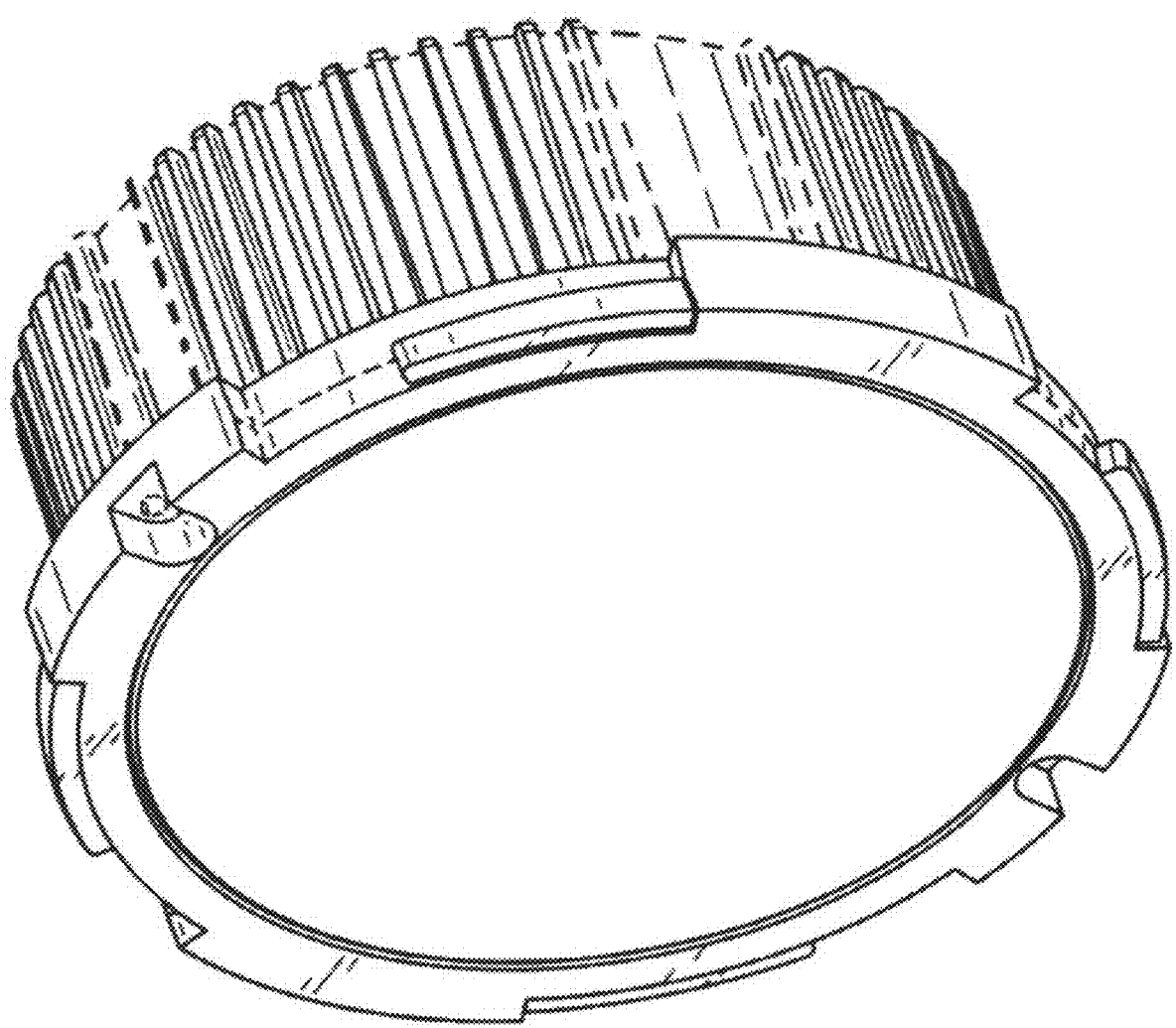
Figure 32C:
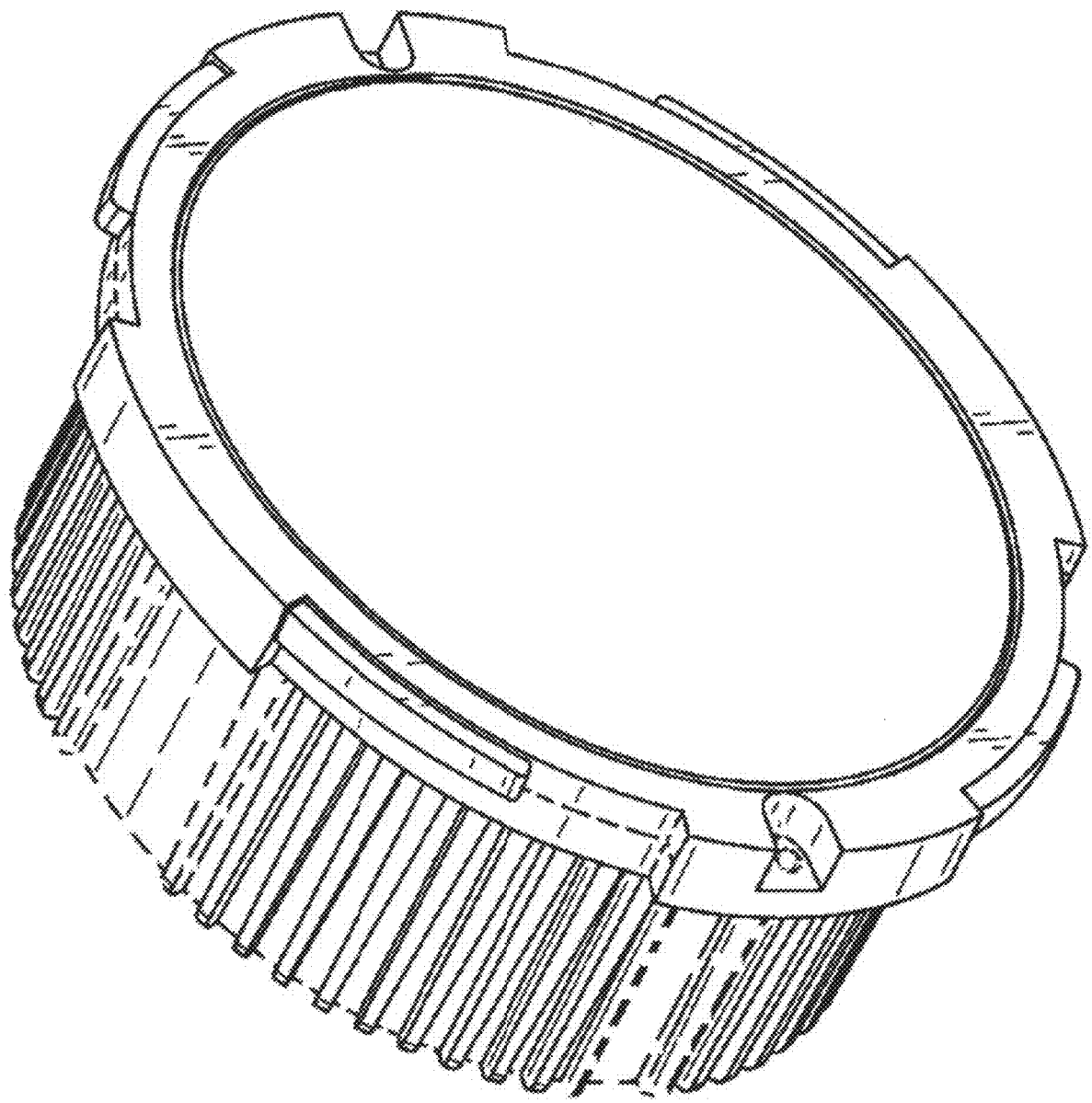
Figure 32D:
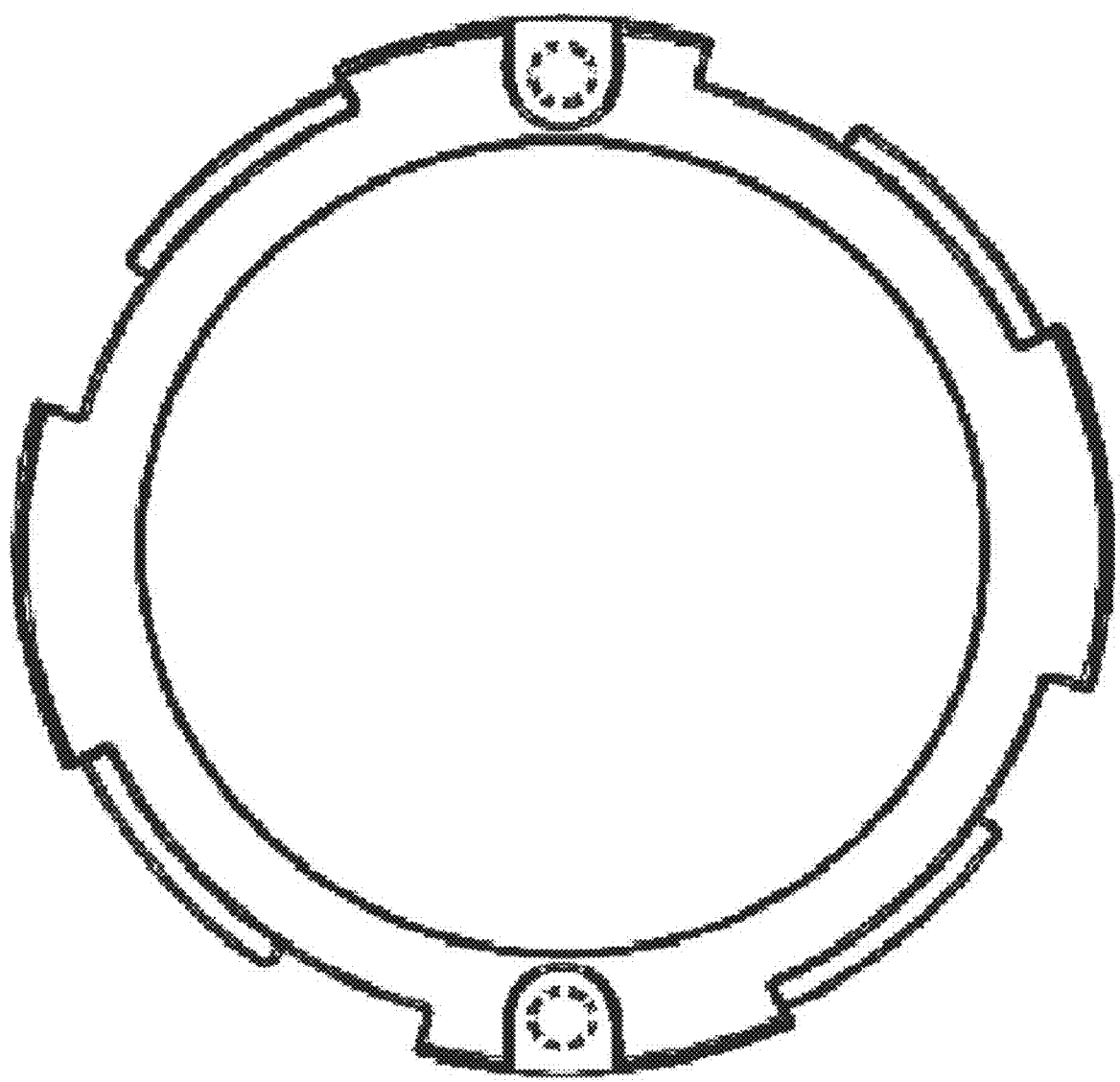
Figure 32E:
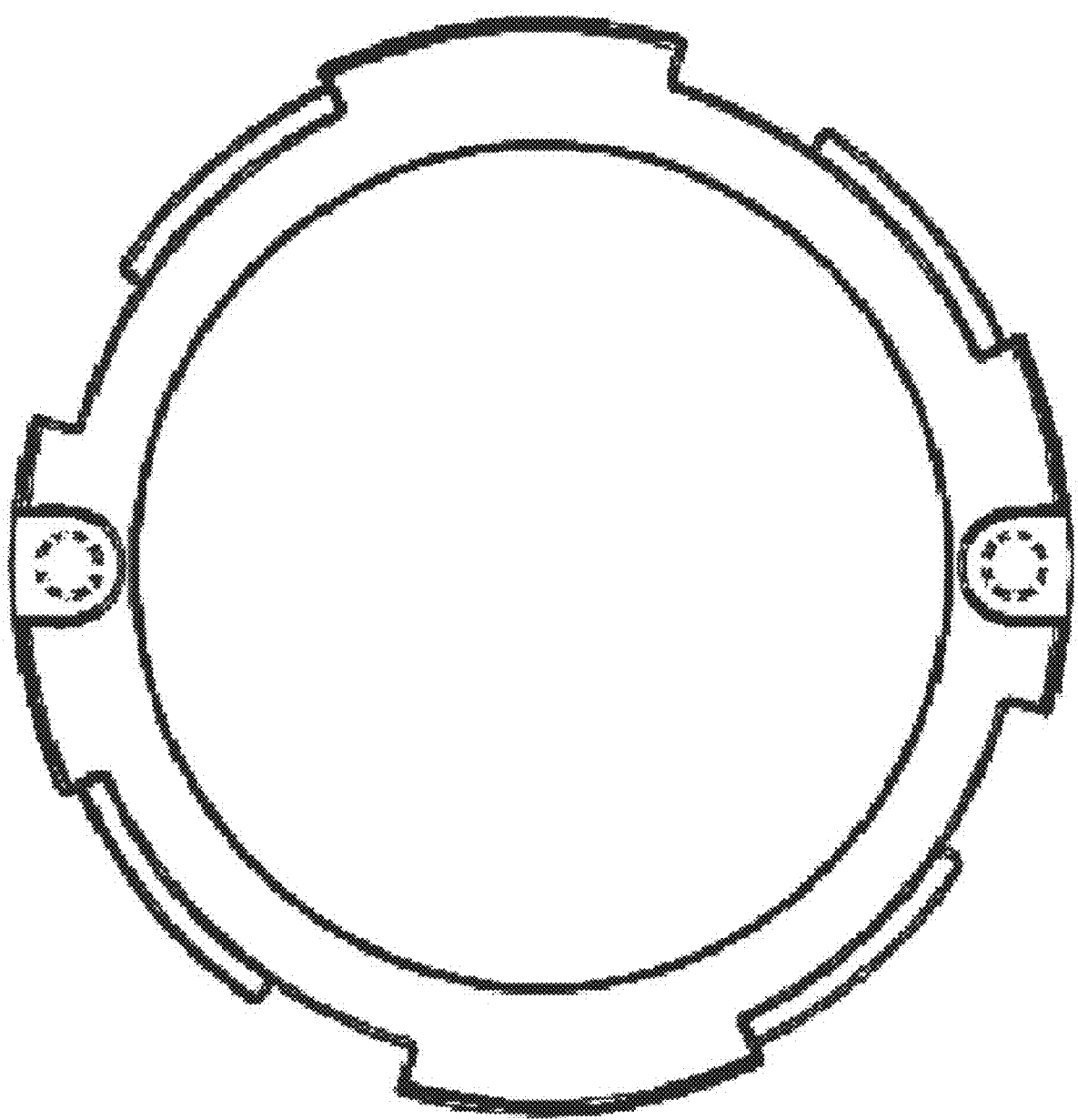
Figure 33A:
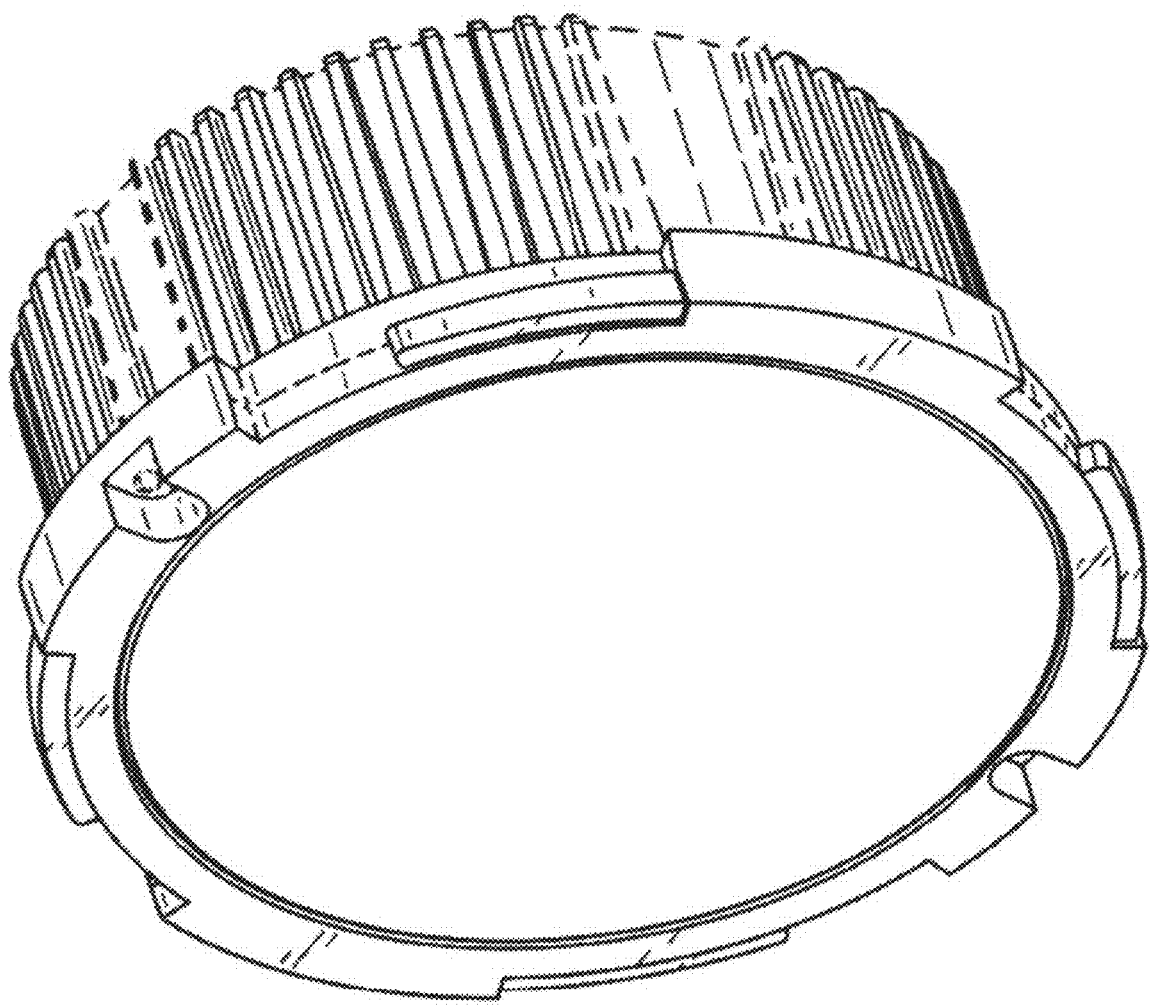
Figure 33B:
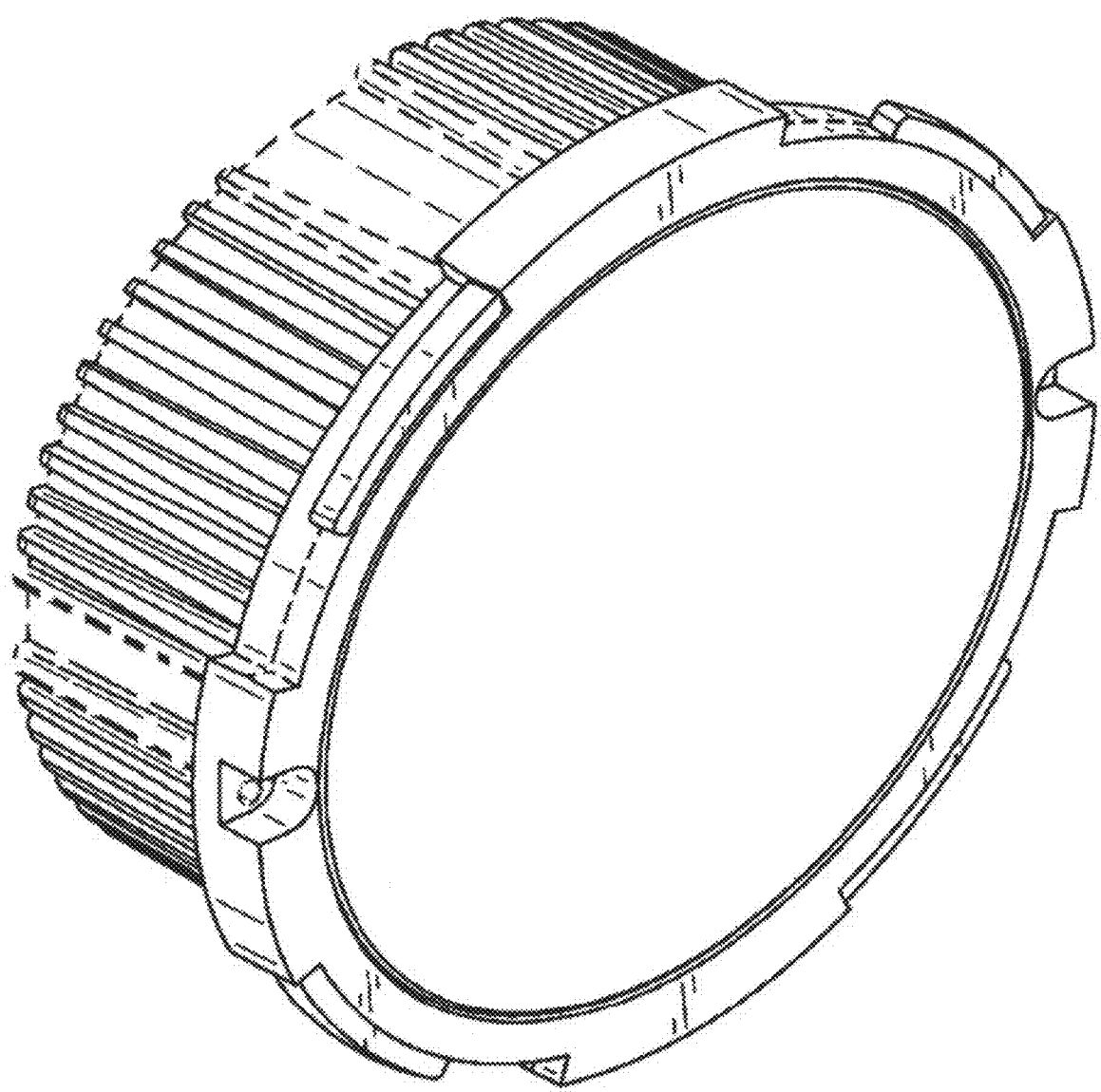
Figure 33C:
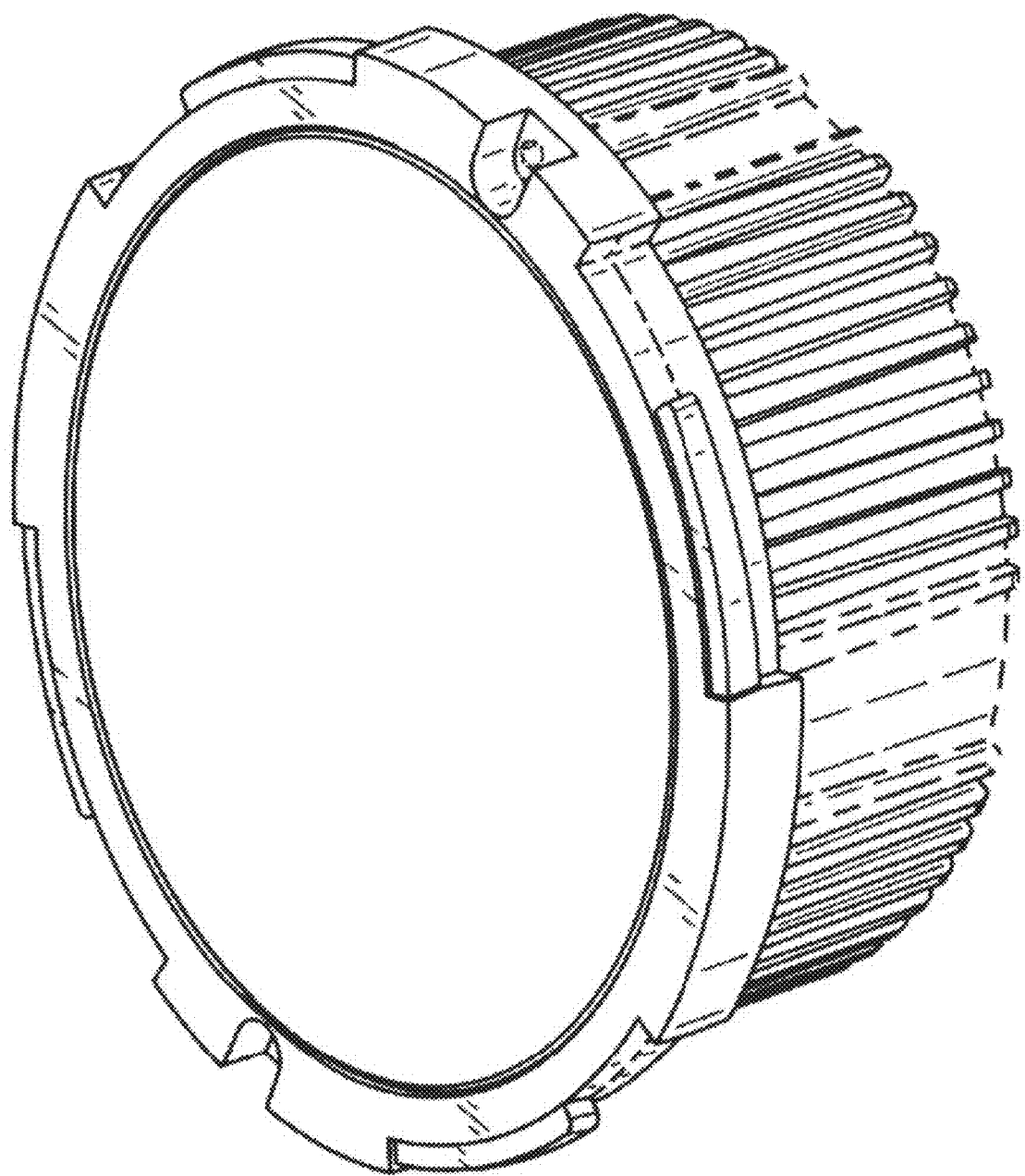
Figure 33D:
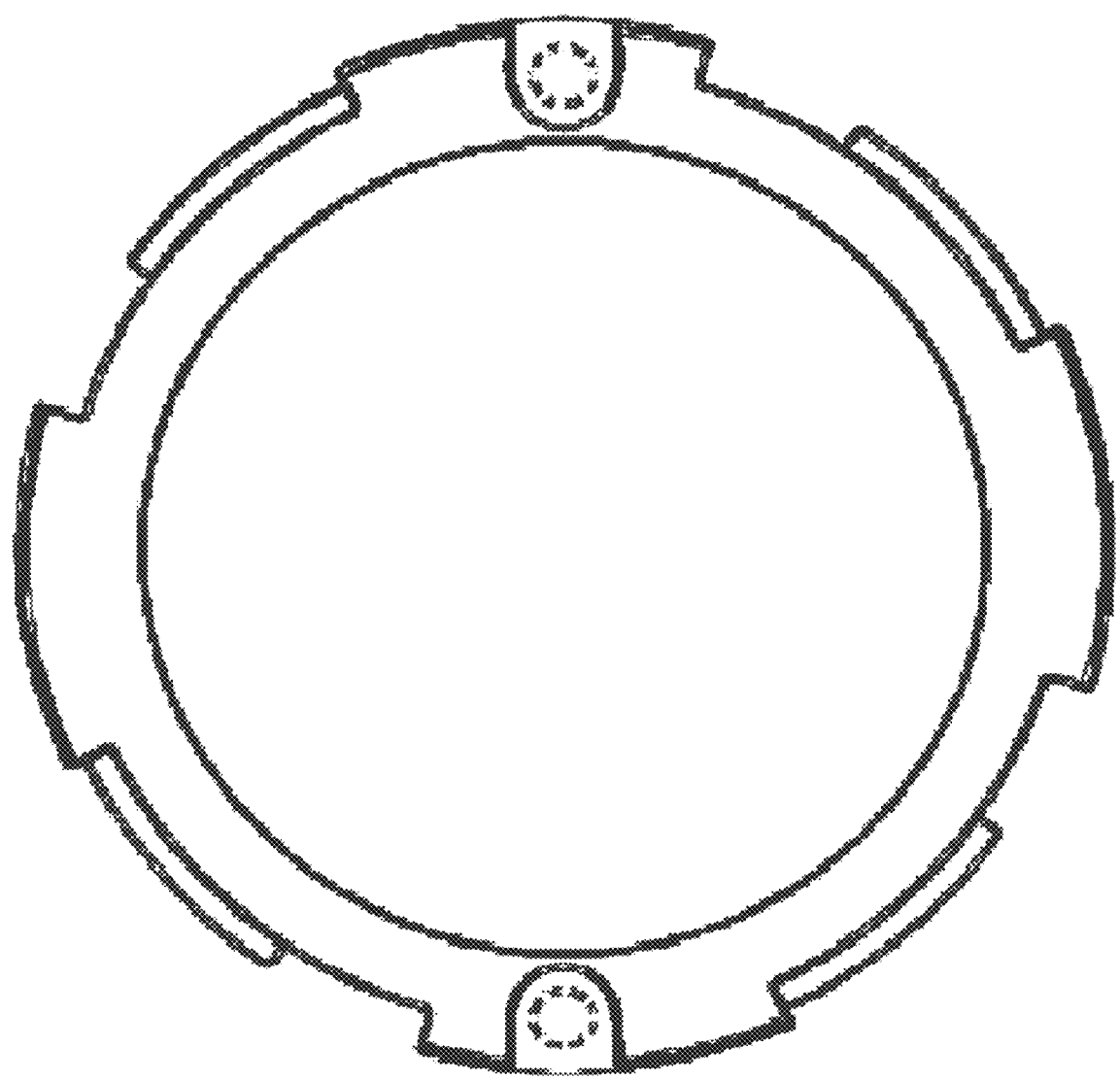
Figure 33E:
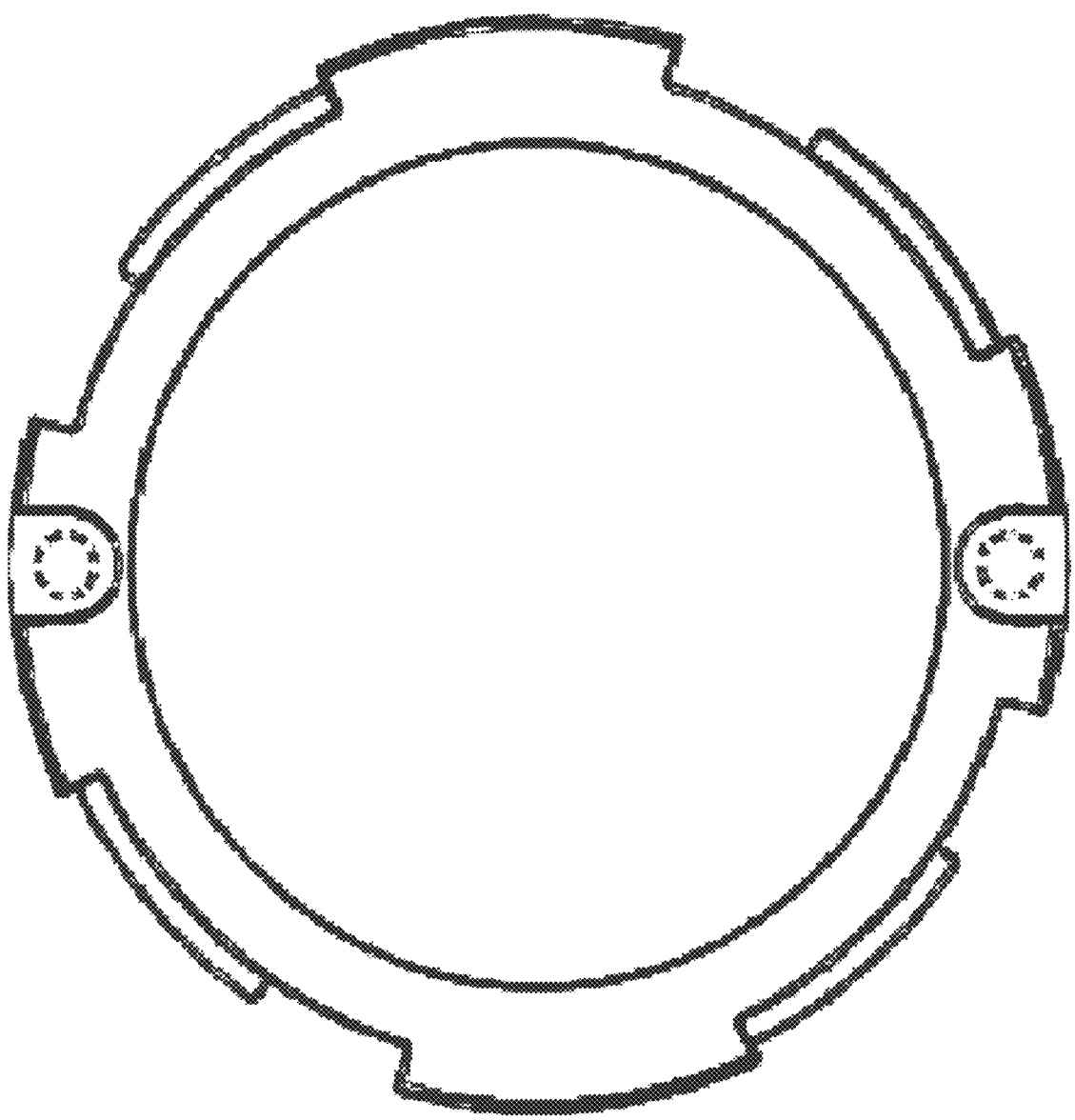
Figure 33F:
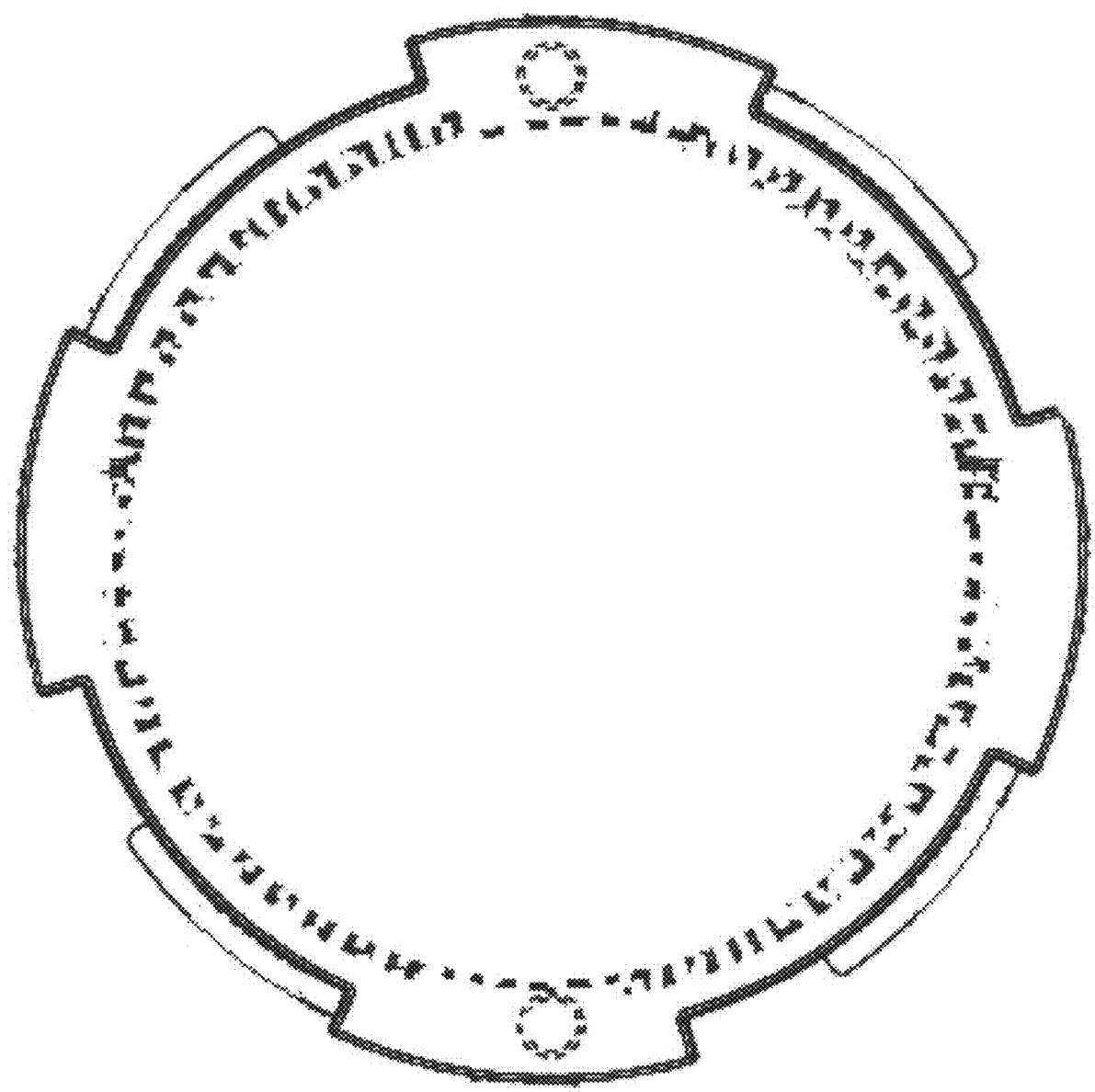
Figure 33G:
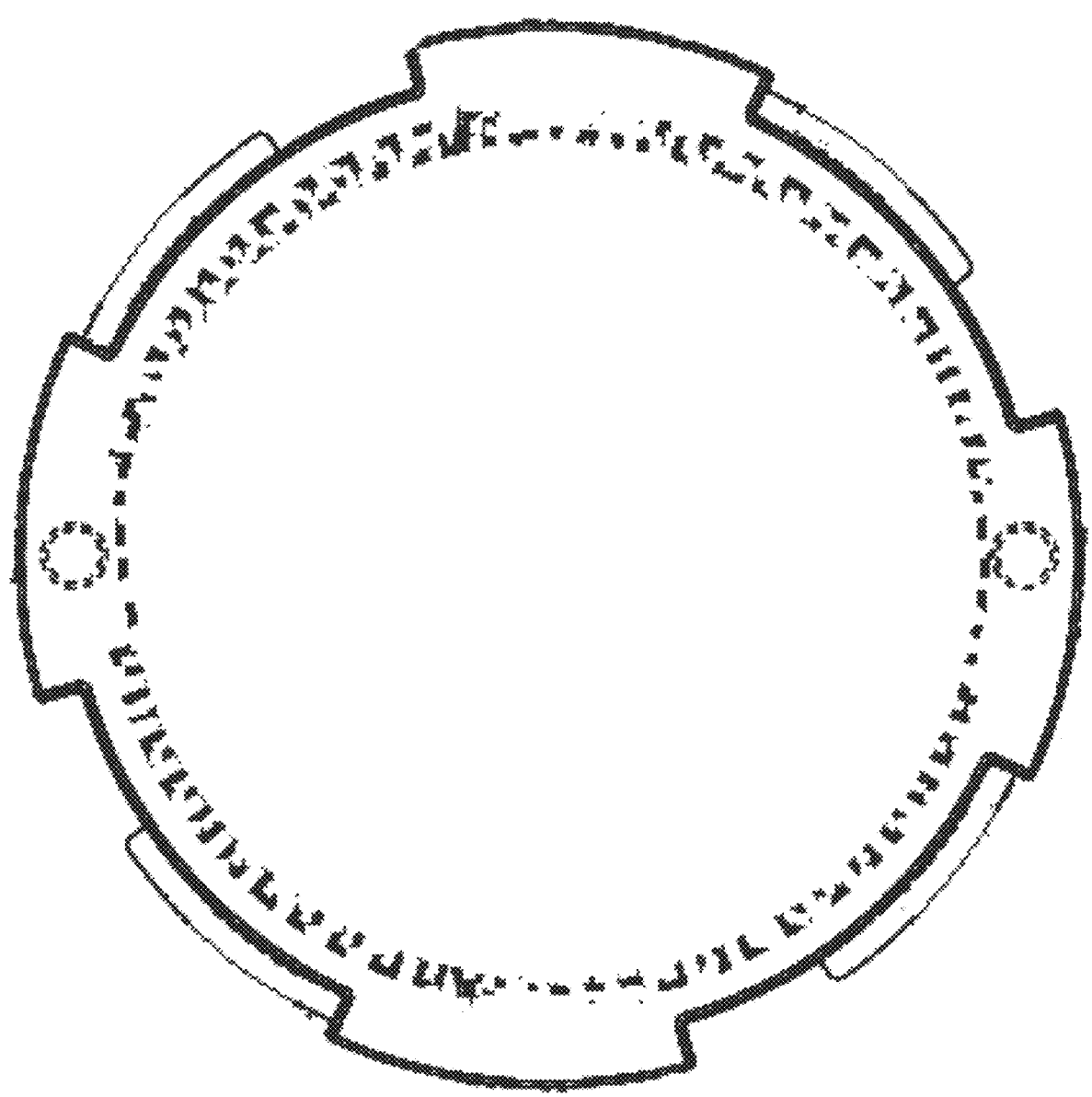
Figure 34A:
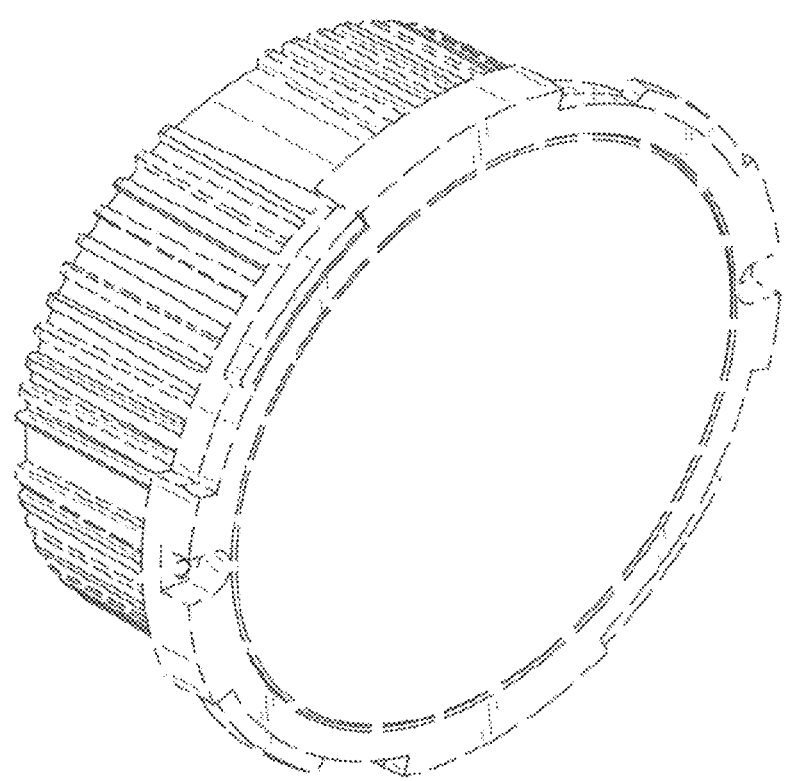
Figure 34B:
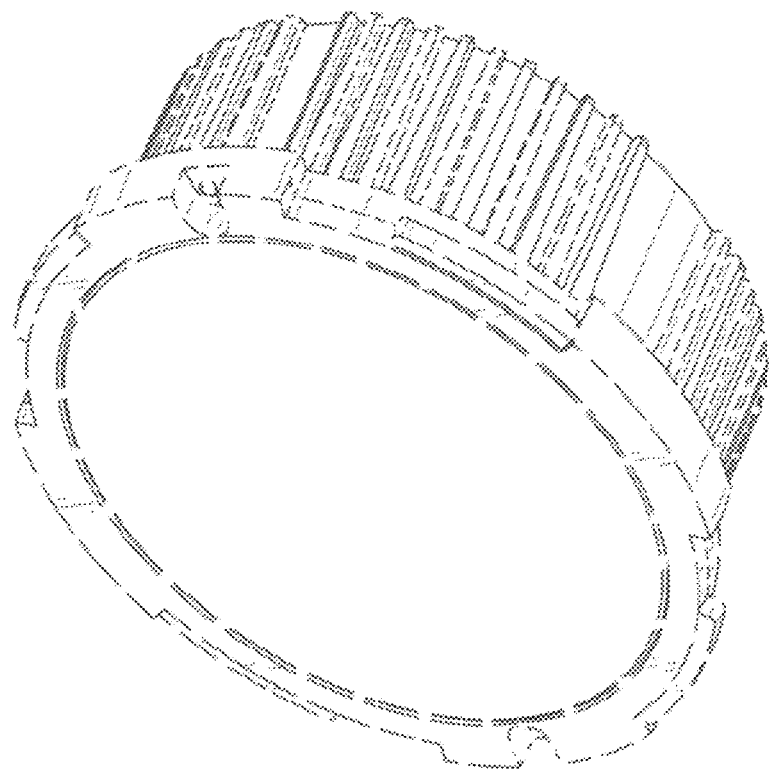
Figure 35A:
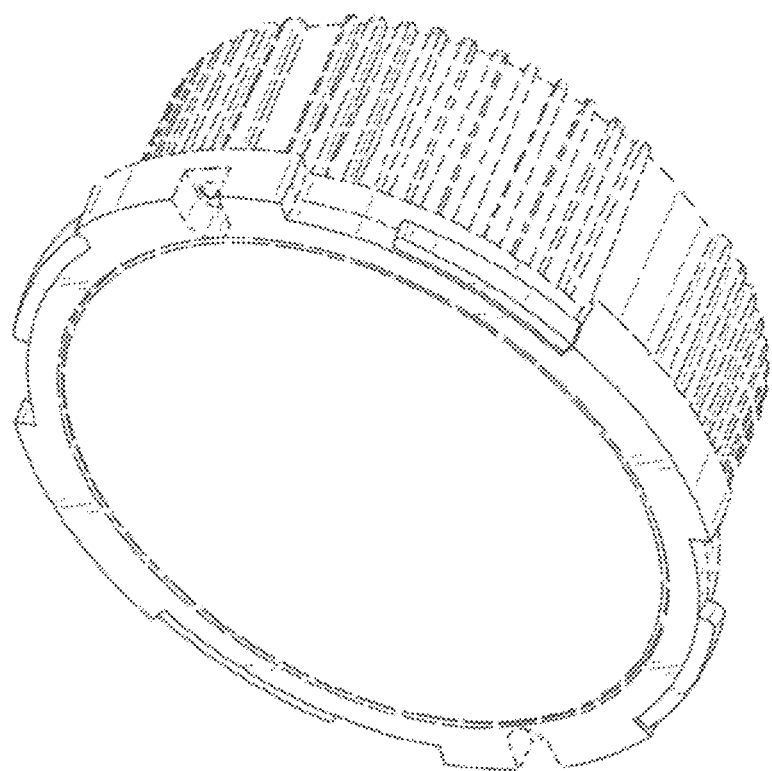
Figure 35B:
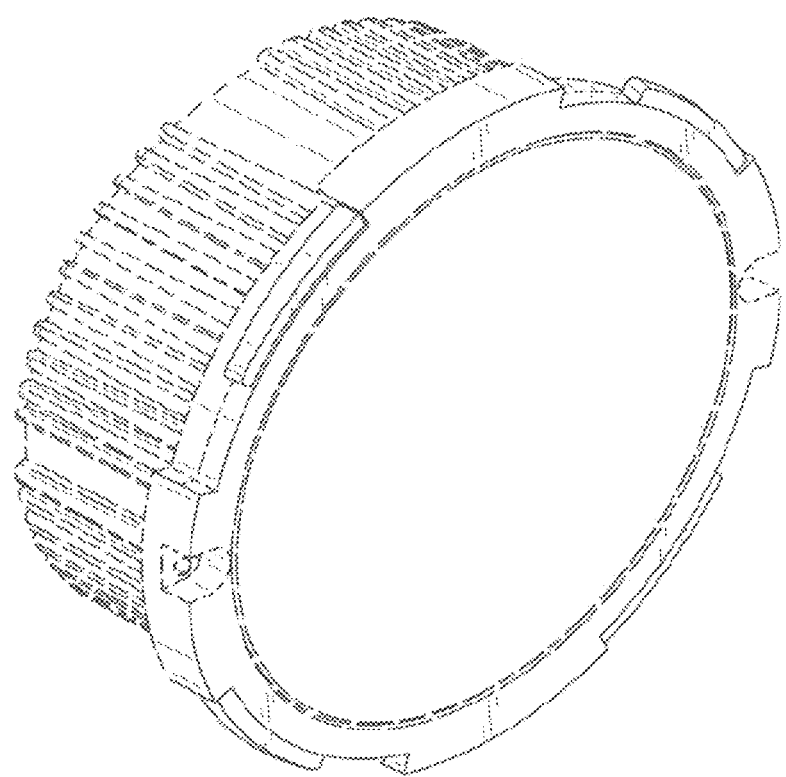

Also shown in FIG. 26A and in the section view of FIG. 28 is another embodiment of the disclosure, where a holding bracket 1003 is added inside the cavity of the casing 1002. A perspective view of the holding bracket 1003 is shown in FIG. 31. The holding bracket 1003 may be a separate piece than the casing 1002, and is coupled to an attaching member

1015 that is fixed in position onto the sidewall 1010. The bracket 1003 may have one or more arms 1017 that extend upward from a frame 1018 that has a frame opening 1019 therein. In a preferred embodiment, there are two arms 1017 that extend upward from the frame 1018, but additional arms 1017 may be provided. The bracket 1003 may be initially formed from a flat sheet of metal, with the frame 1018 and the arms 1017 formed on a same plane. Subsequently, the arms 1017 may be cut out and then bent upward in the same direction. Each arm 1017 may have a slot 1020 running along its length through which a respective attaching member 1015 may be fitted. The attaching member 1015 may be a screw, bolt, pin, rivet or any other structure that is capable of coupling with the arm 1017, by extending through the slot 1020 and being fixed to the sidewall 1010. While so engaged to the attaching member 1015, the arm 1017 of the bracket 1003 is slidable within the cavity 1011, relative to the attaching member 1015 and along its slot 1020. There may be some friction between the slot 1020 and the attaching member 1015 that may prevent the bracket 1003 from freely sliding downward (under the force of gravity alone.) To maintain a desired, and optionally, adjustable, spacing between the arm 1017 and the sidewall, the attaching member 1015 may be threaded so as to receive a corresponding nut (not shown). In that condition, the arm 1017 is held within a desired spacing between the nut and the sidewall 10 of the casing 1002. In one instance, the nut is received on the end of the attaching member 1015 that is located inside the casing 1002.

The holding bracket 1003 may also be described as having multiple arms extending upward from the frame 1018, where the frame 1018 has a border that encloses a frame opening 1019 as shown. The slot 1020 is elongated, and runs along a length dimension of its respective arm 1017. The attaching member 1015 extends from the sidewall 1010 into the cavity 1011 of the casing 1002, while passing through the slot 1020, and is sized so as to couple the arm 1017 to the sidewall 1010 constraining translation of the arm 1017 in the lateral direction but allowing pivoting of the arm 1017 about the attaching member 1015. The arm 1017 has a surface that is facing the sidewall 1010 and that is flat from one end to another end that is joined to the border of the frame 1018. The arm 1017 is slidable along the sidewall 1010 between its innermost position and its outermost position within the cavity, wherein the outermost position of the arm is reached when its sliding is stopped by the attaching member 1015.

Note that use of the bracket 1003 is optional. When the bracket 1003 is used, its frame 1018 may be attached to the light source module 1004, before the trim 1005 is attached to the module 1004. The arms of the bracket 1003 and the slots therein should be long enough to allow the bracket 1003 to slide deeper into the cavity 1011, as needed to raise the trim 1005 so that the brim 1041 can lie flush against the ceiling or wall.

In one embodiment, when the bracket 1003 is at its innermost (or uppermost) position inside the cavity 1011, the bottom of the frame 1018 may be within the range of 1 inch to 2.5 inch above the bottom edge of the sidewall of the casing 1002 (that defines the bottom end opening 1012 of the casing 1002.) In one embodiment, when the bracket 1003 is at its outermost (or lowermost) position, the bottom of the frame 1018 may be in the range of 0 inch to ½ inch below the bottom edge of the sidewall of the casing 1002. Also, when the bracket 1003 is at its outermost position, there may be some play allowing the bracket 1003 to pivot laterally (when the attaching members 1015 are up against the uppermost end of the slots 1020.) The bracket 1003 also functions to prevent the light source module 1004 (and the attached trim 1005) from falling out of the casing 1002, when the bracket has reached its outermost position; the attaching member 1015 in that condition acts as a stop against the sliding arm 1017, by abutting an inner top end of the arm that is defined by the slot.

Figure 30:
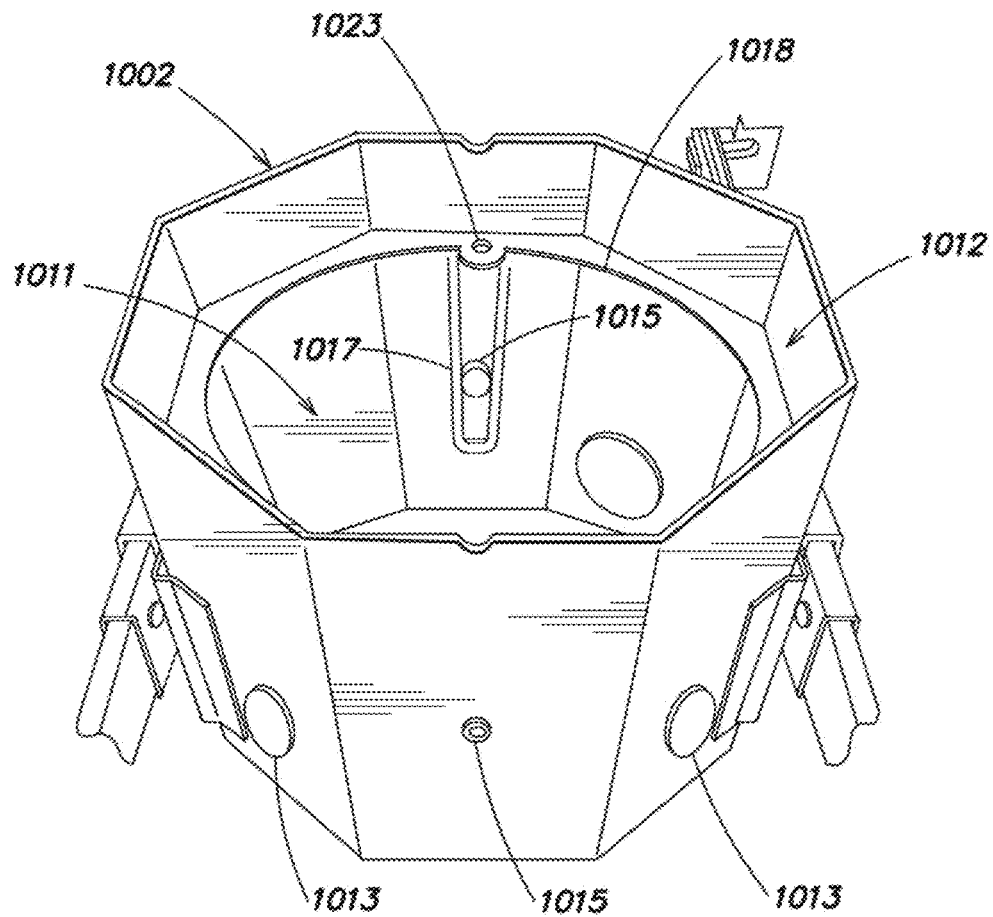
FIG. 30 shows a perspective looking into the cavity of the casing, through the opening.

As seen in FIG. 31, the frame 1018 of the holding bracket 1003 may have an inner edge 1021 that is circular, oval, polygonal or curved. The frame 1018 may have an outer edge 1022 that is circular, oval, polygonal or curved. The outer edge 1022 and the inner edge 1021 may have different contours. In the embodiment shown in FIG. 30 for example, the outer edge 1022 is polygonal while the inner edge 1021 is circular. In a preferred embodiment, the outer edge 1022 has the same number of sides as the casing 1002, and the outer edge 1022 conforms to the shape of the sidewall 1010 of the casing 1002. It is not necessary to have the outer edge 1022 of the frame 1018 that precisely conforms to the shape of the sidewall 1010 of the casing 1002. In one embodiment, the outer edge 1022 may be oval or circular as long as the frame 1018 fits inside the cavity 1011 of the casing 1002.

The frame 1018 is attached to the light source module 1004. As also seen in FIG. 31, the frame 1018 may have an opening 1023 that is configured to receive a corresponding attaching member 1024, such as a screw, bolt, pin, or any other fastener piece that is capable of attaching the light source module 1004 to the frame 1018. As seen in FIG. 29, the light source module 1004 may have a lip 1028 that extends laterally outward from a base of the housing of the module 1004, surrounding the base where the lens 1045 is fitted (and from which light produced by the light source 1031 emerges to illuminate the room below). One or more openings 1029 may be formed on the lip 1028 that correspond to and align with the openings 1023 of the frame 1018, when the housing of the module 1004 has been inserted through the frame opening 1019 of the frame 1018, as depicted in FIG. 27. Once the bottom surface of the frame 1018 abuts the top surface of the lip 1028, a fastener (e.g., the attaching member 1024 depicted in FIG. 26A), can be inserted through both openings and then can be fastened so as to secure the module 1004 to the frame 1018. In the embodiment shown in FIG. 31, there are two openings 1023 formed in the frame 1018 which correspond and align with to the two openings 1029 that are formed in the lip 1028 of the light source module 1004 as seen in FIG. 29; the attachment of course can also be achieved at more than locations (with more than two fasteners).

In one embodiment, the recessed lighting unit 1001 may include a set of hangar bars 1006 as shown in FIG. 26A from which the casing 1002 can be hung. The hangar bars 1006 may be rigid, elongated members that are connected between adjacent joists and/or beams that are behind the walls or ceilings of the building (there may be two, positioned on opposite sides of the casing 1002 as shown). In one embodiment, each of the hangar bars 1006 may be telescoping such that the hangar bar 1006 can be extended or retracted to meet the gap between the joists and/or beams.

In one embodiment, each of the hangar bars 1006 may include mounting blocks 1046 at its ends, which are the points at which the hangar bars 1006 are attached to the joists and/or beams. For example, as shown in FIG. 26A, the mounting blocks 1046 may include holes for receiving screws and/or nails or other fasteners that enable the hangar bars 1006 to be securely attached to a building structure. Although shown in FIG. 26A and described above in relation to holes and screws, in other embodiments, other mechanisms of attachment may be used in conjunction with the mounting blocks 1046, including resins, clips, or clamps to attached the bars 1006 to the building structure. In one embodiment, a mounting block 1046 may be integrated in one indivisible structure along with the hangar bar 1006, while in other embodiments, as shown in FIG. 26A, the mounting blocks 1046 may be coupled to the hangar bars 1006 through the use of one or more attachment mechanisms (e.g., screws, bolts, resins, clips, or clamps). Using the telescoping and mounting features described above, the recessed lighting unit 1001 may be installed in almost all of the typical 2"×2" through 2"×18" wood joist constructions, metal stud constructions, and t-bar ceiling constructions.

Still referring to FIG. 26A, in one embodiment, the recessed lighting unit 1001 may have a mechanism for mounting the casing 1002 to the hangar bars 1006, that includes a set of casing holders 1007 that couple the casing 1002 to the hangar bars 1006. As also seen in FIG. 27, the casing holder 1007 may have a plate portion that conforms to the polygonal shape of the sidewall and is secured to the sidewall 1010 of the casing 1002 by a nut and bolt/screw combination 1049; if a slot is also formed in the sidewall 1010 through which bolt/screw of the combination 1049 passes, then the height of the casing 1002 becomes adjustable relative to the hangar bars 1006. Alternatively, the casing holder 1007 may be attached to the sidewall via a clip, a clamp, a weld, or an adhesive resin. The casing holder 1007 may have another portion that is configured to wrap around but slide (or otherwise move) along the length of its corresponding, elongated hangar bar 1006 (between the ends of the hangar bar 1006.) The casing 1002 may thus be moved along the hangar bars 1006 to a desired location (e.g., at which the lens 1045 of the light source module 1004 will be directly above the opening in the ceiling or wall), and then it may be affixed to the hangar bars 1006 once at the desired location, so that the casing holder 1007 can no longer be moved relative to the hangar bars 1006.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of skill. FIG. 32A to FIG. 35B show views of additional embodiments according to some implementations of recessed lighting modules according to some embodiments of the disclosure. Text and other surface ornamentation may or may not form part of the claimed subject matter. Color and texture may or may not form part of the claimed design. Applicant reserves the right to claim any embodiment, component, part, portion, configuration, element and/or combination thereof of the disclosed innovations, including to replace any solid line with a broken line to disclaim any component, part, portion, element and/or combination thereof of the disclosed design, or to replace any broken line with a solid line to claim any component, part, portion, element and/or combination thereof of the disclosed innovations. It is to be understood that further embodiments of the disclosure can combine one or more features, components, parts, portions, elements, or configurations, shown in one or more figures and/or embodiments with one or more features, components, parts, portions, elements, or configurations, shown in one or more other figures and/or embodiments, if such combination(s) are not mutually inconsistent, and such embodiments are included within the scope of the disclosure. The spaced broken lines are directed to illustrative environment that forms no part of the disclosed innovation(s) and are for illustrative purposes only, and/or represent portions that form no part of the disclosed innovation(s). Thin solid lines illustrate surface contour. Variations in the length, width, and/or height (or width/depth/height) are included within the scope of disclosure. Applicant reserves the right to add surface shading should the Examiner so request. In some figures, broken lines immediately adjacent one or more surfaces (which can later have surface shading added should the Examiner so request) represent the bounds of the design while other broken lines are directed to environment and are for illustrative purposes only. For example, as mentioned above, the light source module 1004 need not be attached to the trim 1005 (such as by a twist and lock mechanism or other attachment mechanism), if the module 1004 is attached to the holding bracket 1003; in that case, the module 1004 can simply be pushed up into the casing 1002, by the user gripping the trim 1005 and aligning it so that the top of the crown 1038 abuts the lip 1028 of the module 1004, and then pushing upward (until the brim 1041 of the trim 1005 abuts the ceiling or wall or other building partition, at which point the friction clips 1042 should have been squeezed between the crown 1038 and the sidewall 1010 (thereby securing the trim 1005 to the casing 1002.) The description is thus to be regarded as illustrative instead of limiting.

All definitions, as defined and used herein, should be understood to control over dictionary definitions, definitions in documents incorporated by reference, and/or ordinary meanings of the defined terms. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for a recessed lighting fixture, the apparatus comprising:
   an outer casing, comprising:
      a cylindrical side wall having a lower edge defining a circular opening and an upper edge, the lower edge having no tabs that extend inward towards a center vertical axis of the outer casing;
      a closed base end joined to the upper edge of the side wall, the side wall and the closed base end together defining a cavity configured to contain at least one light emitting diode (LED), electrical wires from an external power source carrying at least one of 120 VAC or 277 VAC power, and connectors to electrically couple the electrical wires to the at least one LED;
      a first plurality of knockouts disposed on the closed base end, each knockout of the first plurality of knockouts having a circular shape;
      a second plurality of knockouts disposed on the close base end, each knockout of the second plurality of knockouts having a slot; and
      a third plurality of knockouts disposed on the side wall closer to the upper edge than the lower edge,
      wherein the outer casing has a height less than 5 inches;
   a first hangar bar assembly coupled to the side wall of the outer casing, the first hangar bar assembly comprising:
      a first hangar holder having a first vertically oriented slot;
      a first attachment mechanism, inserted through the first vertically oriented slot, to directly couple the first hangar holder to the side wall of the outer casing such that:
         the outer casing is movable with respect to the first hangar holder along a vertical direction;
         lateral movement of the outer casing relative to the first hangar holder is restricted; and
         the outer casing is lockable at any position along the first vertically oriented slot by the first attachment mechanism; and
      a first pair of hangar bars slidably coupled to the first hangar holder such that the first hangar holder and the outer casing are movable relative to the first pair of hangar bars along a horizontal direction, the first pair of hangar bars being telescopically slidable along the horizontal direction, each hangar bar of the first pair of hangar bars comprising:
         an integrally formed mounting block with a hole; and
         a fastener inserted through the hole to directly couple the hangar bar to a joist or a t-bar; and
   a second hangar bar assembly coupled to the side wall of the outer casing opposite to the first hangar bar assembly, the second hangar bar assembly comprising:
      a second hangar holder having a second vertically oriented slot;
      a second attachment mechanism, inserted through the second vertically oriented slot, to directly couple the second hangar holder to the side wall of the outer casing such that:
         the outer casing is movable with respect to the second hangar holder along the vertical direction;
         lateral movement of the outer casing relative to the second hangar holder is restricted; and
         the outer casing is lockable at any position along the second vertically oriented slot by the second attachment mechanism; and
      a second pair of hangar bars slidably coupled to the second hangar holder such that the second hangar holder and the outer casing are movable relative to the second pair of hangar bars along the horizontal direction, the second pair of hangar bars being telescopically slidable along the horizontal direction, each hangar bar of the second pair of hangar bars comprising:
         an integrally formed mounting block with a hole; and
         a fastener inserted through the hole to directly couple the hangar bar to a joist or a t-bar,
   wherein the apparatus does not include a separate junction box.

2. The apparatus of claim 1, further comprising:
the at least one LED disposed in the cavity of the outer casing;
the electrical wires inserted into the cavity of the outer casing through an opening formed by removal of one knockout from the first plurality of knockouts, the second plurality of knockouts, or the third plurality of knockouts; and
the connectors disposed in the cavity of the outer casing.

3. The apparatus of claim 1, wherein the cavity of the outer casing is further configured to contain a driver to receive electrical power from the electrical wires via the connectors and supply the electrical power to the at least one LED.

4. The apparatus of claim 3, further comprising:
the at least one LED disposed in the cavity of the outer casing;
the electrical wires inserted into the cavity of the outer casing through an opening formed by removal of one knockout from the first plurality of knockouts, the second plurality of knockouts, or the third plurality of knockouts;
the connectors disposed in the cavity of the outer casing; and
the driver disposed in the cavity of the outer casing.

5. The apparatus of claim 1, wherein the cavity of the outer casing is further configured to contain a portion of a trim.

6. The apparatus of claim 5, further comprising:
the at least one LED disposed in the cavity of the outer casing;
the electrical wires inserted into the cavity of the outer casing through an opening formed by removal of one knockout from the first plurality of knockouts, the second plurality of knockouts, or the third plurality of knockouts;
the connectors disposed in the cavity of the outer casing; and
the trim partially disposed in the cavity of the outer casing.

7. The apparatus of claim 1, wherein at least one knockout from the first plurality of knockouts, the second plurality of knockouts, or the third plurality of knockouts is configured to allow installation of a non-metallic sheathed cable.

8. The apparatus of claim 1, wherein the outer casing is configured to accommodate a ceiling having a thickness of at least ½ inch.

9. The apparatus of claim 1, wherein the outer casing is formed from steel.

10. The apparatus of claim 1, wherein the outer casing is formed from galvanized steel.

11. The apparatus of claim 1, wherein the outer casing further comprises:
a first notch disposed along the lower edge of the side wall; and
a second notch disposed along the lower edge of the side wall diametrically opposite to the first notch.

12. The apparatus of claim 1, wherein each of the first hangar holder and the second hangar holder includes a portion that conforms to a shape of the side wall.

13. The apparatus of claim 1, wherein the outer casing further comprises:
a pair of fasteners inserted through corresponding openings on the closed base end such that a portion of each fastener protrudes from an exterior surface of the closed base end.

14. The apparatus of claim 1, wherein each of the first attachment mechanism and the second attachment mechanism comprises one of a screw, a bolt, or a bolt/screw combination.

15. The apparatus of claim 14, wherein:
each of the first attachment mechanism and the second attachment mechanism further comprises a nut disposed in the cavity of the outer casing;
the nut of the first attachment mechanism, when tightened on one of the screw, the bolt, or the bolt/screw combination of the first attachment mechanism, locking the outer casing to a first position along the first vertically oriented slot; and
the nut of the second attachment mechanism, when tightened on one of the screw, the bolt, or the bolt/screw combination of the second attachment mechanism, locking the outer casing to a second position along the second vertically oriented slot.

16. The apparatus of claim 1, further comprising:
a holding bracket disposed in the cavity of the outer casing, the holding bracket having a first pair of openings and a second pair of openings;
a first pair of screws, each screw of the first pair of screws being inserted through one opening of the first pair of openings to directly couple the holding bracket to the outer casing; and
a second pair of screws, each screw of the second pair of screws being inserted through one opening of the second pair of openings.

17. An apparatus for a recessed lighting fixture, the apparatus comprising:
an outer casing formed from steel, the outer casing comprising:
a cylindrical side wall having a lower edge defining a circular opening and an upper edge, the lower edge having no tabs that extend inward towards a center vertical axis of the outer casing, the lower edge comprising:
a first notch; and
a second notch disposed diametrically opposite to the first notch;
a closed base end joined to the upper edge of the side wall, the side wall and the closed base end together defining a cavity configured to contain at least one light emitting diode (LED), electrical wires from an external power source carrying at least one of 120 VAC or 277 VAC power, and connectors to electrically couple the electrical wires to the at least one LED;
a first plurality of knockouts disposed on the closed base end, each knockout of the first plurality of knockouts having a circular shape;
a second plurality of knockouts disposed on the close base end, each knockout of the second plurality of knockouts having a slot; and
a third plurality of knockouts disposed on the side wall closer to the upper edge than the lower edge; and
a pair of fasteners inserted through corresponding openings on the closed base end such that a portion of each fastener protrudes from an exterior surface of the closed base end,
wherein the outer casing has a height less than 5 inches;
a first hangar bar assembly coupled to the side wall of the outer casing, the first hangar bar assembly comprising:
a first hangar holder having a first vertically oriented slot and a first portion that conforms to a shape of the side wall;

a first attachment mechanism to directly couple the first hangar holder to the side wall of the outer casing such that:
 the outer casing is movable with respect to the first hangar holder along a vertical direction; and
 lateral movement of the outer casing relative to the first hangar holder is restricted,
the first attachment mechanism comprising:
 a first screw inserted through the first vertically oriented slot; and
 a first nut directly coupled to the first screw and disposed in the cavity of the outer casing, the first nut, when tightened, locking the outer casing to a first position along the first vertically oriented slot; and
a first pair of hangar bars slidably coupled to the first hangar holder such that the first hangar holder and the outer casing are movable relative to the first pair of hangar bars along a horizontal direction, the first pair of hangar bars being telescopically slidable along the horizontal direction, each hangar bar of the first pair of hangar bars comprising:
 an integrally formed mounting block with a hole; and
 a fastener inserted through the hole to directly couple the hangar bar to a joist or a t-bar; and
a second hangar bar assembly coupled to the side wall of the outer casing opposite to the first hangar bar assembly, the second hangar bar assembly comprising:
 a second hangar holder having a second vertically oriented slot and a second portion that conforms to the shape of the side wall;
 a second attachment mechanism to directly couple the second hangar holder to the side wall of the outer casing such that:
  the outer casing is movable with respect to the second hangar holder along the vertical direction; and
  lateral movement of the outer casing relative to the second hangar holder is restricted,
 the second attachment mechanism comprising:
  a second screw inserted through the second vertically oriented slot; and
  a second nut directly coupled to the second screw and disposed in the cavity of the outer casing, the second nut, when tightened, locking the outer casing to a second position along the second vertically oriented slot; and
 a second pair of hangar bars slidably coupled to the second hangar holder such that the second hangar holder and the outer casing are movable relative to the second pair of hangar bars along the horizontal direction, the second pair of hangar bars being telescopically slidable along the horizontal direction, each hangar bar of the second pair of hangar bars comprising:
  an integrally formed mounting block with a hole; and
  a fastener inserted through the hole to directly couple the hangar bar to a joist or a t-bar,
wherein the apparatus does not include a separate junction box.

18. The apparatus of claim 17, further comprising:
the at least one LED disposed in the cavity of the outer casing;
the electrical wires inserted into the cavity of the outer casing through an opening formed by removal of one knockout from the first plurality of knockouts, the second plurality of knockouts, or the third plurality of knockouts; and
the connectors disposed in the cavity of the outer casing.

19. The apparatus of claim 17, wherein the cavity of the outer casing is further configured to contain a driver to receive electrical power from the electrical wires via the connectors and supply the electrical power to the at least one LED.

20. The apparatus of claim 19, further comprising:
the at least one LED disposed in the cavity of the outer casing;
the electrical wires inserted into the cavity of the outer casing through an opening formed by removal of one knockout from the first plurality of knockouts, the second plurality of knockouts, or the third plurality of knockouts;
the connectors disposed in the cavity of the outer casing; and
the driver disposed in the cavity of the outer casing.

* * * * *